US011935663B2

(12) United States Patent
Singh et al.

(10) Patent No.: US 11,935,663 B2
(45) **Date of Patent: *Mar. 19, 2024**

(54) CONTROL ROD DRIVE SYSTEM FOR NUCLEAR REACTOR

(71) Applicant: SMR Inventec, LLC, Camden, NJ (US)

(72) Inventors: Krishna P. Singh, Jupiter, FL (US); Patrick Ingravallo, Mount Laurel, NJ (US); Leyland Vann, Carney's Point, NJ (US)

(73) Assignee: SMR Inventec, LLC

(*) Notice: Subject to any disclaimer, the term of this patent is extended or adjusted under 35 U.S.C. 154(b) by 531 days.

This patent is subject to a terminal disclaimer.

(21) Appl. No.: 17/081,753

(22) Filed: Oct. 27, 2020

(65) Prior Publication Data

US 2021/0210221 A1 Jul. 8, 2021

Related U.S. Application Data

(60) Continuation-in-part of application No. 15/822,704, filed on Nov. 27, 2017, now Pat. No. 10,923,239, (Continued)

(51) Int. Cl.
*G21C 7/12* (2006.01)
*G21C 7/10* (2006.01)

(Continued)

(52) U.S. Cl.
CPC ................. *G21C 7/12* (2013.01); *G21C 7/10* (2013.01); *G21C 7/117* (2013.01); *G21C 9/004* (2013.01);

(Continued)

(58) Field of Classification Search
CPC . G21C 7/12; G21C 7/10; G21C 7/117; G21C 19/10; G21C 7/14

(Continued)

(56) References Cited

U.S. PATENT DOCUMENTS 2,399,714 A 5/1946 Wasilewski
2,873,242 A 2/1959 Treshow (Continued)

FOREIGN PATENT DOCUMENTS

CN 87106445 4/1988
CN 101836262 9/2010

(Continued)

OTHER PUBLICATIONS

U.S. Appl. No. 16/883,592, filed May 26, 2020.

(Continued)

*Primary Examiner* — Jack W Keith
*Assistant Examiner* — Daniel Wasil
(74) *Attorney, Agent, or Firm* — The Belles Group, P.C.

(57) ABSTRACT

A control rod drive system (CRDS) for use in a nuclear reactor. In one embodiment, the system generally includes a drive rod mechanically coupled to a control rod drive mechanism (CRDM) operable to linearly raise and lower the drive rod along a vertical axis, a rod cluster control assembly (RCCA) comprising a plurality of control rods insertable into a nuclear fuel core, and a drive rod extension (DRE) releasably coupled at opposing ends to the drive rod and RCCA. The CRDM includes an electromagnet which operates to couple the CRDM to DRE. In the event of a power loss or SCRAM, the CRDM may be configured to remotely uncouple the RCCA from the DRE without releasing or dropping the drive rod which remains engaged with the CRDM and in position.

19 Claims, 102 Drawing Sheets

Related U.S. Application Data which is a continuation of application No. 14/413,807, filed as application No. PCT/US2013/049722 on Jul. 9, 2013, now Pat. No. 9,865,363, application No. 17/081,753 is a continuation-in-part of application No. 16/744,144, filed on Jan. 15, 2020, now Pat. No. 11,094,421, which is a continuation of application No. 16/406,852, filed on May 8, 2019, now Pat. No. 10,573,418, which is a continuation of application No. 15/288,436, filed on Oct. 7, 2016, now Pat. No. 10,573,419, which is a continuation of application No. 14/417,628, filed as application No. PCT/US2013/053644 on Aug. 5, 2013, now Pat. No. 9,496,057, application No. 17/081,753 is a continuation-in-part of application No. 16/139,043, filed on Sep. 23, 2018, now abandoned, which is a continuation of application No. 14/433,394, filed as application No. PCT/US2013/063405 on Oct. 4, 2013, now Pat. No. 10,115,487, which is a continuation-in-part of application No. 14/620,390, filed on Feb. 12, 2015, now Pat. No. 10,102,936, which is a continuation-in-part of application No. PCT/US2013/054961, filed on Aug. 14, 2013, application No. 17/081,753 is a continuation-in-part of application No. 16/695,102, filed on Nov. 25, 2019, now Pat. No. 11,289,219, which is a continuation of application No. 15/715,631, filed on Sep. 26, 2017, now Pat. No. 10,580,539, which is a division of application No. 14/771,018, filed as application No. PCT/US2014/019042 on Feb. 27, 2014, now Pat. No. 9,773,576, application No. 17/081,753 is a continuation-in-part of application No. 16/883,592, filed on May 26, 2020, now abandoned, which is a continuation of application No. 15/901,249, filed on Feb. 21, 2018, now Pat. No. 10,665,354, which is a continuation of application No. 14/289,545, filed on May 28, 2014, now Pat. No. 10,096,389, which is a continuation-in-part of application No. PCT/US2013/042070, filed on May 21, 2013.

(60) Provisional application No. 61/669,428, filed on Jul. 9, 2012, provisional application No. 61/680,133, filed on Aug. 6, 2012, provisional application No. 61/709,436, filed on Oct. 4, 2012, provisional application No. 61/770,213, filed on Feb. 27, 2013, provisional application No. 61/828,017, filed on May 28, 2013, provisional application No. 61/649,593, filed on May 21, 2012.

(51) Int. Cl.

| | |
|---|---|
| ***G21C 7/117*** | (2006.01) |
| *G21C 9/004* | (2006.01) |
| *G21C 13/02* | (2006.01) |
| *G21C 15/12* | (2006.01) |
| *G21C 15/18* | (2006.01) |
| *G21C 19/10* | (2006.01) |
| *G21D 1/00* | (2006.01) |

(52) U.S. Cl.
CPC ............ *G21C 13/02* (2013.01); *G21C 15/12* (2013.01); *G21C 15/18* (2013.01); *G21C 19/10* (2013.01); *G21D 1/00* (2013.01); *G21D 1/006* (2013.01); *Y02E 30/30* (2013.01)

(58) Field of Classification Search
USPC ................................ 376/219, 224, 228, 233
See application file for complete search history.

(56) References Cited

U.S. PATENT DOCUMENTS

| | | | | |
|---|---|---|---|---|
| 2,890,009 A | | 6/1959 | Chapellier | |
| 3,121,045 A | | 2/1964 | Harris et al. | |
| 3,124,514 A | | 3/1964 | Koutz et al. | |
| 3,146,173 A | | 8/1964 | Fortescue et al. | |
| 3,149,043 A | | 9/1964 | Goldstein et al. | |
| 3,198,709 A | | 8/1965 | Macomber | |
| 3,212,980 A | * | 10/1965 | Kmonk | G21C 7/12 376/233 |
| 3,244,598 A | | 4/1966 | Rose et al. | |
| 3,320,969 A | | 5/1967 | Gordon | |
| 3,367,839 A | | 2/1968 | Leopoldo | |
| 3,489,206 A | | 1/1970 | Lecourt | |
| 3,563,855 A | | 2/1971 | Marko | |
| 3,575,807 A | | 4/1971 | Ripley | |
| 3,597,939 A | * | 8/1971 | Ripley | G21C 7/10 376/233 |
| 3,640,844 A | | 2/1972 | Shank | |
| 3,718,539 A | | 2/1973 | West et al. | |
| 3,785,924 A | | 1/1974 | Notari | |
| 3,849,257 A | | 11/1974 | Bevilacqua | |
| 3,852,153 A | | 12/1974 | Maslenok et al. | |
| 3,855,061 A | | 12/1974 | Triggiani et al. | |
| 3,857,599 A | | 12/1974 | Jones et al. | |
| 3,888,730 A | | 6/1975 | Jackson | |
| 3,920,513 A | | 11/1975 | Loose et al. | |
| 3,923,596 A | | 12/1975 | Leonard, Jr. | |
| 3,929,567 A | | 12/1975 | Schabert et al. | |
| 3,939,804 A | | 2/1976 | Barratt | |
| 3,952,885 A | | 4/1976 | Schabert et al. | |
| 4,039,377 A | | 8/1977 | Andrieu et al. | |
| 4,045,283 A | | 8/1977 | Noyes et al. | |
| 4,073,685 A | | 2/1978 | Brown et al. | |
| 4,080,256 A | | 3/1978 | Braun et al. | |
| 4,134,789 A | | 1/1979 | Aubert | |
| 4,163,470 A | | 8/1979 | Johnsen et al. | |
| 4,175,005 A | | 11/1979 | Harstead | |
| 4,187,146 A | | 2/1980 | Shen et al. | |
| 4,236,970 A | | 12/1980 | Harand et al. | |
| 4,278,500 A | | 7/1981 | Ailloud et al. | |
| 4,280,796 A | | 7/1981 | Reinsch | |
| 4,478,784 A | | 10/1984 | Burelbach | |
| 4,508,677 A | | 4/1985 | Craig et al. | |
| 4,573,725 A | | 3/1986 | Griffiths | |
| 4,637,914 A | | 1/1987 | Boyle et al. | |
| 4,656,335 A | | 4/1987 | Durrant et al. | |
| 4,678,626 A | | 7/1987 | Germer | |
| 4,695,425 A | | 9/1987 | Aoyama et al. | |
| 4,699,754 A | | 10/1987 | French | |
| 4,702,881 A | | 10/1987 | Weiland et al. | |
| 4,731,220 A | | 3/1988 | Kim, Jr. | |
| 4,747,993 A | | 5/1988 | Hankinson et al. | |
| 4,752,439 A | | 6/1988 | Elter et al. | |
| 4,765,946 A | | 8/1988 | Dagard et al. | |
| 4,812,286 A | | 3/1989 | Gluntz | |
| 4,849,162 A | | 7/1989 | Garner et al. | |
| 4,941,159 A | | 7/1990 | Schwirian et al. | |
| 5,011,652 A | | 4/1991 | Tominaga et al. | |
| 5,043,135 A | | 8/1991 | Hunsbedt et al. | |
| 5,049,353 A | | 9/1991 | Conway et al. | |
| 5,075,075 A | | 12/1991 | Kapil | |
| 5,087,408 A | | 2/1992 | Tominaga et al. | |
| 5,087,409 A | | 2/1992 | Wedellsborg et al. | |
| 5,091,143 A | | 2/1992 | Tate et al. | |
| 5,096,659 A | | 3/1992 | Hidaka et al. | |
| 5,154,877 A | | 10/1992 | Schultz et al. | |
| 5,176,877 A | | 1/1993 | Nakajima et al. | |
| 5,202,083 A | | 4/1993 | Spinks et al. | |
| 5,217,682 A | | 6/1993 | Spinks | |
| 5,272,737 A | | 12/1993 | Fujii et al. | |
| 5,282,230 A | | 1/1994 | Billig et al. | |
| 5,319,692 A | | 6/1994 | Hopkins et al. | |
| 5,343,507 A | | 8/1994 | Arnold et al. | |
| 5,345,481 A | | 9/1994 | Oosterkamp | |
| 5,345,482 A | | 9/1994 | Conway et al. | |
| 5,349,616 A | | 9/1994 | Nakayama et al. | |

(56) References Cited

U.S. PATENT DOCUMENTS

| | | | |
|---|---|---|---|
| 5,359,634 | A | 10/1994 | Johannesson |
| 5,426,681 | A | 6/1995 | Aburomia |
| 5,442,668 | A | 8/1995 | Todreas et al. |
| 5,443,802 | A | 8/1995 | Freedman et al. |
| 5,491,731 | A | 2/1996 | Corpora et al. |
| 5,499,277 | A | 3/1996 | Hunsbedt |
| 5,612,982 | A | 3/1997 | Woodcock et al. |
| 5,642,389 | A | 6/1997 | Mattern et al. |
| 5,706,319 | A | 1/1998 | Holtz |
| 5,737,379 | A | 4/1998 | Erbes |
| 5,963,611 | A | 10/1999 | Narabayashi et al. |
| 5,999,583 | A | 12/1999 | Pysnik et al. |
| 6,009,137 | A | 12/1999 | Matsumoto et al. |
| 6,064,710 | A | 5/2000 | Singh |
| 6,264,203 | B1 | 7/2001 | Weems et al. |
| 6,718,001 | B2 | 4/2004 | Hidaka et al. |
| 7,139,352 | B2 | 11/2006 | Nishiguchi et al. |
| 7,873,138 | B2 | 1/2011 | Nakajima et al. |
| 8,687,759 | B2 | 4/2014 | Reyes, Jr. et al. |
| 8,721,982 | B2 | 5/2014 | Yamazumi et al. |
| 9,496,057 | B2 | 11/2016 | Singh et al. |
| 9,773,576 | B2 | 9/2017 | Singh et al. |
| 9,865,363 | B2 | 1/2018 | Singh et al. |
| 10,096,389 | B2 | 10/2018 | Singh et al. |
| 10,102,936 | B2 | 10/2018 | Singh et al. |
| 10,115,487 | B2 | 10/2018 | Singh et al. |
| 10,573,418 | B2 | 2/2020 | Singh et al. |
| 10,573,419 | B2 | 2/2020 | Singh et al. |
| 10,580,539 | B2 | 3/2020 | Singh et al. |
| 10,665,354 | B2 | 5/2020 | Singh et al. |
| 10,923,239 | B2 | 2/2021 | Singh et al. |
| 11,094,421 | B2 | 8/2021 | Singh et al. |
| 2002/0044623 | A1 | 4/2002 | Manabe et al. |
| 2002/0101951 | A1 | 8/2002 | Nakamaru et al. |
| 2003/0123600 | A1 | 7/2003 | Hesketh et al. |
| 2005/0018806 | A1 | 1/2005 | Gautier et al. |
| 2009/0129531 | A1 | 5/2009 | Reyes, Jr. et al. |
| 2009/0129532 | A1 | 5/2009 | Reyes, Jr. et al. |
| 2009/0323884 | A1 | 12/2009 | Sato et al. |
| 2010/0183113 | A1 | 7/2010 | Ishida et al. |
| 2010/0260302 | A1 | 10/2010 | Pelisson |
| 2010/0272225 | A1 | 10/2010 | Singh |
| 2010/0316177 | A1 | 12/2010 | Stambaugh et al. |
| 2011/0158371 | A1 | 6/2011 | Sato et al. |
| 2011/0222640 | A1 | 9/2011 | DeSantis |
| 2011/0299648 | A1 | 12/2011 | Tylman |
| 2011/0314858 | A1 | 12/2011 | Tahara et al. |
| 2012/0076254 | A1 | 3/2012 | Malloy et al. |
| 2012/0076255 | A1 | 3/2012 | Jain et al. |
| 2012/0121056 | A1 | 5/2012 | Sato et al. |
| 2012/0207260 | A1 | 8/2012 | Houghton et al. |
| 2013/0051511 | A1 | 2/2013 | Watson et al. |
| 2013/0272473 | A1 | 10/2013 | Koestner |
| 2013/0272474 | A1 | 10/2013 | Conway et al. |
| 2014/0140463 | A1 | 5/2014 | Walton et al. |
| 2015/0113988 | A1 | 4/2015 | Ichinose et al. |

FOREIGN PATENT DOCUMENTS

| | | |
|---|---|---|
| CN | 101884073 | 11/2010 |
| CN | 102194533 | 9/2011 |
| CN | 202549316 | 11/2012 |
| CN | 102867550 | 1/2013 |
| CN | 102903404 | 1/2013 |
| CN | 103000233 | 3/2013 |
| CN | 202948738 | 5/2013 |
| DE | 2642352 | 3/1978 |
| DE | 3517632 | 11/1986 |
| DE | 19703441 | 8/1998 |
| EP | 0232186 | 4/1991 |
| EP | 0528672 | 2/1993 |
| EP | 0734028 | 9/1996 |
| GB | 949608 | 2/1964 |
| GB | 1414286 | 11/1975 |
| JP | 59029871 | 2/1984 |
| JP | S62187291 | 8/1987 |
| JP | S63217296 | 9/1988 |
| JP | H02176496 | 7/1990 |
| JP | H02296196 | 12/1990 |
| JP | H03018793 | 1/1991 |
| JP | 03039692 | 2/1991 |
| JP | H04125495 | 4/1992 |
| JP | H05087967 | 4/1993 |
| JP | H07-181279 | 7/1995 |
| JP | H07198885 | 8/1995 |
| JP | H10-90468 | 4/1998 |
| JP | 2004245763 | 9/2004 |
| JP | 3601188 | 12/2004 |
| JP | 2006510117 | 3/2006 |
| JP | 2006138744 | 6/2006 |
| JP | 2007297854 | 11/2007 |
| JP | 2008134102 | 6/2008 |
| JP | 2009150846 | 7/2009 |
| JP | 2010203858 | 9/2010 |
| JP | 2010236885 | 10/2010 |
| JP | 2011501811 | 1/2011 |
| JP | 2011503614 | 1/2011 |
| JP | 2011232179 | 11/2011 |
| JP | 2012198168 | 10/2012 |
| RU | 2073920 | 2/1997 |
| RU | 2271585 | 3/2006 |
| WO | WO9954886 | 10/1999 |
| WO | WO2009/064654 | 5/2009 |
| WO | WO2012/047473 | 4/2012 |
| WO | WO2013/177196 | 11/2013 |
| WO | WO2014/025700 | 2/2014 |

OTHER PUBLICATIONS

U.S. Appl. No. 16/744,144, filed Jan. 15, 2020.
U.S. Appl. No. 16/695,102, filed Nov. 25, 2019.
U.S. Appl. No. 16/406,852, filed May 8, 2019.
U.S. Appl. No. 16/139,043, filed Sep. 23, 2018.
U.S. Appl. No. 15/901,249, filed Feb. 21, 2018.
U.S. Appl. No. 15/822,704, filed Nov. 27, 2017.
U.S. Appl. No. 15/715,631, filed Sep. 26, 2017.
U.S. Appl. No. 15/288,436, filed Oct. 7, 2016.
U.S. Appl. No. 14/771,018, filed Aug. 27, 2015.
U.S. Appl. No. 14/433,394, filed Apr. 3, 2015.
U.S. Appl. No. 14/620,390, filed Feb. 12, 2015.
U.S. Appl. No. 14/417,628, filed Jan. 27, 2015.
U.S. Appl. No. 14/413,807, filed Jan. 9, 2015.
U.S. Appl. No. 14/289,545, filed May 28, 2014.
Chung, Young-Jong, et al. "Passive cooldown performance of a 65 MW integral reactor." Nuclear Engineering and Design238.7 (2008): 1681-1689.
Kris Singh et al: "On the Thermal-Hydraulic Essentials of the Holtec Inherently Safe Modular Underground Reactor (HI-SMUR) System", ASME 2011 Small Modular Reactors Symposium, Jan. 1, 2011, pp. 95-106.
Ito, T. et al. Development of an Advance Startup-Procedure for a Pius-type Reactor. Journal of Nuclear Science and Technology, vol. 35, No. 8., Mar. 15, 2012, pp. 554-563 [Online].
IAEA, Passive Safety Systems and Natural Circulation in Water Cooled Nuclear Power Plants, Nov. 2009 (Nov. 2009).
Kusunoki, Design of advanced integral-type marine reactor, MRX: Nuclear Engineering and Design 201, No. 2-3 (2000): 155-175.
Uchiyama, "World's first all-in-one-piece extraction and replacement work of PWR reactor internals," Mitsubishi Heavy Industries, Ltd. Technical Review 43, No. 1 (2006).
Stanculescu, A., ed. Thorium uel Utilization: options and trends. (2002) IAEA-TECDOC-1319.

* cited by examiner

Decay Heat Curve

CONTROL ROD DRIVE SYSTEM FOR NUCLEAR REACTOR

CROSS-REFERENCE TO RELATED PATENT APPLICATIONS

The present application is a continuation-in-part of U.S. patent application Ser. No. 15/822,704 filed Nov. 27, 2017, which is a continuation of U.S. patent application Ser. No. 14/413,807 filed Jan. 9, 2015, which is a U.S. national stage application under 35 U.S.C. § 371 of PCT Application No. PCT/US2013/049722 filed Jul. 9, 2013, which claims the benefit of U.S. Provisional Patent Application No. 61/669,428 filed Jul. 9, 2012; the entireties of which are incorporated herein by reference.

The present application is also continuation-in-part of U.S. patent application Ser. No. 16/744,144 filed Jan. 15, 2020, which is a continuation of U.S. patent application Ser. No. 16/406,852 filed May 8, 2019, which is a continuation of U.S. patent application Ser. No. 15/288,436 filed Oct. 7, 2016, which is a continuation of U.S. patent application Ser. No. 14/417,628 filed Jan. 27, 2015, which claims priority as a national stage application, under 35 U.S.C. § 371, to international application No. PCT/US2013/053644, filed Aug. 5, 2013, which claims the benefit of U.S. Provisional Patent Application Ser. No. 61/680,133, filed Aug. 6, 2012. The disclosures of the aforementioned priority applications are incorporated herein by reference in their entireties.

The present application is also a continuation-in-part of U.S. patent application Ser. No. 16/139,043 filed Sep. 23, 2018, which is a continuation of U.S. patent application Ser. No. 14/433,394 filed Apr. 3, 2015, which is a continuation-in-part of U.S. patent application Ser. No. 14/620,390 filed Feb. 12, 2015, and is a 371 National Stage entry of PCT International Patent Application No. PCT/US2013/063405 filed Oct. 4, 2013, which is a continuation-in-part of PCT International Patent Application No. PCT/US2013/054961 filed Aug. 14, 2013, and claims the benefit of U.S. Provisional Patent Application Ser. No. 61/709,436 filed Oct. 4, 2012. U.S. patent application Ser. No. 14/620,390 filed Feb. 12, 2015 is a continuation-in-part of PCT International Patent Application No. PCT/US2013/054961 filed Aug. 14, 2013, which claims priority to U.S. Provisional Patent Application Ser. No. 61/683,021, filed Aug. 14, 2012; the entireties of which are all incorporated herein by reference.

The present application is also a continuation-in-part of U.S. patent application Ser. No. 16/695,102 filed Nov. 25, 2019, which is a continuation of U.S. patent application Ser. No. 15/715,631 filed Sep. 26, 2017, which is a divisional of U.S. patent application Ser. No. 14/771,018 filed Aug. 27, 2015, which is a U.S. national stage application under 35 U.S.C. § 371 of International Patent Application No. PCT/US2014/019042 filed Feb. 27, 2014, which claims the benefit of U.S. Provisional Patent Application Serial No. U.S. 61/770,213 filed Feb. 27, 2013; the entireties of which are all incorporated herein by reference.

The present application is also a continuation-in-part of U.S. patent application Ser. No. 16/883,592 filed May 26, 2020, which is a continuation of U.S. patent application Ser. No. 15/901,249 filed Feb. 21, 2018, which is a continuation of U.S. patent application Ser. No. 14/289,545 filed May 28, 2014 (now U.S. Pat. No. 10,096,389), which claims the benefit of U.S. Provisional Patent Application No. 61/828,017 filed May 28, 2013. U.S. patent application Ser. No. 14/289,545 is further a continuation-in-part of International Patent Application No. PCT/US2013/042070 filed May 21, 2013, which claims of benefit of U.S. Provisional Patent Application No. 61/649,593 filed May 21, 2012. The entireties of the foregoing application are incorporated herein by reference.

BACKGROUND OF THE INVENTION

The present invention in one aspect relates generally to nuclear reactors and methods and apparatus of fueling and defueling the same, and more specifically to an optimized arrangement of fuel assemblies in a nuclear reactor core and/or a portable nuclear fuel cartridge.

A typical nuclear reactor core in a light water reactor comprises tightly packed "nuclear fuel assemblies" (also referred to as nuclear fuel bundles) of square cross section. Each nuclear fuel assembly is an assemblage of multiple "nuclear fuel rods" which are sealed hollow cylindrical metal tubes (e.g. stainless steel or zirconium alloy) packed with enriched uranium fuel pellets and integral burnable poisons arranged in an engineered pattern to facilitate as uniform a burning profile of the nuclear fuel assembly (in both the axial and cross sectional/transverse directions) as possible. Heretofore, in prior systems, each of the nuclear fuel assemblies are handled individually and loaded/unloaded from the stationary nuclear reactor located inside the reactor vessel one at a time, which has proved to be a cumbersome and time consuming process. Periodically, spent nuclear fuel assemblies are removed and unloaded on a piecemeal basis from the nuclear reactor core, which are then placed in a spent fuel pool for temporary storage. These spent nuclear fuel assemblies are later moved from the spent fuel pool to a fuel storage facility using transport canisters (such as multi-purpose canisters) and/or casks. New nuclear fuel assemblies are then inserted and loaded on a piecemeal basis into the nuclear reactor core. As can be imagined, this process requires lengthy unit refueling outages to complete all of the necessary nuclear fuel assembly replacements.

The leakage of neutrons from the periphery of the fuel core is minimized by a so-called "reflector," which, as its name implies, serves to reflect the outgoing neutrons back towards the core. The reflector girdles the core, minimizing its physical space with the peripheral fuel assemblies. The square shaped fuel assemblies however, are not conducive to making efficient use of all available space within the core circumscribed by the reflector leaving unused regions between the core and reflector.

In view of the above, an improved reactor core is desirable. Additionally, improved apparatus and methods for fueling and/or defueling nuclear reactors are also desirable.

The present invention in another aspect relates to control rod drive systems for nuclear reactors, and more particularly to a fail-safe control rod drive system.

A rod cluster control assembly (RCCA) comprises an array of tubular elements ("control rods") containing neutron absorber "poison" connected to a common support header for raising and lowering the control rod array as a unit. The control rods in an RCCA are arrayed at a precise spacing, which ensures each rod is perfectly aligned with respective circular cavities in the fuel assemblies of the fuel core. The extent of insertion of the rod assembly into the fuel core is controlled by the device referred to as a control rod drive mechanism (CRDM), which is a subcomponent of the control rod drive system (CRDS).

In typical pressurized light water reactors (PLWRs), the CRDM is operated from the top of the reactor head which is approximately 15 to 20 feet above the top of the nuclear fuel core. However, in certain new reactor systems, the height of the reactor head may be many times greater above the top of the fuel core. For example, in the HI-SMUR™ SMR-160 from Holtec International, the RCCAs may require operation from a distance of over 60 feet, which using the present existing technology, would require the drive rod (DR) which is normally supplied with existing CRDM to be in excess of 60 feet long. DRs with such a long length, however, would be impractical for the following reasons:

Removing drive rods from the reactor vessel would require an inordinate amount of crane head room;

Performing routine maintenance would require a large laydown area;

The weight of the drive rod becomes so large due to the increased length, that during a SCRAM (emergency shutdown procedure of the reactor in which control rod are quickly inserted into the fuel core to suppress the nuclear reaction), the top nozzle of the fuel assembly risks becoming damaged from the weight of the falling RCCA as well as the ESA;

During a SCRAM, the drive rod is at risk of being damaged because of the inertia load, which is magnified in the CRDM which utilizes a lead screw for the drive rod; and Manufacture of drive rod becomes difficult thereby increasing the cost to fabricate the CRDS.

Another problem is presented by the location of the CRDM. Contemporary commercial technology requires the CRDM to be installed External to the Reactor Vessel. This presents major concerns with regards to the operational safety of the CRDS. With presently available technology should a failure of the pressure retaining portion of the CRDM occur the pressure differential between the inside of the reactor vessel and the atmosphere external to the reactor vessel would subsequently cause the CRDM drive rod to be ejected from the reactor. This in turn could cause a spike in the reactivity of the reactor core, since the drive rod is mechanically connected to the RCCA in the current state-of-the-art technology.

One solution would be to locate CRDM within the reactor vessel. However, this would pose several technical challenges. First, control rod drive mechanisms are complex electromechanical devices. Exposing these to the high pressure and temperature environment inside the reactor vessel can cause the mechanism to fail prematurely. Second, placing the control rod drive mechanism inside the reactor vessel presents possibly structural problems since the mechanism is also subject to flow induced vibration. Accordingly, although this approach would solve the long drive rod problem, it is undesirable for the foregoing reasons.

An improved control rod drive system is desired.

The present invention in another aspect relates to nuclear steam supply systems, and more particularly to a shutdown system for a nuclear steam supply system usable for cooling primary and secondary coolant.

For starting up a nuclear steam supply system in a typical pressurized water reactor (PWR), it is necessary to heat the reactor coolant water to an operating temperature, which is known in the art as the no-load operating temperature of the reactor coolant water. Furthermore, in conventional nuclear steam supply systems it is necessary to ensure full flow through the coolant loop and the core. This is necessary to ensure that a completely turbulated flow across the fuel core exists as the control rods are being withdrawn in order to avoid localized heating and boiling, and to ensure that the reactivity of water is in the optimal range during start-up and during normal operation.

In the present state of the art, the desired start-up condition is achieved by the use of the reactor coolant pump whose primary function is to circulate coolant through the reactor core during normal operating conditions. In normal operation, the substantial frictional heat produced by the reactor coolant pumps is removed by external cooling equipment (heat exchangers) to maintain safe operating temperature. However, during start-up external cooling is disabled so that the frictional heat can be directly transferred to the reactor coolant water, enabling it to reach no-load operating temperature. As the reactor coolant water is being heated, the pressure in the reactor coolant loop is increased using a bank of internal heaters which evaporates some reactor coolant water and increases the pressure in the reactor coolant system by maintaining a two-phase equilibrium.

The above process for heating the reactor water inventory during start-up is not available in a passively safe nuclear steam supply system. This is because such a passively safe nuclear steam supply system does not include or require any pumps, and thus the use of the frictional heat is unavailable for heating the reactor water inventory. Thus, a need exists for a start-up system for heating the reactor water inventory in a passively safe nuclear steam supply system.

According to another aspect of PWRs, it is desirable to provide a shutdown system for a nuclear steam supply system to cool primary and secondary coolant in order to bring the reactor from a hot full power state to a cold and shutdown state in a safe and controlled manner which protects the reactor and steam supply system from potential damage associated thermal and/or pressure transients.

The present invention in another aspect relates to nuclear reactor vessels, and more particularly to a nuclear reactor shroud surrounding the fuel core.

Many nuclear reactor designs are of circulatory type wherein the water heated in the reactor fuel core region must be separated from the cooler water outside of it. Such a nuclear reactor may be typically equipped with a cylindrical shroud around the fuel core. The shroud serves to separate the internal space in the reactor vessel between an "up-flow" (e.g. riser) region in which primary coolant heated by the core flows inside the shroud and the "downcomer" region in which colder primary coolant returned to the reactor vessel from the Rankine cycle steam generating system flows outside the shroud. It is desirable to minimize heat transfer from the heated hot reactor water inside the riser region of the shroud to the colder downcomer water outside the shroud which is deleterious to the thermodynamic performance of the reactor.

The standard practice in shroud design has typically consisted of hermetically enclosing a fibrous or ceramic insulation in a stainless steel (or another corrosion resistant alloy) enclosure. Such a shroud works well until a leak in the enclosure develops, usually caused by the thermal stresses and strains that are inherent to any structure operating under a temperature differential. Concerns regarding failure of the shroud and subsequent dismembering of the insulation have been a source of significant and expensive ameliorative modification efforts in many operating reactors.

The present invention in another aspect relates nuclear reactors, and more particularly to a passive cooling system for use in the event of a loss-of-coolant accident and a reactor shutdown.

The containment for a nuclear reactor is defined as the enclosure that provides environmental isolation to the nuclear steam supply system (NSSS) of the plant in which nuclear fission is harnessed to produce pressurized steam. A commercial nuclear reactor is required to be enclosed in a pressure retaining structure which can withstand the temperature and pressure resulting from the most severe accident that can be postulated for the facility. The most severe energy release accidents that can be postulated for a reactor and its containment can generally be of two types.

One thermal event of potential risk to the integrity of the containment is the scenario wherein all heat rejection paths from the plant's nuclear steam supply system (NSSS) are lost, forcing the reactor into a "scram." A station black-out is such an event. The decay heat generated in the reactor must be removed to protect it from an uncontrolled pressure rise.

Loss-of-Cooling Accident (LOCA) is another type of thermal event condition in which a breach in the pressure containment boundary of reactor coolant system (RCS) leads to a rapid release of flashing water into the containment space. The reactor coolant (primary coolant), suddenly depressurized, would violently flash resulting in a rapid rise of pressure and temperature in the containment space. The in-containment space is rendered into a mixture of air and steam. LOCA events are usually postulated to occur due to a failure in an RCS system pipe containing the primary coolant water. The immediate consequence of a LOCA is rapid depressurization of the RCS and spillage of large quantities of the primary coolant water until the pressure inside the RCS and in the containment reach equilibrium. Nuclear plants are designed to scram immediately in the wake of the RCS depressurization which suppresses the reactor's criticality and stops the chain reaction. However, the large enthalpy of the primary coolant water spilling from the RCS into the containment and the ongoing generation of decay heat in the core are sources of energy that would cause a spike in the containment pressure which, if sufficiently high, may threaten its pressure retention capacity.

More recently, the containment structure has also been called upon by the regulators to withstand the impact from a crashing aircraft. Containment structures have typically been built as massive reinforced concrete domes to withstand the internal pressure from LOCA. Although its thick concrete wall could be capable of withstanding an aircraft impact, it is also unfortunately a good insulator of heat, requiring pumped heat rejection systems (employ heat exchangers and pumps) to reject its unwanted heat to the external environment (to minimize the pressure rise or to remove decay heat). Such heat rejection systems, however, rely on a robust power source (off-site or local diesel generator, for example) to power the pumps. The station black out at Fukushima in the wake of the tsunami is a sobering reminder of the folly of relying on pumps. The above weaknesses in the state-of-the-art call for an improved nuclear reactor containment system.

What is needed is an efficient energy expulsion system to bring the internal pressure in the containment in the wake of a LOCA to normal condition in as short a time as possible. To ensure that such a system would render its intended function without fail, it is further desirable that it be gravity operated (i.e., the system does not rely on an available power source to drive any pumps or motors).

SUMMARY OF THE INVENTION

In one aspect, an improved nuclear reactor core is provided that utilizes nuclear fuel assemblies having two different transverse cross-sectional configurations. The nuclear fuel assemblies having two different transverse cross-sectional configurations are arranged in a pattern that, compared to existing nuclear reactor cores, takes advantage of peripheral corner regions that are formed between the fuel core and the reflector cylinder (which is generally a tubular structure that circumferentially surrounds the nuclear fuel core). In nuclear reactor cores that utilize nuclear fuel assemblies having only one cross-sectional configuration, such peripheral corner regions are left empty as they are too small to accommodate one of the nuclear fuel assemblies. By creating the nuclear reactor with nuclear fuel assemblies having at least two different transverse cross-sectional configurations, nuclear fuel assemblies can be provided in these peripheral corner spaces that were previously left empty, thereby providing a nuclear reactor core that makes optimum use of the available nuclear reactor core space to increase the service or cycle life of the nuclear fuel supply.

In one embodiment, the improved nuclear reactor core utilizes available nuclear reactor core space by providing a plurality of second fuel assemblies in the heretofore empty peripheral corner regions created by a plurality of first fuel assembles, wherein the first and second nuclear fuel assemblies have different configurations. Because the second nuclear fuel assemblies will typically have a smaller transverse cross-section than the first nuclear fuel assemblies in certain embodiments (and thus include less fuel rods), the first nuclear fuel assemblies may be referred to as "full nuclear fuel assemblies" while the second nuclear fuel assemblies may be referred to as "partial nuclear fuel assemblies" for convenience. In certain embodiments, these partial nuclear fuel assemblies may not have control rods, although in other embodiments these partial nuclear fuel assemblies may include control rods. In one exemplary embodiment, with the partial nuclear fuel assemblies installed, the resulting nuclear fuel core (which may be referred to as a fuel assembly array if desired) may approximate an octagon in transverse cross-section. Accordingly, in some embodiments, the full nuclear fuel assemblies may have a rectangular transverse cross-sectional shape while the partial nuclear fuel assemblies may have a generally triangular transverse cross-sectional shape.

Calculations show that by adding the partial fuel assemblies, the cycle life of the nuclear fuel core may be increased by approximately four months in some embodiments. An even greater increase in the cycle life, as much as an additional four months, may be realized by coasting at a reduced operating power level, say approximately 90% of normal power, in the last few months of the cycle. This stretch power approach directly helps in nuclear fuel utilization (through higher burn-up). Accordingly, the partial fuel assemblies advantageously support such convenient power stretching strategies.

In one such embodiment, the invention can be a nuclear reactor core comprising: a reflector cylinder; a nuclear fuel core disposed within the reflector cylinder, the fuel assembly array comprising: a plurality of first nuclear fuel assemblies, each of the plurality of first nuclear fuel assemblies having a first transverse cross-sectional shape; and a plurality of second nuclear fuel assemblies, each of the plurality of second nuclear fuel assemblies having a second transverse cross-sectional shape that is different than the first transverse cross-sectional shape.

In another such embodiment, the invention can be a nuclear reactor core comprising: a plurality of first nuclear fuel assemblies, each of the plurality of first nuclear fuel assemblies having a first transverse cross-sectional configuration, the plurality of first nuclear fuel assemblies arranged in a rectilinear pattern defining peripheral corner regions; a plurality of second nuclear fuel assemblies, each of the plurality of second nuclear fuel assemblies having a second transverse cross-sectional configuration that is different than the first transverse cross-sectional configuration; and wherein the plurality of second nuclear fuel assemblies are disposed within the corner regions, the plurality of first and second nuclear fuel assemblies collectively forming a nuclear fuel core.

In a further such embodiment, the invention can be a nuclear fuel core comprising: a plurality of first nuclear fuel assemblies, each of the plurality of first nuclear fuel assemblies having a first transverse cross-sectional configuration; and a plurality of second nuclear fuel assemblies, each of the plurality of second nuclear fuel assemblies having a second transverse cross-sectional configuration that is different than the first transverse cross-sectional configuration.

In another aspect, a portable nuclear fuel cartridge is provided that allows a nuclear reactor to be completely fueled and/or defueled by loading and/or unloading a self-supporting assemblage as a single unit. The portable nuclear fuel cartridge includes a unitary support structure and an integrated nuclear fuel core that is configured to be insertable into and removable from a nuclear reactor vessel as a self-contained and self-supporting unit, thereby forming a complete and highly portable nuclear fuel core. Accordingly, embodiments of the present invention include a portable nuclear fuel cartridge which is self-supporting and free standing outside of the nuclear reactor vessel with all of the nuclear fuel assemblies completely pre-installed. The integrated nuclear fuel core may comprise all of the nuclear fuel assemblies required to operate the nuclear reactor.

Without limitation, the portable nuclear fuel cartridge may comprise a unitary support structure, such as an open skeletal framework, that supports the nuclear fuel core therein. The unitary support structure may be comprised of top and bottom support structures, such as top and bottom core plates, that are coupled together by connecting members, such as rods. The nuclear fuel core is retained in the unitary support structure and sandwiched between the top and bottom support structure. In one embodiment, a reflector such as a reflector cylinder may be included as part of the portable nuclear fuel cartridge. In other embodiments, the reflector may be omitted as the reflector may be included as part of the nuclear reactor vessel.

The portable nuclear fuel cartridge may be preassembled outside of the nuclear reactor vessel with all nuclear fuel assemblies intact, and then inserted into the nuclear reactor vessel. When the fuel supply is depleted, the entire portable nuclear fuel cartridge may be readily removed from the nuclear reactor vessel and a new complete and preassembled portable nuclear fuel cartridge may be inserted in its place. Advantageously, this negates the need to handle individual nuclear fuel assemblies on-site in piecemeal fashion to significantly reduce nuclear unit downtime for refueling. The portable nuclear fuel cartridge is constructed to be lifted, transported, installed, and stored as self-supporting and free-standing. In essence, the portable nuclear fuel cartridge serves as a "cradle-to-grave" structure from fueling a nuclear reactor to long-term storage.

In one such embodiment, the invention can be a portable nuclear fuel cartridge comprising: a unitary support structure; a plurality of nuclear fuel assemblies arranged to collectively form a fuel core for a nuclear reactor, each of the plurality of nuclear fuel assemblies comprising a plurality of nuclear fuel rods; and the fuel core integrated into the unitary support structure to collectively form a self-supporting assemblage than can be lifted as a single unit.

In another such embodiment, the invention can be a portable nuclear fuel cartridge configured for placement in a reactor vessel, the fuel cartridge comprising: top and bottom core plates at opposing ends of the unitary nuclear fuel cartridge, each of the top and bottom core plates including a gridwork defining a plurality of open cells; a plurality of nuclear fuel assemblies disposed between the top and bottom core plates, each of the plurality of nuclear fuel assemblies including a plurality of fuel rods; a plurality of connecting members extending between and interconnecting the top and bottom core plates together to form a unitary support structure; and the top and bottom core plates, the plurality of connecting members, and the plurality of nuclear fuel assemblies collectively defining an assemblage that is self-supporting outside of the reactor vessel and transportable as a single unit.

In a further such embodiment, the invention can be a method of assembling a nuclear fuel cartridge comprising: a) positioning a plurality of fuel assemblies between top and bottom core plates, each fuel assembly including a plurality of fuel rods and top and bottom flow nozzles at opposing ends thereof; b) coupling the top and bottom core plates together with a plurality of connecting rods extending between the core plates; and c) drawing the top and bottom core plates together with the connecting rods, wherein the fuel assemblies are sandwiched between the top and bottom core plates to form a self-supporting assemblage than can be lifted as a single unit.

In a further aspect, methods of fueling and/or defueling a nuclear reactor are provided that take advantage of a nuclear fuel cartridge that comprises a unitary support structure and a nuclear fuel core integrated into the unitary support structure such that the nuclear fuel cartridge can be handled as a single unit.

In one such embodiment, the invention can be a method of fueling a nuclear reactor, the method comprising: a) opening a nuclear reactor vessel; b) moving a nuclear fuel cartridge from a position outside of the nuclear reactor vessel to a position within an interior cavity of the nuclear reactor vessel, the nuclear fuel cartridge comprising a unitary support structure, and a plurality of nuclear fuel assemblies arranged to collectively form a fuel core, the fuel core mounted in the unitary support structure; and c) closing the nuclear reactor vessel.

In another such embodiment, the invention can be a method of defueling a nuclear reactor, the method comprising: a) opening a nuclear reactor vessel; b) removing a nuclear fuel cartridge from an interior cavity of the nuclear reactor vessel, the nuclear fuel cartridge comprising a unitary support structure, and a plurality of nuclear fuel assemblies arranged to collectively form a fuel core, the fuel core mounted in the unitary support structure; and c) submerging the nuclear fuel cartridge within a spent fuel pool.

In yet another such embodiment, the invention can be a method of storing spent nuclear fuel, the method comprising: a) removing a nuclear fuel cartridge from an interior cavity of the nuclear reactor vessel, the nuclear fuel cartridge comprising a unitary support structure, and a plurality of nuclear fuel assemblies arranged to collectively form a fuel core, the fuel core mounted in the unitary support structure; b) positioning the nuclear fuel cartridge in a multi-purpose canister; and c) positioning the multi-purpose canister in a cask.

The present disclosure provides a control rod drive system (CRDS) that overcomes the foregoing problems and yields a number of additional benefits, which will be readily discerned from the description which follows. The present invention may be beneficially used for nuclear reactor vessel designs of a high head design described above (e.g. top of the reactor head located at a vertical distance greater than approximately 15 to 20 feet above the top of the nuclear fuel core), but has broader application as well to virtually any reactor vessel design.

In one configuration, a control rod drive system (CRDS) generally includes a drive rod mechanically coupled to a control rod drive mechanism operable to linearly raise and lower the drive rod along a vertical axis, a rod cluster control assembly (RCCA) comprising a plurality of control rods positioned proximate to and insertable into a nuclear fuel core, and a drive rod extension (DRE) releasably engaged between the drive rod and RCCA. The CRDS is remotely operable to selectively couple and uncouple the DRE from the RCCA and drive rod. The CRDM includes an electromagnet which releasably couples the CRDM to DRE. This arrangement contrasts to known CRDSs in which the drive rod is directly coupled to the RCCA, which is unsuitable in situations requiring drive rods with excessively long lengths (e.g. greater than 15-20 feet). In the event of a power loss or SCRAM, the CRDM may be configured to remotely uncouple the RCCA from the DRE without releasing or dropping the drive rod which remains engaged with the CRDM and in axial position. Advantageously, this protects the integrity of the CRDM and eliminates potential problems with known designs caused by dropping the drive rod which may damage equipment, as described above. The present DRE includes unique features providing the remote coupling and uncoupling functionality, and failsafe operation in the event of a power loss or SCRAM, as further described herein.

According to one exemplary embodiment of the present invention, a control rod drive system for a nuclear reactor vessel includes: a vertically oriented drive rod mechanically coupled to a control rod drive mechanism operable to raise and lower the drive rod through a plurality of axial positions; a rod cluster control assembly comprising a plurality of control rods configured for removable insertion into a nuclear fuel core; a drive rod extension extending axially between the rod cluster control assembly and the drive rod, the drive rod extension having a bottom end releasably coupled to the rod cluster control assembly; and a drive rod extension grapple assembly connected to the drive rod, the grapple assembly releasably coupled to a top end of the drive rod extension. Raising and lowering the drive rod raises and lowers the rod cluster control assembly. In one embodiment, the grapple assembly includes an electromagnet which magnetically couples the drive rod extension to the grapple assembly when the electromagnet is energized and uncouples the drive rod extension from the grapple assembly when the electromagnet is de-energized.

According to another exemplary embodiment, a control rod drive system for a nuclear reactor vessel includes: a control rod drive mechanism mounted externally to the reactor vessel; a drive rod mechanically coupled to the control rod drive mechanism and extending through the reactor vessel into an interior cavity of the reactor vessel holding a nuclear fuel core, the control rod drive mechanism operable to raise and lower the drive rod through a plurality of vertical axial positions; a grapple assembly connected to the drive rod in the interior cavity of the reactor vessel and movable with the drive rod; an electromagnet mounted in the grapple assembly; a rod cluster control assembly comprising a plurality of control rods configured for removable insertion into the nuclear fuel core; and a drive rod extension extending axially between the rod cluster control assembly and the grapple assembly. The drive rod extension includes: an axially extending actuator shaft having a top end including a magnetic block configured to releasably engage the electromagnet of the grapple assembly and a bottom end configured to releasably engage the rod cluster control assembly; and a lifting head sleeve including a diametrically enlarged lifting head, the lifting head sleeve slidably receiving the actuating rod therethrough for axial upward and downward movement. The electromagnet is operable to magnetically couple the actuating shaft to the grapple assembly at the top of the drive rod extension when the electromagnet is energized and uncouple the actuating shaft from the rod cluster control assembly at the bottom of the drive rod extension when the electromagnet is de-energized. Raising the actuator shaft when the electromagnet is energized couples the actuator shaft to the rod cluster control assembly and de-energizing the electromagnet lowers and uncouples the actuating shaft from the rod cluster control assembly.

According to another exemplary embodiment, a control rod drive system for a nuclear reactor vessel includes: a reactor vessel having a top head and an interior cavity; a nuclear fuel core supported in the interior cavity of the reactor vessel; a rod cluster control assembly comprising a plurality of control rods configured for removable insertion into the nuclear fuel core; a control rod drive mechanism mounted externally to the reactor vessel above the top head; a drive rod mechanically coupled to the control rod drive mechanism and extending through the top head of reactor vessel into the interior cavity, the control rod drive mechanism operable to raise and lower the drive rod through a plurality of vertical axial positions; a grapple assembly connected to the drive rod inside the interior cavity of the reactor vessel and movable with the drive rod, the grapple assembly including an electromagnet; a drive rod extension extending axially between the rod cluster control assembly and the grapple assembly, the drive rod extension including a bottom end releasably coupled to the rod cluster control assembly and a top end releasably coupled to the grapple assembly via the electromagnet; and a longitudinally-extending drive rod extension support structure mounted in the reactor vessel above the nuclear fuel core, the support structure including a plurality of vertically-oriented guide tubes at least one of which is configured to slidably receive the drive rod extension therein for axial upward and downward movement. The electromagnet is operable to magnetically couple the drive rod extension to the grapple assembly when the electromagnet is energized and uncouple the drive rod extension from the grapple assembly when the electromagnet is de-energized. De-energizing the electromagnet drops and uncouples the drive rod extension from the rod cluster control assembly remotely at the bottom of the drive rod extension.

An exemplary method for coupling a control rod drive mechanism to a rod cluster control assembly in a nuclear reactor vessel is provided. The method includes the steps of: providing: a reactor vessel having a top head and an interior cavity; a nuclear fuel core supported in the interior cavity; a rod cluster control assembly positioned at a top of the fuel core and comprising a plurality of control rods configured for removable insertion the fuel core; a control rod drive mechanism mounted externally above the reactor vessel; a drive rod assembly including a drive rod mechanically coupled to the control rod drive mechanism and extending into the interior cavity of the reactor vessel, and a grapple assembly disposed on an end of the drive rod and including an electromagnet. The method further includes lowering the drive rod assembly; contacting the drive rod assembly with a top end of a drive rod extension extending vertically between the rod cluster control assembly and the top head of the reactor vessel, a bottom end of the drive rod extension contacting the rod cluster control assembly in a non-locking manner; energizing the electromagnet to magnetically couple the drive rod assembly with the drive rod extension; raising the drive rod assembly by a first vertical distance; locking the bottom end of the drive rod extension with the rod cluster control assembly, wherein raising and lowering the drive rod assembly with the control rod drive mechanism raises and lowers the rod cluster control assembly for controlling the reactivity within the fuel core.

The present disclosure provides an improved shutdown system for a nuclear steam supply system. The shutdown system may include a primary coolant cooling system and a secondary coolant cooling systems. Both cooling systems may be operated in tandem and cooperation to cool the primary coolant, which in turn removes and rejects residual decay heat produced by the nuclear fuel core during reactor shutdown conditions. In one embodiment, as further described herein, the primary and secondary coolant cooling systems may be operated in sequential stages or phases to gradually and safely bring the reactor from a hot full power state to a cold and shutdown state.

In one embodiment, a nuclear steam supply system with shutdown cooling system includes: a reactor vessel having an internal cavity; a reactor core comprising nuclear fuel disposed within the internal cavity and operable to heat a primary coolant; a steam generating vessel fluidly coupled to the reactor vessel; a riser pipe positioned within the steam generating vessel and fluidly coupled to the reactor vessel; a primary coolant loop formed within the reactor vessel and the steam generating vessel, the primary coolant loop being configured for circulating primary coolant through the reactor vessel and steam generating vessel; and a primary coolant cooling system. The primary coolant system includes: an intake conduit having an inlet fluidly coupled to the primary coolant loop; a pump fluidly coupled to the intake conduit, the pump configured and operable to extract and pressurize primary coolant from the primary coolant loop and discharge the pressurized primary coolant through an injection conduit; a Venturi injection nozzle having an inlet fluidly coupled to the injection conduit and positioned within the riser pipe to inject pressurized primary coolant into the riser pipe from the pump; and a heat exchanger configured and operable to cool the extracted primary coolant.

In another embodiment, a nuclear steam supply system with shutdown cooling system includes: a reactor vessel having an internal cavity; a reactor core comprising nuclear fuel disposed within the internal cavity and operable to heat a primary coolant; a steam generating vessel fluidly coupled to the reactor vessel and containing a secondary coolant for producing steam to operate a steam turbine, the steam generating vessel including a superheater section and a steam generator section; a riser pipe positioned inside the steam generating vessel and fluidly coupled to the reactor vessel; a primary coolant flow loop formed within the reactor vessel and the steam generating vessel, the primary coolant flow loop being configured and operable for circulating primary coolant through the reactor vessel and steam generating vessel; a primary coolant cooling system; and a secondary coolant cooling system. The primary coolant cooling system includes: a first pump having an inlet fluidly coupled to the primary coolant flow loop, the first pump configured and operable to extract and pressurize a portion of the primary coolant from the primary coolant loop; a Venturi injection nozzle having an inlet fluidly coupled to a discharge of the first pump and positioned inside the riser pipe in the steam generating vessel, the injection nozzle receiving and injecting the pressurized portion of the primary coolant into the riser pipe from the pump; and a first heat exchanger configured and operable to cool the extracted primary coolant prior to injecting the pressurized portion of the primary coolant. The secondary coolant cooling system includes: a steam bypass condenser having an inlet fluidly coupled to the superheater section of the steam generator vessel for receiving and cooling secondary coolant in a steam phase; a second heat exchanger having an inlet fluidly coupled to the steam generator section of the steam generating vessel for receiving and cooling secondary coolant in a liquid phase; and a second pump having an inlet fluidly coupled to the steam bypass condenser and the second heat exchanger, the second pump configured and operable to pressurize and circulate secondary coolant through the steam generator in a secondary coolant flow loop. The secondary coolant cooling system is configured to cool secondary coolant in either the steam or liquid phase.

In another embodiment, a nuclear steam supply system with shutdown cooling system includes: a reactor vessel having an internal cavity; a vertically elongated reactor core comprising nuclear fuel disposed within the internal cavity and operable to heat a primary coolant; a vertically elongated steam generating vessel fluidly coupled to the reactor vessel and containing a secondary coolant for producing steam to operate a steam turbine, the steam generating vessel including a superheater section and a steam generator section; a vertically elongated riser pipe positioned inside the steam generating vessel and fluidly coupled to the reactor vessel; a primary coolant flow loop formed within the reactor vessel and the steam generating vessel, the primary coolant flow loop being configured and operable for circulating primary coolant through the reactor vessel and steam generating vessel; a secondary coolant flow loop formed outside of the reactor vessel and steam generating vessel, the secondary coolant flow loop being configured and operable for circulating secondary coolant through the steam generating vessel; and a Venturi jet pump disposed inside the riser pipe of the steam generating vessel, the jet pump including an injection nozzle fluidly coupled to the primary coolant flow loop. The jet pump receives and injects a portion of the primary coolant into the riser pipe which draws and mixes primary coolant from the reactor vessel with the injected portion of the primary coolant in the riser pump to circulate primary coolant through the primary coolant flow loop.

A method for removing residual decay heat from a nuclear reactor fuel core under shutdown conditions is provided. The method includes: providing a steam generating vessel hydraulically coupled to a reactor vessel housing a nuclear fuel core; circulating a primary coolant through a primary coolant flow loop formed inside and between the steam generating vessel and reactor vessel; extracting a portion of the primary coolant from the primary coolant flow loop; pressurizing the extracted portion of the primary coolant; injecting the extracted portion of the primary coolant into a riser pipe disposed inside the steam generating vessel through a Venturi injection nozzle; and drawing primary coolant from the reactor vessel into the riser pipe using the injection nozzle. In one embodiment, the method further includes cooling the extracted portion of the primary coolant prior to injecting the extracted portion of the primary coolant into the riser pipe. In one embodiment, the cooling step is performed using a first tubular heat exchanger. The tubular heat exchanger may be a dual purpose heat exchanger configured for either cooling the primary coolant during steam supply system shutdown or heating the primary coolant during steam supply system startup.

The present invention further provides an improved nuclear steam supply system and start-up sub-system therefor that overcomes the deficiencies of the foregoing existing arrangements. The present invention also provides an improved method of heating a primary coolant in a nuclear steam supply system to a no load operating temperature.

In one aspect, the invention can be a nuclear steam supply system comprising: a reactor vessel having an internal cavity, a reactor core comprising nuclear fuel disposed within the internal cavity; a steam generating vessel fluidly coupled to the reactor vessel; a riser pipe positioned within the steam generating vessel and fluidly coupled to the reactor vessel; a primary coolant at least partially filling a primary coolant loop formed within the reactor vessel and the steam generating vessel; and a start-up sub-system comprising: an intake conduit having an inlet located in the primary coolant loop; a pump fluidly coupled to the intake conduit for pumping a portion of the primary coolant from the primary coolant loop through the intake conduit and into an injection conduit; at least one heating element for heating the portion of the primary coolant to form a heated portion of the primary coolant; and an injection nozzle fluidly coupled to the injection conduit and positioned within the riser pipe for injecting the heated portion of the primary coolant into the riser pipe.

In another aspect, the invention can be a nuclear steam supply system comprising: a reactor vessel having an internal cavity, a reactor core comprising nuclear fuel disposed within the internal cavity; a steam generating vessel fluidly coupled to the reactor vessel; a primary coolant loop formed within the reactor vessel and the steam generating vessel, a primary coolant in the primary coolant loop; and a start-up sub-system fluidly coupled to the primary coolant loop, the start-up sub-system configured to: (1) receive a portion of the primary coolant from the primary coolant loop; (2) heat the portion of the primary coolant to form a heated portion of the primary coolant; and (3) inject the heated portion of the primary coolant into the primary coolant loop.

In yet another aspect, the invention can be a method of heating a primary coolant to a no-load operating temperature in a nuclear steam supply system, the method comprising: a) filling a primary coolant loop within a reactor vessel and a steam generating vessel that are fluidly coupled together with a primary coolant; b) drawing a portion of the primary coolant from the primary coolant loop and into a start-up sub-system; c) heating the portion of the primary coolant within the start-up sub-system to form a heated portion of the primary coolant; and d) injecting the heated portion of the primary coolant into the primary coolant loop.

In a further aspect, the invention can be a method of starting up a nuclear steam supply system, the method comprising: a) at least partially filling a primary coolant loop within a reactor vessel and a steam generating vessel that are fluidly coupled together with a primary coolant, wherein the primary coolant loop comprises a riser pipe in the steam generating vessel; b) drawing a portion of the primary coolant from the primary coolant loop and into a start-up sub-system; c) heating the portion of the primary coolant within the start-up sub-system to form a heated portion of the primary coolant; and d) introducing the heated portion of the primary coolant into the riser pipe of the steam generating vessel.

The present disclosure provides a reactor shroud which minimizes heat transfer between the hot reactor riser water and cold downcomer water in a manner which eliminates drawbacks of the foregoing insulated enclosure designs. In an embodiment of the present invention, the shroud may be comprised of a series of concentric cylindrical shells separated by a small radial clearance. The top and bottom extremities of the shells are each welded to common top and bottom annular plates ("closure plates") to create an essentially isolated set of narrow & tall annular cavities. Each cavity is connected to its neighbor by one or more small drain holes such that submerging the multi-shell body in water (e.g. demineralized primary coolant in a reactor vessel) would fill all of the internal cavities with water and expel virtually all entrapped air, thereby creating water-filled annular cavities.

In one non-limiting embodiment, the thin walled concentric shells may be buttressed against each other with a prescribed gap by small fusion welds made by a suitable process such as spot, plug, or TIG welding. In such a welding process, a small piece of metal (e.g. spacer) equal in thickness to the radial gap or clearance in the cavity serves to enable a fusion nugget to be created between the two shell walls. The number of such nuggets is variable, but preferably is sufficient to prevent flow induced vibration of the shroud weldment during reactor operation.

One principal advantage of the multi-shell closed cavity embodiment described herein is that it is entirely made of materials native to the reactor's internal space, namely demineralized water (e.g. primary coolant) disposed within the radial gaps between the concentric shells and metal such as stainless steel. No special insulation material of any kind is used in the reactor shroud (which may degrade and fail over time). Advantageously, the present shroud design provides the desired heat transfer minimization between the hot reactor water inside the riser region of the shroud to the colder downcomer water outside the shroud without insulation, thereby preserving the thermodynamic performance of the reactor.

According to one exemplary embodiment, a nuclear reactor vessel includes an elongated cylindrical body defining an internal cavity containing primary coolant water; a nuclear fuel core disposed in the internal cavity; an elongated shroud disposed in the internal cavity, the shroud comprising an inner shell, an outer shell, and a plurality of intermediate shells disposed between the inner and outer shells; and a plurality of annular cavities formed between the inner and outer shells, the annular cavities being filled with the primary coolant water. In one embodiment, the annular cavities are fluidly interconnected by a plurality of drain holes allowing the primary coolant to flow into and fill the cavities from the reactor vessel.

According to another embodiment, a shroud segment for a nuclear reactor vessel includes an elongated inner shell; an elongated outer shell; a plurality of elongated intermediate shells disposed between the inner and outer shells; the inner shell, outer shell, and intermediate shells being radially spaced apart forming a plurality of annular cavities for holding water; a top closure plate attached to the top of the shroud segment; and a bottom closure plate attached to the bottom of the shroud segment, wherein the top and bottom closure plates are configured for coupling to adjoining shroud segments to form a stacked array of shroud segments.

A method for assembling a shroud for a nuclear reactor vessel is provided. The method includes: providing a first shroud segment and a second shroud segment, each shroud segment including a top closure plate and a bottom closure plate; abutting the top closure plate of the second shroud segment against the bottom closure plate of the first shroud segment; axially aligning a first mounting lug on the first shroud segment with a second mounting lug on the second shroud; and locking the first mounting lug to the second mounting lug to couple the first and second shroud segments together. In one embodiment, the locking step is preceded by pivoting a mounting clamp attached to the first shroud segment from an unlocked open position to a locked closed position.

A passive nuclear reactor cooling system for use in the event of a loss-of-coolant accident (LOCA) and complete reactor shutdown is provided that overcomes the foregoing drawbacks. The cooling system is configured to create a completely passive means to reject the reactor's decay heat without any reliance on and drawbacks of pumps and motors requiring an available electric power supply. In one embodiment, the cooling system relies entirely on gravity and varying fluid densities to extract and induce flow of cooling water through the system which includes a heat exchanger. The cooling system is engineered to passively extract decay heat from the reactor in the event of a LOCA station black out or another postulated accident scenario wherein the normal heat rejection path for the nuclear fuel core is lost such as via a ruptured pipe in the primary coolant piping or other event.

In one configuration, the passive cooling system utilizes the reserve cooling water in the reactor well as a vehicle to extract and reject decay heat from the reactor via a heat exchanger attached to the reactor containment vessel walls. The cooling water flows via gravity in a closed flow loop between the reactor well and the heat exchanger to reject heat through the containment vessel walls to an external heat sink. In one embodiment, the heat sink may be an annular reservoir filled with cooling water that surrounds the containment vessel.

In further embodiments, as further described herein, an in-containment auxiliary reservoir (e.g. storage tank) of cooling water may be provided which is fluidly coupled to the reactor well to provide a supplemental source or reserve of cooling water. The cooling system closed flow loop may circulate cooling water between both the reactor well and auxiliary reservoir heat exchanger and the heat exchanger.

In one embodiment, a passive reactor cooling system usable after a loss-of-coolant accident includes a containment vessel in thermal communication with a heat sink, a reactor well disposed in the containment vessel, a reactor vessel disposed at least partially in the reactor well, the reactor vessel containing a nuclear fuel core which heats primary coolant in the reactor vessel, a water storage tank disposed in the containment vessel and in fluid communication with the reactor well, the tank containing an inventory of cooling water, and a heat exchanger disposed in the containment vessel, the heat exchanger in fluid communication with the reactor well via a closed flow loop. Following a loss of primary coolant, the tank is configured and operable to flood the reactor well with cooling water which is converted into steam by heat from the fuel core and flows through the closed flow loop to the heat exchanger. In one embodiment, the steam condenses in the heat exchanger forming condensate, and the condensate flows via gravity back to the reactor well.

The heat exchanger comprises an array of heat dissipater ducts integrally attached to the containment vessel in one embodiment.

In another embodiment, a passive reactor cooling system usable after a loss-of-coolant accident includes a containment vessel in thermal communication with a heat sink, a reactor well disposed in the containment vessel, a reactor vessel disposed at least partially in the reactor well, the reactor vessel containing a nuclear fuel core and primary coolant heated by the fuel core, a water storage tank disposed in the containment vessel and in fluid communication with the reactor well, the tank containing an inventory of cooling water, and a heat exchanger disposed in the containment vessel, the heat exchanger in fluid communication with the reactor well via an atmospheric pressure closed flow loop. Following a loss of primary coolant, the tank is configured and operable to flood the reactor well with cooling water. The cooling water in the flooded reactor well is heated by the fuel core and converted into steam, the steam flows through the closed flow loop to the heat exchanger and condenses forming condensate, and the condensate flows back to the reactor well. The heat exchanger comprises an array of heat dissipater ducts integrally attached to the containment vessel in one embodiment.

A method for passively cooling a nuclear reactor after a loss-of-coolant accident is provided. The method includes: locating a reactor vessel containing a nuclear fuel core and primary coolant in a reactor well disposed inside a containment vessel; at least partially filling a water storage tank fluidly coupled to the reactor well with cooling water; releasing cooling water from the water storage tank into the reactor well; heating the cooling water with the fuel core; converting the cooling water at least partially into steam; accumulating the steam in the reactor well; flowing the steam through a heat exchanger; condensing the steam forming condensate in the heat exchanger; and returning the condensate to the reactor well, wherein the coolant steam and condensate circulates through a closed flow loop between the heat exchanger and reactor well. In one embodiment, the steam is produced within an insulating liner assembly disposed on an outside surface of the reactor vessel, the liner assembly being fluidly coupled to the reactor well via flow-hole nozzles disposed at the bottom and top portions of the reactor vessel. The liner assembly may comprise a plurality of spaced apart liners. The condensing step may further include the heat exchanger rejecting heat from the steam to an annular reservoir holding water that surrounds the containment vessel. The heat exchanger may comprises an array of heat dissipater ducts integrally attached to the containment vessel adjacent the annular reservoir.

According to other aspects of the disclosure, the present invention further provides nuclear reactor containment system that overcomes the deficiencies of the foregoing arrangements for rejecting heat released into the environment within the containment by a thermal event. The containment system generally includes an inner containment vessel which may be formed of steel or another ductile material and an outer containment enclosure structure (CES) thereby forming a double walled containment system. In one embodiment, a water-filled annulus may be provided between the containment vessel and the containment enclosure structure providing an annular cooling reservoir. The containment vessel may include a plurality of longitudinal heat transfer fins which extend (substantially) radial outwards from the vessel in the manner of "fin". The containment vessel thus serves not only as the primary structural containment for the reactor, but is configured and operable to function as a heat exchanger with the annular water reservoir acting as the heat sink. Accordingly, as further described herein, the containment vessel advantageously provides a passive (i.e. non-pumped) heat rejection system when needed during a thermal energy release accident such as a LOCA or reactor scram to dissipate heat and cool the reactor.

In one embodiment according to the present disclosure, a nuclear reactor containment system includes a containment vessel configured for housing a nuclear reactor, a containment enclosure structure (CES) surrounding the containment vessel, and an annular reservoir formed between the containment vessel and containment enclosure structure (CES) for extracting heat energy from the containment space. In the event of a thermal energy release incident inside the containment vessel, heat generated by the containment vessel is transferred to the annular reservoir which operates to cool the containment vessel. In one embodiment, the annular reservoir contains water for cooling the containment vessel. A portion of the containment vessel may include substantially radial heat transfer fins disposed in the annular reservoir and extending between the containment vessel and containment enclosure structure (CES) to improve the dissipation of heat to the water-filled annular reservoir. When a thermal energy release incident occurs inside the containment vessel, a portion of the water in the annulus is evaporated and vented to atmosphere through the containment enclosure structure (CES) annular reservoir in the form of water vapor.

Embodiments of the system may further include an auxiliary air cooling system including a plurality of vertical inlet air conduits spaced circumferentially around the containment vessel in the annular reservoir. The air conduits are in fluid communication with the annular reservoir and outside ambient air external to the containment enclosure structure (CES). When a thermal energy release incident occurs inside the containment vessel and water in the annular reservoir is substantially depleted by evaporation, the air cooling system becomes operable by providing a ventilation path from the reservoir space to the external ambient. The ventilation system can thus be viewed as a secondary system that can continue to cool the containment ad infinitum.

According to another embodiment, a nuclear reactor containment system includes a containment vessel configured for housing a nuclear reactor, a containment enclosure structure (CES) surrounding the containment vessel, a water filled annulus formed between the containment vessel and containment enclosure structure (CES) for cooling the containment vessel, and a plurality of substantially radial fins protruding outwards from the containment vessel and located in the annulus. In the event of a thermal energy release incident inside the containment vessel, heat generated by the containment vessel is transferred to the water filled reservoir in the annulus through direct contact with the external surface of the containment vessel and its fins substantially radial thus cooling the containment vessel. In one embodiment, when a thermal energy release incident occurs inside the containment vessel and water in the annulus is substantially depleted by evaporation, the air cooling system is operable to draw outside ambient air into the annulus through the air conduits to cool the heat generated in the containment (which decreases exponentially with time) by natural convection. The existence of water in the annular region completely surrounding the containment vessel will maintain a consistent temperature distribution in the containment vessel to prevent warping of the containment vessel during the thermal energy release incident or accident.

In another embodiment, a nuclear reactor containment system includes a containment vessel including a cylindrical shell configured for housing a nuclear reactor, a containment enclosure structure (CES) surrounding the containment vessel, an annular reservoir containing water formed between the shell of the containment vessel and containment enclosure structure (CES) for cooling the containment vessel, a plurality of external (substantially) radial fins protruding outwards from the containment vessel into the annulus, and an air cooling system including a plurality of vertical inlet air conduits spaced circumferentially around the containment vessel in the annular reservoir. The air conduits are in fluid communication with the annular reservoir and outside ambient air external to the containment enclosure structure (CES). In the event of a thermal energy release incident inside the containment vessel, heat generated by the containment vessel is transferred to the annular reservoir via the (substantially) radial containment wall along with its internal and external fins which operates to cool the containment vessel.

Advantages and aspects of a nuclear reactor containment system according to the present disclosure include the following:

Containment structures and systems configured so that a severe energy release event as described above can be contained passively (e.g. without relying on active components such as pumps, valves, heat exchangers and motors);

Containment structures and systems that continue to work autonomously for an unlimited duration (e.g. no time limit for human intervention);

Containment structures fortified with internal and external ribs (fins) configured to withstand a projectile impact such as a crashing aircraft without losing its primary function (i.e. pressure & radionuclide (if any) retention and heat rejection); and Containment vessel equipped with provisions that allow for the ready removal (or installation) of major equipment through the containment structure.

It is to be understood that the various aspects of the invention described above can be combined in various manners. Moreover, further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The features of the exemplary embodiments will be described with reference to the following drawings in which like elements are labeled similarly, and in which:

FIGS. 17-24 schematically illustrate a method or process of defueling a nuclear reactor according to an embodiment of the present invention, wherein the nuclear fuel cartridge of FIG. 1 has been used to operate the nuclear reactor, and in which FIG. 17 is a first step in the process, FIG. 18 is a second step in the process, FIG. 19 is a third step in the process, FIG. 20 is a fourth step in the process, FIG. 21 is a fifth step in the process, FIG. 23 is an eighth step in the process, and FIG. 24 is a ninth step in the process;

FIG. 25-33 schematically illustrate a method or process of defueling a nuclear reactor comprising storing the removed cartridge placed in a spent nuclear fuel canister from the preceding steps in a storage cask according to an embodiment of the present invention, and in which FIG. 25 is a first step in the storage process, FIG. 26 is a second step in the storage process, FIG. 27 is a third step in the process, FIG. 28 is a fourth step in the storage process, FIG. 29 is a fifth step in the storage process, FIG. 30 is a sixth step in the storage process, FIG. 31 is a seventh step in the storage process, FIG. 32 is an eighth step in the storage process, and FIG. 33 is a ninth step in the storage process;

All drawings are schematic and not necessarily to scale. Parts given a reference numerical designation in one figure may be considered to be the same parts where they appear in other figures without a numerical designation for brevity unless specifically labeled with a different part number and described herein A reference to a whole figure number herein (e.g. FIG. 92) which includes related figures sharing the same number but with alphabetical suffixes (e.g. FIGS. 92A and 92B) shall be construed as a reference to all those figures unless stated otherwise.

DETAILED DESCRIPTION

Figure 1:
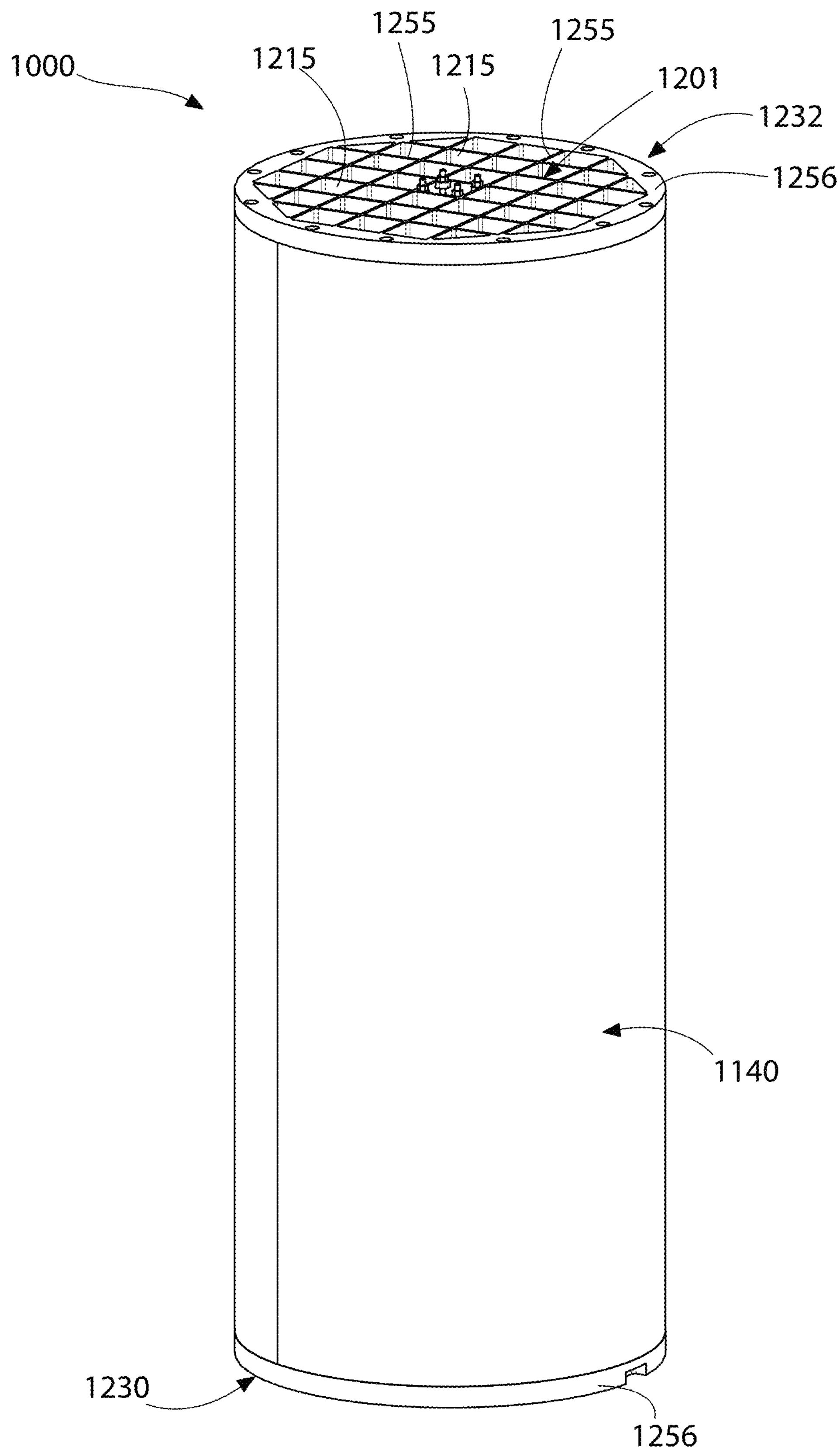
FIG. 1 is a perspective view of a nuclear fuel cartridge according to an embodiment of the present invention.

The features and benefits of the present disclosure are illustrated and described herein by reference to exemplary ("example") embodiments. This description of exemplary embodiments is intended to be read in connection with the accompanying drawings, which are to be considered part of the entire written description. Accordingly, the present disclosure expressly should not be limited to such embodiments illustrating some possible non-limiting combination of features that may exist alone or in other combinations of features; the scope of the claimed invention being defined by the claims appended hereto.

In the description of embodiments disclosed herein, any reference to direction or orientation is merely intended for convenience of description and is not intended in any way to limit the scope of the present invention. Relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation. Terms such as "attached," "coupled," "affixed," "connected," "interconnected," and the like refer to a relationship wherein structures are secured or attached to one another either directly or indirectly through intervening structures, as well as both movable or rigid attachments or relationships, unless expressly described otherwise.

As used throughout, any ranges disclosed herein are used as shorthand for describing each and every value that is within the range. Any value within the range can be selected as the terminus of the range.

Multiple Inventive Concept Roadmap

Multiple broad inventive concepts are described herein and are distinguished from one another using different sections each having an appropriately descriptive header in the description and discussion that follows. Specifically, FIGS. 1-33 are relevant to a broad first Inventive Concept #1, FIGS. 34-51 are relevant to a broad second Inventive Concept #2, FIGS. 52-62 are relevant to a broad third Inventive Concept #3, FIGS. 63-70 are relevant to a fourth Inventive Concept #4, and FIGS. 71-93 are relevant to a broad fifth Inventive Concept #5. The broad inventive concepts should each be considered in isolation from one another. Each broad inventive concept may comprise multiple inventive concepts and embodiments within which may be designated by descriptive sub-headers in some instances. It is possible that there may be conflicting language or terms used in the description of the first through sixth inventive concepts. For example, it is possible that in the description of the first inventive concept a particular term may be used to have one meaning or definition and that in the description of the second inventive concept the same term may be used to have a different meaning or definition. In the event of such conflicting language, reference should be made to the disclosure of the relevant inventive concept being discussed which should be used and is controlling for interpreting the language of the description of that particular relevant inventive concept. Similarly, the section of the description describing a particular relevant inventive concept being claimed should be used and is controlling to interpret the respective claim language when necessary.

Inventive Concept #1

Reference is made generally to FIGS. 1-33 which are relevant to Inventive Concept #1 described below.

For further ease of discussion, the descriptions of the various aspects of the invention have been broken down into three sub-sections. It is, however, to be understood that in certain embodiments, the aspects of the inventions, or portions thereof, can be combined as desired. For example, the optimized fuel core concepts discussed in the first section below can be included in the portable nuclear fuel cartridge concept discussed in the second section discussed below, and vice versa. In other embodiments, however, the optimized fuel core concepts are not limited to the portable nuclear fuel cartridge environment but can be incorporated into a nuclear reactor core having a stationary support structure for supporting the nuclear fuel assemblies in the optimized fuel core arrangement. Similarly, while the portable nuclear fuel cartridge is exemplified as utilizing the optimized fuel core in certain embodiments, in other embodiments the portable nuclear fuel cartridge can utilize a nuclear fuel core with a more traditional pattern, such as a rectilinear arrangement that utilizes only nuclear fuel assemblies having the same transverse cross-sectional configuration.

Optimized Fuel Core Geometry & Reactor Core Including the Same

Figure 4:
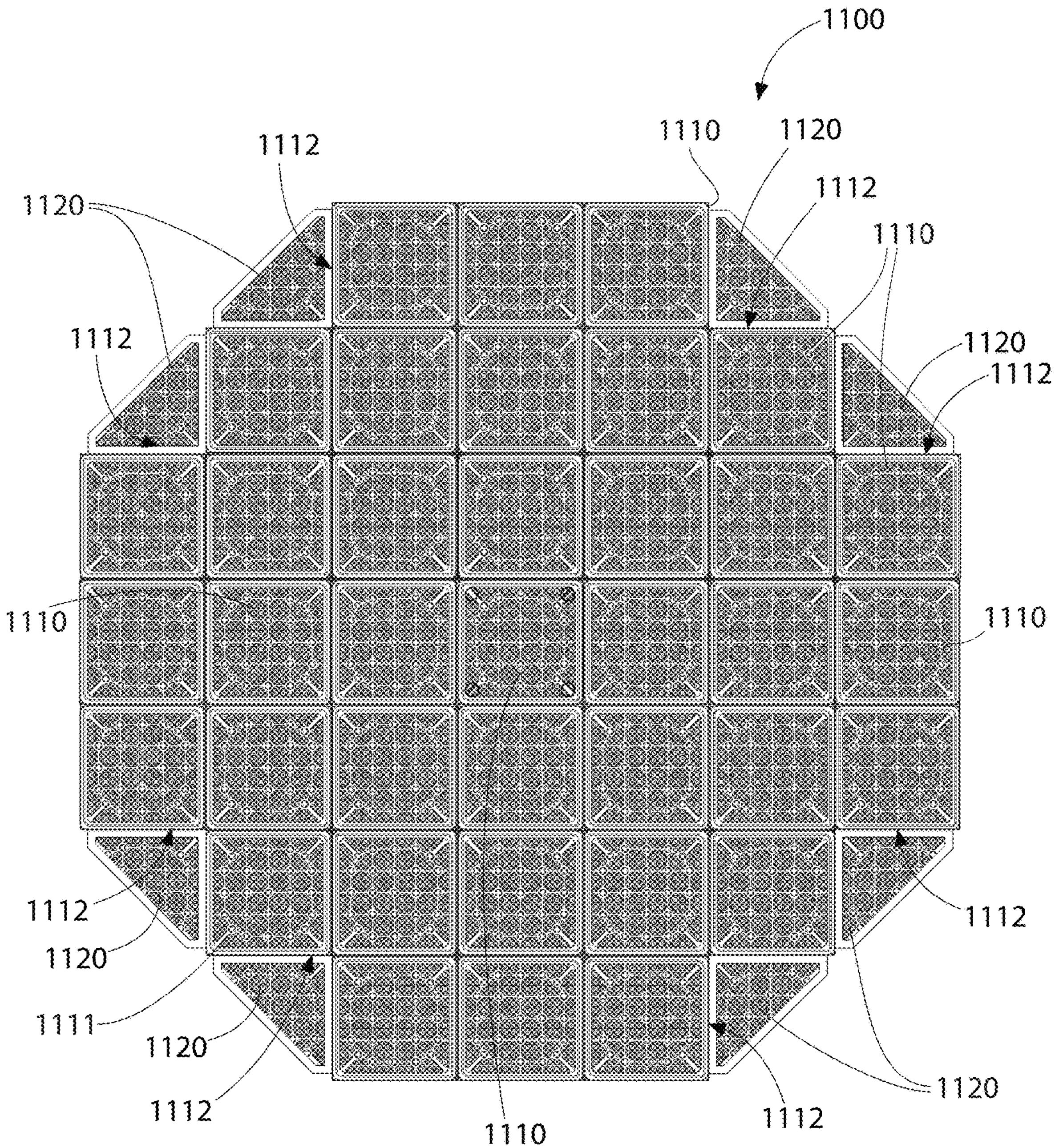
FIG. 4 is transverse cross-sectional view through a nuclear fuel core according to an embodiment of the present invention, which happens to be incorporated into the nuclear fuel cartridge of FIG. 1.

Referring first to FIG. 4, a nuclear fuel core 1100 according to an embodiment of the present invention is illustrated. In certain embodiments, the nuclear fuel core 1100 can be incorporated into a portable nuclear fuel cartridge 1000 (discussed in greater detail below), which is then positioned within a nuclear reactor vessel 1500, thereby forming a nuclear reactor core 1550 in conjunction with other reactor core infrastructure and stationary components. In another embodiment, the nuclear fuel core 1100 can be formed in the nuclear reactor vessel 1500 by loading the nuclear fuel assemblies 1110, 1120 into a stationary support structure that is designed to create the optimized fuel arrangement discussed below, thereby forming the nuclear reactor core.

The nuclear fuel core 1100 comprises a plurality of first nuclear fuel assemblies 1110 and a plurality of second nuclear fuel assemblies 1120. Each of the plurality of first nuclear fuel assemblies 1110 comprises a first transverse cross-sectional configuration. Each of the plurality of second nuclear fuel assemblies 1120 comprises a second transverse cross-sectional configuration, wherein the first and second transverse cross-sectional configurations are different from one another. In one embodiment, the first transverse cross-sectional configuration is different than the second transverse cross-sectional configuration due to the first and second transverse cross-sectional configurations being different shapes. In another embodiment, the first transverse cross-sectional configuration is different than the second transverse cross sectional configuration due to the first and second transverse cross-sectional configurations being different sizes. In certain other embodiments, the first transverse cross-sectional configuration is different than the second transverse cross sectional configuration due to the first and second transverse cross-sectional configurations being of different sizes and shapes.

In the exemplified embodiment, the first transverse cross-sectional configuration of the first nuclear fuel assemblies 1110 comprises a rectangular transverse cross-sectional shape while the second transverse cross-sectional configuration of the second nuclear fuel assemblies 1120 comprises a triangular transverse cross-sectional shape. In one embodiment, the rectangular transverse cross-sectional shape of the first transverse cross-sectional configuration of the first nuclear fuel assemblies 1110 is square. The invention, however, is not limited to any specific shape for either of the first and/or second transverse cross-sectional configurations unless specified by the claims. In other embodiments, the first and/or second transverse cross-sectional configurations can take on other polygonal, oval, and/or irregular shapes.

In another embodiment, both the first and second transverse cross-sectional shapes can comprises a rectangular transverse cross-sectional shapes, wherein the rectangular transverse cross-sectional shape of the second transverse cross-sectional configuration has a sufficiently smaller area than that of the rectangular transverse cross-sectional shape of the first transverse cross-sectional configuration such that the second plurality of nuclear fuel assemblies 1120 can fit within the peripheral corner regions 1101 (as explained in greater detail below).

The plurality of first nuclear fuel assemblies 1110 are arranged to form a central region of the nuclear fuel core 1100 while the second nuclear fuel assemblies 1120 are arranged about the periphery of the central region formed by the first nuclear fuel assemblies 1110. In the exemplified embodiment, the plurality of first nuclear fuel assemblies 1110 are arranged in a rectilinear pattern to form a central region having a modified cruciform shape defining peripheral corner regions 1112. In one embodiment, such as the one illustrated, the modified cruciform pattern formed by the first nuclear fuel assemblies 1120 comprises four symmetric quadrants, each of the four quadrants comprising two peripheral corner regions 1112. Of course, in other embodiments, the first nuclear fuel assemblies 1110 can be arranged in other patterns, rectilinear or non-rectilinear, that also form peripheral corner regions 1112.

The plurality of second nuclear fuel assemblies 1120 are disposed within the corner regions 1112, thereby forming a nuclear fuel core 1100 that is densely packed with fuel assemblies 1110, 1120 that maximizes the available space in the nuclear reactor core (which in some embodiments may be defined as the space circumscribed by the reflector cylinder 1140). Moreover, while in the exemplified embodiment, the nuclear fuel core 1100 comprises nuclear fuel assemblies 1110, 1120 having two different transverse cross-sectional configurations, in other embodiments the nuclear fuel core 1100 may comprise nuclear fuel assemblies having more than two different transverse cross-sectional configurations, such as three or four to further maximize the available space in the nuclear reactor core.

Due to the arrangement of the second nuclear fuel assemblies 1120 in the corner regions 1112 formed by the pattern of the first nuclear fuel assemblies 1110, the nuclear fuel core 1100 has a polygonal transverse cross-sectional shape. In one non-limiting embodiment, when the first and second nuclear fuel assemblies 1110, 1120 are arranged in the illustrated pattern, the nuclear fuel core 1100 has an octagonal transverse cross-sectional shape. Of course, other transverse cross-sectional shapes can be achieved for the nuclear fuel core 1100 utilizing the above concepts, the exact shape of which will be dictated by the selected transverse cross-sectional shapes of the first and second nuclear fuel assemblies 1110, 1120 and their arrangement within the pattern.

In one example, without limitation, the nuclear fuel core 1100 may be comprised of thirty-seven full first nuclear fuel assemblies 1110 and eight second nuclear fuel assemblies 1120. Due in part to its small transverse cross-section compared to large nuclear reactor cores, a compact nuclear fuel core 1100 with thirty-seven first nuclear fuel assemblies 1110 enriched to 5% U-235 computes to have a cycle life of approximately 42 months (in contrast to only 18 to 24 months for the large reactor cores used in modern operating reactors).

In one embodiment, each of the thirty-seven first nuclear fuel assemblies 1110 in this nuclear fuel core 1100 include their own individual control rod assembly that is operated autonomously to raise and/or lower control rods 1150 (best shown in FIG. 7) to control reactivity during the nuclear reactor's operation. Each of the plurality of second nuclear fuel assemblies 1120 is free of a control rod assembly in one embodiment. However, in other embodiments, each of the plurality of second nuclear fuel assemblies 1120 can include a control rod assembly similar to that described above for the first nuclear fuel assemblies 1100.

Each of the first and second nuclear fuel assemblies 1110, 1120 comprise a plurality of nuclear fuel rods 1111. Because the first nuclear fuel assemblies 1110 are larger in transverse cross-sectional size than the second nuclear fuel assemblies 1120, each of the plurality of first nuclear fuel assemblies 1110 comprises X nuclear fuel rods while each of the plurality of second nuclear fuel assemblies 1120 comprises Y nuclear fuel rods, wherein Y is less than X. Thus, conceptually, the first nuclear fuel assemblies 1110 may be referred to as "full nuclear fuel assemblies" while the second nuclear fuel assemblies 1120 may be referred to as "partial nuclear fuel assemblies" for convenience. In one embodiment, a ratio of Y:X is in a range of 1:1.5 to 1:3. In a more specific embodiment, Y is about one-half X.

Figure 16:
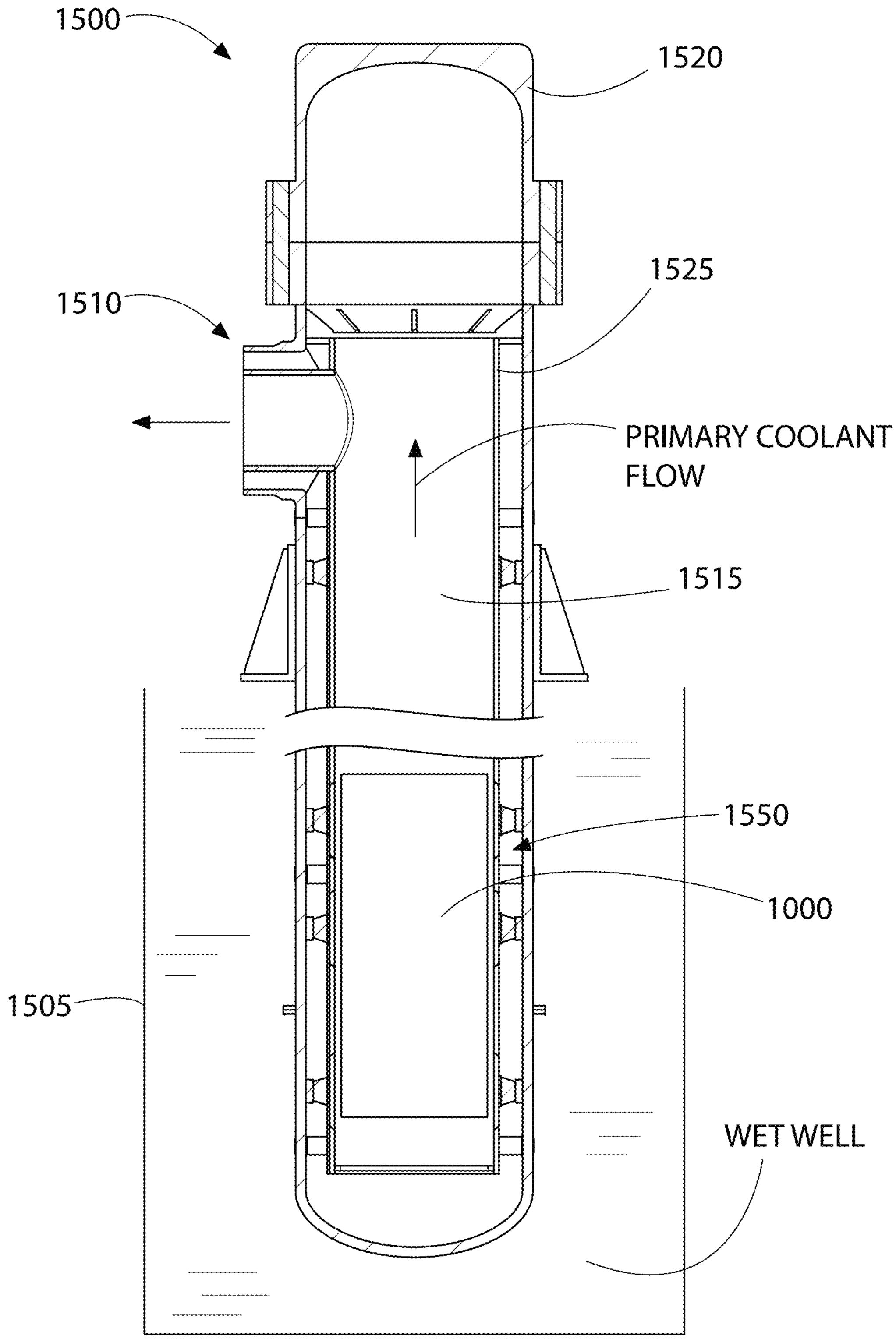
FIG. 16 is a side view of the nuclear fuel cartridge of FIG. 1 positioned within a nuclear reactor vessel, in accordance with an embodiment of the present invention.

Referring now to FIGS. 4 and 16 concurrently, it is mentioned above that when the nuclear fuel core 1100 is properly positioned in (or formed within) an interior cavity 1515 of the nuclear reactor vessel 1500, a nuclear reactor core 1550 is conceptually formed. In certain embodiments, in addition to the nuclear fuel core 1100, the nuclear reactor core 1550 may comprises a reflector cylinder. While in the embodiment illustrated in FIG. 16 the reflector cylinder is integrated as part of the nuclear fuel cartridge 1000 (see element 140 in FIG. 2), in other embodiments, the reflector cylinder may be mounted within the nuclear reactor vessel 1500 in a stationary manner.

Irrespective of whether the reflector cylinder is part of a portable nuclear fuel cartridge or permanently mounted within the nuclear reactor vessel 1500, the reflector cylinder may be a hollow tubular structure which extends vertically and defines a substantially circular interior compartment (in transverse cross-section) in which the nuclear fuel core 1100 is disposed. The reflector cylinder minimizes leakage of neutrons from the periphery of the nuclear fuel core 1100 by reflecting the outgoing neutrons back towards the nuclear fuel core 1100. The reflector cylinder circumferentially surrounds the nuclear fuel core 1100. In one embodiment, the reflector cylinder may be comprised of individual arcuately-shaped reflector wall segments, as described in greater detail below for the portable nuclear fuel cartridge 1000. In other embodiments, the reflector cylinder is singular hollow tube structure.

In certain embodiments, the reflector cylinder has a circular transverse cross-sectional shape while the first nuclear fuel assemblies 1110 have a rectangular transverse cross-sectional shape and are arranged in a rectilinear pattern. As a result, a spaces exists between the periphery of the pattern of first nuclear fuel assemblies 1110 and the inner surface of the reflector cylinder that is too small (or of a shape) such that one of the first nuclear fuel assembly cannot be accommodated. However, due to having a different transverse configuration than that of the first nuclear fuel assemblies 1110, the second nuclear fuel assemblies 1110 can be accommodated within the spaces formed between the periphery of the pattern of first nuclear fuel assemblies 1110 and the inner surface of the reflector cylinder. In one embodiment, the shape and size of the transverse cross-sectional shape of the second nuclear fuel assemblies 1120 is selected so that the spaces between the periphery of the pattern of first nuclear fuel assemblies 1110 and the inner surface of the reflector cylinder are substantially filled and completely occupied. As a result, the nuclear fuel core 1100 allows additional nuclear fuel rods 1111 to be packed into the nuclear fuel core 1100 while not taking up additional space within the nuclear reactor vessel 1500.

Additional structural details of certain embodiments of the first and second fuel assemblies 1110, 1120 will be described below with respect to the portable nuclear fuel cartridge 1000.

Portable Nuclear Fuel Cartridge

Figure 2:
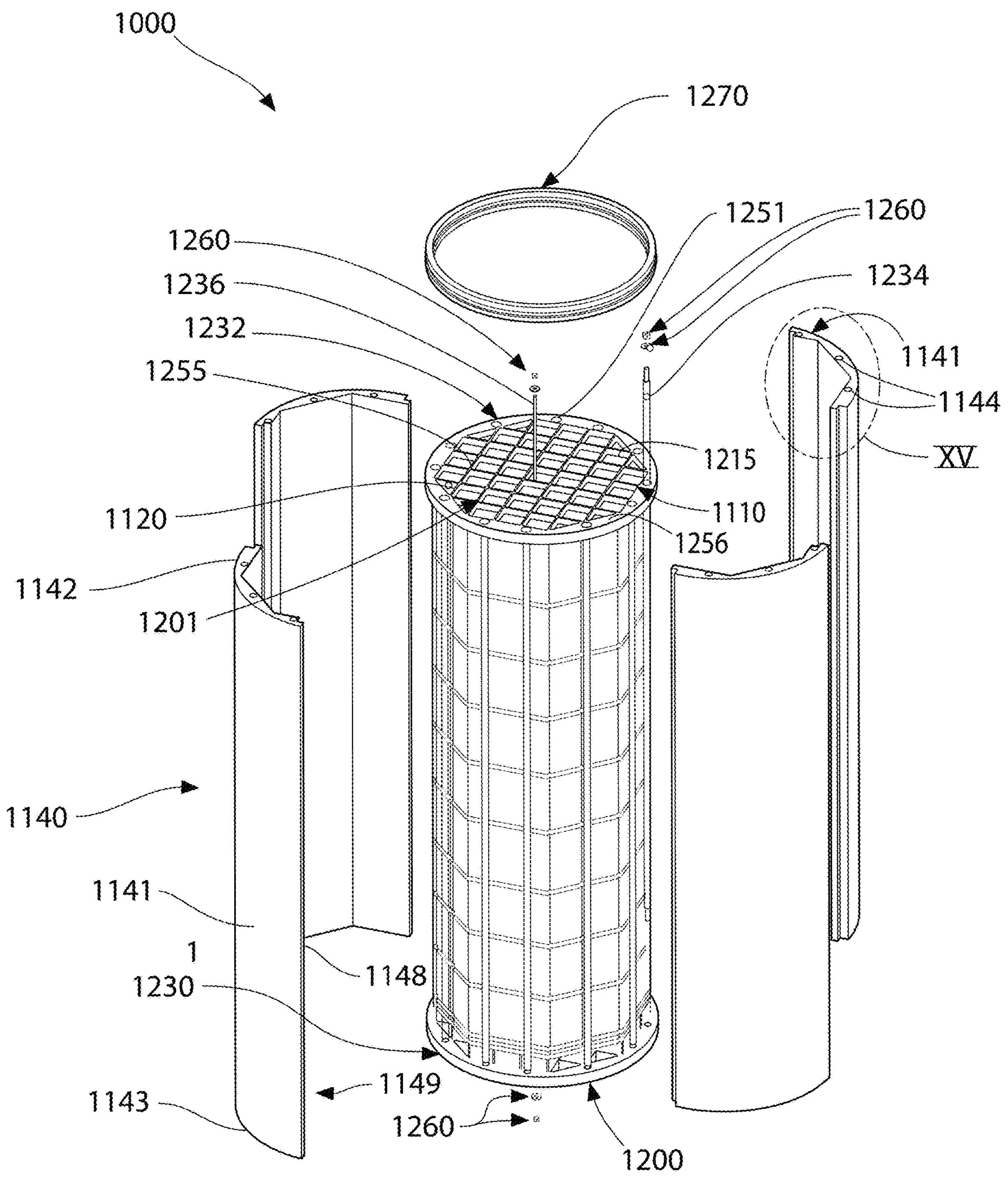
FIG. 2 is an exploded view of the nuclear fuel cartridge of FIG. 1.
Figure 3:
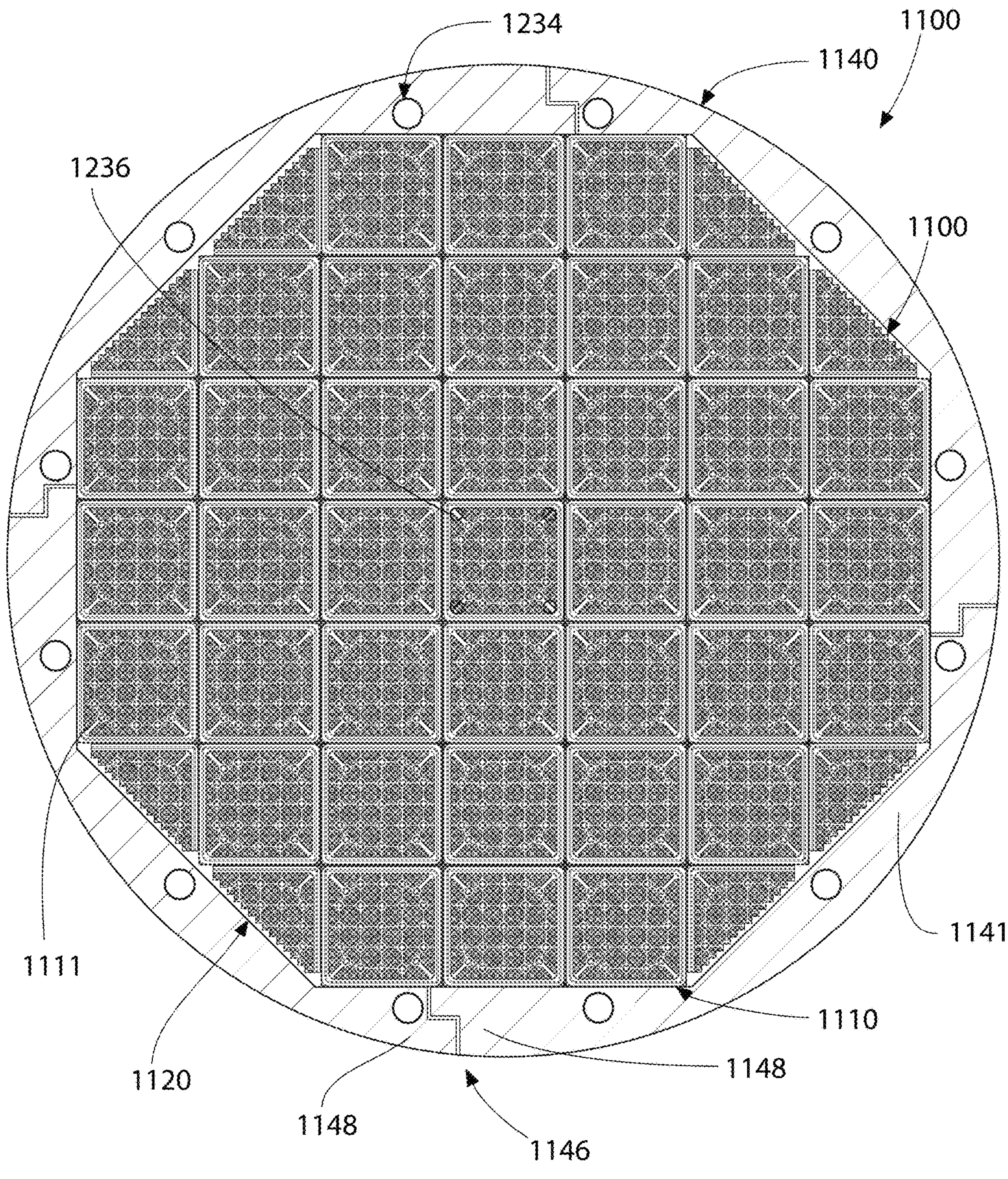
FIG. 3 is a transverse cross-sectional view through the nuclear fuel cartridge of FIG. 1 FIG. 1.

Referring now to FIGS. 1-3 concurrently, a portable nuclear fuel cartridge 1000 according to an embodiment of the present invention is illustrated. The portable nuclear fuel cartridge 1000 is a unitary, self-supporting construction that, in certain embodiments, can be free-standing when position on a horizontal surface. As discussed in greater detail below, the portable nuclear fuel cartridge 1000 comprises a unitary support structure 1200 (shown in isolation in FIG. 10) and an integrated nuclear fuel core, which is exemplified as the nuclear fuel core 1100 discussed above. While the nuclear fuel core 1100 is particularly suited for use in the portable nuclear fuel cartridge 1000, it should be noted that the portable nuclear fuel cartridge 1000 can include a wide variety of nuclear fuel core arrangements and, in certain embodiments, is not limited to the arrangement particulars of the nuclear fuel core 1100 described above. For example, in one such embodiment, the portable nuclear fuel cartridge 1000 can utilize a nuclear fuel core that includes only one type of nuclear fuel assembly, such as only the first fuel assemblies 1110 (or other types of fuel assemblies, such as hexagonal).

The portable nuclear fuel cartridge 1000, which includes an integrated nuclear fuel core 1100 can be lifted and transported as a self-contained and self-supported structural unit. This allows for rapid fueling (which as used herein includes refueling) and defueling of the nuclear reactor vessel 1500. Conceptually, the portable nuclear fuel cartridge 1000 may simply be plugged into or unplugged from a reactor vessel somewhat analogous to a self-contained power source like a typical battery. Due in part to the unitary construction of the portable nuclear fuel cartridge 1000 (with complete nuclear fuel core contained therein), the entire refueling outage duration for a nuclear reactor can be reduced to 5 days compared to a 30-day outage duration of modern reactors. Combined with a 48-month operating cycle, a nuclear reactor utilizing the portable nuclear fuel cartridge 1000 computes to have an installed availability factor of 99.6% (1455 days out of 1460 days), which has been unattainable heretofore in modern day reactors.

As exemplified, the portable nuclear fuel cartridge 1000 generally comprises the unitary support structure 1200 (shown in isolation in FIG. 10), the nuclear fuel core 1100 and a reflector cylinder 1140. In cert embodiments, the reflector cylinder 1140 may be omitted and incorporated into the nuclear react vessel 1500 as described above. The nuclear fuel core 1100 is mounted within the unitary support structure 1200 (described in greater detail below) such that a self-supporting assemblage is collectively formed than can be lifted as a single unit.

Referring now to FIGS. 1-3 and 10-14 concurrently, the unitary support structure 1200 is illustrated according to one embodiment of the present invention. The unitary support structure 1200 is sufficiently strong to enable handling of the portable nuclear fuel cartridge 1000 within a margin of safety required by ANSI 14.6(1993). While a specific structural embodiment of the unitary support structure 1200 will be described below, it is to be understood that the unitary support structure 1200 can take on wide variety of structural embodiments and configurations, including skeletal frameworks and enclosure-like housings.

The unitary support structure 1200 generally comprises a bottom support structure 1230 (exemplified as a bottom core plate), a top support structure 1232 (exemplified as a top core plate), and a plurality of longitudinal members 1234, 1236 (exemplified as connecting rods) that interconnect the top and bottom support structures 1232, 1230. It is to be understood that while the top and bottom structures are referred to as top and bottom core plates herein, it is to be understood that these terms are used broadly to encompass any structure that can provide the requisite structural integrity for handling the load while allowing adequate fluid flow through the integrated nuclear fuel core 1100.

The nuclear fuel core 1100 is sandwiched between the top and bottom core plates 1232, 1230 so as to be incapable of being removed from the unitary support structure 1200 without disassembling the unitary support structure 1200. As can be seen each of the top and bottom core plates 1232, 1230 comprise a lattice structure (or gridwork) 1201 that defines a plurality of open cells 1215. Thus, each of the top and bottom core plates 1232, 1230 comprises a plurality of open cells 1215.

The bottom and top core plates 1130, 1132 are each a honeycomb lattice structure, which has minimum cross sectional area and weight, but maximum flexural strength. This provides maximum open area for fluid flow in the vertical/axial direction. The resistance to flow can be customized by adding additional hydraulic resistance under each nuclear fuel assembly 1110, 1120 of the nuclear fuel core 1100 to promote the desired distribution of water up-flow along and through each fuel assembly 1110, 1120 in the nuclear fuel core 1100. As described in greater detail below, each of the plurality of open cells 1215 of the top and bottom core plates 1232, 1230 fluidly communicate with at least one of the nuclear fuel assemblies 1110, 1120 of the nuclear fuel core 1100 to form a fluid flow path through the nuclear fuel assemblies 1110, 1120.

Figure 14:
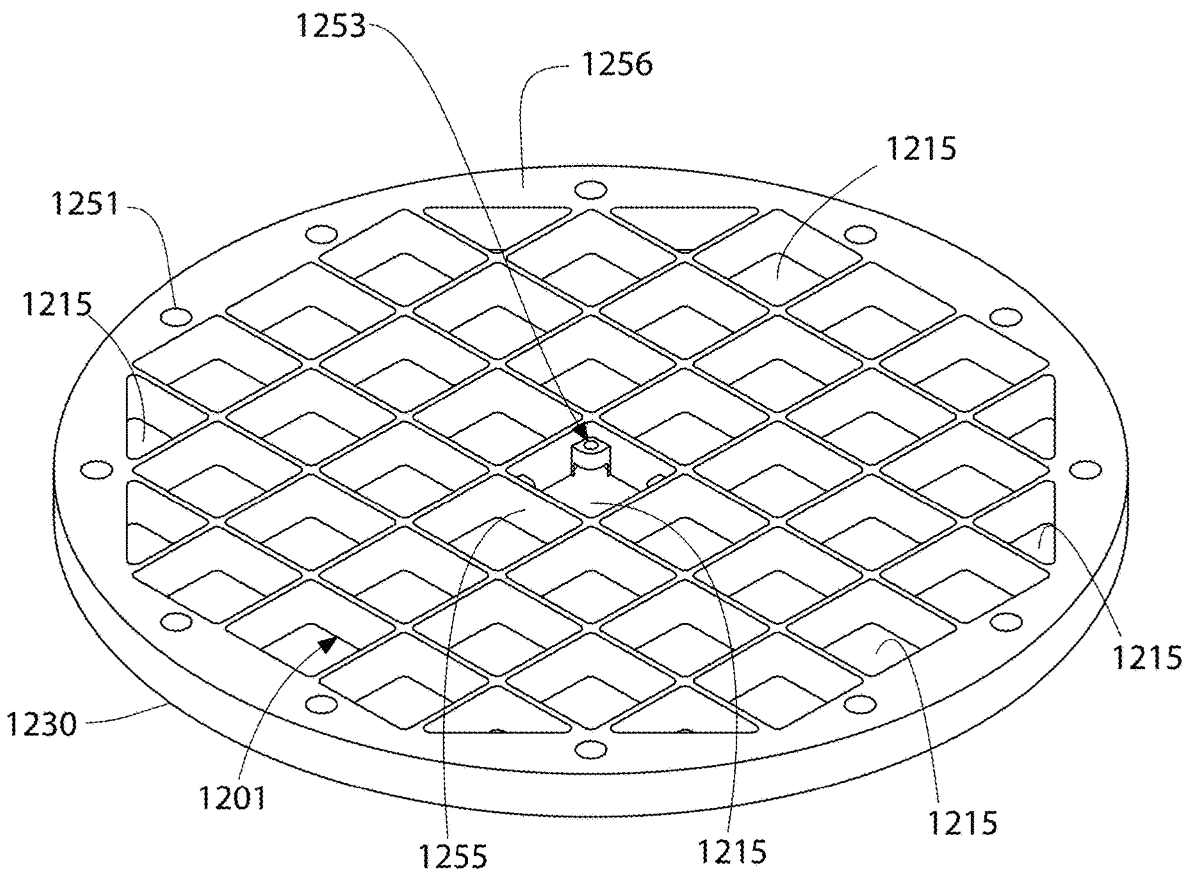
FIG. 14 is a perspective view of a bottom core plate of the unitary support structure of FIG. 10.
Figure 15:
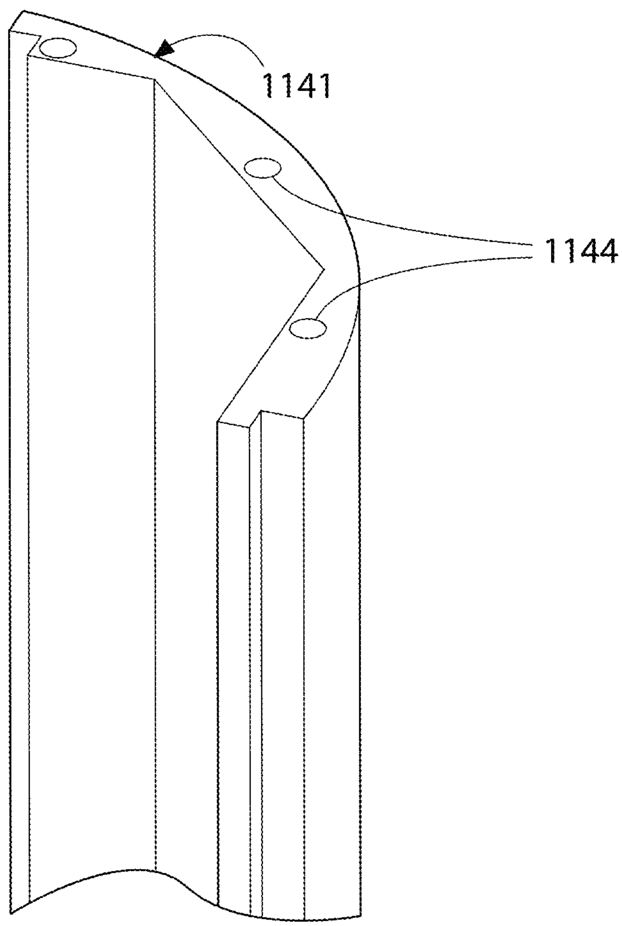
FIG. 15 is a close-up view of the top portion of one of the arcuate segments of the reflector cylinder of the nuclear fuel cartridge of FIG. 1.

While the bottom core plate 1130 is depicted in FIG. 14, it is to be understood that the top core plate 1132 may have a similar construction. Thus, the description below is applicable to both the bottom and top core plates 1232, 1230. The lattice/gridwork 1201 is formed created by an array of intersecting grid plates 1255 that are supported within an annular rim 1256. The plurality of open cells 1215 are created by the array of intersecting grid plates 1255. The open cells 1215 define passageways which are each configured and dimensioned to conform to the configuration of a respective one of the first or second nuclear fuel assemblies 1110, 1120 that are aligned therewith. When installed in the nuclear reactor during operation, this forms a primary reactor coolant flow paths through the portable nuclear fuel cartridge 1000 (in conjunction with the top and bottom nozzles 1152, 1154 of the fuel assemblies). Accordingly, the open cells 1215 may each have a polygonal configuration in top plan view in one embodiment which coincides with an associated nuclear fuel assembly 1110, 1120. Thus, in one embodiment, the open cells 1215 intended for the first nuclear fuel assemblies 1110 may be square in configuration while the open cells 1215 intended for the second nuclear fuel assemblies 1120 may be triangular in configuration. These open cells 1215 are arranged in pattern that corresponds to the pattern formed by the first and second nuclear fuel assemblies 1110, 1120 of the nuclear fuel core 1100. In one arrangement, the triangular shaped open cells 1215 are located near the periphery of the top and bottom core plates 1232, 1230. In the exemplified embodiment, the open cells 1115 collectively form a pattern having an octagonal shape in top plan view that matches the nuclear fuel core 1100.

Turning back to the structure of the unitary support structure 1200, the plurality of longitudinal members 1134, 1136 interconnect the top and bottom core plates 1232, 1230 at a fixed distance from one another. In the exemplified embodiment, the longitudinal members comprise a plurality of connecting rods 1234, 1236 extending axially between the top and bottom core plates 1232, 1230. As exemplified, the plurality of connecting rods comprise a plurality of peripheral connecting rods 1234 located outboard of the nuclear fuel core 1100 and a plurality of central connecting rods 1236 located inboard of the nuclear fuel core 1100.

The plurality of peripheral connecting rods 1234 are circumferentially arranged around a periphery of the self-supporting assemblage formed by the combination of the unitary support structure 1200 and the nuclear fuel core 1100. In the exemplified embodiment, the plurality of peripheral connecting rods 1234 are circumferentially arranged around the periphery in a substantially equi-spaced arrangement. The peripheral connecting rods 1234 extend through mounting holes 1251 formed through and around the periphery of the top and bottom core plates 1232, 1230 (in the annular rim 1256). As discussed below, the holes 1251 are concentrically alignable with through-passageways 1144 of the reflector cylinder 1140 so that the peripheral connecting rods 1234 can be used to coupled the reflector cylinder 1140 to the unitary support structure 1200.

The plurality of central connecting rods 1236 are located adjacent a central axis A-A of the self-supporting assemblage formed by the combination of the unitary support structure 1200 and the nuclear fuel core 1100. The central connecting rods 1236 pass through the space created by modifying the corners of the centrally located open cells 1215 of both of the top and bottom core plates 1232, 1230. The first nuclear fuel assembly 1110 positioned mounted in the central cells 1215 of the top and bottom core plates 1232, 1230 is modified to include notches in its corners to accommodate the plurality of central connecting rods 1236. The central cell 1215 includes corner brackets 1253 formed in each of the four corners at the intersections of the grid plates 1155. The brackets 1253 include holes configured to pass the central connecting rods 1234 therethrough. The centrally connecting rods 1134 help ameliorate the bending stress in the bottom core plate 1230, which carries the dead weight of the nuclear fuel core 1100 during lifting and handling of the portable nuclear fuel cartridge 1000 for various operations. In some embodiments, however, the central connecting rods 1156 may be omitted.

In one embodiment, the top and bottom core plates 1232, 1230 may be coupled together using the connecting rods 1134, 1136 with suitable mounting hardware 1260. The mounting hardware 1260 may include washers and hex nuts configured to engage threaded ends of the connecting rods 1234, 1236. Other suitable mounting hardware or means to couple the bottom and top core plates 1230 1232 may be used, such as welding. In one embodiment, the top and bottom core plates 1232, 1230 are removably coupled together to allow the nuclear fuel cartridge 1100 to be removed.

In one embodiment, the unitary support structure 1200 may further include an integral lifting ring 1270 to facilitate lifting and handling of the portable nuclear fuel cartridge 1000, such as by a crane and/or with appropriate rigging. In on embodiment, the lifting ring 1270 is fastened or otherwise fixed to the top core plate 1232. Any suitable means of connection could be used. In one possible embodiment, the peripheral connecting rods 1234 that join the top and bottom core plates 1232, 1230 together using mounting hardware 1260 may be used to attach the lifting ring 1270 to the top core plate 1232. Other suitable attachments methods may be used in addition to or instead of using the peripheral connecting rods 1234, such as welding, fasteners, or the like. The foregoing are only some possible, non-limiting examples.

Referring now to FIGS. 1-3 and 15, the portable nuclear fuel cartridge 1000 may also include, in certain embodiments, a reflector cylinder 1140 coupled to the unitary support structure. The reflector cylinder 1140 may be a hollow tubular walled structure which extends vertically and defines a substantially circular interior compartment (in transverse cross-section) for enclosing the nuclear fuel core 1100.

In one embodiment, the reflector cylinder 1140 may be comprised of individual arcuately-shaped reflector wall segments 1141 which are circumferentially joined together by longitudinally-extending flanged joints 1146 formed by vertical flanges 1148 formed on each lateral side 1149 of a segment. In one embodiment, the flanged joints 1146 formed between adjoining reflector wall segments 1141 may be interlocking lap joints in design having a step-shaped joint configuration as shown so that a portion of each segment lateral side 1149 overlaps the lateral end of the adjacent reflector segment to eliminate any straight pathways through the reflector cylinder 1140 for neutrons to escape. Various other suitable configurations are possible. As noted herein, the reflector cylinder 1140 reflects the neutrons escaping from the nuclear fuel core 1100 back inwards towards the nuclear fuel core 1100. The reflector wall segments 1141 of reflector cylinder 1140 may be made of any suitable metallic material operable having neutron reflecting properties.

The reflector cylinder 1140 can be coupled to the unitary support structure 1200 in a variety of manners, such as fastening, welding, or interference fit. In on embodiment, the reflector cylinder 1140 is coupled to the unitary support structure 1200 using the peripheral connecting rods 1234 that also join the bottom and top plates 1230, 1232. In this embodiment, the peripheral connecting rods 1234 pass through longitudinally-extending passageways 1144 formed in each reflector wall segment 1141. In the exemplified embodiment, the longitudinally-extending passageways 1144 are located on flanges that protrude inward from the reflector wall segment 1141.

As mentioned above, the peripheral connecting rods 1234 also extend through the mounting holes 1251 formed through and around the periphery of the top and bottom core plates 1232, 1230 in the annular rim 1256. The holes 1251 are axially alignable with through passageways 1144 of the reflector wall segments 1141 to pass the connecting rods 1234 therethrough. The flanged joints 1146 between adjoining reflector wall segments 1141 in some embodiments may be held together by the foregoing assembly of the bottom and top core plates 1230, 1232 and the peripheral connecting rods 1234 without any direct mechanical coupling between the flanges 1148 of the reflecting segments.

When coupled to the unitary support structure 1200, the reflector cylinder 1140 circumscribes the nuclear fuel core 1100. In some embodiments, the reflector cylinder 1140 may be omitted from the portable nuclear fuel cartridge 1000.

Referring now to FIGS. 5A and 6-9 concurrently, a single one of the first fuel assemblies 1110 is illustrated. Each first fuel assembly 1110 includes a plurality of fuel rods 1111, longitudinally spaced grid sheets 1113 (that include a plurality of openings through which the plurality of fuel rods 1111 extend), a plurality of control rods 1150, a top nozzle 1152, and a bottom nozzle 1154. The top and bottom nozzles 1152, 1154 are disposed at opposing top and bottom ends 1157, 1158 of the first nuclear fuel assembly 1110. In one embodiment, the top and bottom nozzles 1152, 1154 are open structures defining a central flow opening and may be formed by adjoining peripheral plates having a polygonal configuration in top plan view, and in some embodiments a rectilinear configuration.

In one embodiment, the top and bottom flow nozzles 1152, 1154 are configured and dimensioned to engage the top and bottom core plates 1130, 1132 respectively of the portable nuclear fuel cartridge 1000 so that the first nuclear fuel assemblies 1110 cannot be completely passed through the open cells 1215 of the top and bottom core plates 1232, 1230. Thought of another way, each of the plurality of fuel assemblies 1110, 1120 are sized and/or shaped so as to be incapable of being removed from the unitary support structure 1200 through the open cells 1215 of the top and bottom core plates 1232, 1230 with which it is in fluid communication. This allows the first nuclear fuel assemblies 1110 to be removably locked into the top and bottom core plates 1232, 1230 when the portable nuclear fuel cartridge 1000 is being assembled.

Accordingly, in one embodiment, each of the nuclear fuel assemblies 1110, 1120 comprises a top portion (which in the exemplified embodiment comprises the top nozzle 1152) that at least partially nests within one of the plurality of open cells 1215 of the top core plate 1232 and a bottom portion (which in the exemplified embodiment comprises the bottom nozzle 1154) that at least partially nests within one of the plurality of open cells 1215 of the bottom core plate 1230. In embodiments where the top and bottom nozzles 1152, 1154 may be omitted other cap or sleeve structures could be used in their stead.

Furthermore in order to ensure that the nuclear fuel assemblies 1110, 1120 cannot be completely passed through the open cells 1215 of the top and bottom core plates 1232, 1230, the top portion of each of the nuclear fuel assemblies 1110, 1120 comprises a top shoulder element (exemplified as stepped portion 1180) that abuts a bottom surface of the top core plate 1232. Similarly, the bottom portion of each of the nuclear fuel assemblies 1110, 1120 comprises a bottom shoulder element (also exemplified as stepped portion 1180) that abuts a top surface of the bottom core plate 1230. In other embodiments, the top and/or bottom shoulder elements can take the form of a protuberance, pin, flange, or any other structure capable of mechanically interfering with the lattice structure/gridwork 1201 in a manner that prevents the nuclear fuel assemblies 1110, 1120 from being slid completely through the open cells 1215. In still another embodiment, top and/or bottom shoulder elements can be formed by a sloped section/wall of the nuclear fuel assemblies 1110, 1120.

The top nozzle 1152 and the bottom nozzle 1154 each include the stepped portion 1180 which, as mentioned above, is configured to engage the grid plates 1255 defining the open cells 1215 of the top and bottom core plates 1232, 1230, thereby preventing the fuel assemblies 1110, 1120 from passing completely through the open cells 1215 in which they nest. In the exemplified embodiment, the stepped portion 1180 is formed in the peripheral lateral sides 1181 of each flow nozzle 1152, 1154. The stepped portion 1180 may extend partially or completely around the perimeter of the sides 1181 of the top and bottom nozzles 1152, 1154 and be intermittent or continuous in configuration. The stepped portion 1180 of top and bottom nozzles 1152, 1154 defines an outer insertion end portion 1182 configured to extend at least partially into the open cells 1115 of the bottom and top core plates 1230, 1232 and an inner end portion 1183 configured to have a larger cross sectional width than the open cells 1215 so as to remain outside of the open cells 1215 when the insertion end portion 1182 of the top and bottom nozzles 1152, 1154 are inserted into the open cells 1215.

As opposed to prior reactor core arrangements wherein the core plates are permanently affixed inside the reactor vessel and the fuel assemblies must be individually inserted one at a time through openings in the fixed plates, the foregoing present arrangement and configuration of the bottom and top core plates 1230, 1232 and top and bottom flow nozzles 1152, 1154 advantageously permit the fuel assemblies 1110, 1120 to be compressed between the top and bottom core plates 1232, 1230 to form a self-supporting and free standing structure.

In some embodiments, the top and bottom nozzles 1152, 1154 may further have a transverse cross-sectional shape which complements the cross-sectional shape of the first fuel assembly 1110. In one embodiment, the top and bottom nozzles 1152, 1154 may have a square shape in top plan view. The top and bottom nozzles 1152, 1154 provide flow outlets and inlets for the nuclear fuel core 1100, allowing the reactor primary coolant to flow through the core 1100 from end to end and pick up heat from the fuel rods 1111.

Figure 5A:
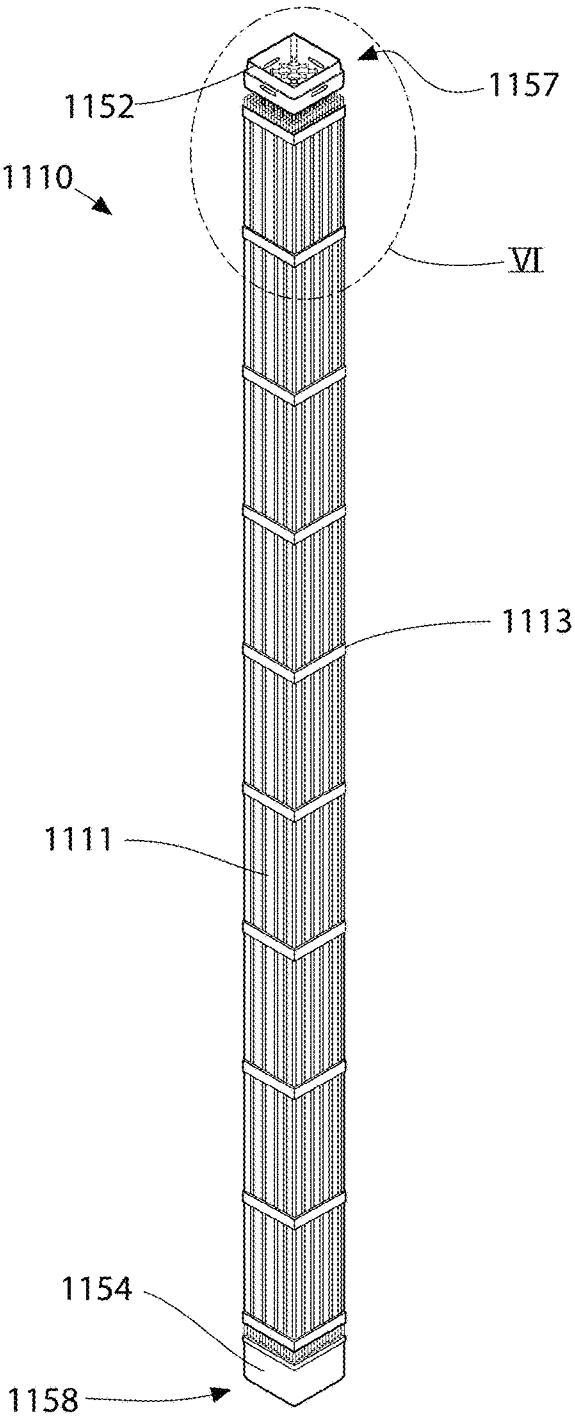
FIG. 5A is a perspective view of a first nuclear fuel assembly having a first transverse cross-sectional configuration removed from the nuclear fuel core of FIG. 4, the first transverse cross-sectional configuration comprising a rectangular transverse cross-sectional shape as exemplified.
Figure 5B:
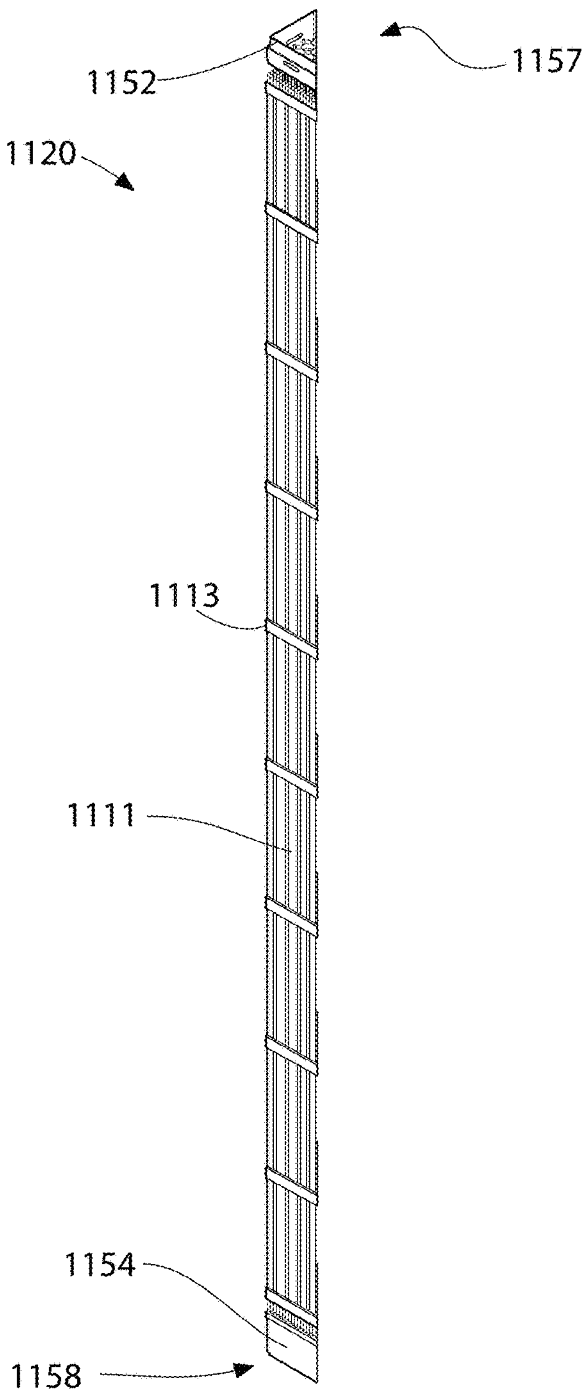
FIG. 5B is a perspective view of a second nuclear fuel assembly having a second transverse cross-sectional configuration removed from the nuclear fuel core of FIG. 4, the second transverse cross-sectional configuration comprising a triangular transverse cross-sectional shape as exemplified.
Figure 6:
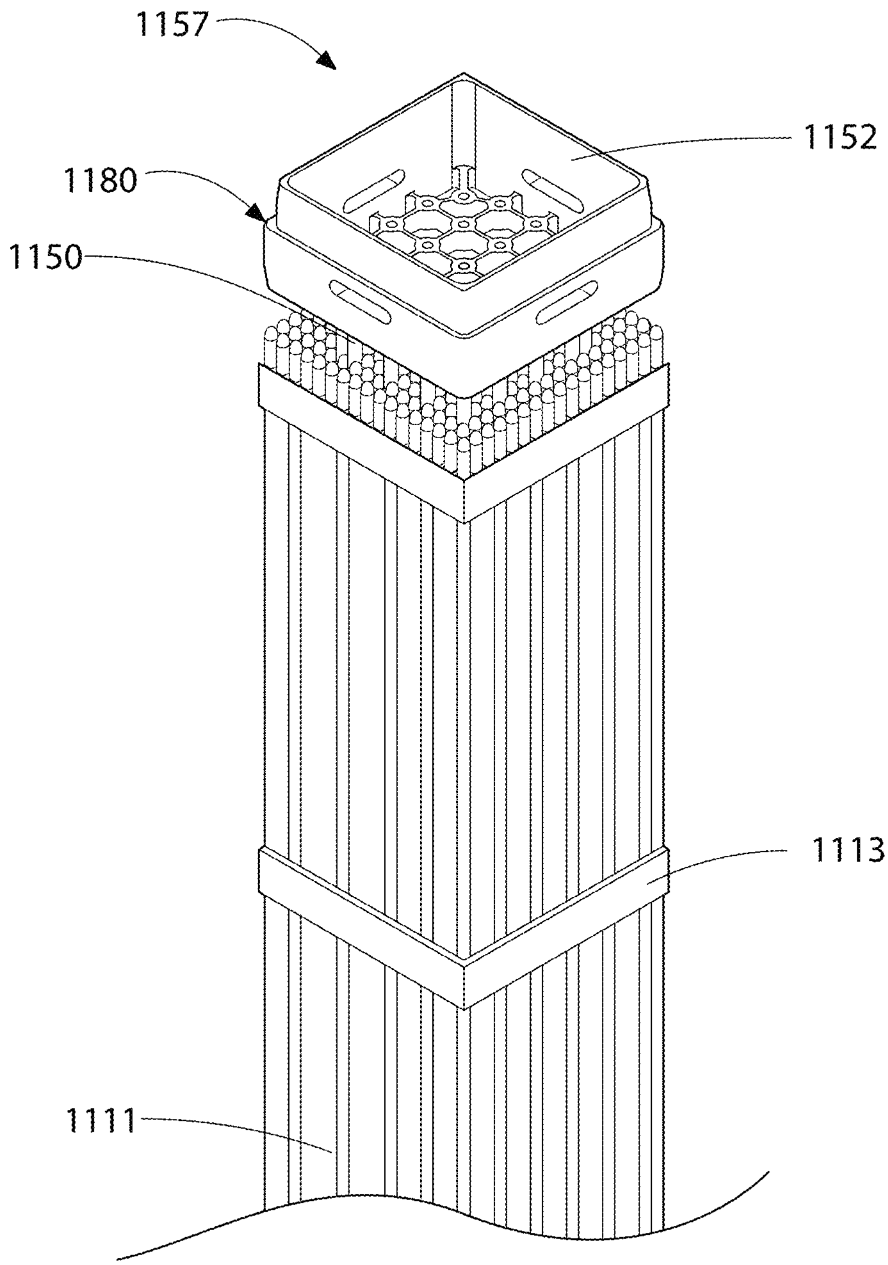
FIG. 6 is a close-up view of the top portion of the first nuclear fuel assembly of FIG. 5B taken at area VI.
Figure 7:
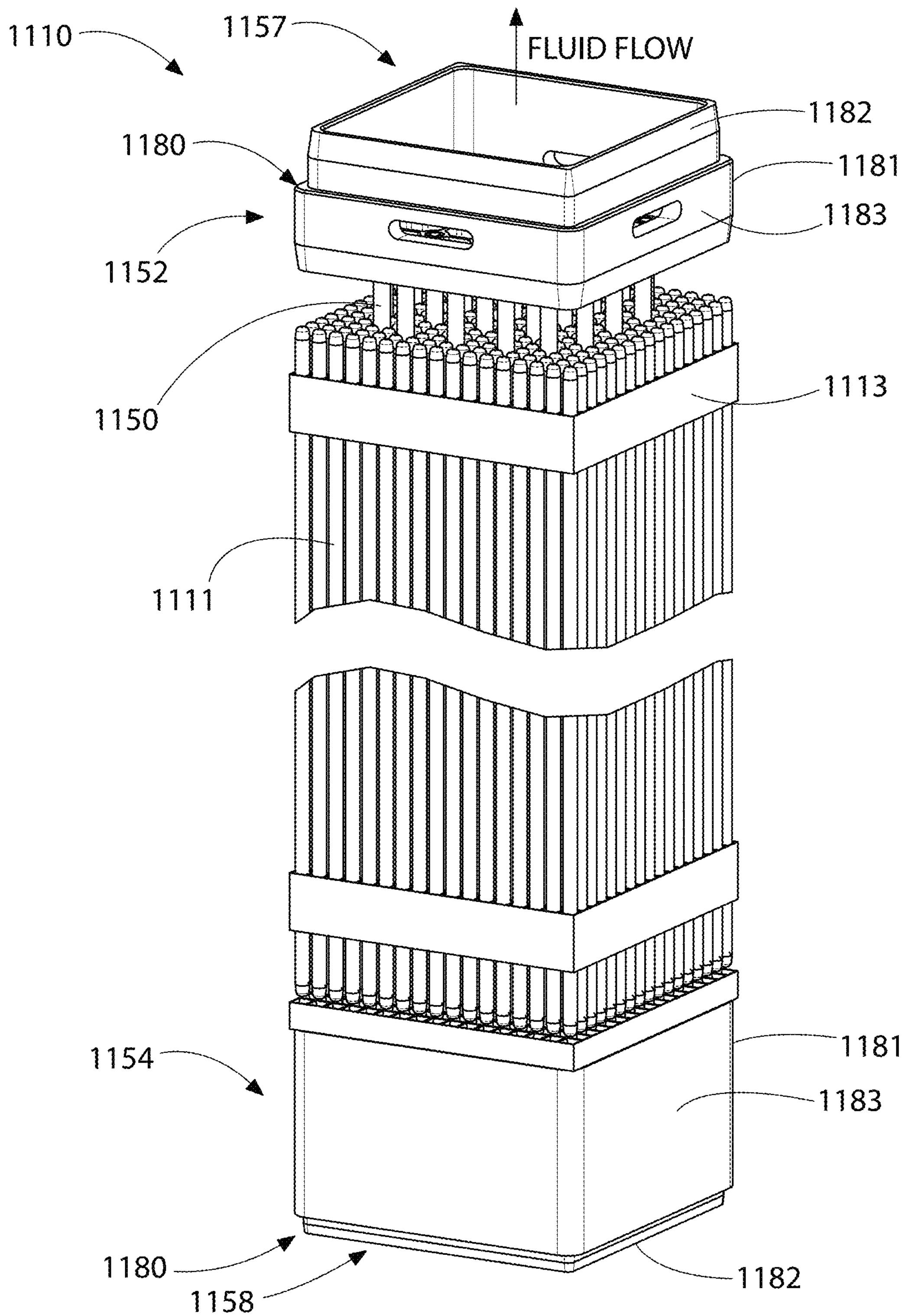
FIG. 7 is a close-up view of the top and bottom portions of the first nuclear fuel assembly of FIG. 5B, wherein the first nuclear fuel assembly is shown broken in length.

As shown in FIG. 5B, the second nuclear fuel assemblies 1120 may be similar in construction to the first fuel assemblies 1110 described above, having fuel rods 1111, top and bottom nozzles 1152, 1154, control rods 1150, and grid sheets 1113. The exception being that the components have a three-sided configuration instead of a four-sided configuration.

Having described the structure of the portable nuclear fuel cartridge 1000, an exemplary method for assembling the portable nuclear fuel cartridge 1000 will now be briefly described. The assembly process may begin by first generally positioning the fuel assemblies 1110, 1120 between top and bottom core plates 1232, 1230. The flow nozzles 1252, 1254 of the fuel assemblies 1110, 1120 are axially aligned with a respective open cell 1215 in the top and bottom core plates 1232, 1230. Next, the process includes partially inserting the insertion end portion 1182 of the top flow nozzle 1152 of each of the fuel assemblies 1110, 1120 into an open cell 1215 formed in the top core plate 1232. This is done in one embodiment from the underside of the top core plate 1232. The top nozzle 1152 is now partially inserted into the open cell 1215 and the shoulder portion 1180 of the top nozzle 1152 engages the top plate, more specifically the grid plates 1155. The same process is repeated for the bottom nozzles 1154 of the fuel assemblies 1110, 1120 in which the shoulder portions 1180 of the bottom nozzles 1154 are engaged with the bottom core plate 1230 in a similar manner. This process may be conducted in any order or sequence, so that in some instances the bottom flow nozzles 1154 may first be inserted into the bottom core plate 1230 before the top flow nozzles 1152 are inserted into the top core plate 1232. Either approach is acceptable.

The assembly process continues by coupling the top and bottom core plates 1232, 1230 together using the plurality of connecting rods 1234 and 1236 (where used) extending between the core plates 1230,1232 as described above. The threaded ends of the connecting rods 1234, 1236 are inserted through the holes 1251 and the central mounting brackets 1253 in the top and bottom core plates 1232, 1230. The mounting hardware 1260 is installed on each connecting rod 1234, 1236. The nuts of the mounting hardware 1260 are tightened, which in turn results in drawing the top and bottom core plates 1232, 1230 together with the connecting rods. The fuel assemblies 1110, 1120 are compressed between the top and bottom core plates 1230, 1232 to complete the portable nuclear fuel cartridge 1000 assembly process.

The assembled portable nuclear fuel cartridge 1000 defines a compact and versatile nuclear fuel core unit that may be installed in a reactor vessel 1500 of any suitable configuration and in any appropriate orientation. FIG. 16 shows the portable nuclear fuel cartridge 1000 in one of many possible installations in a reactor vessel 1500. The portable nuclear fuel cartridge 1000 is shown positioned inside a nuclear reactor vessel 1500 which is located in a nuclear reactor containment enclosure 1505 including a wet well. The reactor vessel 1500 includes a primary coolant inlet/outlet nozzle 1510 and a removable nuclear reactor vessel head 1520 which provides access to an interior cavity 1515 of the nuclear reactor vessel 1500 configured for receiving and supporting the portable nuclear fuel cartridge 1000, as shown. In one embodiment, the portable nuclear fuel cartridge 1000 may be positioned in a riser pipe 1525 disposed inside the reactor vessel 1500; however, other suitable mounting arrangements may be used. In one embodiment, the fuel cartridge 1000 may be oriented vertically and primary coolant in the reactor vessel may flow upwards through the fuel cartridge 1000 and reactor core fuel assemblies 1110, 1120 entering the bottom core plate 1230 and leaving the top core plate 1232. The primary coolant is heated as it flows through the fuel assembly core 1100 in passing by the fuel rods 1111 in a manner well known in the art. The primary coolant in the reactor vessel 1500 enters the bottom core plate 1230 and a bottom nozzle 1254 of the fuel assemblies 1110, 1120, flows in parallel along the fuel rods 1111, and exits the top nozzle 1252 and top core plate 1232. It will be appreciated that in some embodiments, the partial fuel assemblies 1120 may optionally be omitted.

Methods of Fueling a Nuclear Reactor

Referring now to FIG. 16, a method of fueling a nuclear reactor 1500 according to the present invention will be described. While the inventive method is described below in conjunction with the portable nuclear fuel cartridge 1000 described above, it is to be understood tat the method is not so limited in al embodiments and different structural embodiments of a portable nuclear fuel cartridge can be utilized.

The method may include: opening a reactor vessel 1500 defining an interior cavity 1515; loading the fuel cartridge 1000 into the cavity 1515; and closing the reactor vessel 1500. Because the fuel cartridge 1000 comprises an integrated fuel core 1100, there is no need to manipulate and handle individual fuel assemblies 1110 or 1120 on site when initially fueling the reactor vessel 1500. The entire fuel cartridge 1000 is merely lifted and transported to the reactor vessel 1500 and then inserted or plugged into the reactor vessel 1500 after removing the nuclear reactor vessel head 1520 from the nuclear reactor vessel body. The top head closure 1220 is then re-closed. If a spent fuel cartridge 1000 is in place in the reactor, this spent unit would first be removed from the reactor vessel 1500 to make room for the new fuel cartridge 1000. Advantageously, the fuel cartridge 1000 with all of the fuel assemblies 1110, 1120 installed may be assembled outside of the reactor vessel 1500 and containment enclosure, either elsewhere on site or off site. Since the fully assembled and complete fuel cartridge 1000 is ready to go, the duration of a refueling outage may be greatly reduced thereby saving labor, time, and financial resources.

Another method of fueling a nuclear reactor will now be described, in which the method comprises: a) opening a nuclear reactor vessel; b) moving a nuclear fuel cartridge from a position outside of the nuclear reactor vessel to a position within an interior cavity of the nuclear reactor vessel, the nuclear fuel cartridge comprising a unitary support structure, and a plurality of nuclear fuel assemblies arranged to collectively form a fuel core, the fuel core mounted in the unitary support structure; and c) closing the nuclear reactor vessel. The nuclear fuel cartridge is moved as a single unit.

The step of opening the nuclear reactor vessel may include setting a water level in a reactor containment enclosure to allow access to head bolts that secure a nuclear reactor vessel head to a nuclear reactor vessel body, removing the head bolts, and raising the water level and removing the nuclear reactor vessel head from the nuclear reactor vessel body to provide an opening into the interior cavity of the nuclear reactor vessel.

The step of opening the nuclear reactor vessel may comprise removing a nuclear reactor vessel head from a nuclear reactor vessel body to provide an opening into the interior cavity of the nuclear reactor vessel. The step of moving the nuclear fuel cartridge may comprise lowering the nuclear fuel cartridge into the nuclear reactor vessel body. The step of closing the nuclear reactor vessel may comprise securing the nuclear reactor vessel head to the nuclear reactor vessel body to enclose the opening into the interior cavity.

In certain embodiments, the step of moving the nuclear fuel cartridge may further comprise coupling a crane to the unitary support structure of the nuclear fuel cartridge, lifting the nuclear fuel cartridge with the crane, lowering the nuclear fuel cartridge into the nuclear reactor vessel body with the crane, and uncoupling the crane from the unitary support structure of the nuclear fuel cartridge. Coupling the crane to the unitary support structure may comprise coupling the crane to a lifting ring of the unitary support structure.

The fuel core of the nuclear fuel cartridge may comprise all nuclear fuel assemblies used to operate the nuclear reactor for a cycle life, which may be greater than 24 months in certain embodiments. During the moving step, the unitary support structure is sufficiently strong to enable handling of the nuclear fuel cartridge within a margin of safety required by ANSI 14.6(1993).

Methods of Defueling a Nuclear Reactor

Referring now to FIGS. 17 to 36, a method of defueling a nuclear reactor 1500 according to the present invention will be described. While the inventive method is described below in conjunction with the portable nuclear fuel cartridge 1000 described above, it is to be understood that the method is not so limited in al embodiments and different structural embodiments of a portable nuclear fuel cartridge can be utilized.

In one embodiment, the method of defueling a nuclear reactor comprises: a) opening a nuclear reactor vessel; b) removing a nuclear fuel cartridge from an interior cavity of the nuclear reactor vessel, the nuclear fuel cartridge comprising a unitary support structure, and a plurality of nuclear fuel assemblies arranged to collectively form a fuel core, the fuel core mounted in the unitary support structure; and c) submerging the nuclear fuel cartridge within a spent fuel pool.

Figure 17:
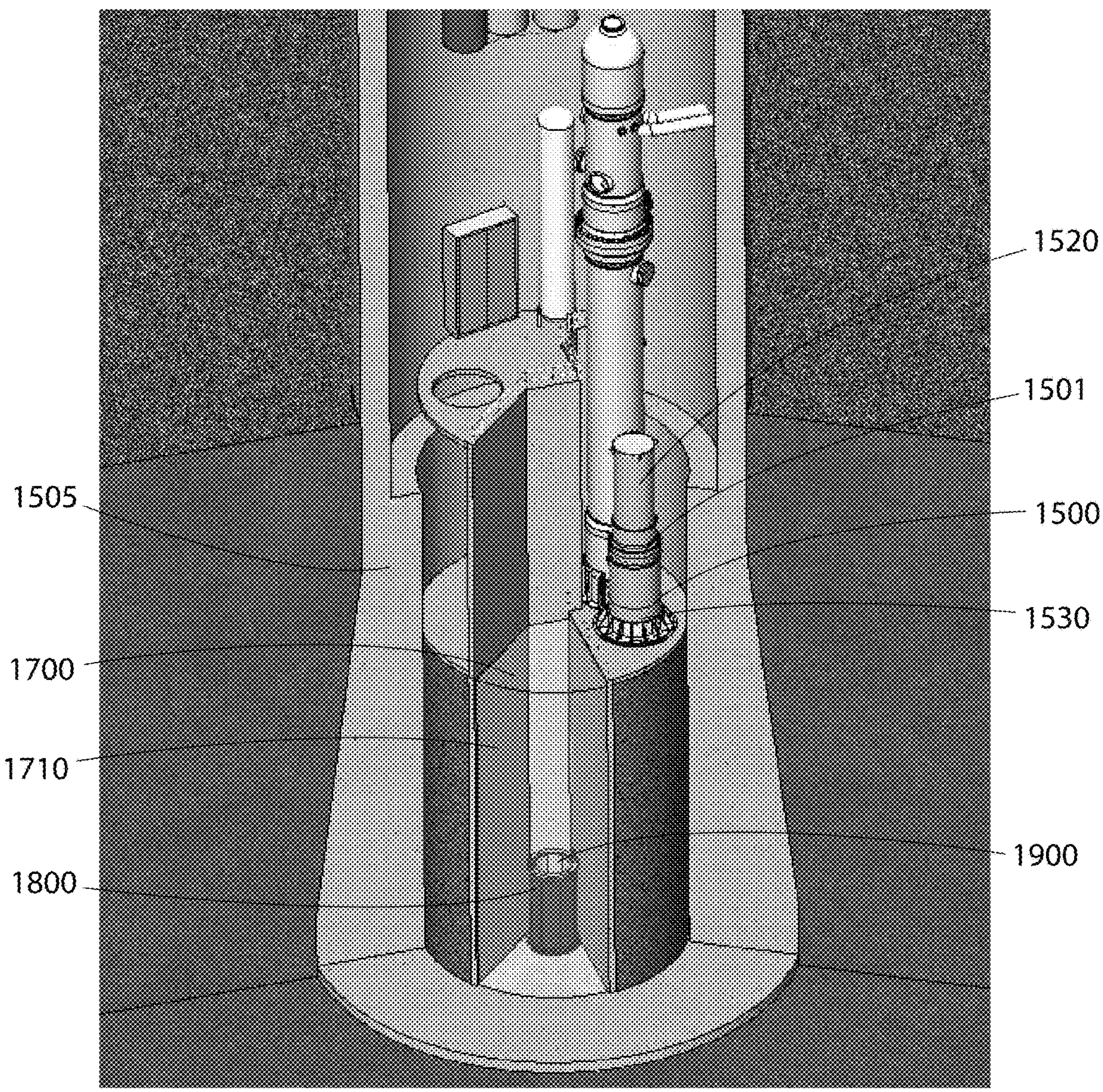

With reference to FIG. 17, in certain embodiments the step of opening the nuclear reactor vessel 1500 may include setting a water level 1700 in a reactor containment enclosure 1505 to allow access to head bolts 1501 that secure a nuclear reactor vessel head 1520 to a nuclear reactor vessel body 1530. Removing the head bolts 1501. An open transfer cask 1800, which includes an open multi-purpose canister 1900 therein, may also be submerged in the spent nuclear fuel pool 1710 at this time.

Figure 18:
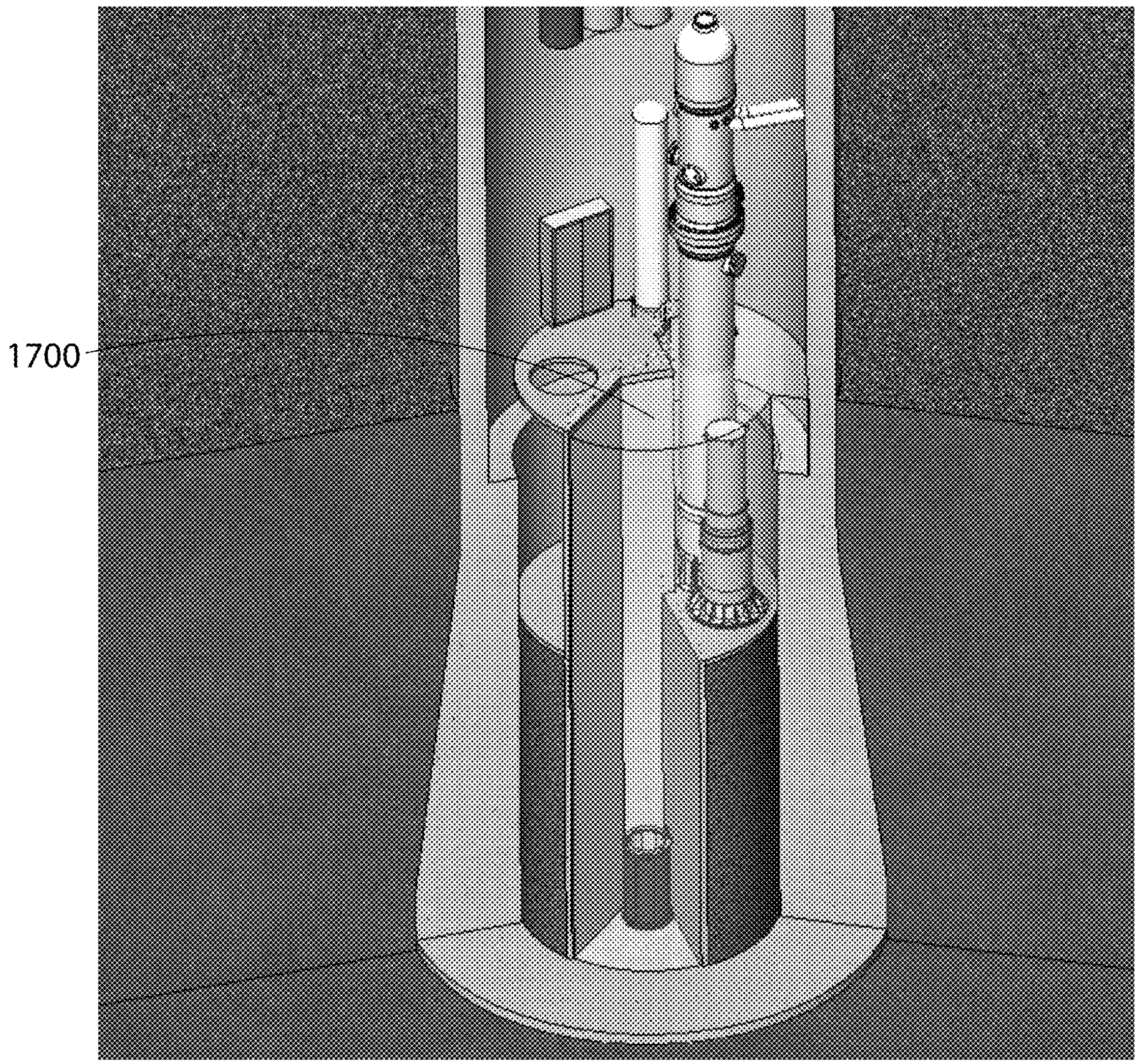
Figure 19:
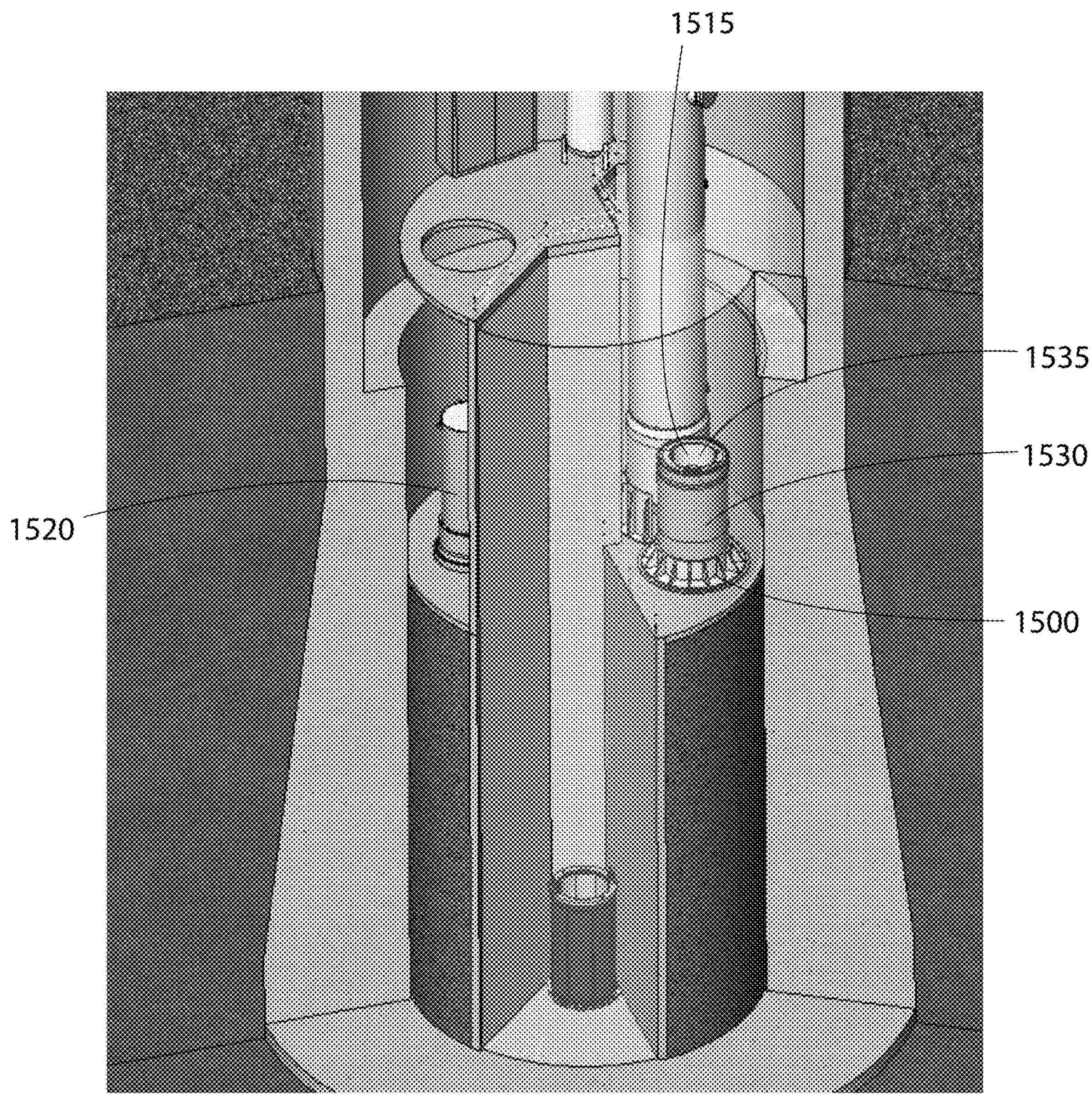

With reference now to FIG. 18, the water level 1700 is then raised. With reference now to FIG. 19, and the nuclear reactor vessel head 1520 is removed from the nuclear reactor vessel body 1530 to provide an opening 1535 into the interior cavity 1515 of the nuclear reactor vessel 1500.

Figure 20:
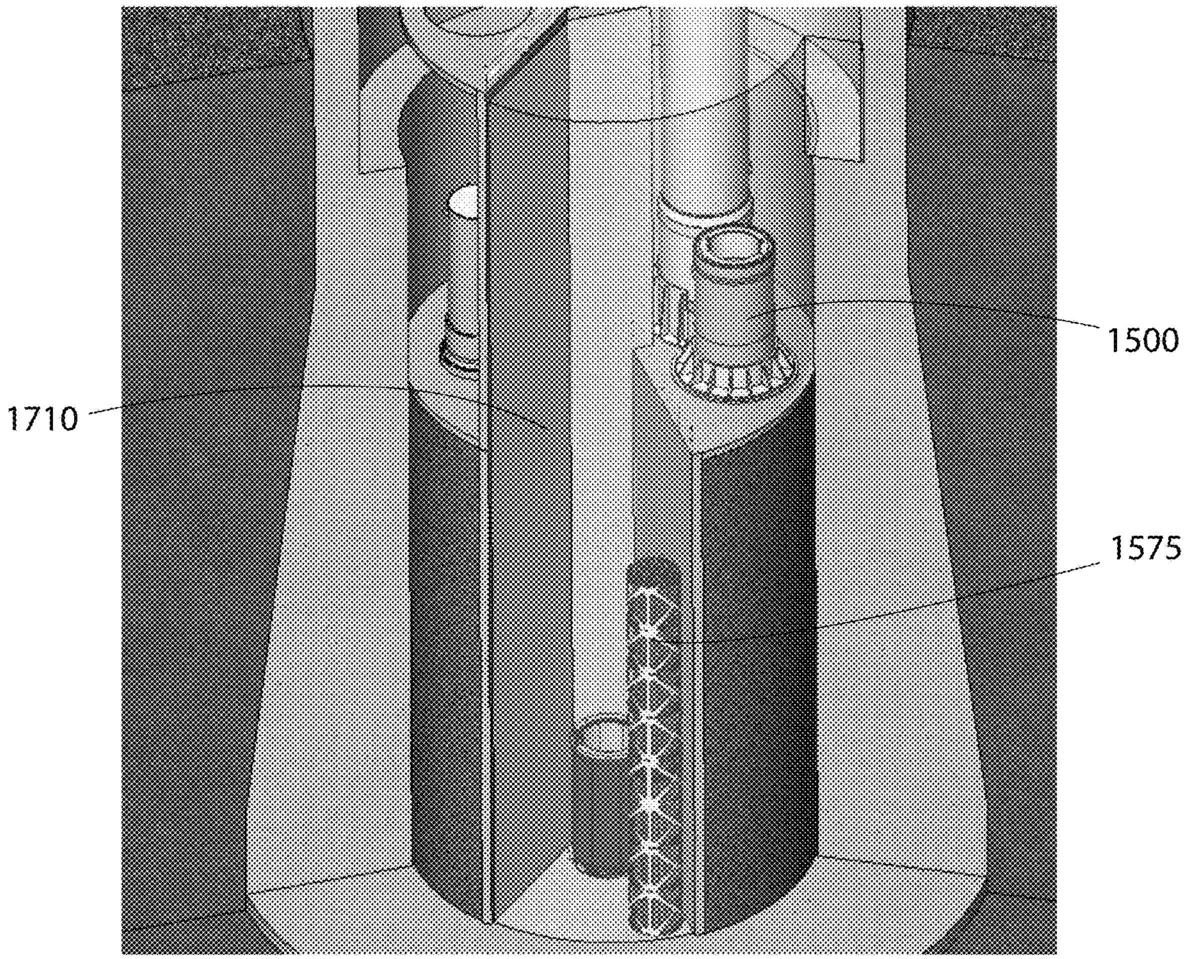
Figure 21:
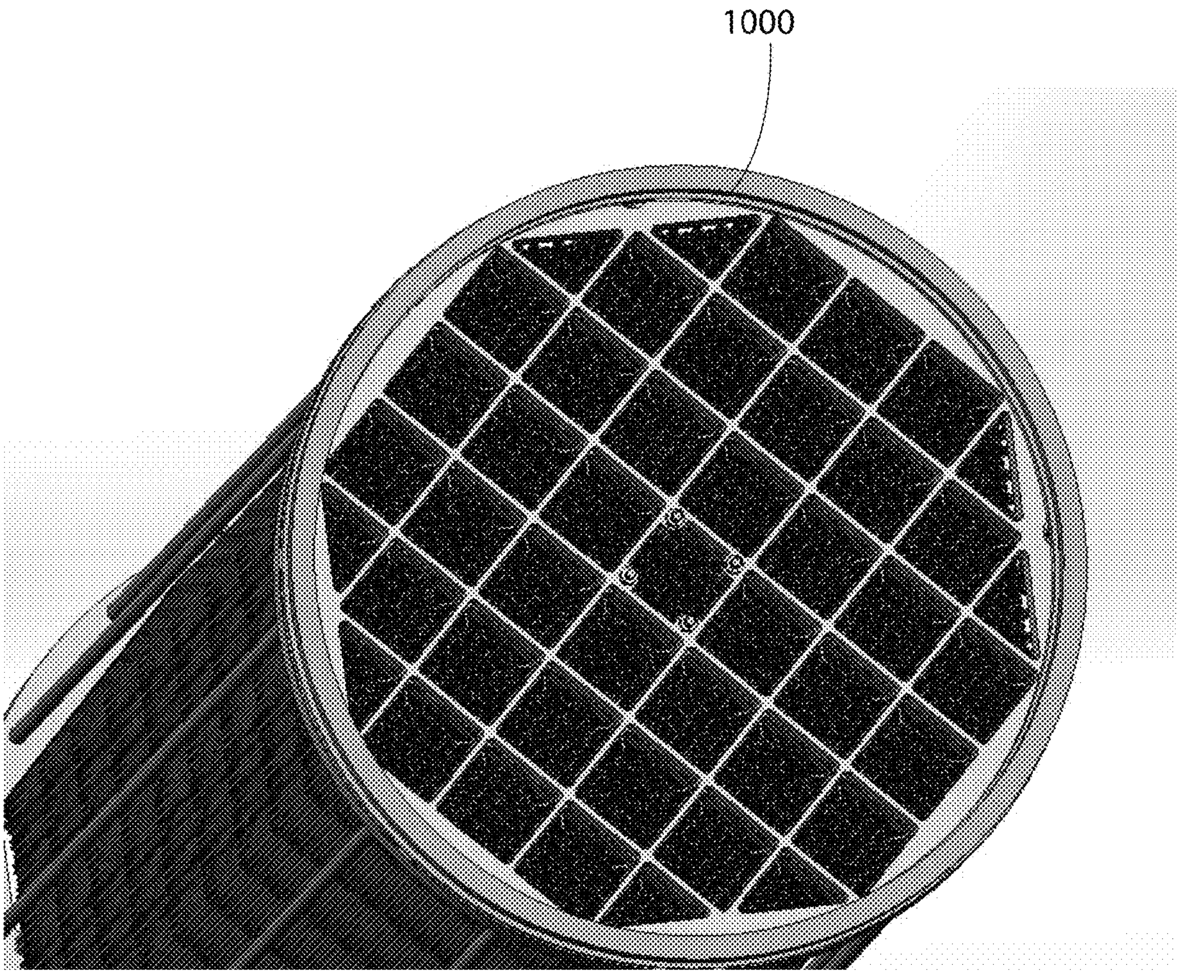

With reference now to FIG. 20, the control rod drive internals 1575 are removed from the nuclear reactor vessel 1500 and placed in the spent fuel pool 1710. A crane (or other lifting mechanism) is then coupled to the unitary support structure 1200 of the nuclear fuel cartridge 1000 (FIG. 21), which is located within the nuclear reactor vessel 1500 as described above. In one embodiment, the crane is coupled to the lifting ring 1270 of the unitary support structure 1200. The nuclear fuel cartridge 1000 is then lifted out of the interior cavity 1515 of the nuclear reactor vessel 1500 with the crane. It should apparent from the above that the nuclear fuel cartridge 1100 is removed from the nuclear reactor vessel 1500 as a single unit.

Figure 22A:
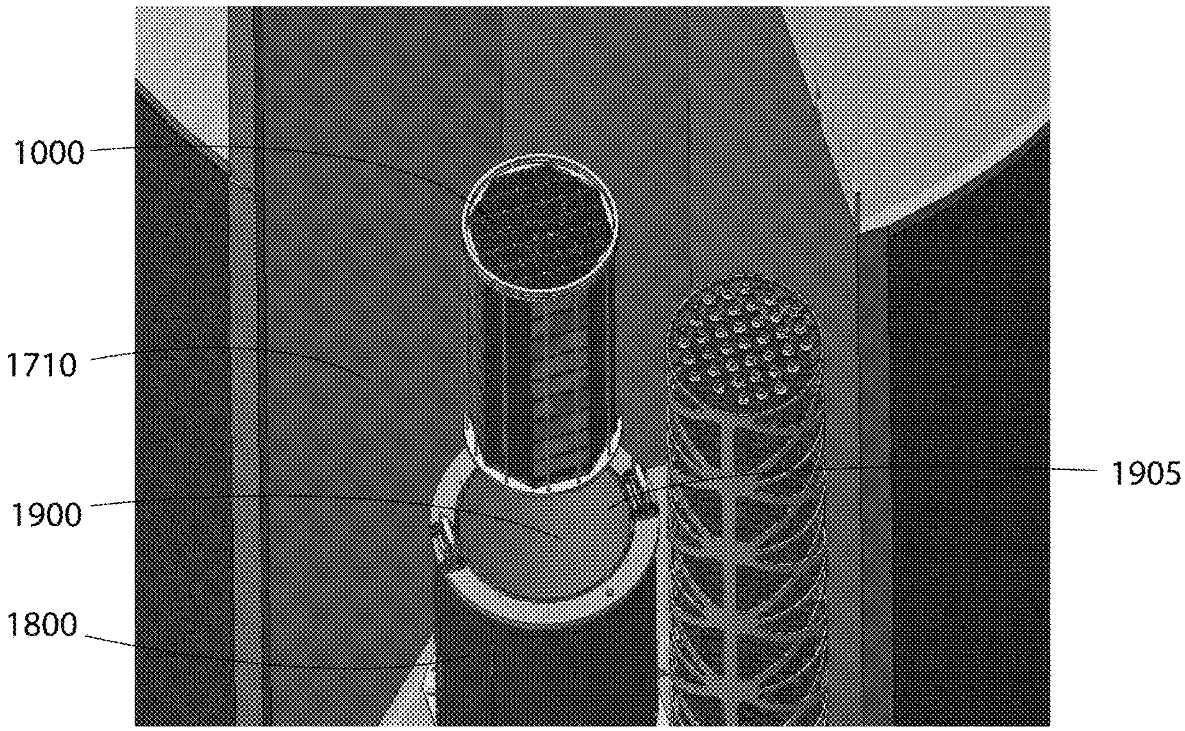
FIG. 22A is a sixth step in the process.
Figure 22B:
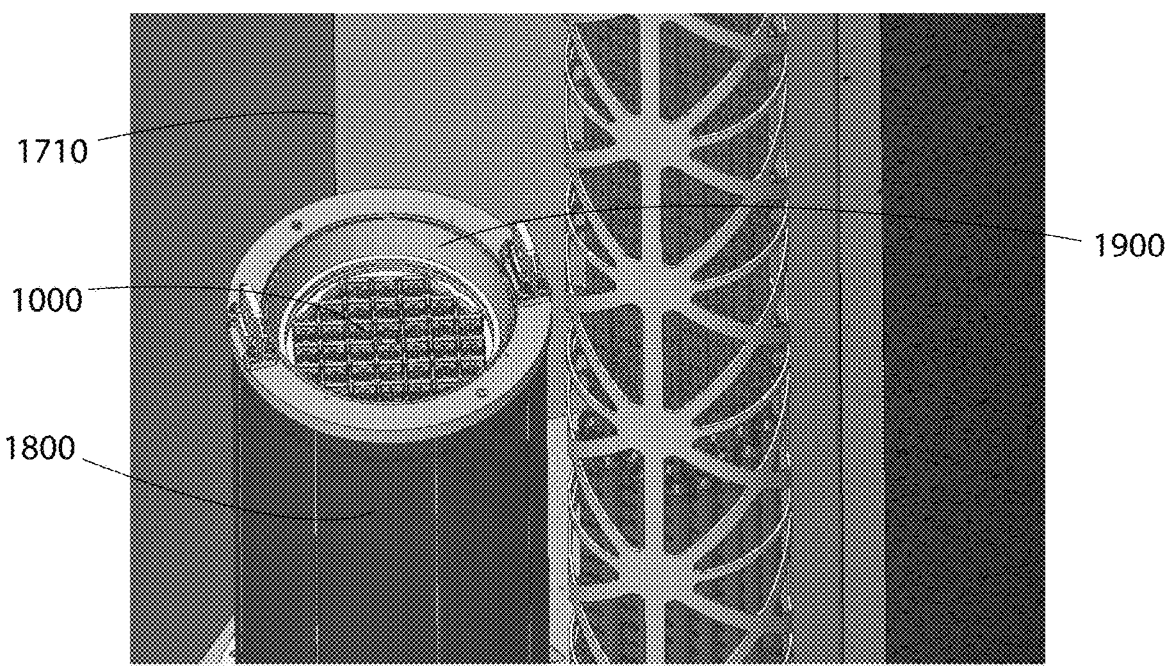
FIG. 22B is a seventh step in the process.

With reference now to FIGS. 22A-B concurrently, the nuclear fuel cartridge 1000 is then lowered into the spent nuclear fuel pool 1710 and lowered into the cavity 1905 of the open multi-purpose canister 1900. As mentioned above, the open multi-purpose canister 1900 may be positioned within an open transfer cask 1800 at this time. The nuclear fuel cartridge 1000 is lowered/submerged into the spent fuel pool 1710 as a single unit.

Figure 23:
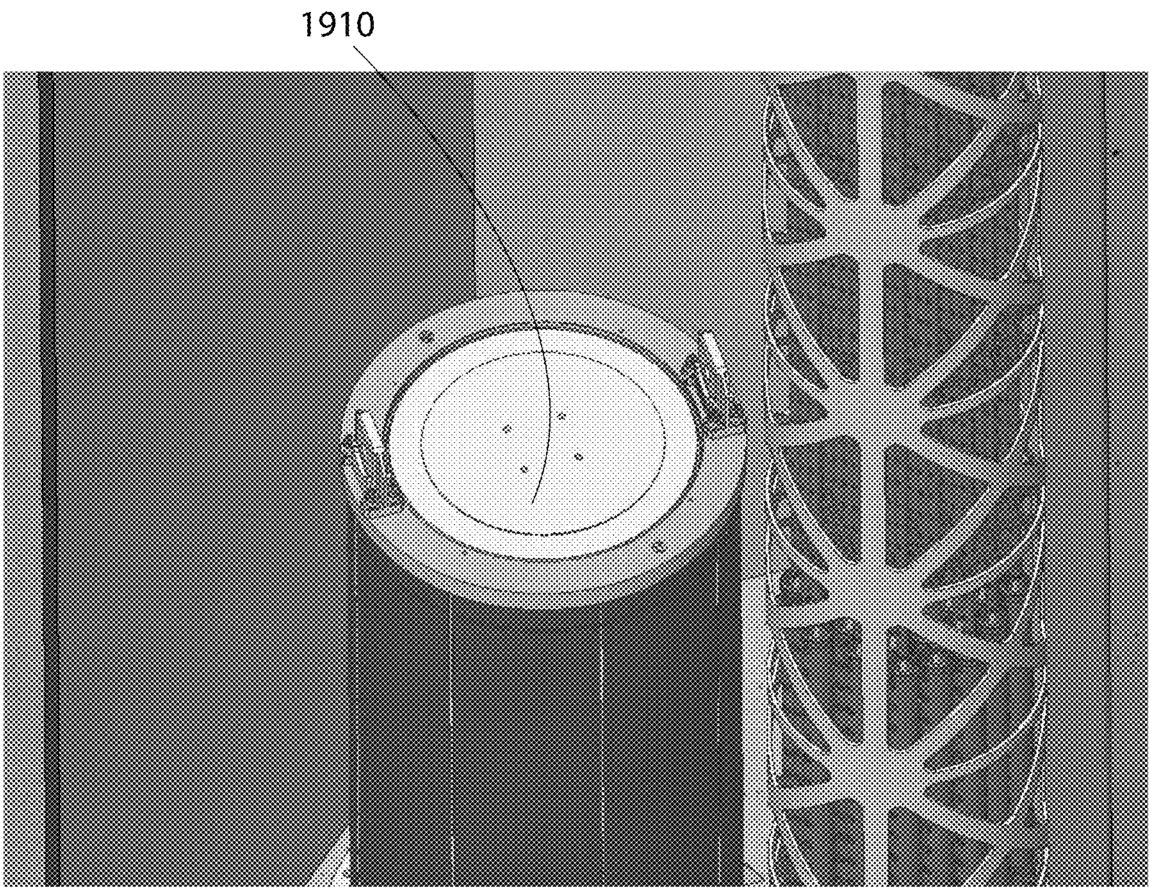
Figure 24:
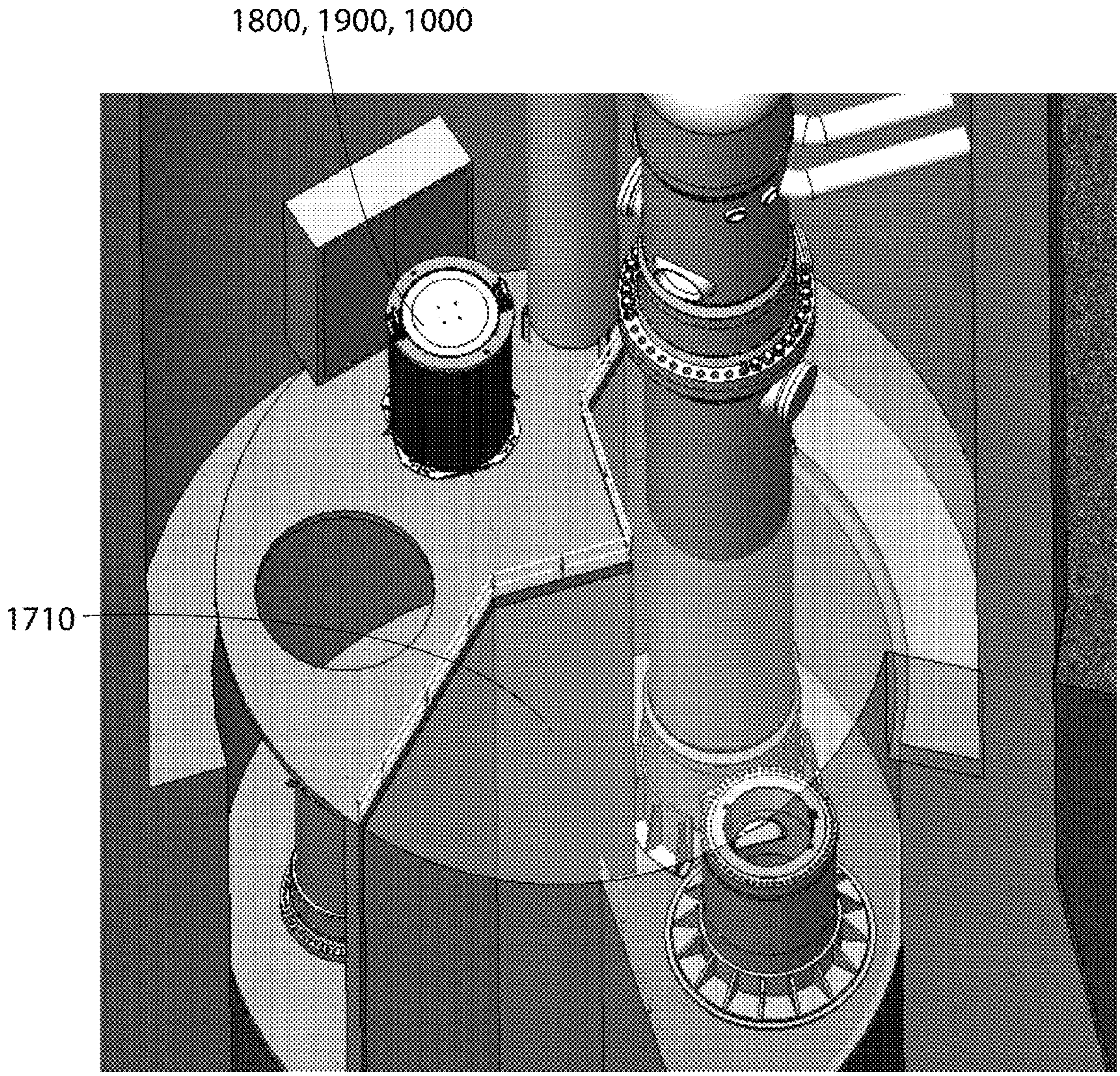

With reference now to FIG. 23, once the nuclear fuel cartridge is within the multi-purpose canister 1900, the multi-purpose canister 1900 is closed by positioning a canister lid 1910 in place. With reference now to FIG. 24, the open cask 1800 and closed canister 1900 are then lifted from the spent fuel pool 1710. The closed multi-purpose canister 1900 is then prepared for dry storage. In one embodiment, this preparation includes draining bulk water from the closed multi-purpose canister 1900, flowing a non-reactive gas through the closed multi-purpose canister 1900 to achieve a level of dryness within the multi-purpose canister 1900 suitable for dry storage, backfilling the closed multi-purpose canister 1900 with a non-reactive gas, and sealing the closed canister. As a result of the above, the unitary support structure 1200 of the nuclear fuel cartridge 1000 serves as a fuel basket within the multi-purpose canister 1900. The multi-purpose canister 1900, along with its load of the nuclear fuel cartridge 1000 is now ready for further transport and storage in a ventilated storage cask.

Figure 25:
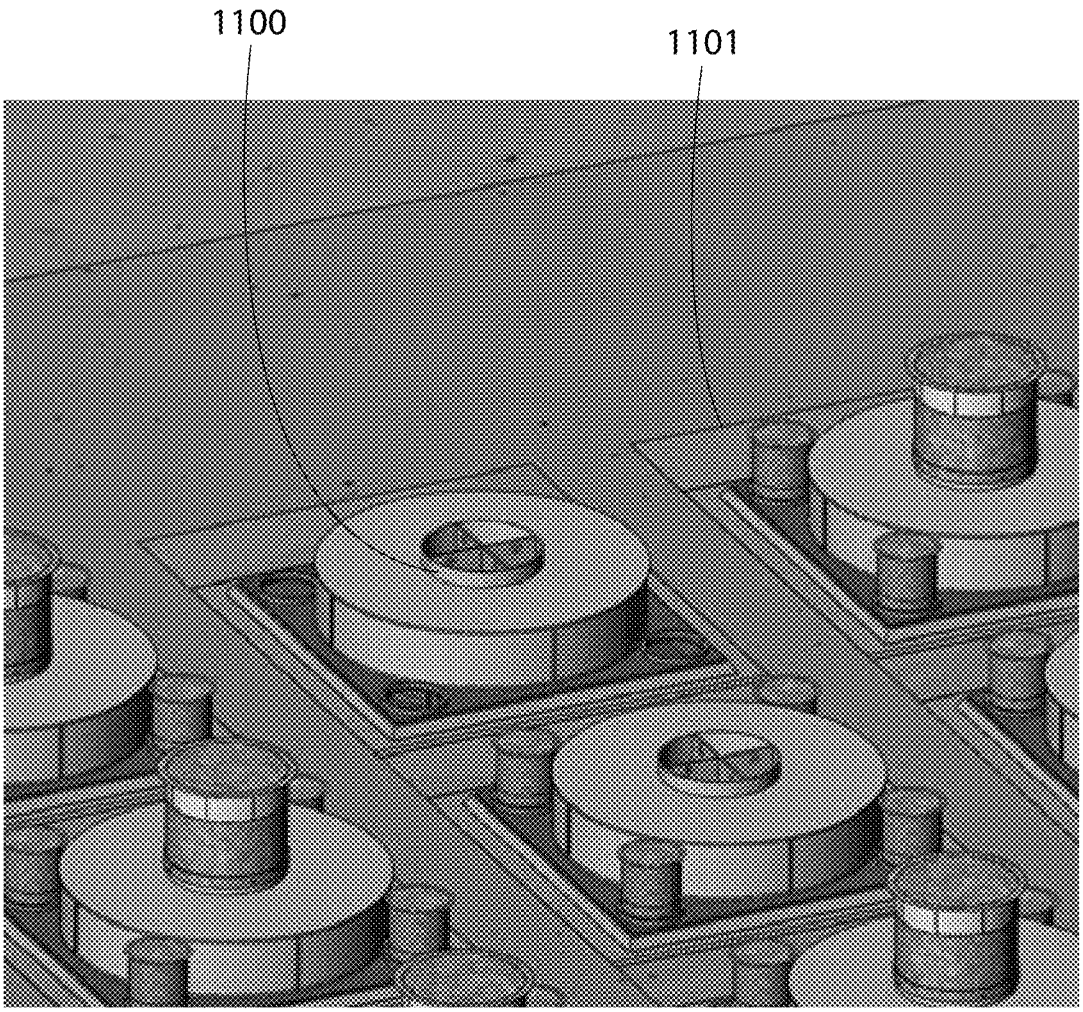
Figure 26:
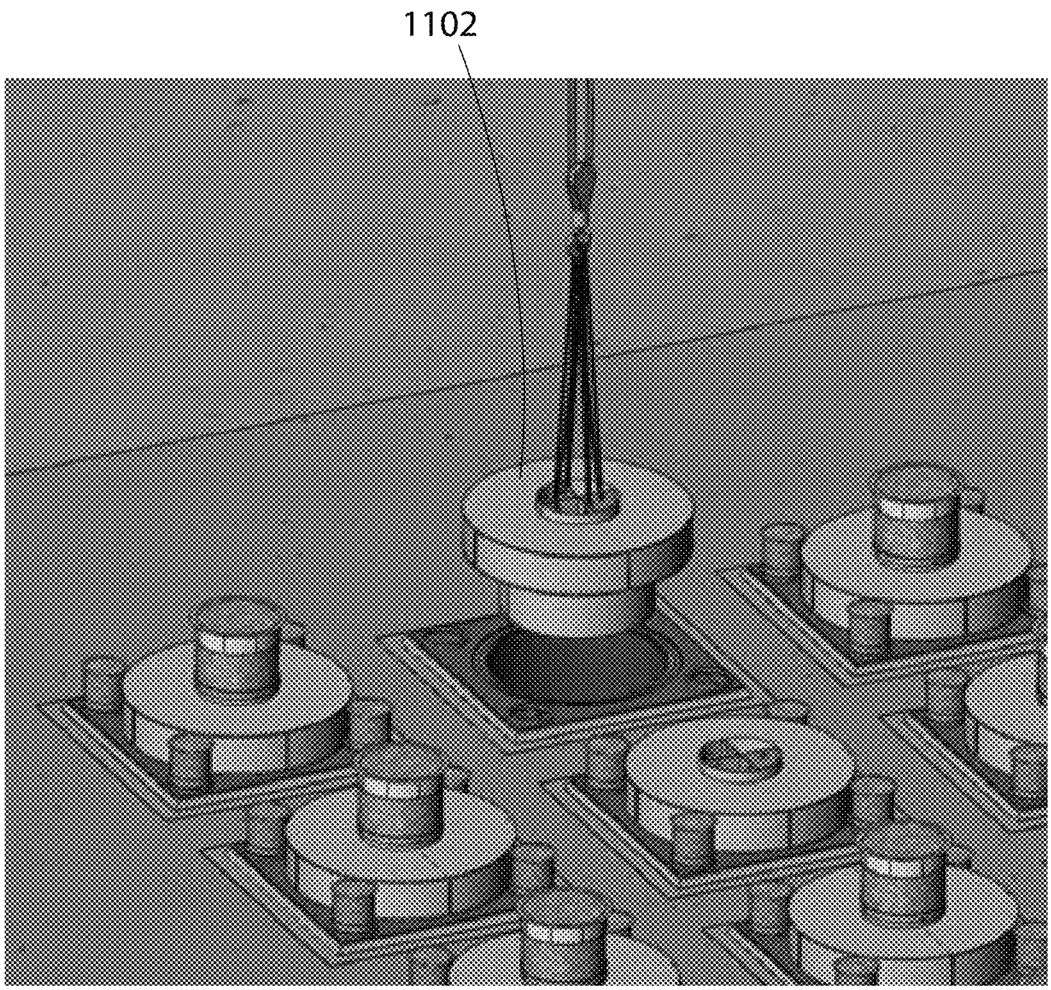

With reference now to FIG. 25, the ventilated storage cask 1100 is prepared for receiving the loaded multi-purpose canister 1900. Initially, the flue extensions 1101 of the ventilated storage cask 1100 are removed to access the lid lifting features. With reference to FIG. 26, the lid 1102 of the ventilated storage cask 1100 is then removed.

Figure 27:
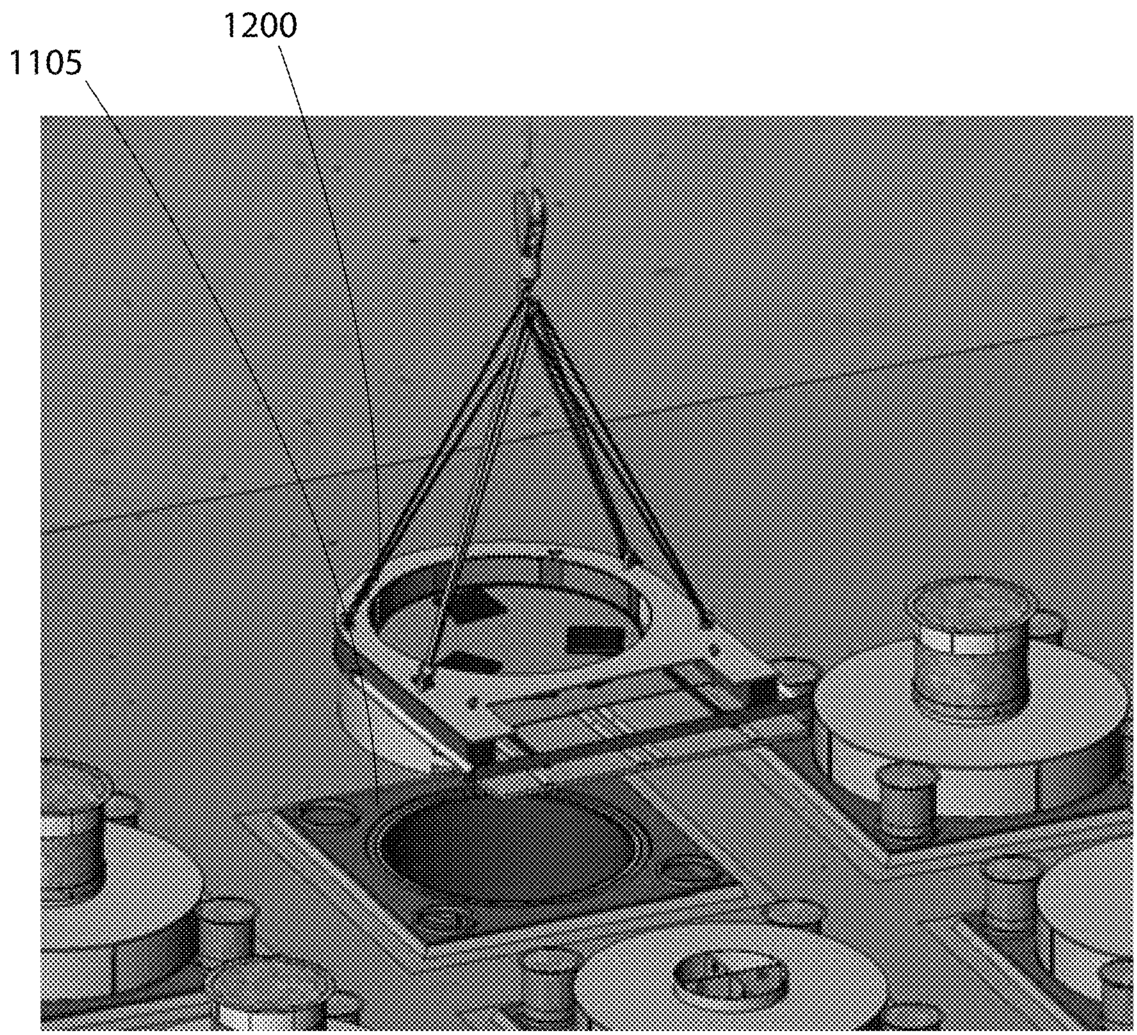
Figure 28:
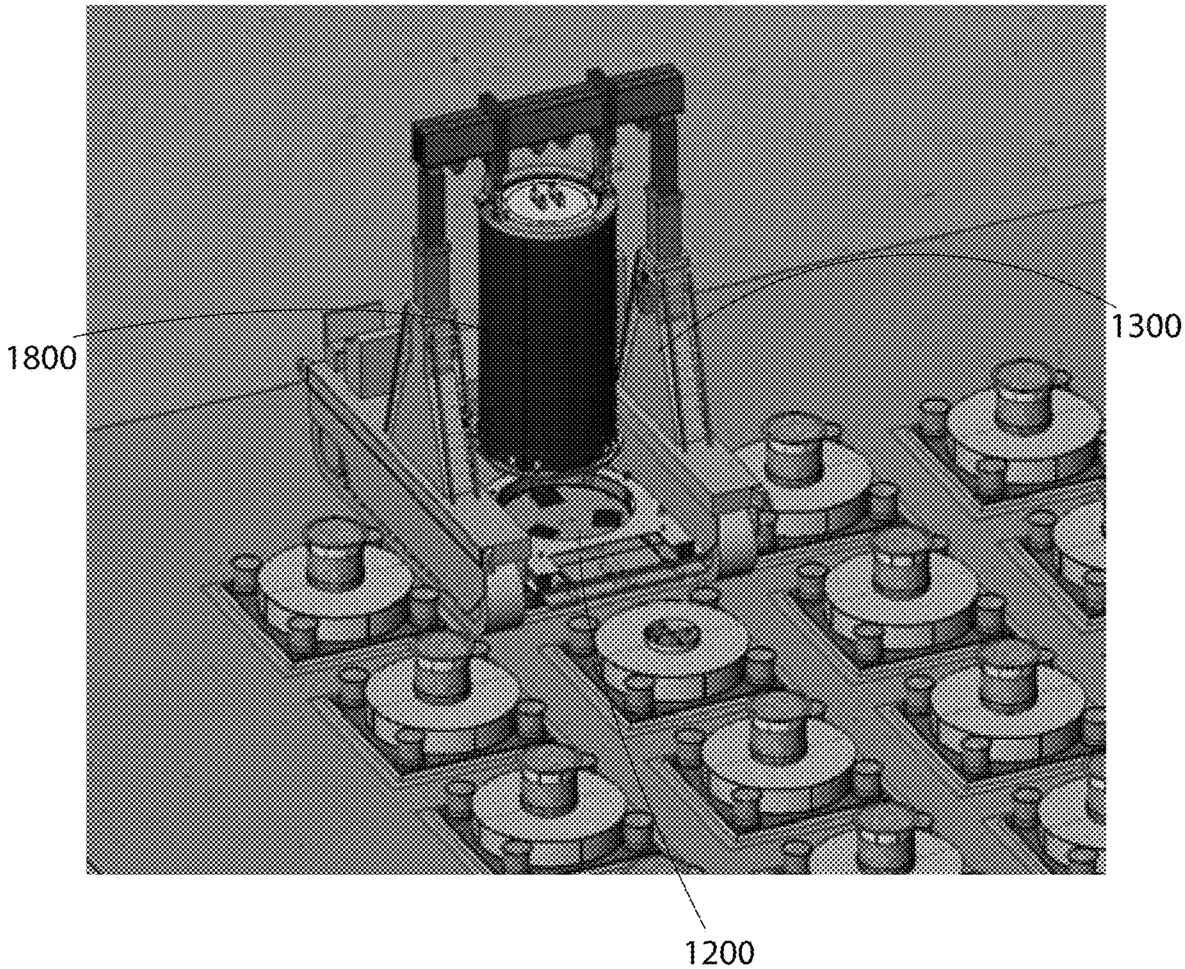
Figure 29:
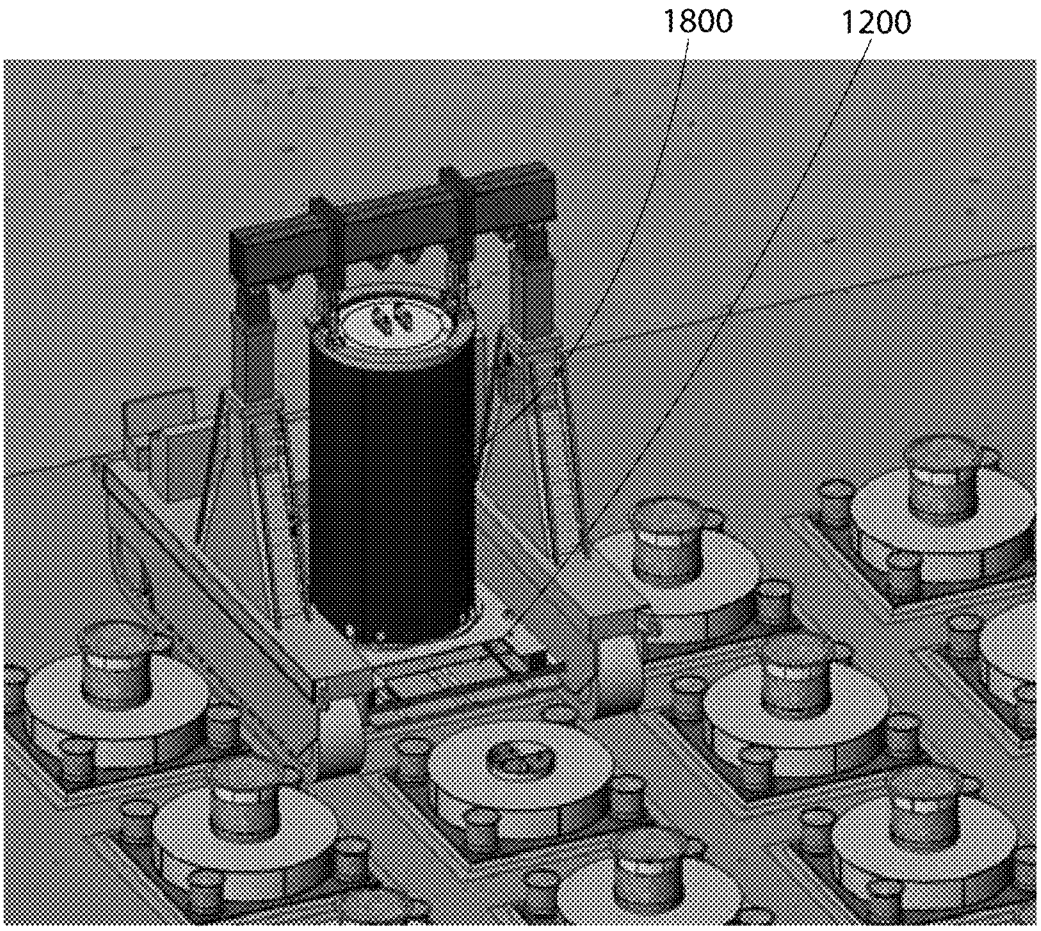

With reference now to FIG. 27, a mating device 1200 is put in position and coupled to the body 1105 of the ventilated storage cask 1100. With reference now to FIG. 28, a cask transporter 1300 then delivers the transfer cask 1800 (which is loaded with canister 1900, which in turn is loaded with the nuclear fuel cartridge 1000) to position above and in alignment with the mating device 1200. With reference now to FIG. 28, the transfer cask 1800 is then mated with the mating device 1200.

Figure 30:
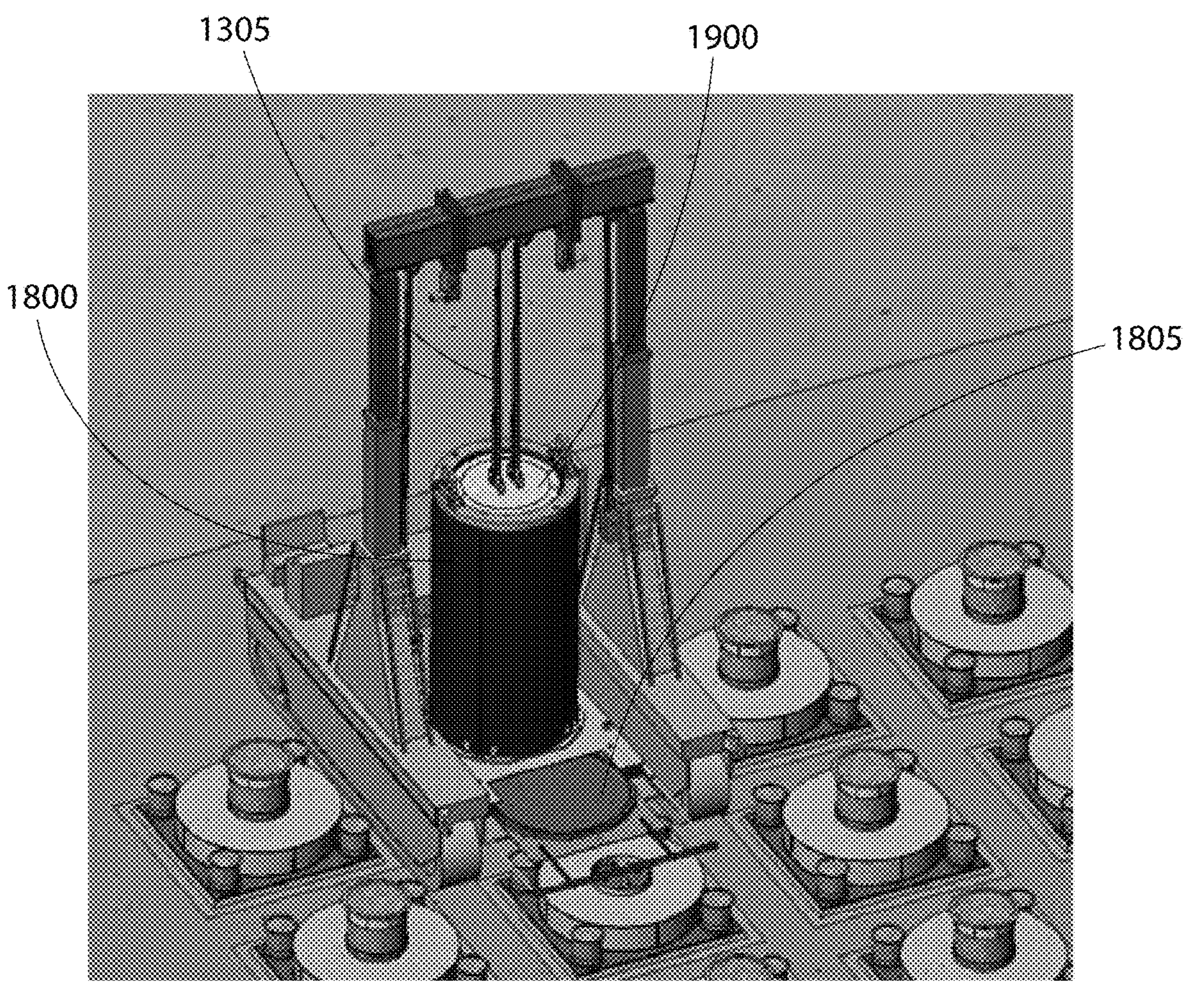
Figure 31:
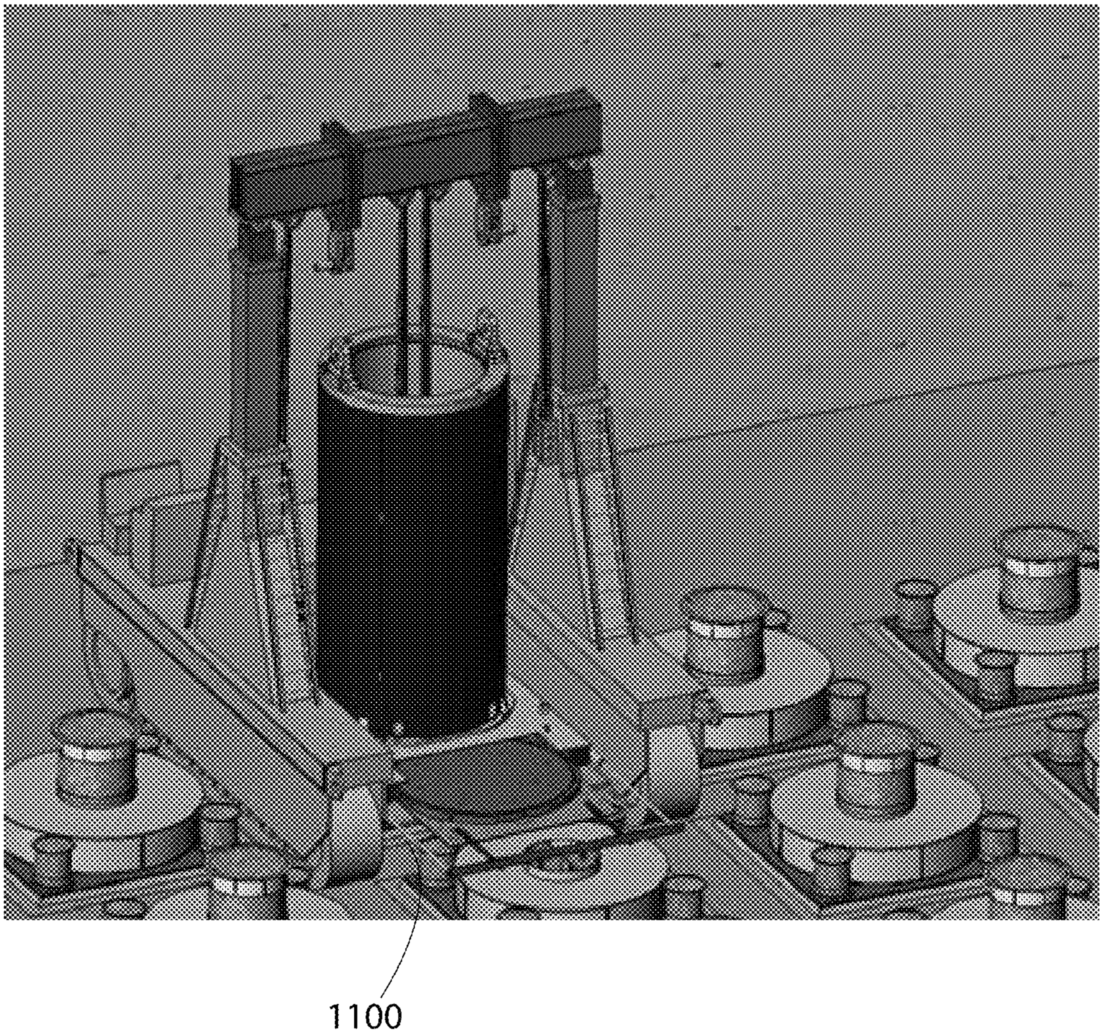
Figure 32:
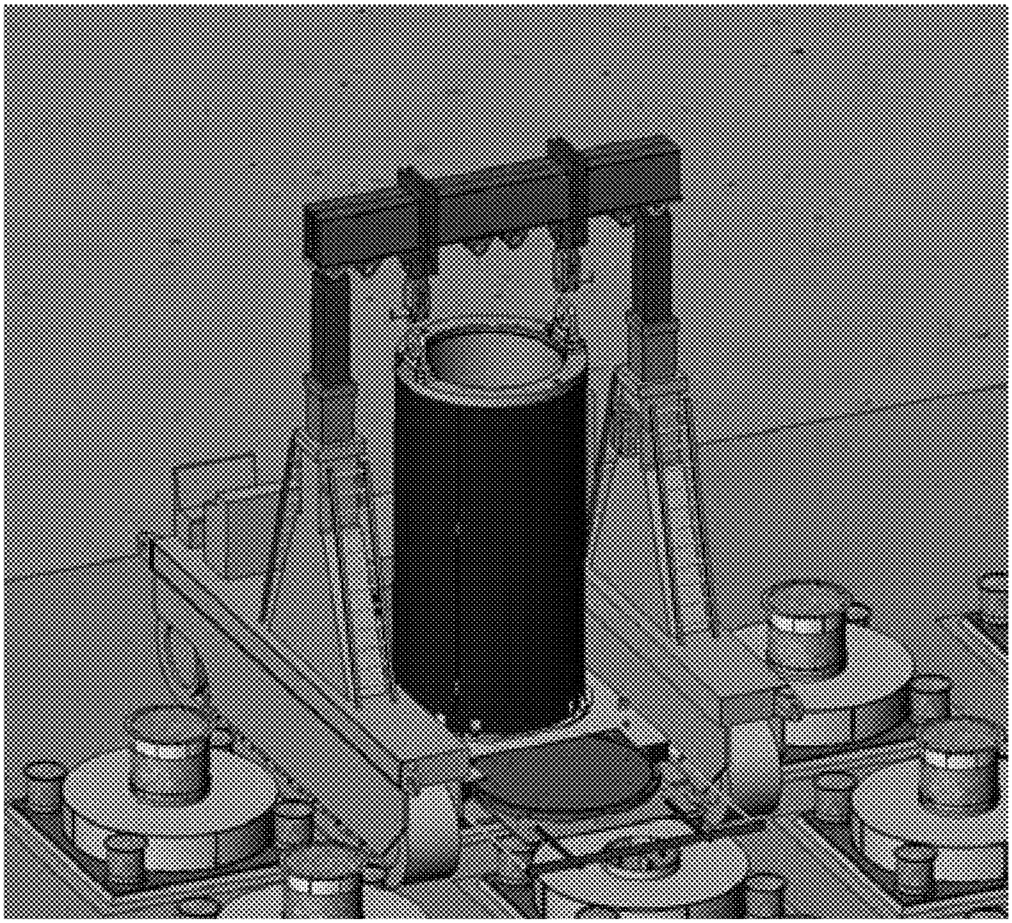
Figure 33:
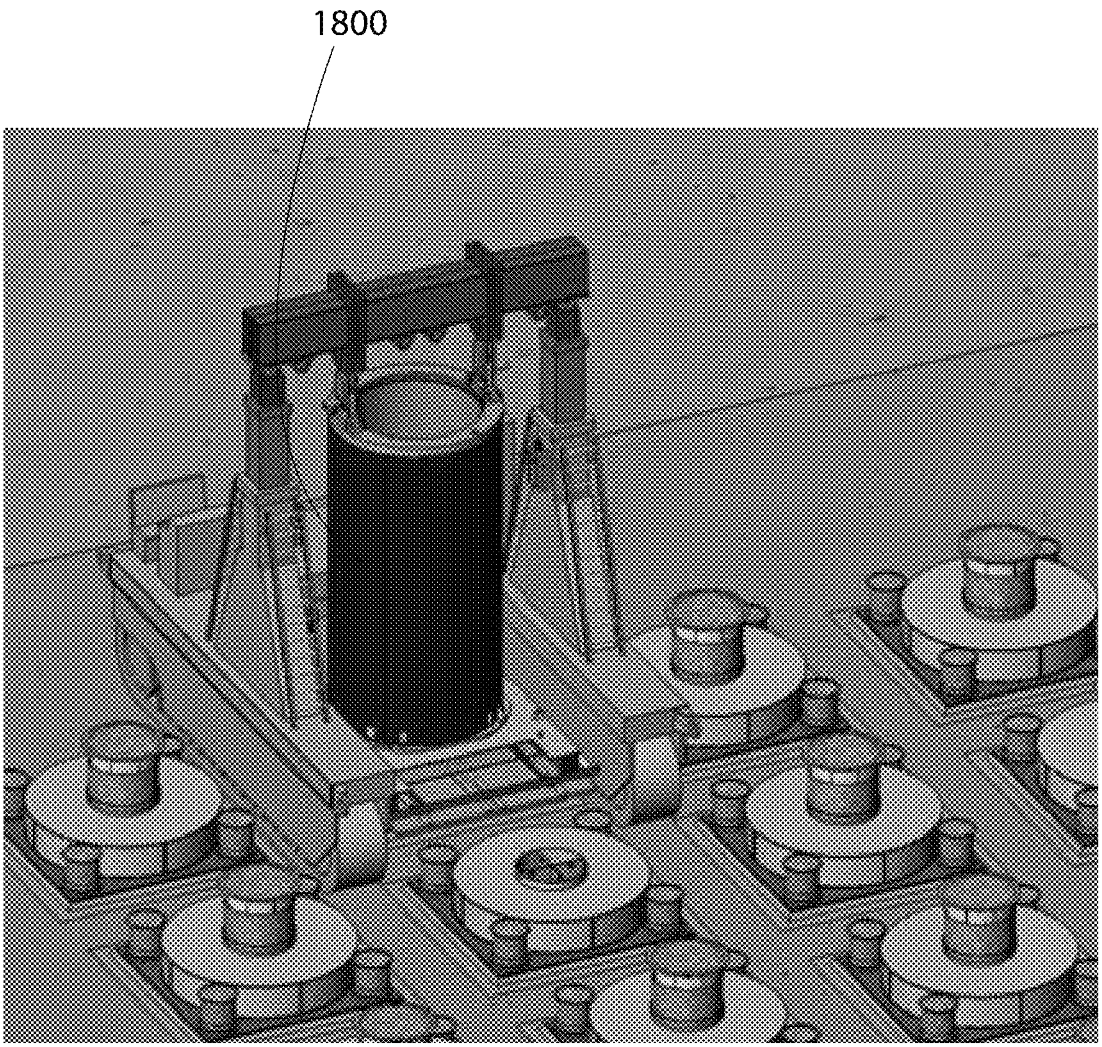

With reference to FIG. 30, the rigging 1305 is attached to the loaded canister 1900 and the canister 1900 is raised slightly. The bottom lid 1805 of the transfer cask 1800 is removed and the mating device 1200 is opened. With reference to FIG. 31, the canister is then lowered into the ventilated storage cask 1100. With reference to FIG. 32, the rigging is then disconnected. With reference to FIG. 33, the transfer cask 1800 is reconnected to the cask transporter 1300 and the mating device 1200 is closed. The transfer cask 1800 and mating device 1200 are then removed and the lid 1102 and vents 1101 of the ventilated storage cask 100 are replaced.

Inventive Concept #2

Reference is made generally to FIGS. 34-51 which are relevant to Inventive Concept #2 described below.

System Component Definitions

In one non-limiting example to provide an overview, a control rod drive system according to the present disclosure may generally include the following major assemblies defined below in summary fashion and further described herein in greater detail:

- Rod ejection protection device (REPD)—a hydraulically-actuated mechanically-returned collet which engages the drive rod of the CRDM and prevents the drive rod from moving in position in the event of a failure of the CRDS.
- Control rod drive mechanism (CRDM)—An electro mechanical device used to control the position of the Control Rods located in the reactor core
- Drive rod (DR)—A shaft that passes through the CRDM into the reactor vessel through the reactor vessel nozzle and is attached to the DREGA.
- Drive rod extension grapple assembly (DREGA)—An assembly that is used to connect the DR to the DRE. This assembly also contains an electromagnet which, when energized and de-energized, engages and disengages the DRE with the RCCA respectively.
- Drive rod extension support structure (DRESS)—a support structure designed to hold and guide the DREs. In one illustrative embodiment, for example without limitation, the DRESS may include thirty seven guide tubes. The guide tubes may be perforated to allow for water circulation (e.g. primary coolant) therethrough. Retaining collars (located at the top of the DRESS) may hold spring loaded retention devices. These devices attach to the DRE lifting head sleeve. Their purpose is to prevent the guide DRE from being removed from the DRESS inadvertently during reactor vessel head removal. The DRESS provides lateral and seismic restraint of the DREs.
- Drive rod extension (DRE)—A device that is connected to the DR by means of the DREGA which extends the reach of the DR to engage the RCCA located below.

Figure 34:
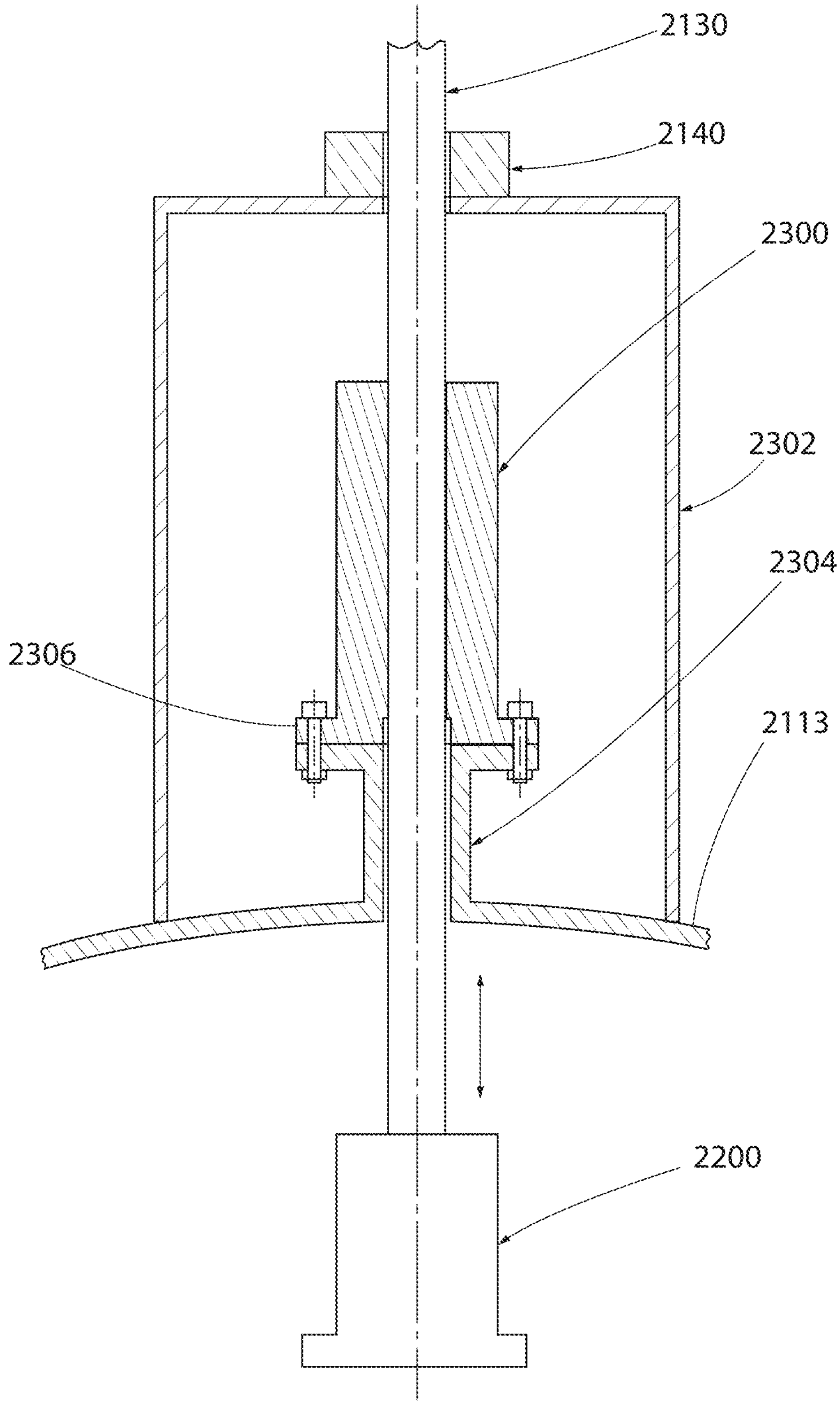
FIG. 34 is a side elevation diagrammatic view of the upper head portion of a nuclear reactor vessel with an exemplary embodiment of control rod drive system according to the present disclosure.
Figure 35:
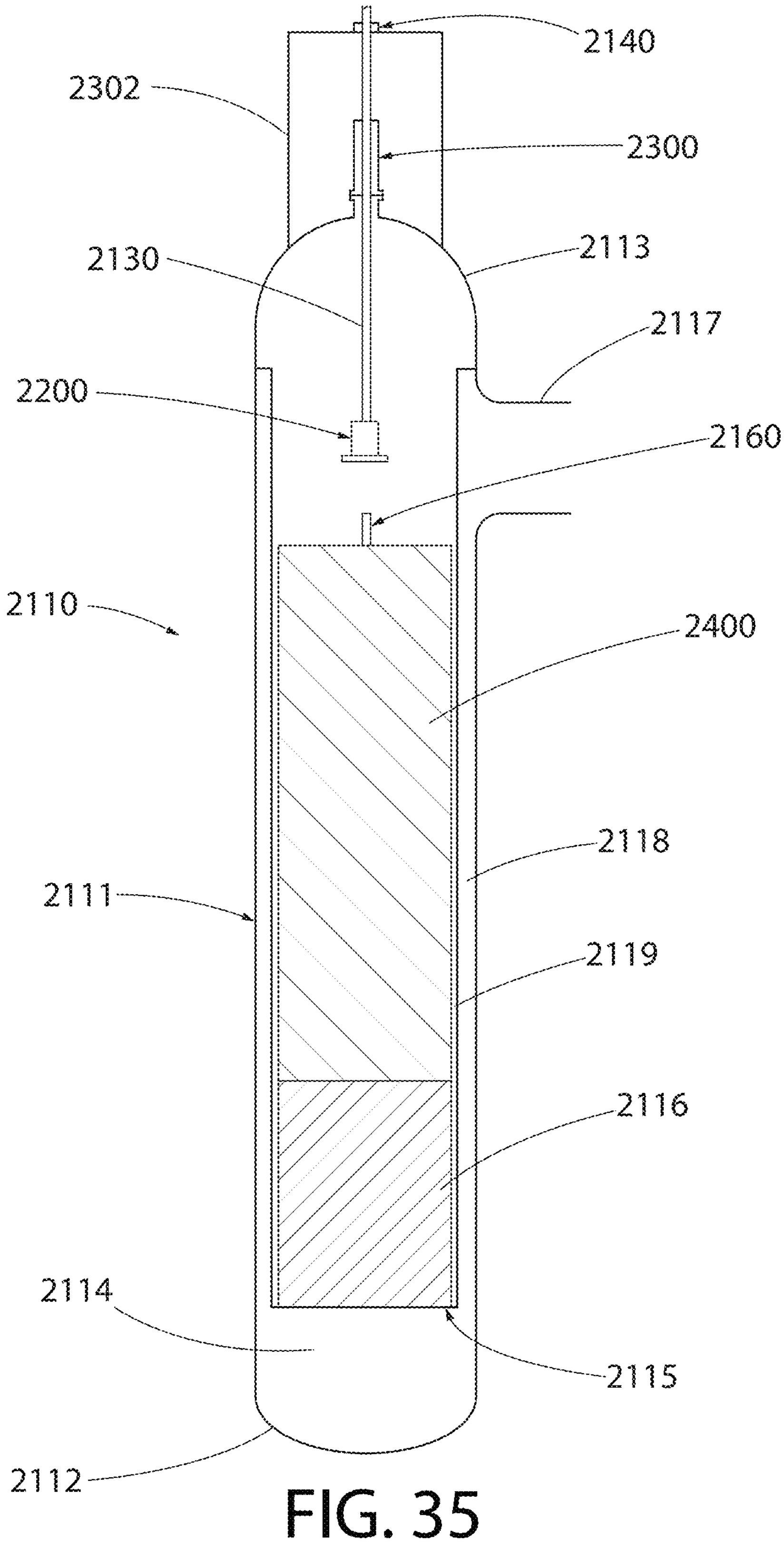
FIG. 35 is a side elevation diagrammatic view of the full reactor vessel of FIG. 34.

FIGS. 34 and 35 depict an exemplary embodiment of a control rod drive system 2100. The control rod drive system 2100 is shown installed on a reactor vessel 2110 which includes a longitudinally-extending and elongated cylindrical shell 2111 defining a vertical axis, bottom head 2112, and top head 2113. In one embodiment, the top head 2113 may be removable form the shell 2111 such as via a bolted flange joint or other form of detachable mounting. The reactor vessel defines an interior cavity 2114 which holds a core support structure 2115 configured to support a nuclear fuel core 2116. In one embodiment, the core support structure 2115 may be in the form of a tubular riser pipe 2119 which conveys primary coolant flowing in an annular space 2118 between the riser pipe 2119 and shell 2111 upwards through the fuel core 2116 and outwards through a flow nozzle 2117 fluidly coupled to a steam generator for generating steam. The primary coolant is heated by flow upwards through the fuel core 2116. In one embodiment, the fuel core 2116 may in the form of a self-supporting fuel cartridge such as the SMR-160 unitary fuel cartridge available from Holtec International which is insertable into the core support structure 2115. As will be well known to those skilled in the art without undue elaboration, a typical nuclear reactor core in a light water reactor comprises tightly packed fuel assemblies 2700 (also referred to as fuel bundles) as further shown in FIG. 41B. Each fuel assembly 2700 is an assemblage of bundled fuel rods 2702 which are sealed hollow cylindrical metal tubes (e.g. stainless steel or zirconium alloy) packed with enriched uranium fuel pellets and integral burnable poisons arranged in an engineered pattern to facilitate as uniform a burning profile of the fuel as possible (in both axial and cross sectional/transverse directions). Multiple longitudinally-extending cavities are formed within each fuel assembly 2700 for insertion of the control rods 2504 into the fuel core in the usual manner, such as through the top nozzles boxes 2704 mounted atop each fuel assembly 2700 which are disposed proximate to the bottom of the drive rod extension support structure (DRESS) 2160 and accessible to the RCCAs 2500. Numerous variations in the arrangement are possible.

It will be appreciated that numerous variations are possible in the arrangement of components within the reactor vessel 2110; the foregoing arrangement described representing only one possible exemplary embodiment. Accordingly, the invention is not limited in this regard to the embodiment described herein.

As shown in FIG. 35, reactor vessel 2110 may be considered a high head reactor vessel design in which the fuel core 2116 is disposed near the bottom head 2112 of the vessel within the core support structure 2115 riser pipe. The distance between the top of the fuel core and top head 2113 of the reactor vessel may exceed the usual 15-20 feet distance in typical pressurized light water reactors (PLWRs).

The reactor vessel 2110 may be made of any suitable metal, such as for example without limitation steels such as stainless steel for corrosion resistance.

With continuing reference to FIGS. 34 and 35, control rod drive system 2100 includes drive rod (DR) 2130, drive rod extension (DRE) 2400, drive rod extension support structure (DRESS) 2160, drive rod extension grapple assembly (DREGA) 2200, control rod drive mechanism (CRDM) 2300, and rod ejection protection device (REPD) 2140. Other than the DRESS 2160 and fuel core 2116 for which a single assembly of each may be provided for a reactor vessel 2110, the control rod drive system (CRDS) 2100 may actually include a plurality of the foregoing remaining components each associated with providing a lifting mechanism for raising/lowering one of the plurality of rod cluster control assemblies (RCCA) 2500 (see, e.g. 44B) provided with the reactor vessel 2110. Accordingly, there may in fact be a plurality of the component assemblies shown in FIGS. 34 and 35 although only a single CRDM 2300 rod drive mechanism 2300 and associated lifting components are shown for clarity of description. In one exemplary embodiment, for illustration, a reactor vessel 2110 installation of a small modular reactor design may include approximately 37 CRDMs 2300 and associated DREs 2400. The invention is not limited to any particular number of CRDMs or other components.

Control rod drive mechanisms 2300 may each be housed in a structural enclosure 2302 mounted to top head 2113 of reactor vessel 2100 for protection of the drive mechanism. The function of this enclosure structure includes to provide lateral and seismic support of the CRDMs 2300, protect the CRDMs from projectile or missile generated within the primary containment structure (not shown) which encloses the reactor vessel 2110, protect the CRDMs from potential drops of equipment from the overhead crane, provide a means of lifting the reactor vessel head, and provide a mounting location for the REPD 2140 which may be mounted on top of enclosure 2302 in one embodiment. The CRDM enclosures 2302 may be attached to the reactor vessel top head 2113 by any suitable means, such as without limitation welding.

In one embodiment, the top head 2113 of reactor vessel 2110 may include a flanged nozzle 2304 configured to receive a bottom mounting flange 2306 on control rod drive mechanism 2300 for coupling and supporting the drive mechanism from the reactor vessel head. The bottom mounting flange 2306 may be detachably coupled to the flanged nozzle 2304 with fasteners (e.g. bolts and nuts) to allow the control rod drive mechanism 2300 to be removed for maintenance or replacement. The drive rod 2130 extends vertically downwards through the rod ejection protection device 2140, top of the enclosure 2302, control rod drive mechanism 2300, and further through the flanged nozzle 2304 into the top portion of reactor vessel beneath top head 2113 as shown in FIGS. 34 and 35. A set of seals may be provided with the drive rod 2130 at the flanged nozzle 2304 to prevent leakage of reactor coolant from the reactor vessel along the drive rod during operation. The bottom end of the drive rod 2130 is coupled to the drive rod extension grapple assembly (DREGA) 2200, as further described herein.

Control rod drive mechanism (CRDM) 2300 may be any type of commercially available electro-mechanical drive operable to lower/raise the drive rod 2130 (and in turn DREGA 2200 attached to the drive rod). As one non-limiting example diagrammatically illustrated in FIG. 51, a CRDM 2300 of one type may have a drive assembly 2600 generally utilizing a motor drive to rotate a lead screw 2604 formed on the drive rod 2130. Such drive mechanisms for drive rods are well known to those skilled in the art. In one arrangement, as shown, the electric drive motor 2610 may be axially offset from the drive rod 2130 and rotates a worm 2608 (i.e. worm gear) arranged transversely to the drive rod. The worm 2608 in turn rotates a ring gear 2606 rigidly affixed to a ball collar or nut or collar 2602 having ball bearings 2612 engaged with the lead screw 2604 on the drive rod 2130. Rotating the ring gear 2606 in opposing directions using the motor drive 2610 which operates to rotate the worm 2608 in opposing rotational directions alternatingly axially raises or lowers the drive rod 2130 in a controlled manner. In other possible arrangements, the ball nut or collar may be directly coupled to the drive motor which may be arranged axially in line with the drive rod. In either of the foregoing arrangements, the CRDM rotates the ball nut or collar which axially advances or retracts the drive rod via the lead screw. Numerous variations of CRDMs using drive rod lead screws are possible. CRDMs are commercially available from a number of manufacturers, including for example General Atomics of San Diego, Calif. CRDMs are further described in U.S. Pat. No. 5,999,583 and U.S. Patent Application Publication 2010/0316177, which are incorporated herein by reference in their entireties.

Figure 36:
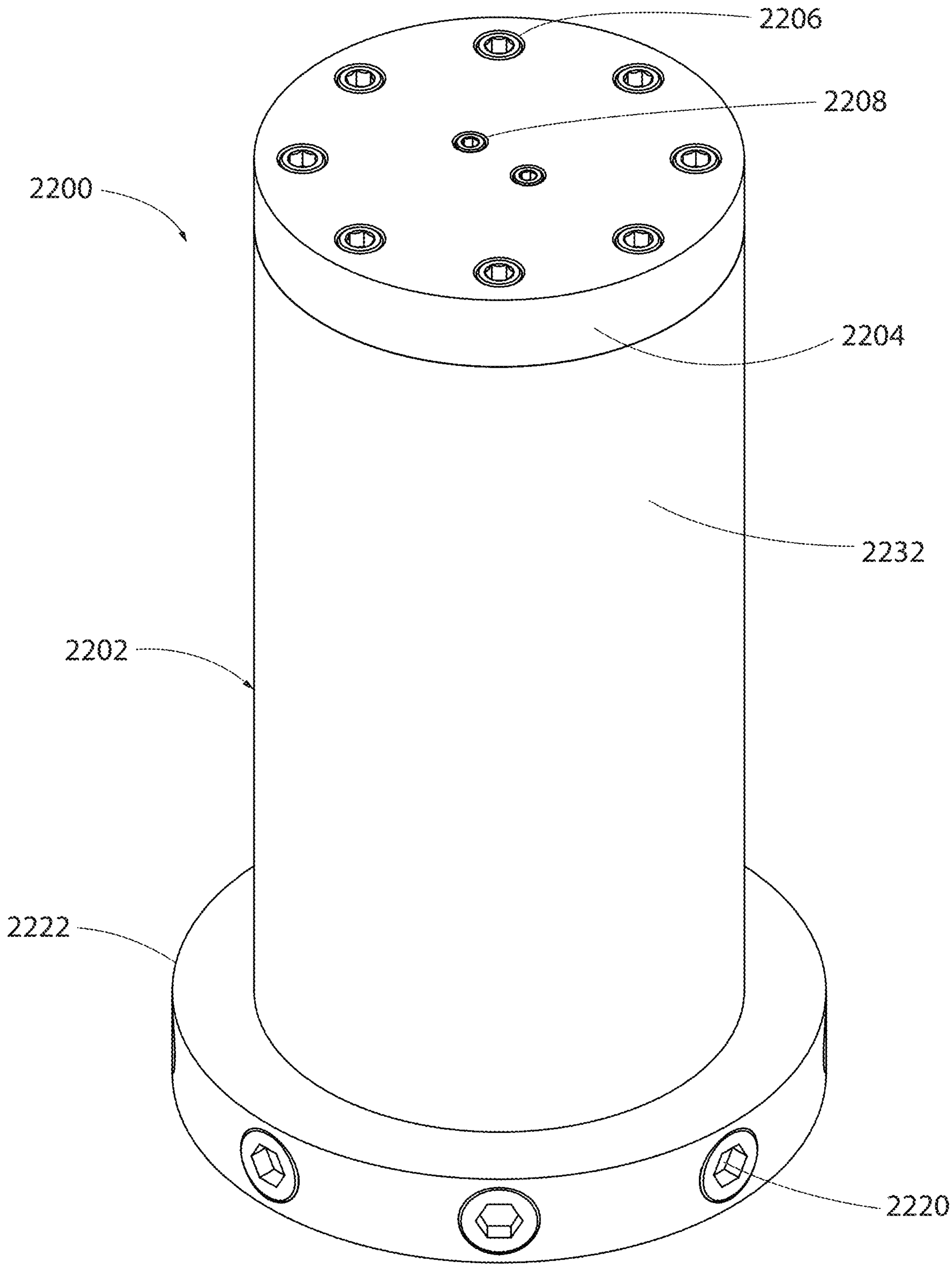
FIG. 36 is a perspective view of a drive rod extension grapple assembly.
Figure 37:
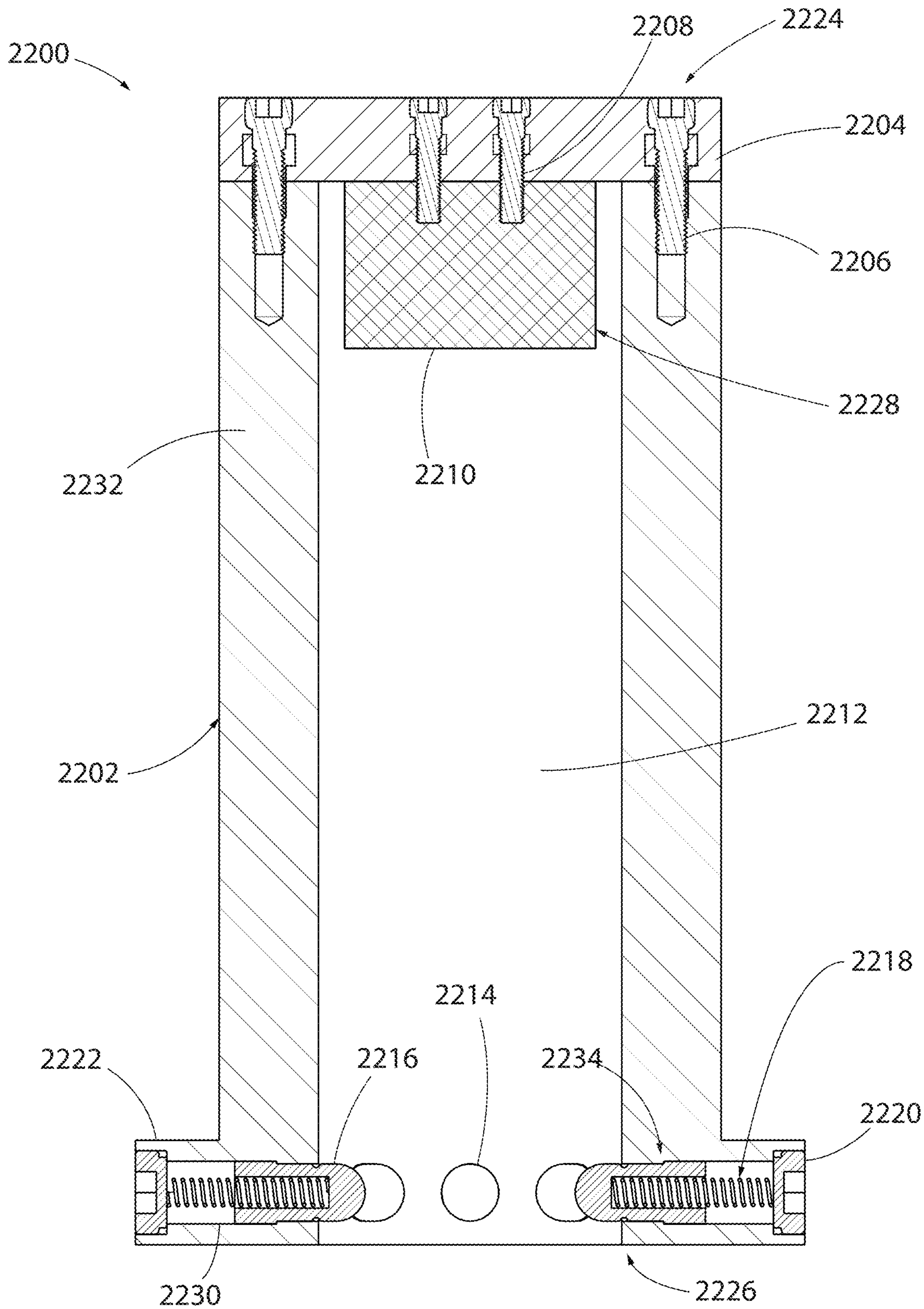
FIG. 37 is a side cross-sectional view thereof.

FIGS. 36 and 37 show drive rod extension grapple assembly (DREGA) 2200 in greater detail. DREGA 2200 includes a cylindrical grapple body 2202 having sidewalls 2232 defining an interior chamber 2212, an open top 2224, and a downwardly open bottom 2226. Top 2224 may be closed by a removable top plate 2204 in one embodiment which is attached to the top annular face of grapple body 2202 via a plurality of circumferentially spaced fasteners 2206. The open bottom 2226 allows an upper portion of drive rod extension 2400 to be inserted therein, as further described herein. An electromagnet 2228 is disposed in chamber 2212 which is engageable with a magnetic block 2402 of drive rod extension 2400 (see, e.g. FIG. 42). In one embodiment, electromagnet 2228 may be mounted at the top end of chamber 2212 and affixed to the underside of top plate 2204 by one or more fasteners 2208. Other variations for mounting electromagnet 2228 are possible.

With continuing reference to FIGS. 36 and 37, drive rod extension grapple assembly (DREGA) 2200 further includes plurality of circumferentially spaced and radially movable lifting pins 2216. Lifting pins 2216 may be oriented horizontally in one embodiment and are operable to project radially inwards into chamber 2212 towards the vertical centerline of grapple body 2202 through corresponding circumferentially spaced openings 2214 formed through the body. The lifting pins 2216 are radially movable between a projected position (shown in FIG. 37) extending partially into the chamber 2212 and a retracted position withdrawn from the chamber. Lifting pins 2216 may each be biased inwards towards the projected position via a suitably configured lift spring 2218 having an end which engages an outward facing open socket formed in each pin as shown.

In one embodiment, lifting pins 2216 may be movably disposed in an annular shaped housing 2222 which extends radially outwards from grapple body 2202. Housing 2222 includes a plurality of circumferentially spaced bores 2230 having a circular cross section configured to slidably receive lifting pins 2216 therein. Bores 2230 may extend radially completely through the housing 2222 and sidewalls 2232 of grapple body 2202 communicating with openings 2214. Each bore 2230 includes a lifting pin 2216 and associated spring 2218. The lifting pins 2216 may include a stepped shoulder 2234 which engages a complementary configured stepped portion of the bore 2230 to prevent the lifting pins from being ejected by the spring 2218 completely through holes 2214 into the chamber 2212 of the grapple body 2202. In one embodiment, the exterior opening in each bore 2230 may be closed off by a removable cap 2220 which threadably engages the annular housing 2222. The caps 2220 each have an interior surface which may engage one end of spring 2218. In one embodiment, the annular housing 2222 may be threaded along an exterior portion surrounding each bore 2230 and the caps 2220 may threadably engage these threaded bore surfaces. Other suitable arrangements of mounting caps 2220 to close bores 2230 may be used.

The drive rod extension grapple assembly (DREGA) 2200 may be mounted to the bottom end of the drive rod 2130 by any suitable means. For example, without limitation, drive rod 2130 may be threadably coupled directly to DREGA 2200 via a threaded socket formed in the top plate 2204 and threading the bottom end of the drive rod, via mounting brackets and fasteners, welding, or other suitable mechanical mounting techniques used in the art. Preferably, in certain embodiments, DREGA 2200 is rigidly mounted to the drive rod 2130.

In one embodiment, cylindrical grapple body 2202 may have a maximum outside diameter larger than the interior diameter of the flanged nozzle 2304 so that the DREGA A cannot be inserted or retracted through the nozzle. In such an arrangement, the DREGA 2200 is connected to the end of the drive rod 2130 beneath the top head 2113 of the reactor vessel 2110. Other suitable arrangements are possible.

FIGS. 38-41 (including all alphabetical subparts) depict the drive rod extension support structure (DRESS) 2160. DRESS 2160 is a vertically elongated structure which includes a plurality of upper guide tubes 2161 and lower guide tubes 2162 circumscribed by an open lattice outer support frame 2163 having a cylindrical shape to complement the shape of the riser pipe 2119 in which the DRESS may be inserted from the top. The open structure reduces the weight of the support frame 2163 while providing structural strength. In one exemplary embodiment, without limitation, the outer support frame 2163 may have an X-shaped lattice formed by diagonal supports 2164 arranged in an X-pattern and enlarged junction plates 2165 formed at the intersection of the diagonal supports. Other suitable open or closed structures are possible for support frame 2163.

The upper and lower guide tubes 2161, 2162 may be intermittently supported along their lengths by axially spaced apart horizontal supports 2166. A horizontal support 2166 is provided at the top 2166*a* and bottom 2166*b* of DRESS 2160. In one exemplary embodiment, the supports 2166 may be spaced axially apart at approximately 5-6 feet intervals along the longitudinal length of the guide tubes 2161, 2162. Other appropriate axial spacing may be used.

In one embodiment, the horizontal supports 2166 may be comprised of interconnected lateral grid plates 2171 extending between adjacent guide tubes 2161, 2162. The outermost supports 2166 may be attached at their ends to an annular shaped peripheral rim 2169 which may be attached to the interior surface of the cylindrical outer support frame 2163, such as at the junction plates 2165 and/or along horizontal arcuately shaped strap members 2167 connected between junction plates. In one embodiment, the horizontal supports 2166 may be welded to the outer support frame; however, other suitable attachment methods may be used instead of or in addition to welding such as fasteners.

In one embodiment, the uppermost horizontal support 2166 may include an array of laterally spaced circular retaining collars 2170 mounted onto the top ends of each upper guide tube 2161. This forms a grid array of retaining collars 2170 having a pattern or layout in top plan view which matches the horizontal pattern or layout of the upper guide tubes 2161. The retaining collars 2170 each have a central opening configured to receive a respective upper guide tube therein. The retaining collars 2170, located at the top of the drive rod extension support structure (DRESS) 2160, may include spring loaded retention devices in the form of radially movable retaining pins 2172 spaced circumferentially around the retaining collars (see, e.g. FIGS. 38A and 44A). The retaining pins 2172 may be horizontally oriented and movable to be retracted from or projected into the central hole of the retaining collar 2170. As noted above the retaining pins 2172 engage the DRE lifting head sleeve 2408 (see also FIGS. 43 and 44). One of their purposes is to prevent the guide DRE 2400 from being removed from the DRESS 2160 inadvertently during reactor vessel head removal.

The upper guide tubes 2161 have a diameter selected to allow the drive rod extension (DRE) 2400 to be axially inserted completely through the guide tube in one embodiment. This allows raising and lowering of the DREs 2400 by the control rod drive mechanism (CRDM) 2300. Each of the lower guide tubes 2162 may have a larger diameter than the upper guide tubes 2161. The lower guide tubes 2162 have a diameter selected to allow the entire control rod support plate 2502 of the rod cluster control assembly (RCCA) 2500 (shown in FIG. 44B) to be raised and lowered within the lower guide tubes for inserting and retracting the control rods 2504 into and from the fuel core 2116. The control rod support plate 2502 has a larger diameter than the widest component of the DRE 2400 in the present exemplary embodiment, thereby necessitating a larger diameter for the lower guide tubes 2162 than the upper guide tubes 2161.

Figure 38B:
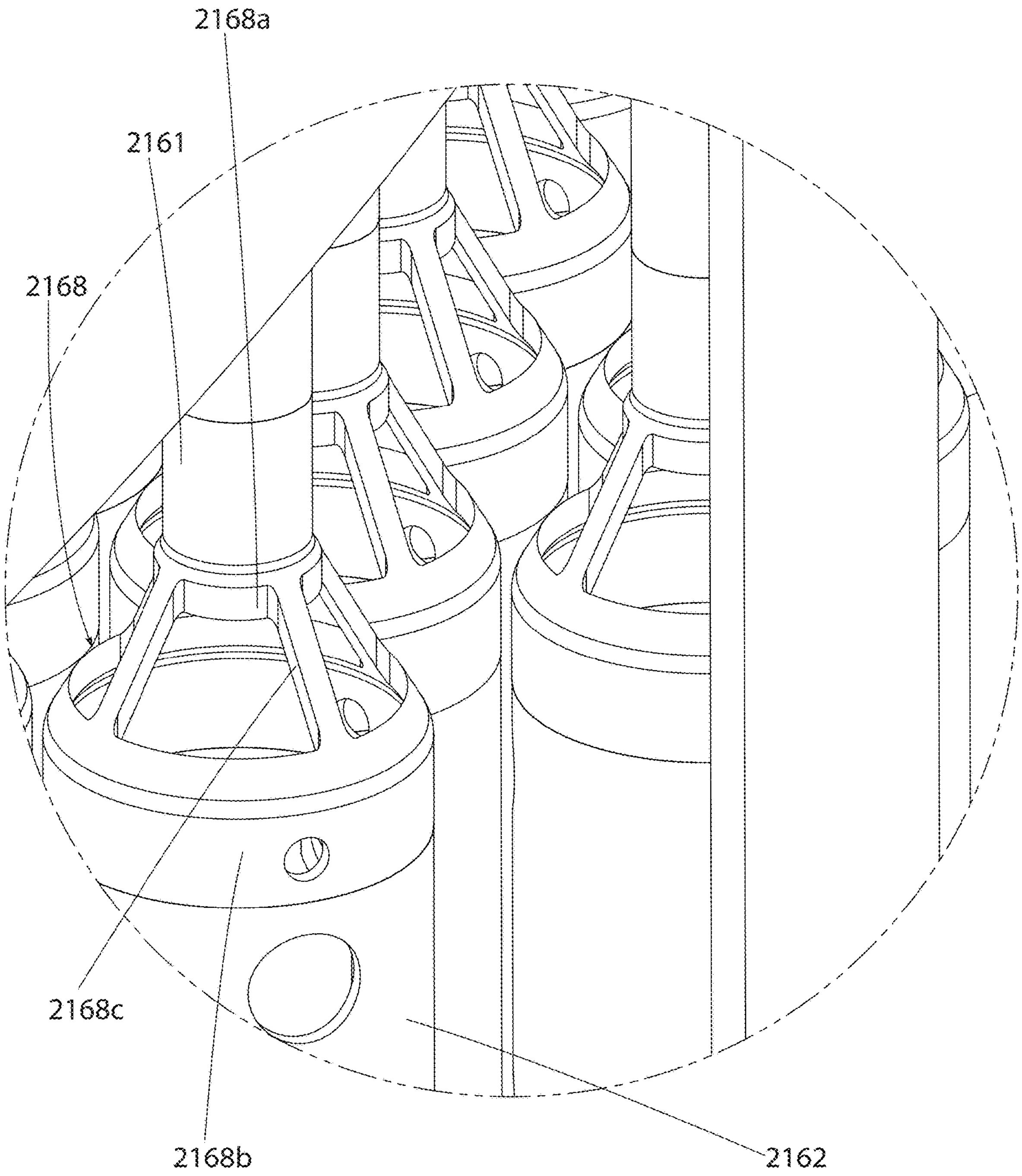
FIG. 38B is an enlarged detail VB taken from FIG. 38.
Figure 39:
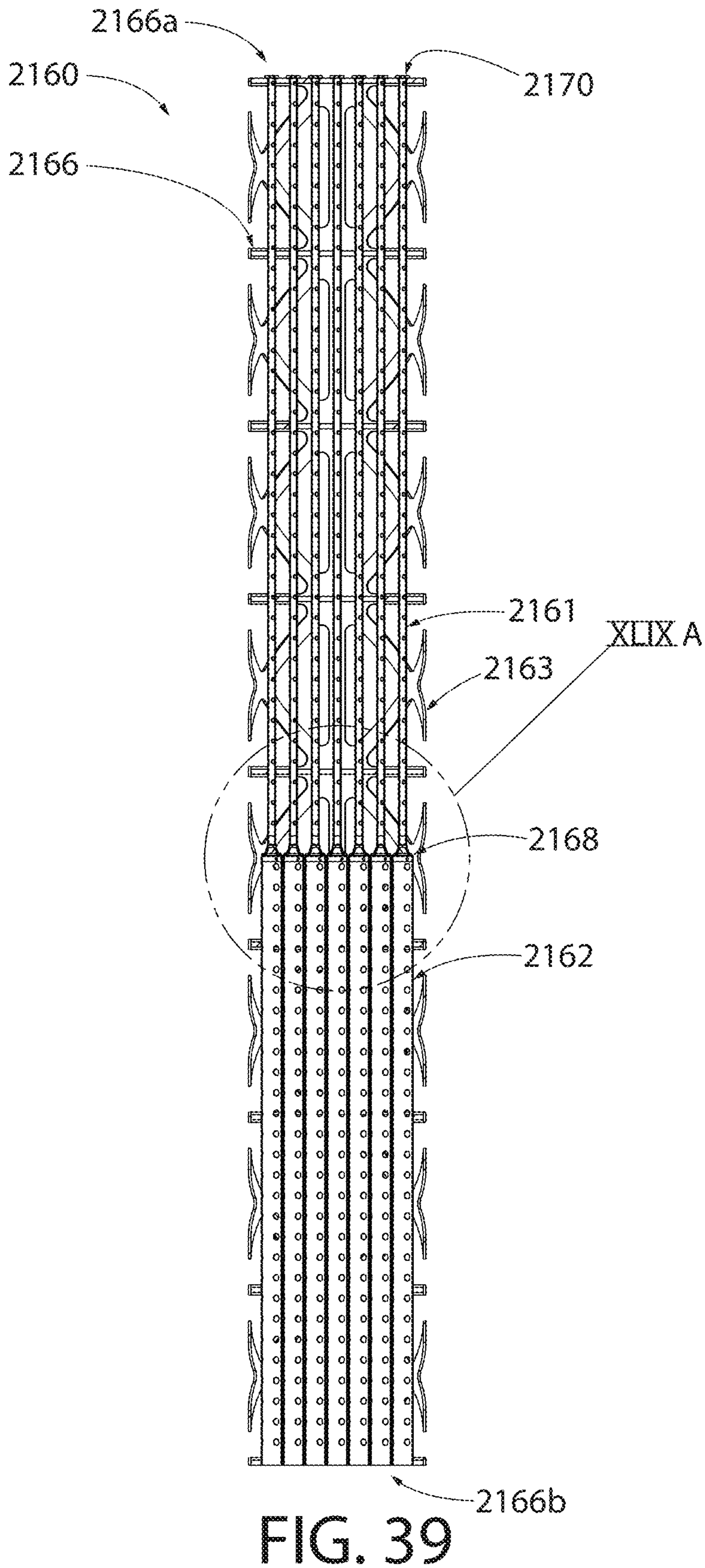
FIG. 39 is a side cross-sectional view of the drive rod extension support structure.
Figure 39A:
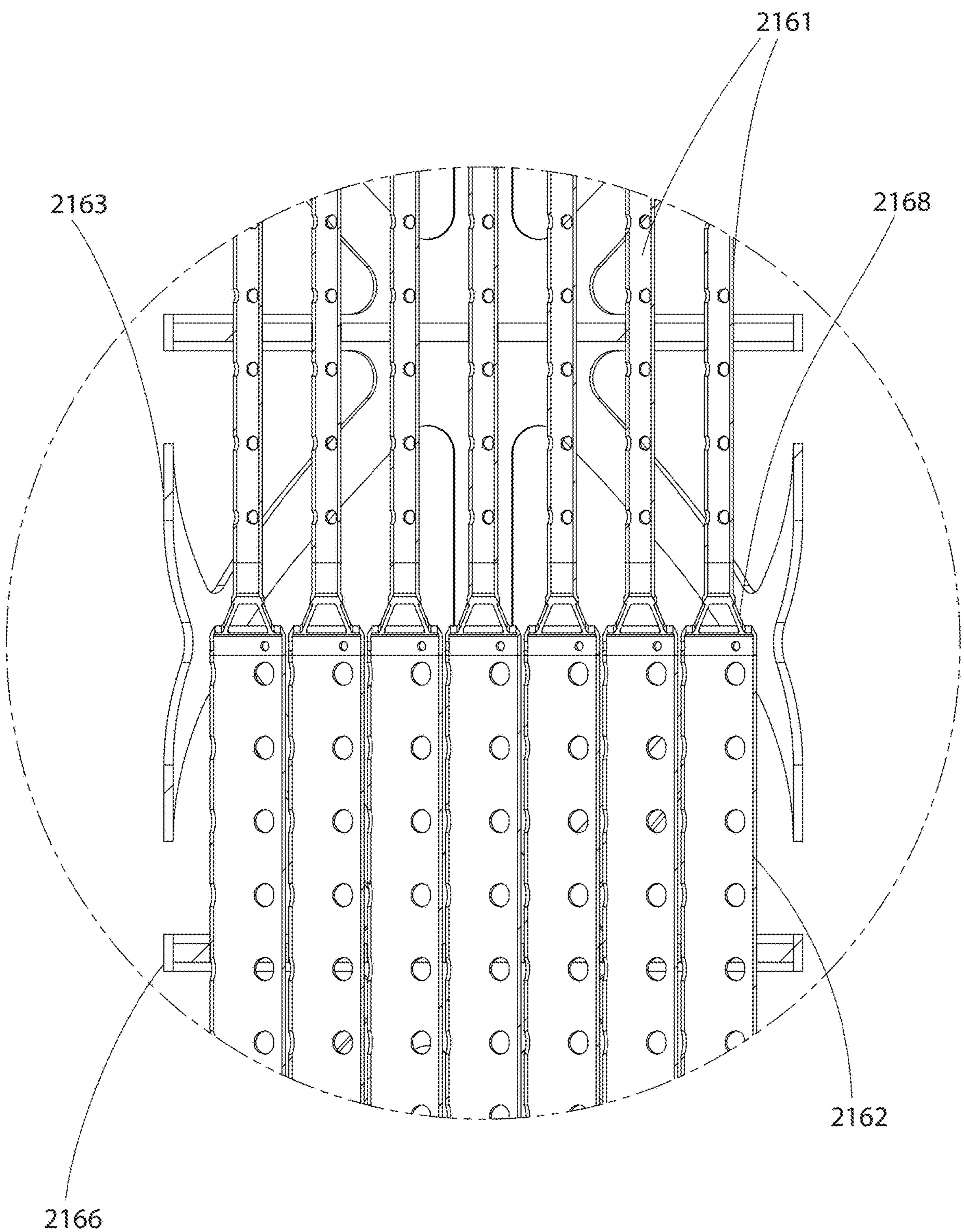
FIG. 39A is an enlarged detail VIA taken from FIG. 39.
Figure 40:
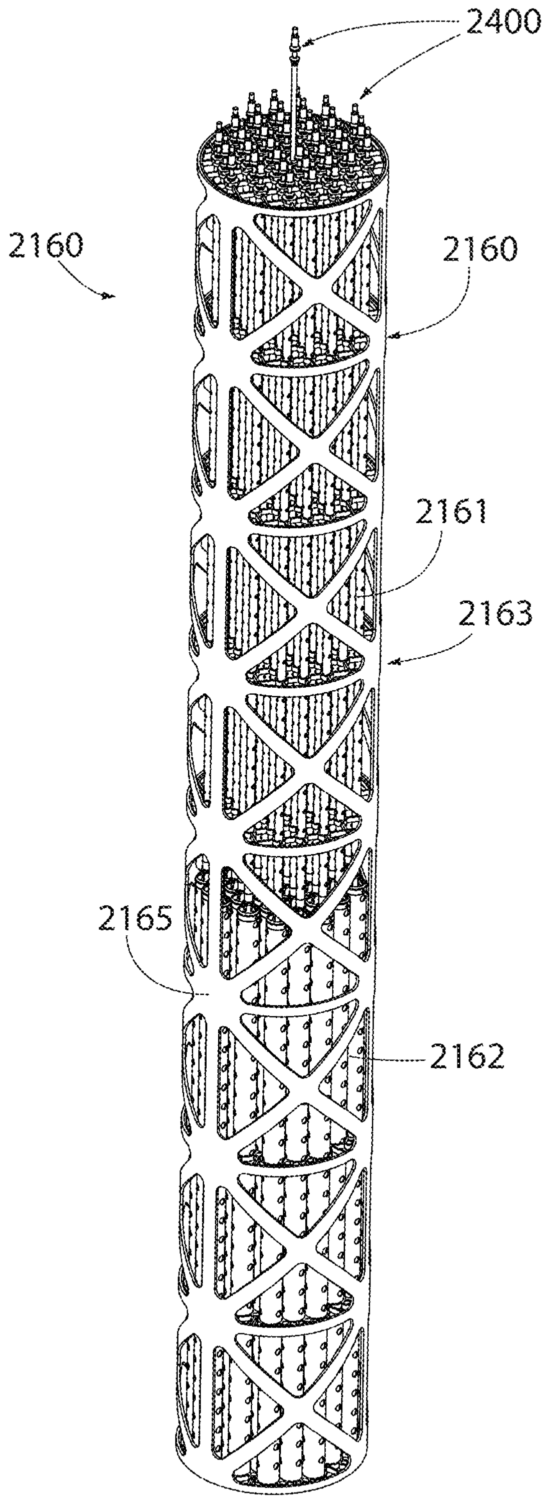
FIG. 40 is an perspective view of a drive rod extension support structure with drive rod extensions mounted therein.

In one embodiment, guide tube transition fittings 2168 may be used to couple the lower ends of each upper smaller diameter upper guide tube 2161 to a corresponding concentrically aligned lower guide tube 2162. In one embodiment, the transition fittings 2168 may be frusto-conical shaped as best shown in FIGS. 38B and 39A and have an open structure comprised of axially spaced apart upper and lower rings 2168*a*, 2168*b* each attached respectively to an upper and lower guide tube 2161, 2162. Accordingly, the lower rings 2168*b* have a larger diameter than the upper rings 2168*a* in this embodiment. The rings 2168*a*, 2168*b* may be joined to form a structural unit by angled and vertically extending struts 2168*c* extending between the rings. In other embodiments, the guide tube transition fittings 2168 may be closed. Other suitable configurations of guide tube transition fittings 2168 are possible including non-frusto-conical shapes. The guide tube transition fittings 2168 help maintain axial alignment between the upper and lower guide tubes 2161, 2162. The guide tubes 2161, 2162 in turn help maintain axial alignment of the control rods with respective corresponding cavities in the fuel core 2118 for insertion or retraction of the rods to control the nuclear reaction rate in various portions of the core. Other suitable configurations of transition fitting, however, may be used and numerous variations are possible.

In some embodiments, the upper and lower guide tubes 2161, 2162 may each include a plurality of holes or perforations along their respective lengths as shown in FIGS. 38-41 which allow the primary coolant to flow inside the guide tubes within the riser pipe 2119. The holes or perforations may be distributed both circumferentially and longitudinally around each guide tube 2161, 2162 in a suitable pattern.

Figure 41:
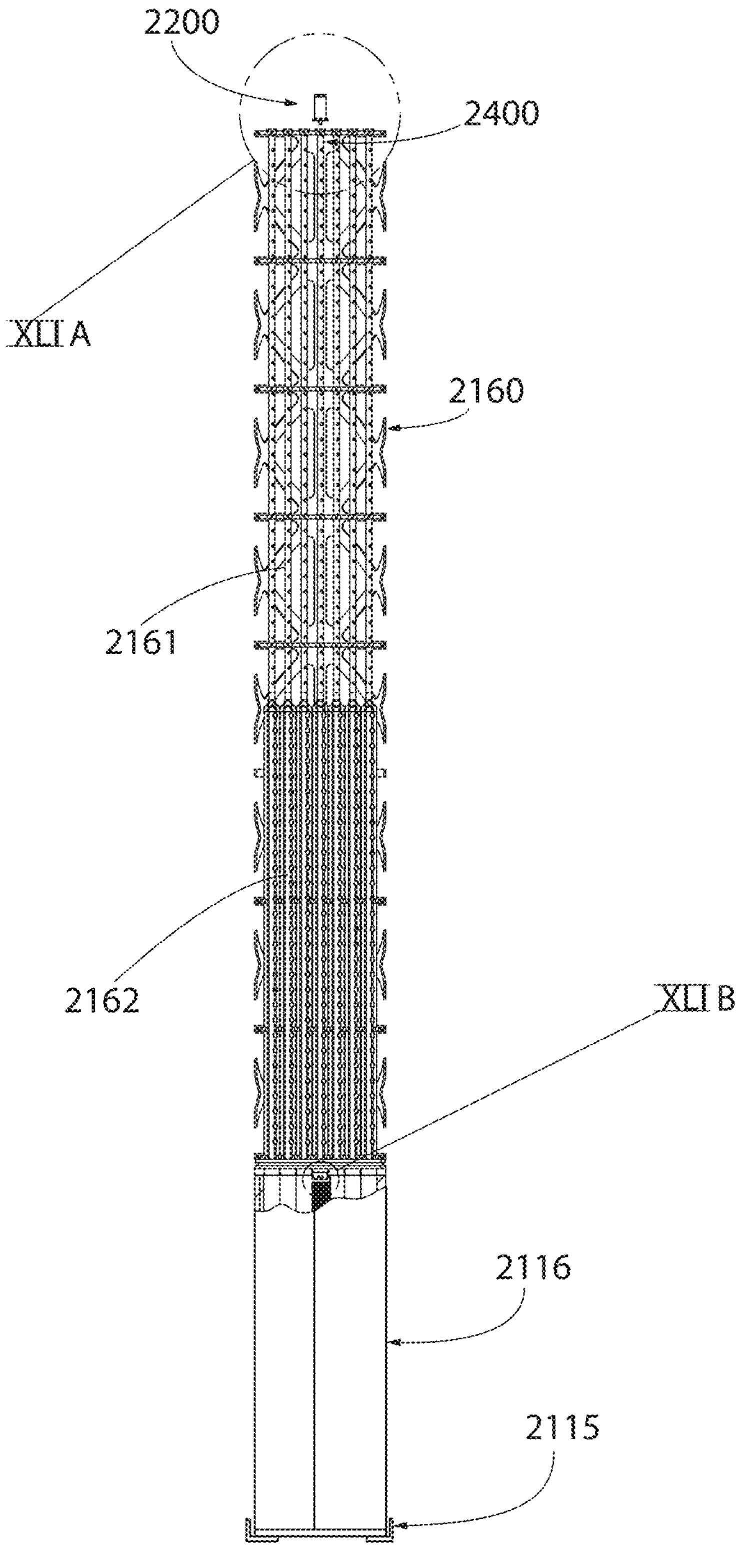
FIG. 41 is a side cross-sectional view of a drive rod extension support structure mounted above a nuclear fuel core.
Figure 41A:
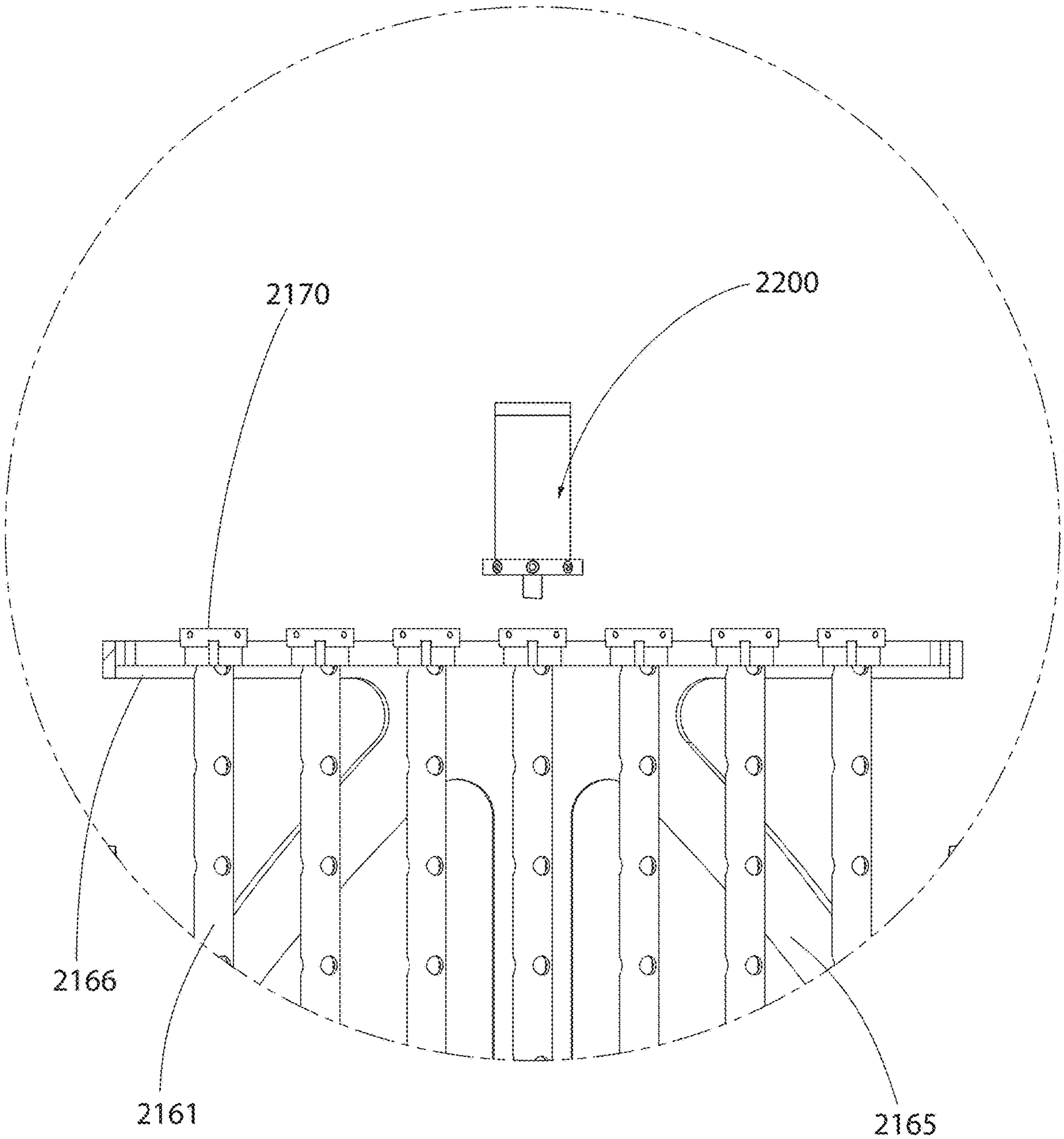
FIG. 41A is an enlarged detail VIIIA taken from FIG. 41.
Figure 41B:
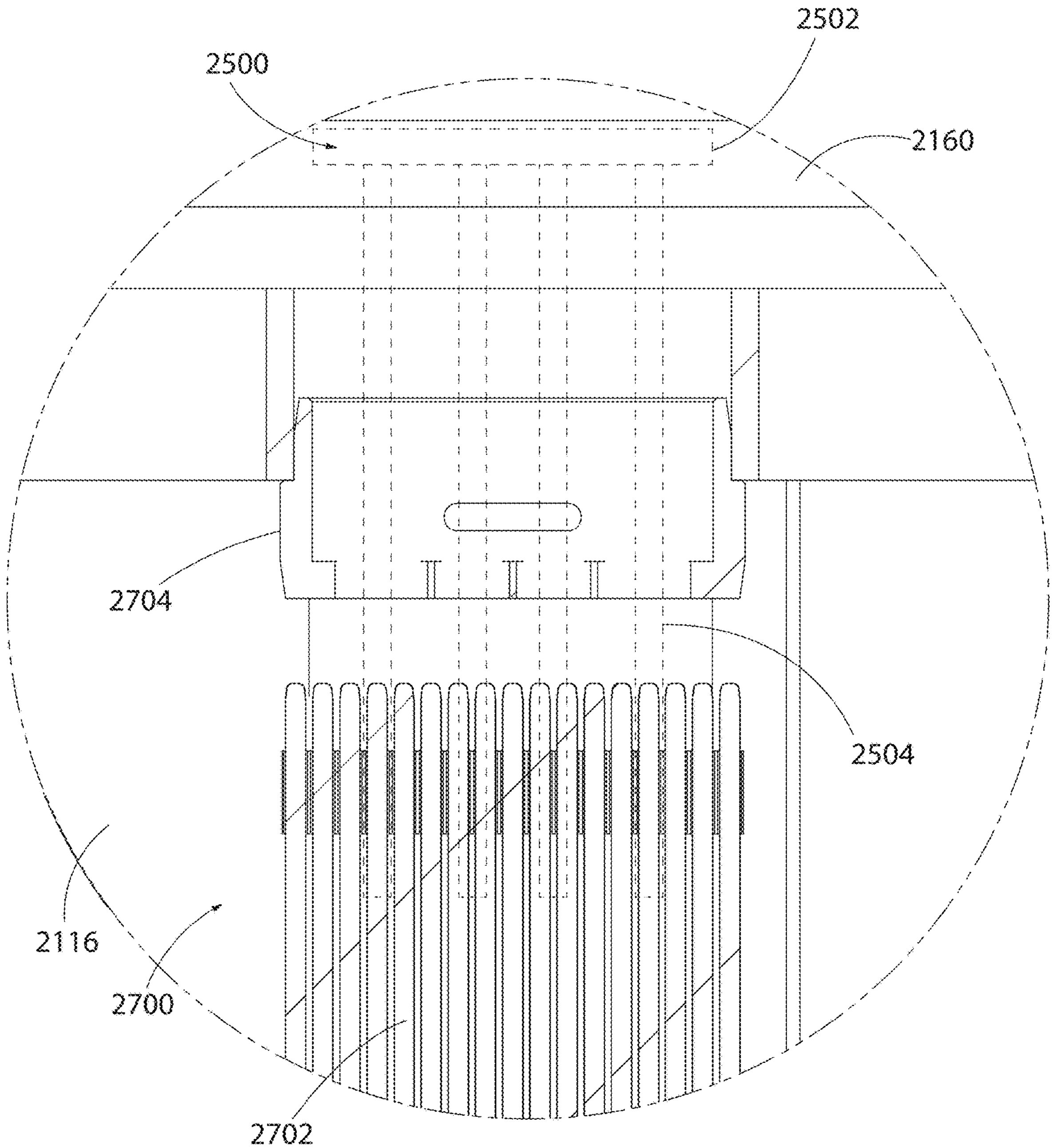
FIG. 41B is an enlarged detail VIIIB taken from FIG. 41.

Referring to FIGS. 35 and 41, the drive rod extension support structure (DRESS) 2160 may be mounted inside the upper portion of riser pipe 2119 proximate to the top of the fuel core 2116. This allows the lower operating ends of each drive rod extensions (DREs) 2400 which may be coupled and uncoupled from the rod cluster control assembly (RCCA) 2500 to be in proper position for inserting or retracting the control rods 2504 into/from the fuel core 2116 for controlling the nuclear reaction rates in parts or all of the fuel core, as further described herein.

Figure 42:
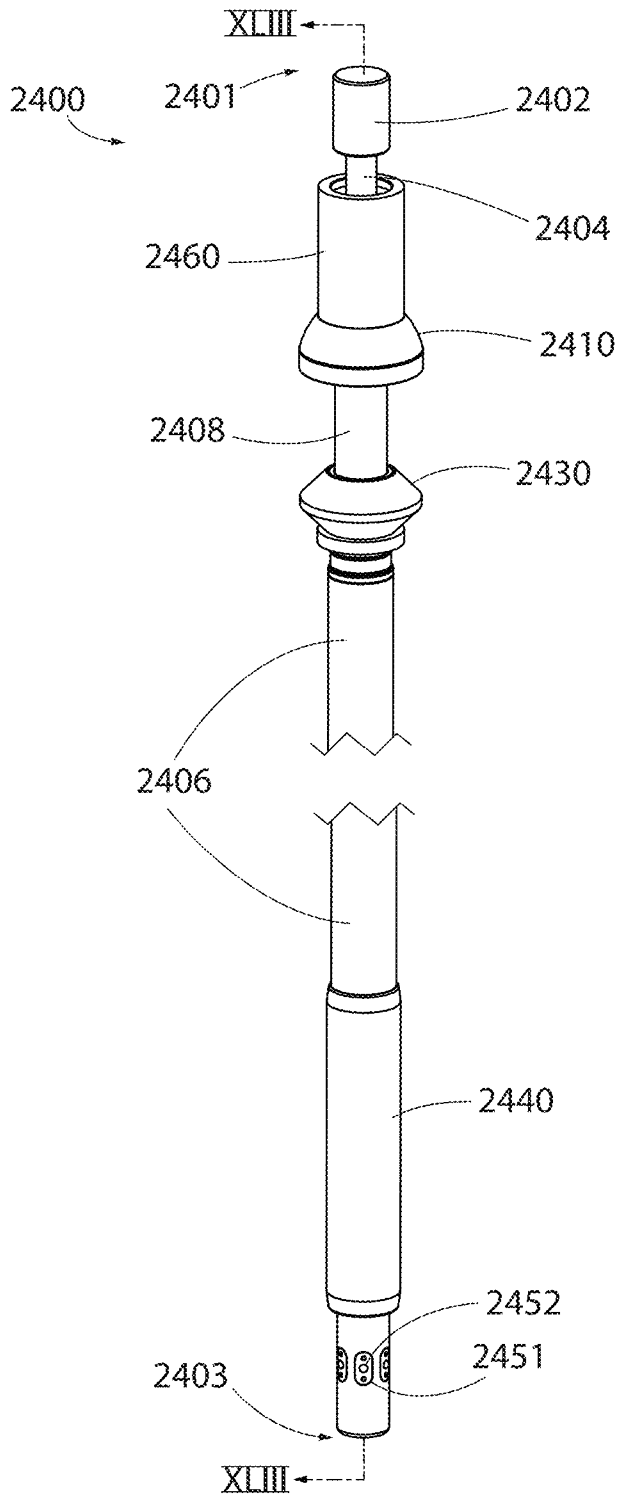
FIG. 42 is a perspective view of a drive rod extension.
Figure 43A:
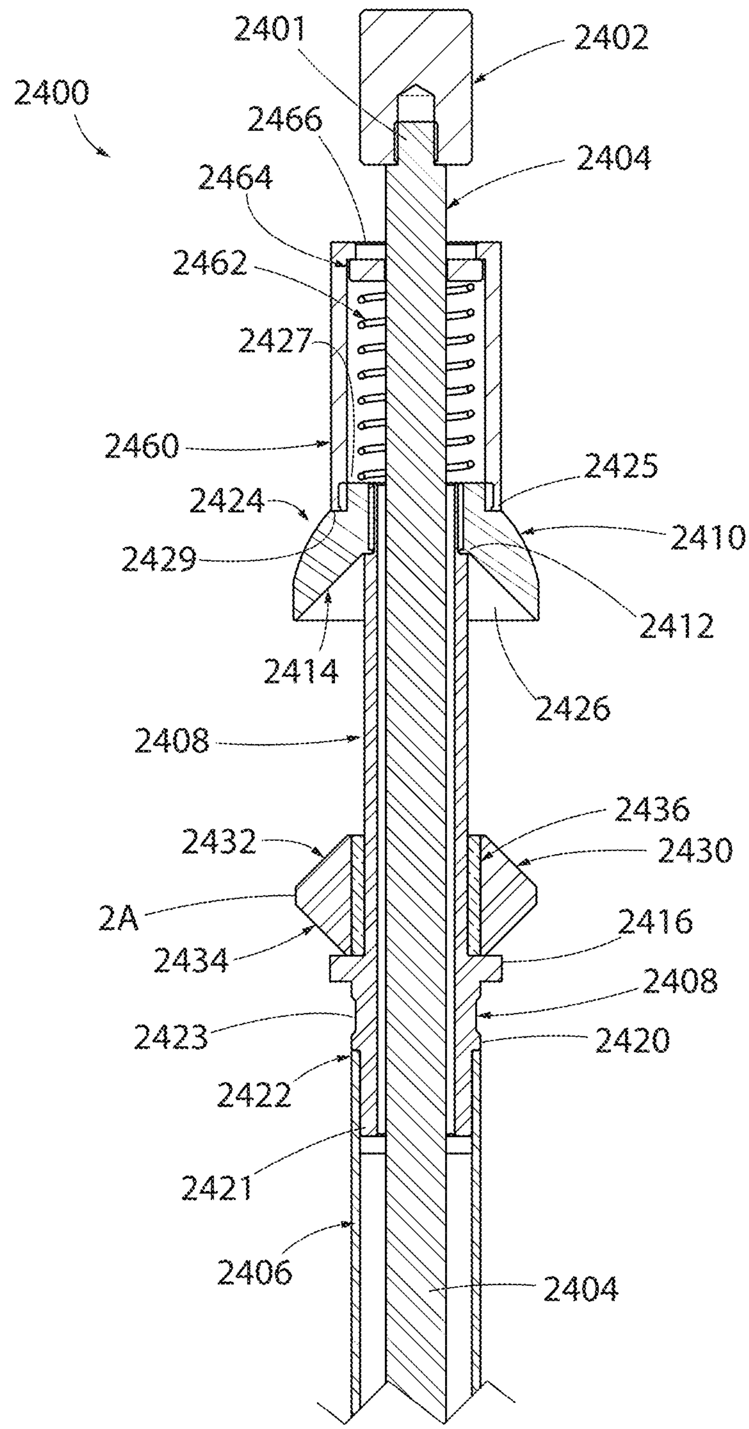
FIG. 43A is a side cross-sectional view of the upper portion of the drive rod extension shown in FIG. 42.
Figure 43B:
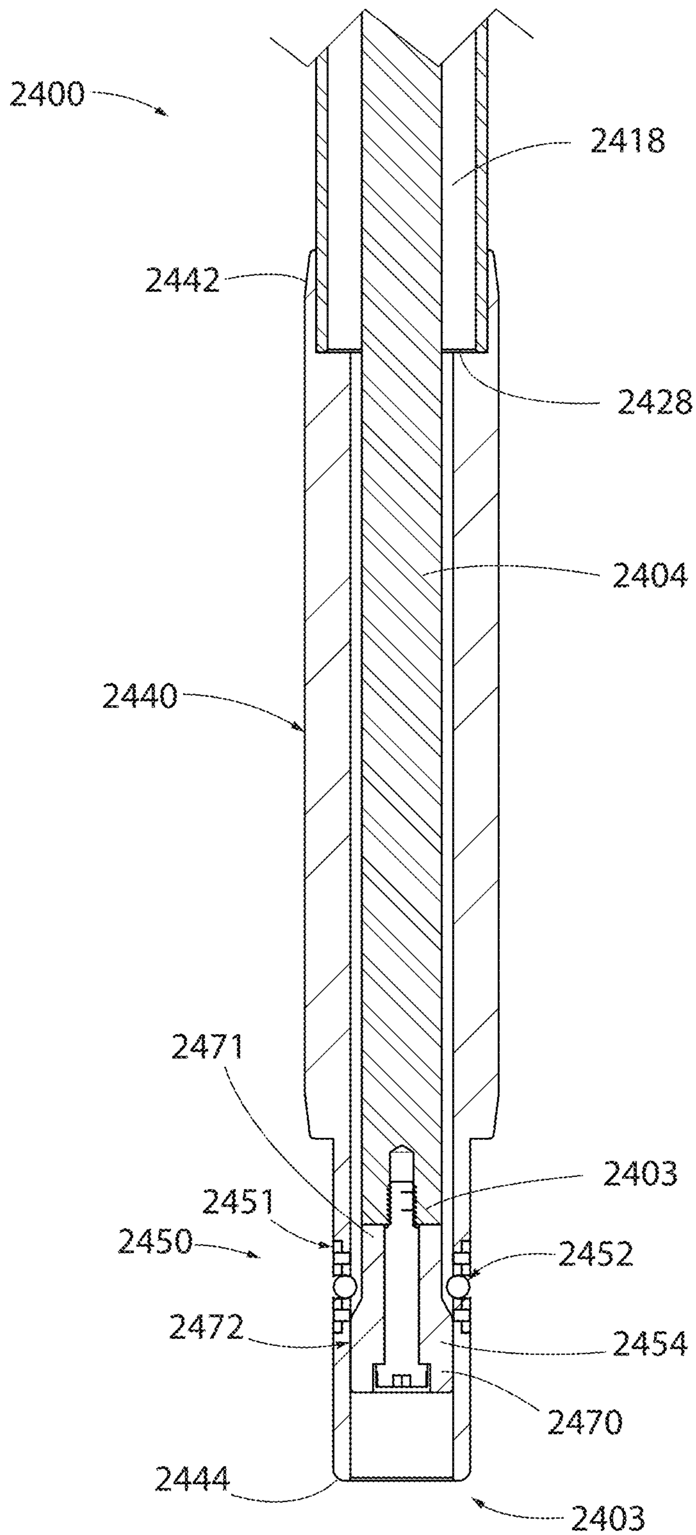
FIG. 43B is a side cross-sectional view of the lower portion of the drive rod extension shown in FIG. 42.

FIGS. 42 and 43 show the drive rod extension (DRE) 2400 in greater detail. Each DRE 2400 is intermediate link which operably couples a drive rod 2130 at top end 2401 of the DRE to a corresponding rod cluster control assembly (RCCA) 2500 at bottom end 2403 of the DRE. DRE 2400 includes an inner actuator shaft 2404 which is disposed inside an outer actuator tube 2406 and a lifting head sleeve 2408. Actuator shaft 2404 extends longitudinally for substantially the entire length of the DRE 2400 and may be a single unitary structure in some embodiments.

In one embodiment, lifting head sleeve 2408 is positioned at an upper portion of the DRE above the top of the drive rod extension support structure (DRESS) 2160. Lifting head sleeve 2408 has a bottom end 2421 and a top end 2412 that abuts a lower surface 2414 of a diametrically enlarged lifting head 2410. Axially spaced between ends 2412 and 2421 is an annular stop flange 2416 extending radially outwards from lifting head sleeve 2408. The stop flange 2416 is configured to engage an axially movable bobbin 2430 which is slidable on lifting head sleeve 2408 and defines a lower travel stop for the bobbin. Stop flange 2416 may be further arranged to engage the top of retaining collar 2170 to limit the insertion depth of the lifting head sleeve into the upper guide tube 2161 (see also 44A).

Lifting head sleeve 2408 may further include a stepped portion 2420 which defines a downward facing surface which abuts a top end 2422 of actuator tube 2406. In one embodiment, the bottom end 2421 of lifting head sleeve 2408 may be sized to be inserted into the open top end 2422 of actuator tube 2406.

Figure 38:
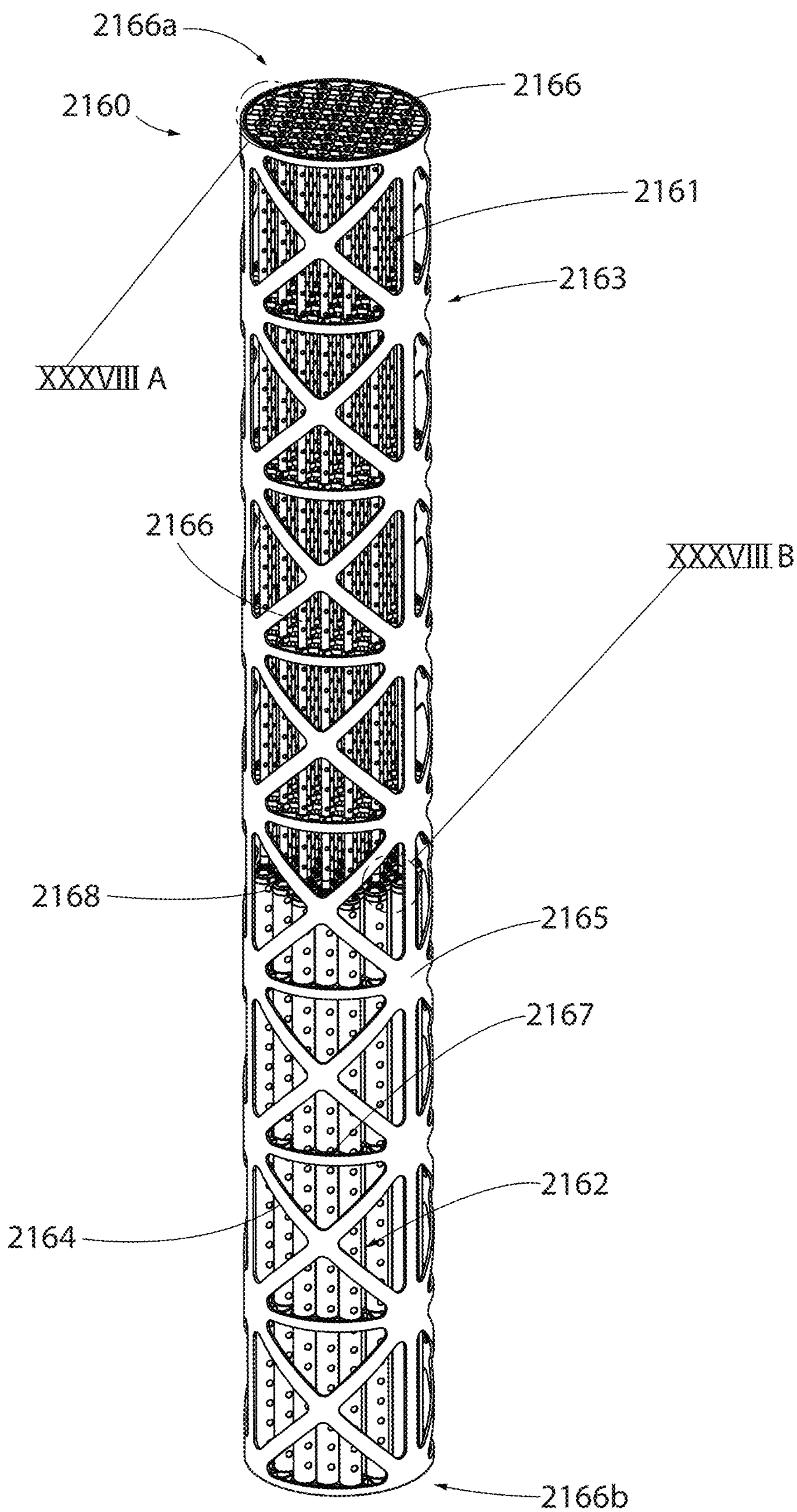
FIG. 38 is an perspective view of a drive rod extension support structure.
Figure 38A:
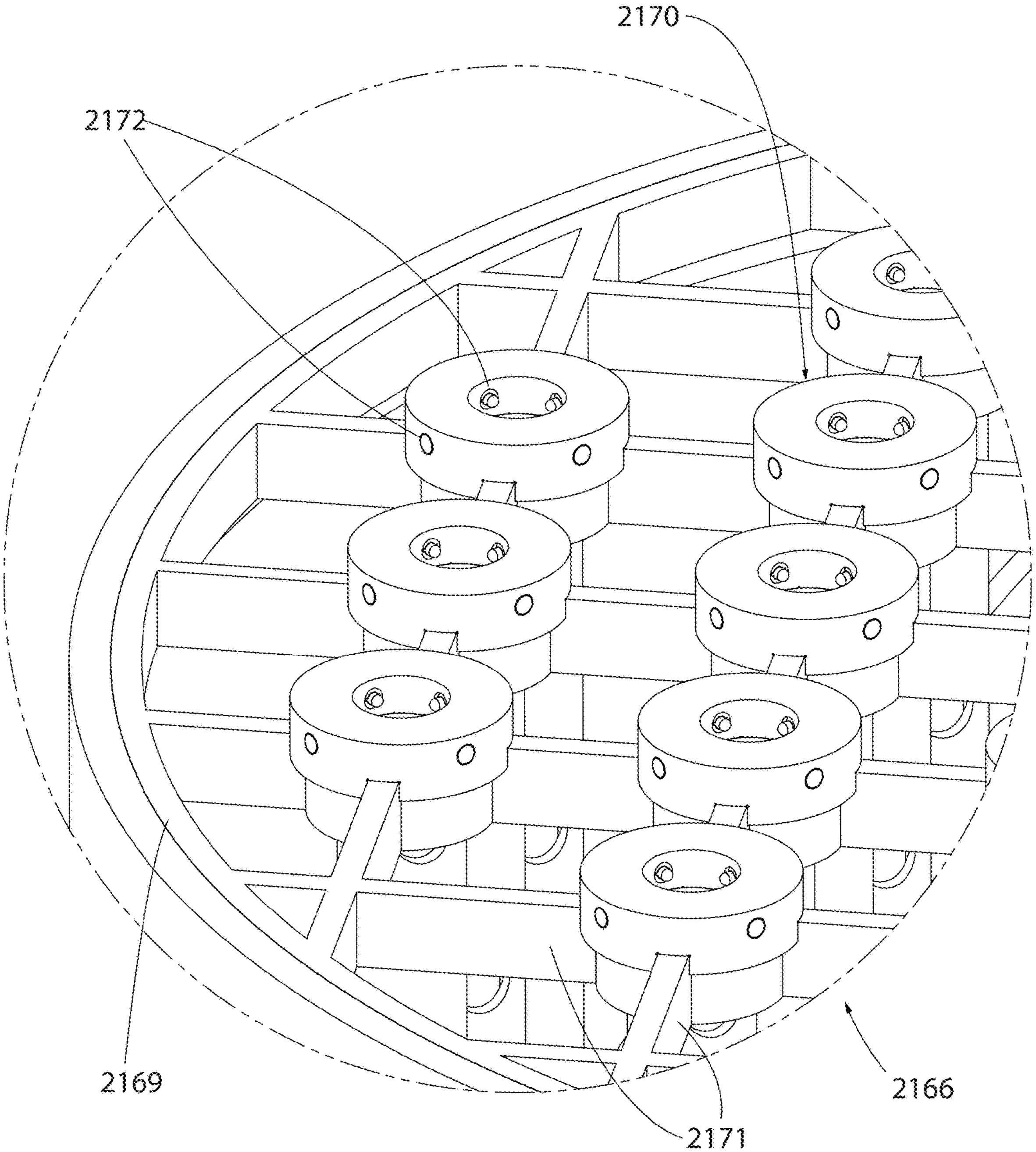
FIG. 38A is an enlarged detail VA taken from FIG. 38.
Figure 44A:
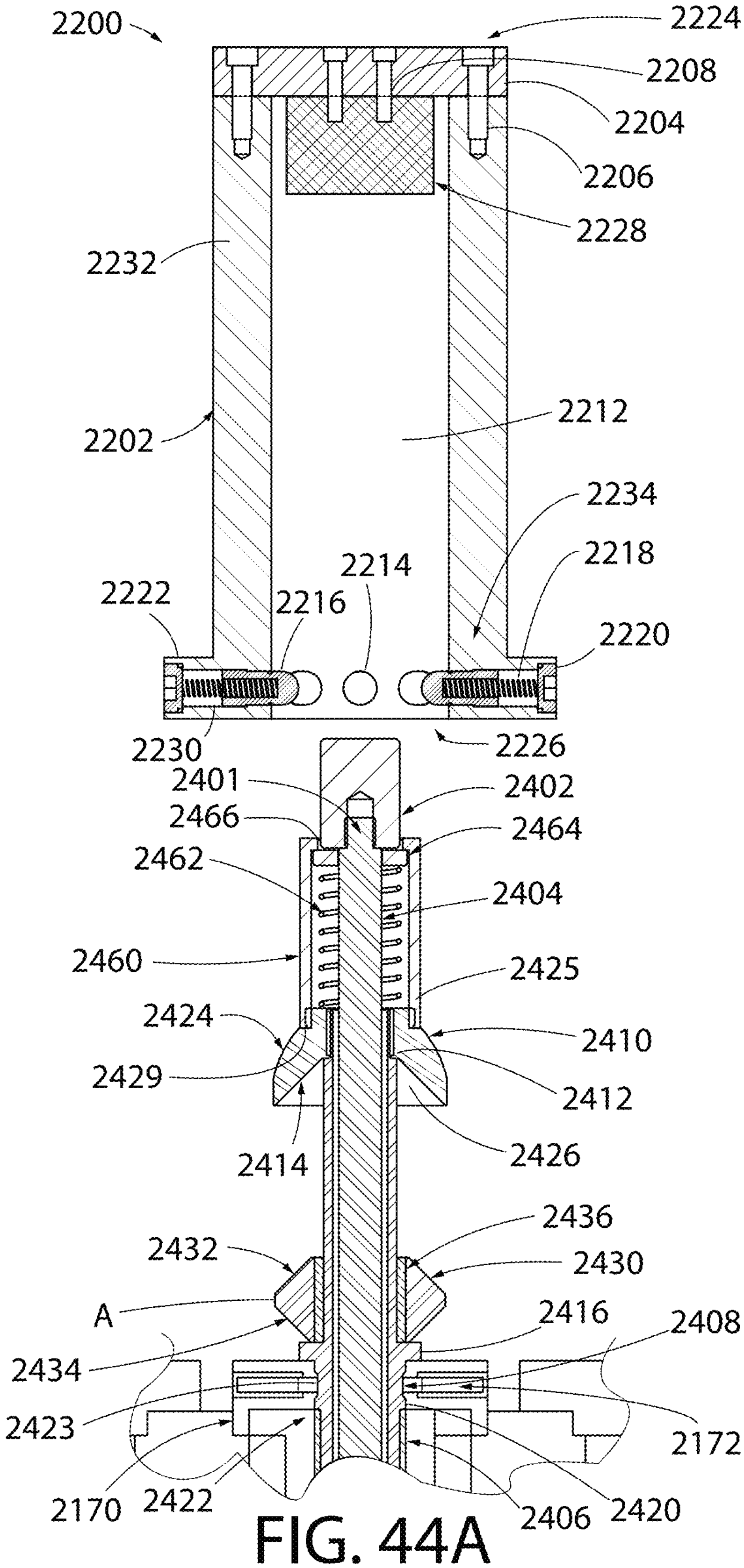
FIG. 44A is a side cross-sectional view of the top end of the drive rod extension and drive rod extension grapple assembly in an uncoupled position.

An axial portion of lifting head sleeve 2408 disposed between stop flange 2416 and stepped portion 2420 defines a recessed annular seating surface 2423 configured to removably receive and engage spring biased retaining pins 2172 of retaining collar 2170 which is initially positioned around the lifting head sleeve at this location (see also FIGS. 38A and 44A).

With continuing reference to FIGS. 42 and 43, bobbin 2430 includes an outward-upward facing angled upper bearing surface 2432 and an opposing outward-downward facing angled lower bearing surface 2434 which meet at a circumferentially extending apex A. Lower bearing surface 2434 is selectively engageable with 2216 of drive rod extension grapple assembly (DREGA) 2200. Upper bearing surface 2432 is selectively engageable with lifting head 2410. The functionality of these bearing surfaces will be further described herein.

Lifting head 2410 may be an annular generally inverted cup-shaped member in some embodiments. Lifting head includes an annular outward-upward facing angled upper bearing surface 2424 and opposing annular inward-downward facing angled lower bearing surface 2414. Bearing surface 2414 defines a downwardly open cavity 2426 which is configured to receive and complement the configuration of bobbin upper bearing surface 2432. A portion of lower bearing surface 2414 is engaged by top end 2412 of lifting head sleeve 2408 to maintain the axial position of the lifting head 2410. Lifting head 2410 has a larger diameter than the top end 2412 of lifting head sleeve 2408.

DRE 2400 may further include a drive extension spring 2462 having a bottom end engaging a top surface 2427 of lifting head 2410. Spring 2462 is arranged concentrically around actuator shaft 2404 and may be a helical coil spring in some embodiments. In one embodiment, a hollow and cylindrically-shaped spring retainer 2460 may be provided which holds spring 2462 therein. Spring retainer 2460 may have an open bottom and a partially open top defining a central opening 2466. A top end of spring 2462 may engage the underside of a spring spacer 2464 disposed inside the spring retainer beneath central top opening 2466 configured to receive magnetic block 2402 at least partially therethrough (see, e.g. FIGS. 48 and 49). The spring spacer 2464 may be generally shaped as a washer having a diameter larger than the diameter of central opening 2466 to prevent the drive extension spring 2462 from being ejected out the top of the spring retainer 2460. The bottom of magnetic block 2402 may bear against the top side of spring spacer 2464 in some positions. Lifting head 2410 may further include a stepped portion 2425 formed in the top surface 2427 and/or upper bearing surface 2424 which engages a bottom annular edge 2429 of spring retainer 2460 for locating the spring retainer on the lifting head. In one embodiment, as shown in FIGS. 42 and 43, lifting head 2410 and spring retainer 2460 may be disposed in the general proximity of top end 2401 of actuator shaft 2404 spaced axially downwards from the top end.

With continuing reference to FIGS. 42 and 43, the lower portion of the drive rod extension (DRE) 2400 includes an adapter sleeve 2440 having a bottom end 2444 and a top end 2442 attached to the bottom end 2428 of the actuator tube 2406. Adapter sleeve 2440 has a hollow cylindrical body which slidably receives actuator shaft 2404 therein. In one embodiment, the bottom end 2428 of the adapter sleeve 2440 may be open. Actuator cap 2454 may be inserted through the open bottom end 2428 of adapter sleeve 2440 to threadably engage bottom end 2403 of actuator shaft 2404 via a fastener.

Adapter sleeve 2440 includes an RCCA locking mechanism configured for releasably coupling the sleeve to the rod cluster control assembly (RCCA) 2500. In one embodiment, the locking mechanism may be a locking element assembly 2450 comprised of a plurality of circumferentially spaced apart and radially moveable locking elements. The locking elements in one exemplary configuration may be locking balls 2452 which may be retained on an outer surface of the adapter sleeve 2440 by ball retaining plates 2451 spaced circumferentially about the sleeve. The locking balls 2452 are engageable with an annular machined groove 2510 formed on an inside surface of a tubular mounting extension 2506 rising upwards from a hub 2508 of the RCCA 2500 (see, e.g. FIG. 44B). The locking balls 2452 are actuated by the actuator cap 2454, as further described herein.

When the drive rod extension (DRE) 2400 is mounted in the reactor vessel 2110, the adapter sleeves 2440 of each DRE are located proximate to the bottom ends of lower guide tubes 2162 in the drive rod extension support structure (DRESS) 2160. This positions the adapter sleeve 2440 to releasably engage the rod cluster control assembly (RCCA) 2500 via the locking ball assembly 2450. The locking ball assembly 2450 is operable to couple and uncouple the RCCA 2500 from the DRE 2400, as further described herein.

Figure 44B:
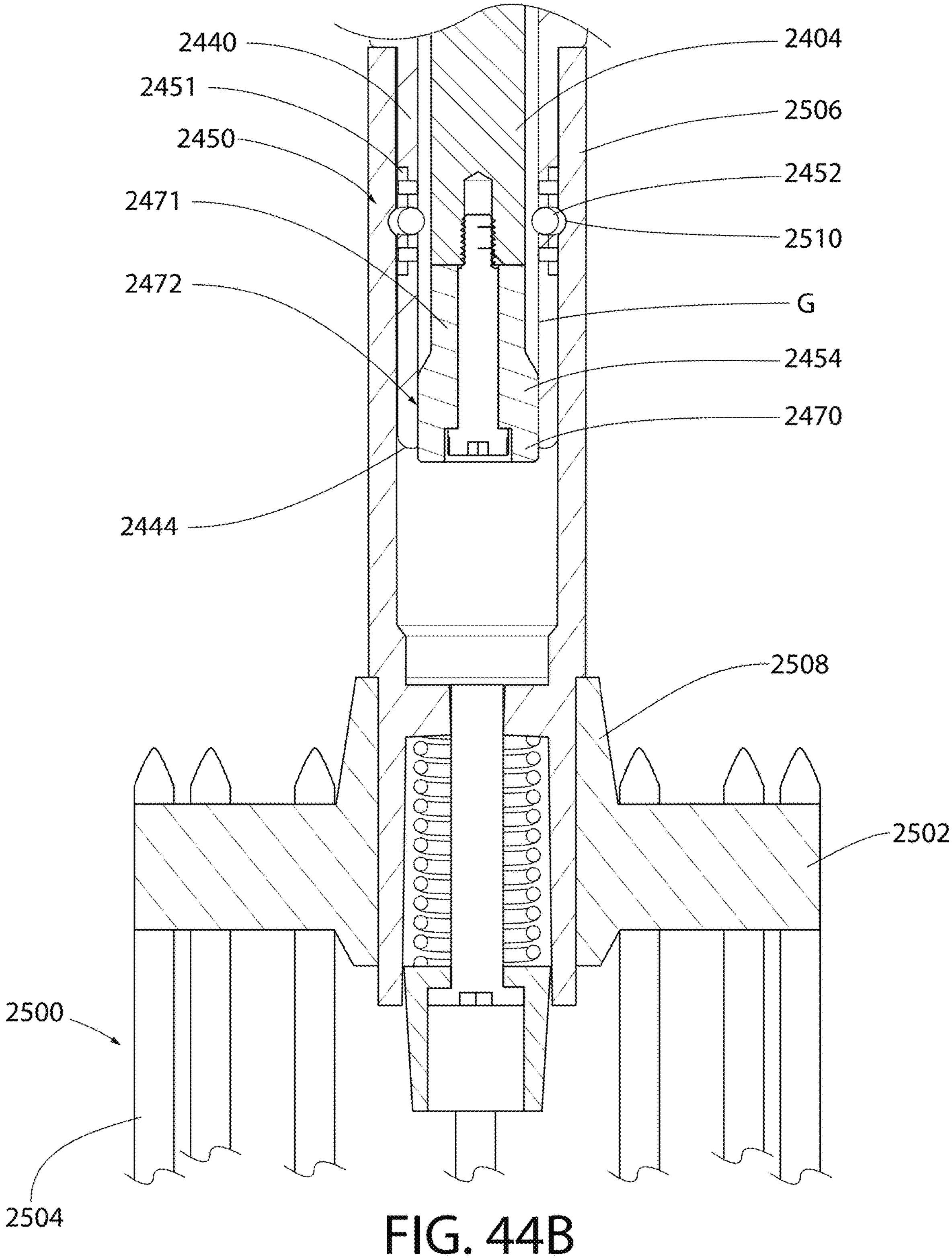
FIG. 44B is a side cross-sectional view of the bottom end of the drive rod extension and rod cluster control assembly in an uncoupled position corresponding to the position of the grapple assembly shown in FIG. 44A.
Figure 45A:
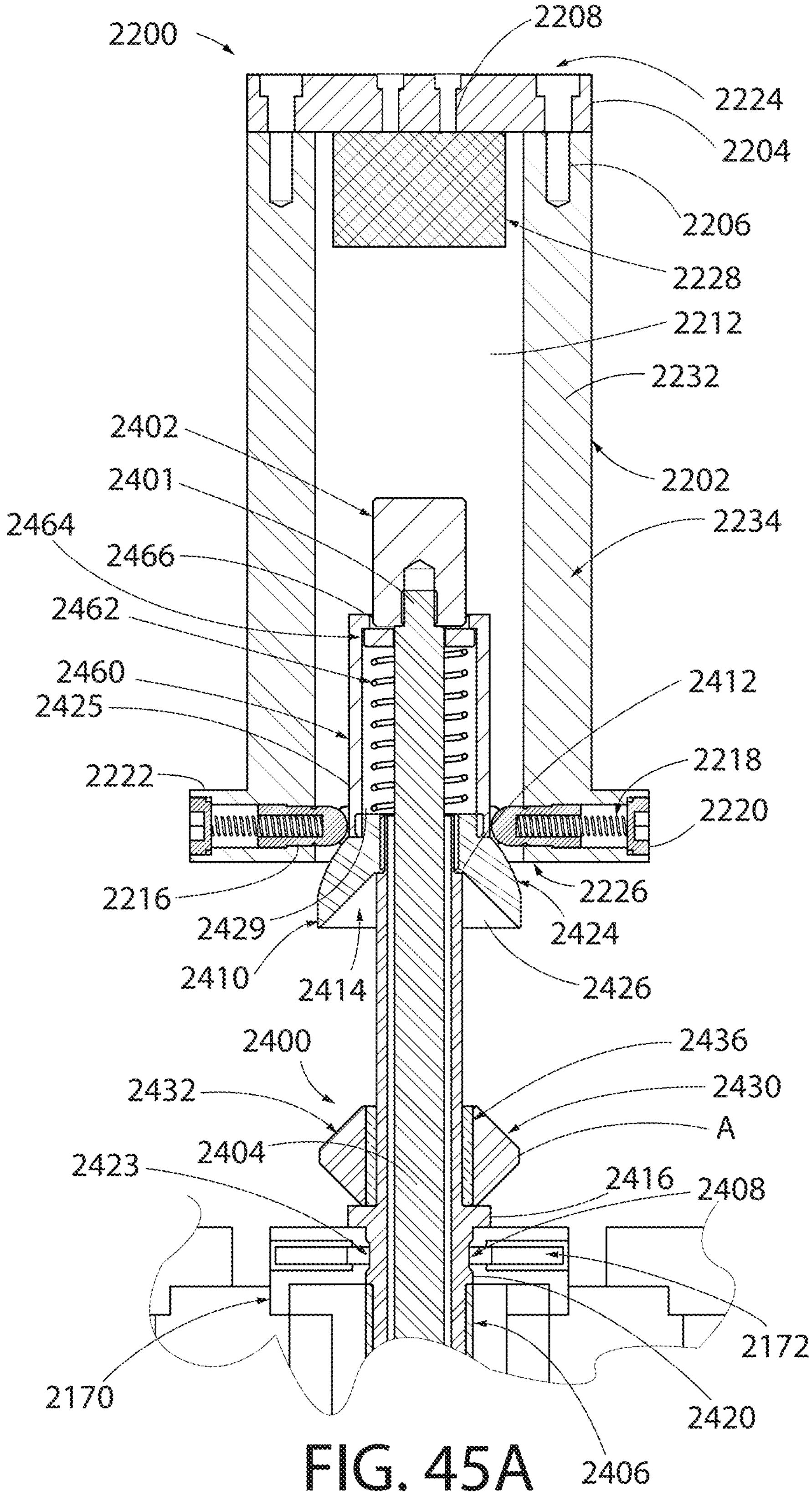
FIGS. 45A and 45B are sequential side cross-sectional views of the top end of the drive rod extension and drive rod extension grapple assembly during the drive rod extension and drive rod extension grapple assembly coupling process.
Figure 45B:
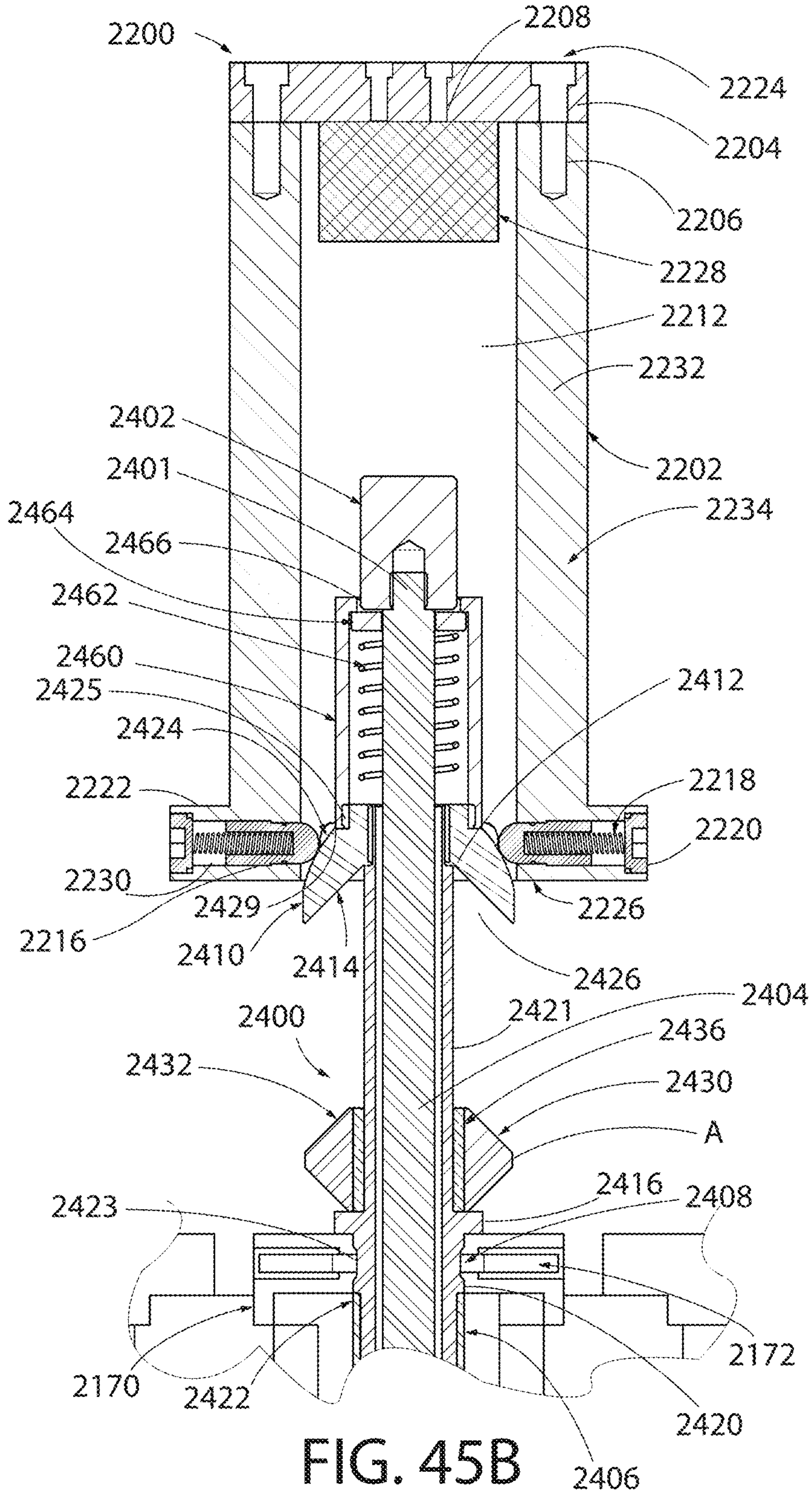

The fuel core 2116 is located at the bottom of the reactor vessel 2110 supported inside the core support structure 2115, such as riser pipe 2119. On top of the fuel core 2116 is the drive rod extension support structure (DRESS) 2160. The DRESS 2160 is oriented such that each guide tube is axially and vertically centered above a RCCA 2500 installed in the fuel core 2116. The drive rod extensions (DRE) 2130 are each positioned in the DRESS 2160 and the lower portion of each DRE is seated in and loosely engaged with an RCCA 2500, although not yet locked in place during initial assembly as evidenced in FIG. 44B showing the actuator cap 2454 positioned below the locking ball assembly 2450 near the bottom of the adapter sleeve 2440.

Control Rod Drive System Operation

An exemplary method for coupling a control rod drive mechanism (CRDM) 2300 to a rod cluster control assembly (RCCA) 2500 will now be described with various reference to FIGS. 44-50 showing sequential steps in the method or process. The drive rod extension support structure (DRESS) 2160 is not shown in these figures for clarity. In one embodiment, as described in greater detail below, the method may be generally accomplished by first coupling the drive rod 2130 to the top of the drive rod extension (DRE) 2400 which will enable the DRE to then be finally coupled to the RCCA 2500. It should be noted that the following process addresses the coupling of a single CRDM 2300 to a RCCA 2500. This same process, however, may be repeated for making the other CRDM-RCCA couplings for embodiments of control rod drive system (CRDS) 2100 in which multiple RCCAs are each individually controlled by a separate dedicated CRDM.

The reactor vessel 2110 is initially provided with the drive rod extension support structure (DRESS) 2160 installed above the fuel core 2116 in the core support structure 2115, in this embodiment tubular riser pipe 2119. DRE 2400 is preliminarily installed and inserted in the drive rod extension support structure (DRESS) 2160. The DRE 2400 is positioned within the upper and lower guide tubes 2161, 2162. At this juncture, however, the DRE 2400 is initially not operably coupled to either the RCCA 2500 or the drive rod assembly (i.e. drive rod extension grapple assembly (DREGA) 2200 attached to drive rod 2130).

As shown in FIG. 44A, the drive rod extension (DRE) 2400 is in an initial or starting vertical axial position with the top end of the actuator shaft 2404, lifting head 2410, and bobbin 2430 exposed and extending above retaining collar 2170 of the drive rod extension support structure (DRESS) 2160. The makes the upper portion of DRE 2400 accessible to the drive rod extension grapple assembly 2200 below the top head 2113 of the reactor vessel 2110. In this initial position of DRE 2400, the flange 2416 of lifting head sleeve 2408 may be engaged with the retaining collar 2170 and the lifting head sleeve is engaged with the radially biased retaining pins 2172 of the collar.

At the bottom end of the DRE 2400, the adapter sleeve 2440 is positioned and inserted into, but not lockingly engaged with the tubular mounting extension of the rod cluster control assembly (RCCA) 2500. Accordingly, at this initial starting position, the RCCA 2500 cannot be operably raised or lowered by CRDM 2300 because the RCCA has not yet been operably coupled and locked to the DRE 2400.

To engage the DRE 2400 with the RCCA 2500 at the fuel core 2116, the DREGA 2200 is first connected to the DRE in the overall coupling process. The DREGA 2200 and drive rod 2130 are axially (vertically) aligned with but spaced apart from top end 2401 of DRE 2400 (see FIG. 44A). The CRDM 2300 is operated to lower the drive rod 2130 with DREGA 2200 attached thereto towards the top end 2401 of DRE 2400. As the DREGA 2200 is lowered onto the DRE 2400, the lifting pins 2216 initially in a fully extended position engage angled upper bearing surface 2424 of lifting head 2410 (see FIGS. 37, 43, and 45A). The lifting pins 2216 and lift springs 2218 gradually retract farther and farther into the DREGA housing 2222 on the grapple body 2202 as DREGA 2200 continues to be lowered and pushed over the lifting head 2410 of DRE 2400. The lifting pins 2216 slidingly engage the upper bearing surface 2424 moving from top to bottom of the lifting head 2410 (see FIG. 45B). The lift springs 2218 become compressed by the retracting motion of the lifting pins 2216.

Figure 46:
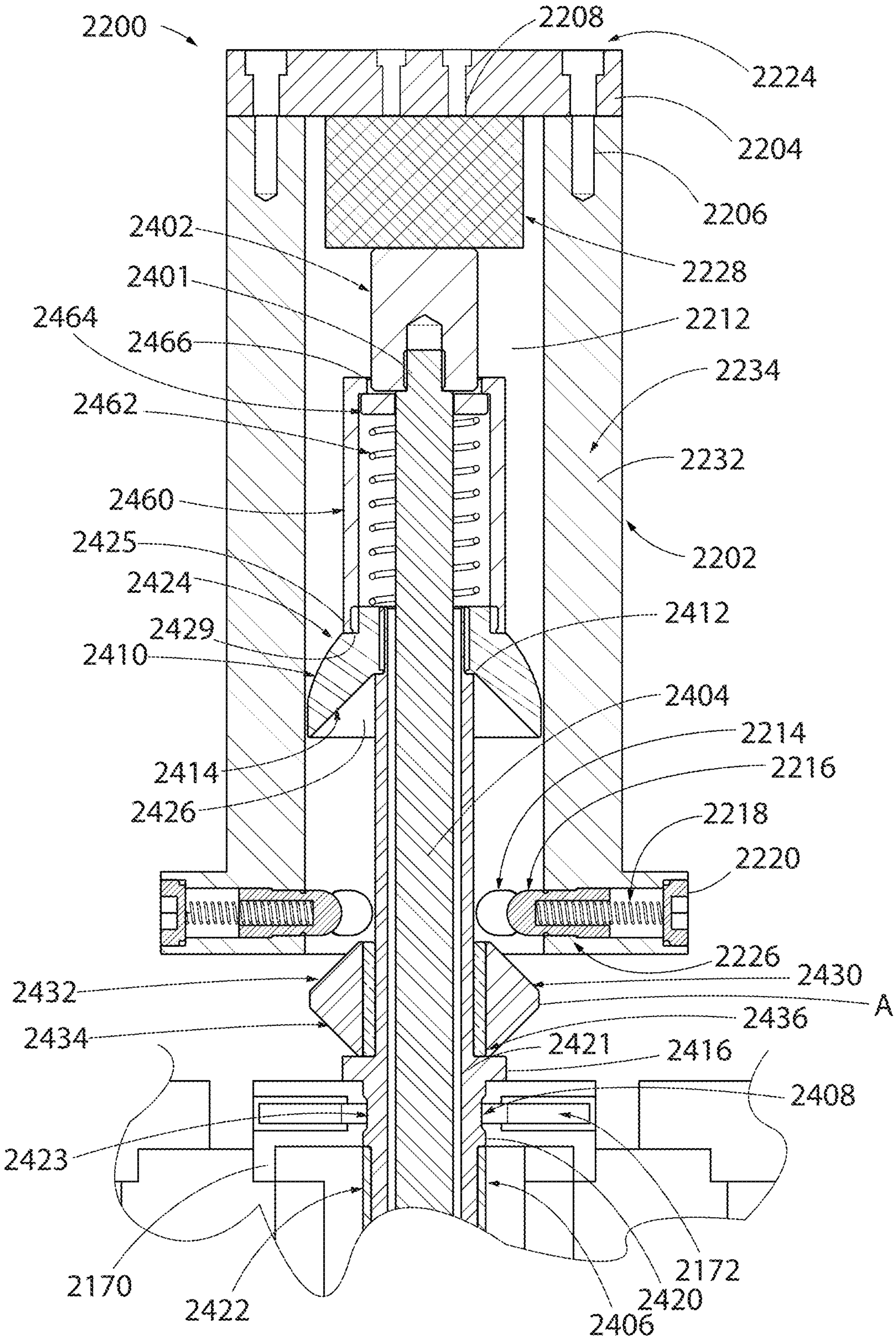
FIG. 46 is a side cross-sectional view of the top end of the drive rod extension and drive rod extension grapple assembly in a coupled position.

When the lifting pins 2216 clear and reach a position just beneath the lifting head 2410, the pins return to their original fully extended positions inside DREGA interior chamber 2212 under the inwards biasing force of the lift springs 2218 (i.e. lifting pins are in a position slightly above that shown in FIG. 46). The DREGA 2200 is now attached to the DRE 2400 and lifting pins 2216 are positioned above the bobbin 2430 as shown. It should be noted that DREGA 2200 cannot be disengaged from DRE 2400 at this point with the lifting pins 2216 in this axial position by merely raising the drive rod and DREGA with the CRDM 2300.

Accordingly, the method carries on by continuing to lower the DREGA 2200 until the electromagnet 2228 in the DREGA comes into complete physical contact with the magnetic block 2402 fastened to the top end 2401 of the DRE actuator shaft 2404, as shown in FIG. 46. The electromagnet 2228 is then activated (energized) from a power source. Activation of the electromagnet 2228 causes the magnetic block 2402 to be releasably coupled to the electromagnet. After this magnetic coupling is completed, the DREGA 2200 and drive rod 2130 assembly is now fully connected to the DRE 2400 such that raising and lowering the drive rod using CRDM 2300 concomitantly raises and lowers the actuator shaft 2404 of the DRE as long as the electromagnet 2228 remains energized.

In the foregoing position shown in FIG. 46, it should be noted that drive extension spring 2462 is uncompressed. The bottom of the magnetic block 2402 is positioned proximate to and may be in contact with the top of the spring retainer 2460.

In order to attach the RCCA 2500 remotely situated at the top of the fuel core 2116 from the CRDM 2500 to the DRE 2400, the actuator shaft 2404 in one embodiment needs to be pulled up to force the locking balls 2452 radially outwards through the adapter sleeve 2440 and into the machined groove 2510 located in the RCCA which engages the actuator shaft with the RCCA to complete the coupling at the bottom of the DRE. At this point in the installation process, the lifting head sleeve 2408 of DRE 2400 is still in its initial axial starting position shown similarly in FIGS. 44A and 46, but with the DREGA 2200 magnetically coupled to the DRE as shown in FIG. 46. The uncoupled DRE 2400 and RCCA 2500 are in their respective lowermost initial positions and at the bottom of their vertical range of travel in the reactor vessel 2110 and DRESS 2160. The control rods 2504 are fully inserted in the fuel core 2116. The lifting head sleeve 2408 remains as yet engaged with the retaining pins 2172 in retaining collar 2170. With additional reference to FIG. 43A, the recessed annular seating surface 2423 of lifting head sleeve 2408 is engaged with the spring biased retaining pins 2172 of retaining collar 2170 which serve to releasably hold the sleeve 2408 in position during coupling of the DREGA 2200 to the DRE 2400. As a point of reference, it may be noted that the lifting head sleeve stop flange 2416 may still rest on the top of retaining collar 2170 at present (see, e.g. FIG. 46) which prevents the lifting head sleeve 2408 from dropping any lower into the upper guide tube 2161 of the DRESS 2160.

Figure 47A:
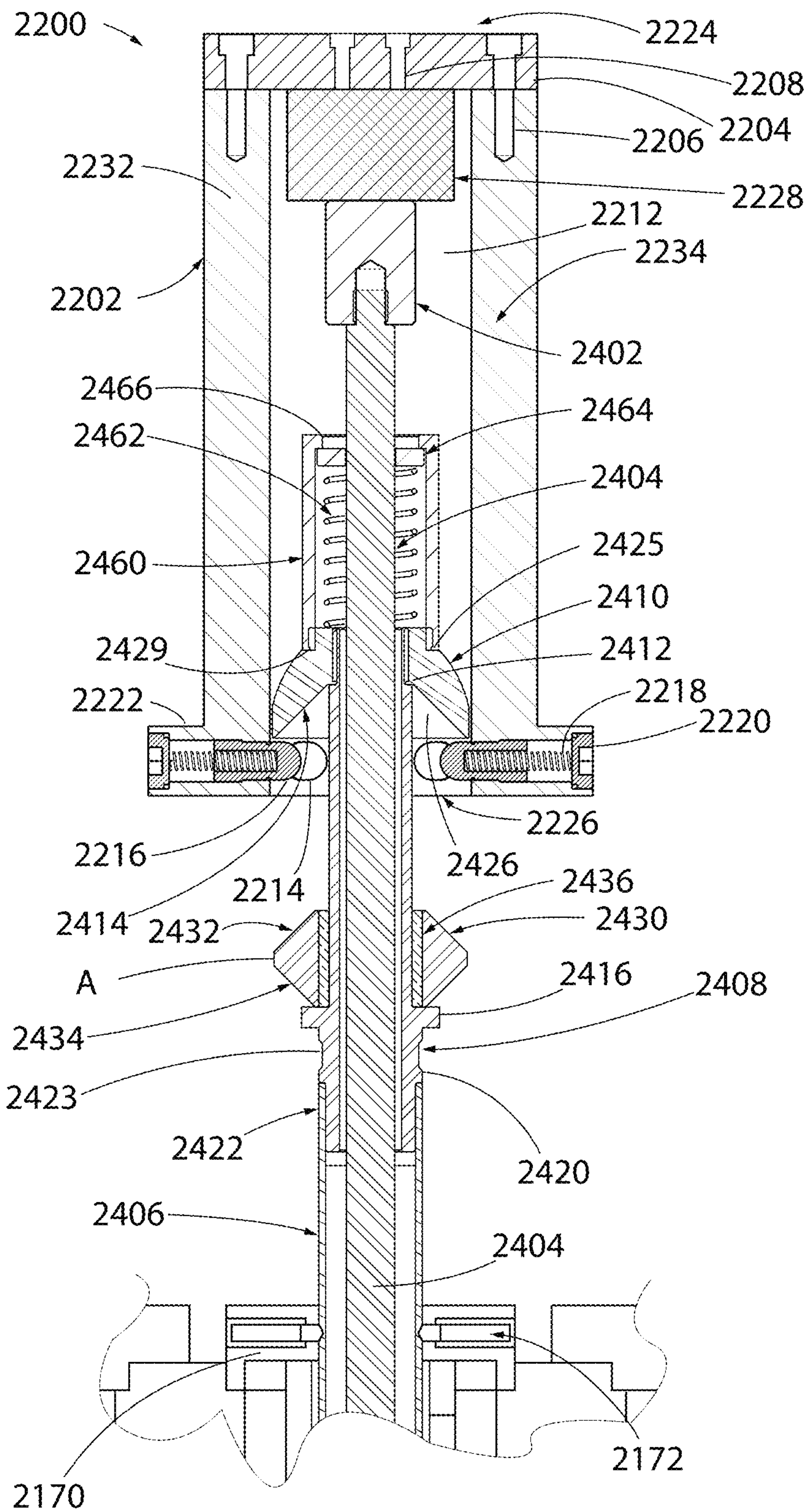
FIG. 47A is a side cross-sectional view of the top end of the drive rod extension and drive rod extension grapple assembly in a higher coupled position than FIG. 46 showing a lifting head sleeve of the drive rod extension disengaged from a retaining collar in the drive rod extension support structure.
Figure 47B:
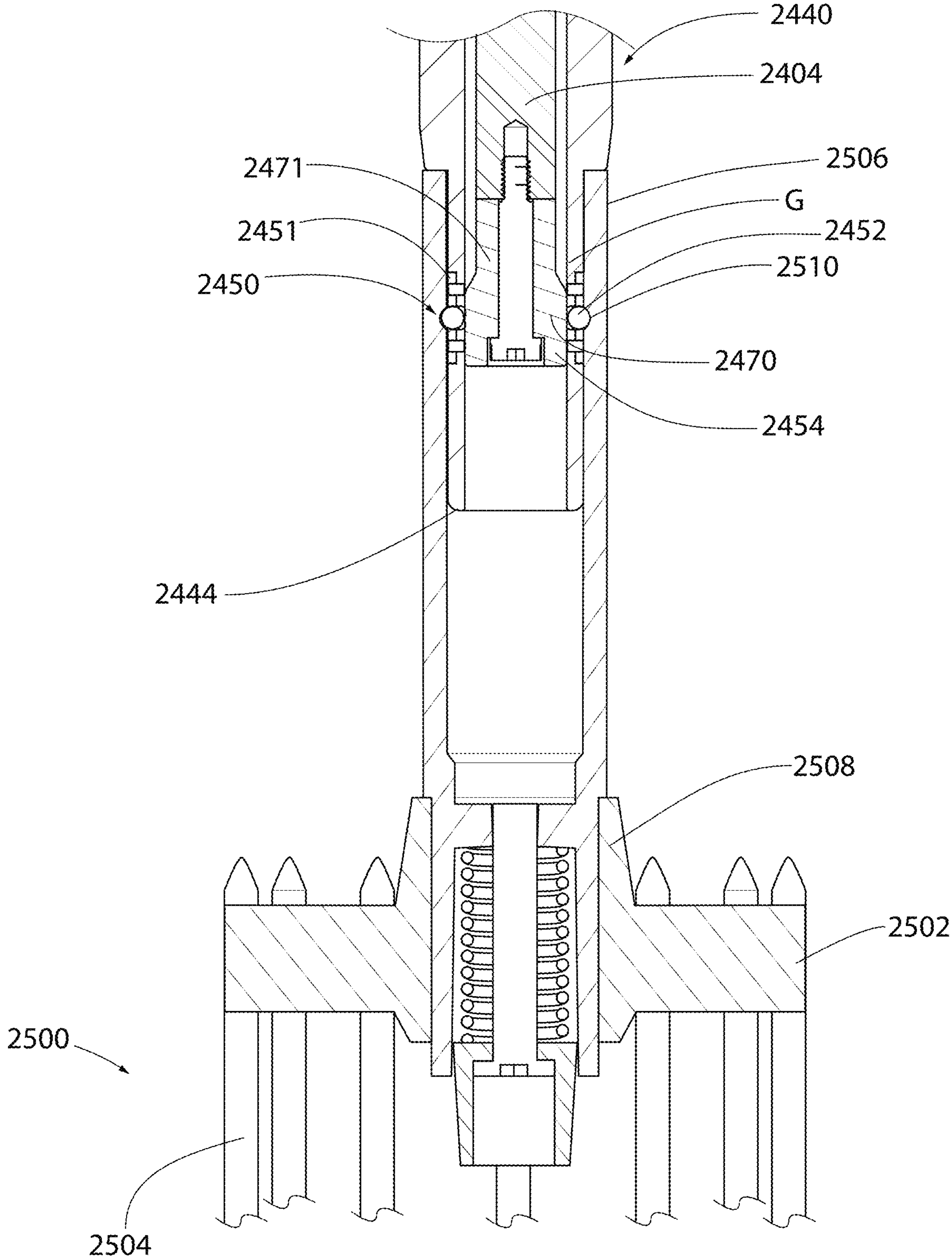
FIG. 47B is a side cross-sectional view of the bottom end of the drive rod extension and rod cluster control assembly in a fully coupled and locked position.

With the DRE 2400 in the position of FIG. 46 and the foregoing magnetic coupling completed of the DREGA 2200 with the DRE, the DREGA is then next raised upwards by a first vertical distance (via the drive rod 2130 using CRDM 2300) which pulls and slides the actuator shaft 2404 upwards inside the adapter sleeve 2440 which remains stationary. The actuator cap 2454 mounted to the bottom of the actuator shaft 2404 moves axially upwards with the shaft from an unlocked position (shown, e.g. in FIG. 44B) to a locked position (shown, e.g. in FIG. 47B) forcing the locking balls 2452 radially outwards from the adapter sleeve 2440 to engage the machined groove 2510 inside RCCA 2500. As shown in FIG. 47B, the DRE 2400 is now fully but releasably coupled at the bottom to RCCA 2500 which can be raised or lowered by the CRDM 2300 via the DRE 2400. Accordingly, the CRDM 2300 has now been linked to the RCCA 2500 for controlling the insertion depth of the control rods 2504 into the fuel core 2116 for controlling the reactivity.

It should be noted that in the unlocked position of actuator cap 2454 (see, e.g. FIG. 44B, 48B, or 49B), the larger diameter lower actuating portion 2470 of the cap with annular bearing surface 2472 does not contact the locking balls 2452 which remain seated but relatively loose in the ball retaining plate 2451. This does not create positive locking engagement of the locking balls 2452 with the machined groove 2510 on the inside of the tubular mounting extension 2506 of RCCA 2500 sufficient to couple the DRE 2400 to the RCCA. The reduced diameter upper portion 2471 of actuator cap 2454 even when positioned adjacent to the locking balls 2452 (see, e.g. 43B) leaves an annular gap G between the cap and adapter sleeve 2440 so the locking balls 2452 remain loose and not positively engaged with the machined groove 2510 of the RCCA 2500.

In the locked position of the actuator cap 2454 (see, e.g. FIG. 47B), the annular bearing surface 2472 of the larger diameter lower actuating portion 2470 of the cap is adjacent to and contacts locking balls 2452. Since there is no appreciable annular gap or space between the lower portion 2470 of actuator cap 2454 and adapter sleeve 2440, the annular bearing surface 2472 drives the locking balls 2452 outwards to engage machined groove 2510 of the RCCA tubular mounting extension 2506 which positively couples the DRE 2400 to the RCCA 2500. In one embodiment, a sloping transition 2475 (see, e.g. FIG. 49B) may be formed between the larger diameter lower portion 2470 and reduced diameter upper portion 2471 of the actuator cap 2454 to provide smooth sliding operation and engagement of the lower portion 2470 with the locking balls 2452.

After the RCCA 2500 has been coupled to the CRDM 2300 in the foregoing manner, the RCCA remains in its bottom and lowermost position within the lower guide tubes 2162 proximate to the top of the fuel core 2116. To provide the ability to operationally retract the control rods 2504 from the fuel core 2116, the DREGA 2200 is slightly raised further upwards if necessary via the CRDM 2300 until the lifting pins 2216 engage the bottom of lifting head 2410 (as shown in FIG. 47A) if not already engaged by the DREGA-RCCA coupling process). Until the lifting pins 2216 engage the underside of lifting head 2410, this initial limited upward range of travel raises the actuator shaft 2404 and DREGA 2200, but not the lifting head sleeve 2408 which remains engaged with retaining collar 2170 and retaining pins 2172.

DREGA 2200 is then further raised through a second upward vertical distance and range of travel which pulls both the actuator shaft 2404 (via the magnetic coupling with the DREGA) and lifting head 2410 with lifting head sleeve 2408 fixed thereto upwards together simultaneously. This action disengages the lifting head sleeve 2408 from the retaining pins 2172 in retaining collar 2170 as also shown in 47A. The DRE 2400 (including actuator shaft 2404, lifting head sleeve, actuator tube 2406, and adapter sleeve 2440 shown in FIGS. 43A and 43B) and the RCCA 2500 coupled thereto may now be freely raised as a unit to a maximum height within the reactor vessel 2110 representing the fullest retracted position of the control rods 2504 from the fuel core 2116 during normal operation of the reactor vessel 2110. The actuator shaft 2404 and lifting head sleeve 2408 may further be alternatingly lowered and then raised again through a plurality of possible axial positions via operation of the CRDM 2300 and drive rod 2130.

It may be noted that the RCCA 2500 fits inside and slides axially upward and downward within the confines of the lower guide tubes 2162 of the DRESS 2160 which have a diameter selected to fully receive the RCCA therein in one embodiment. The length of the lower guide tubes 2162 establishes the maximum vertical range of travel of the RCCA 2500 and correspondingly the control rods 2504 mounted thereto.

Figure 48A:
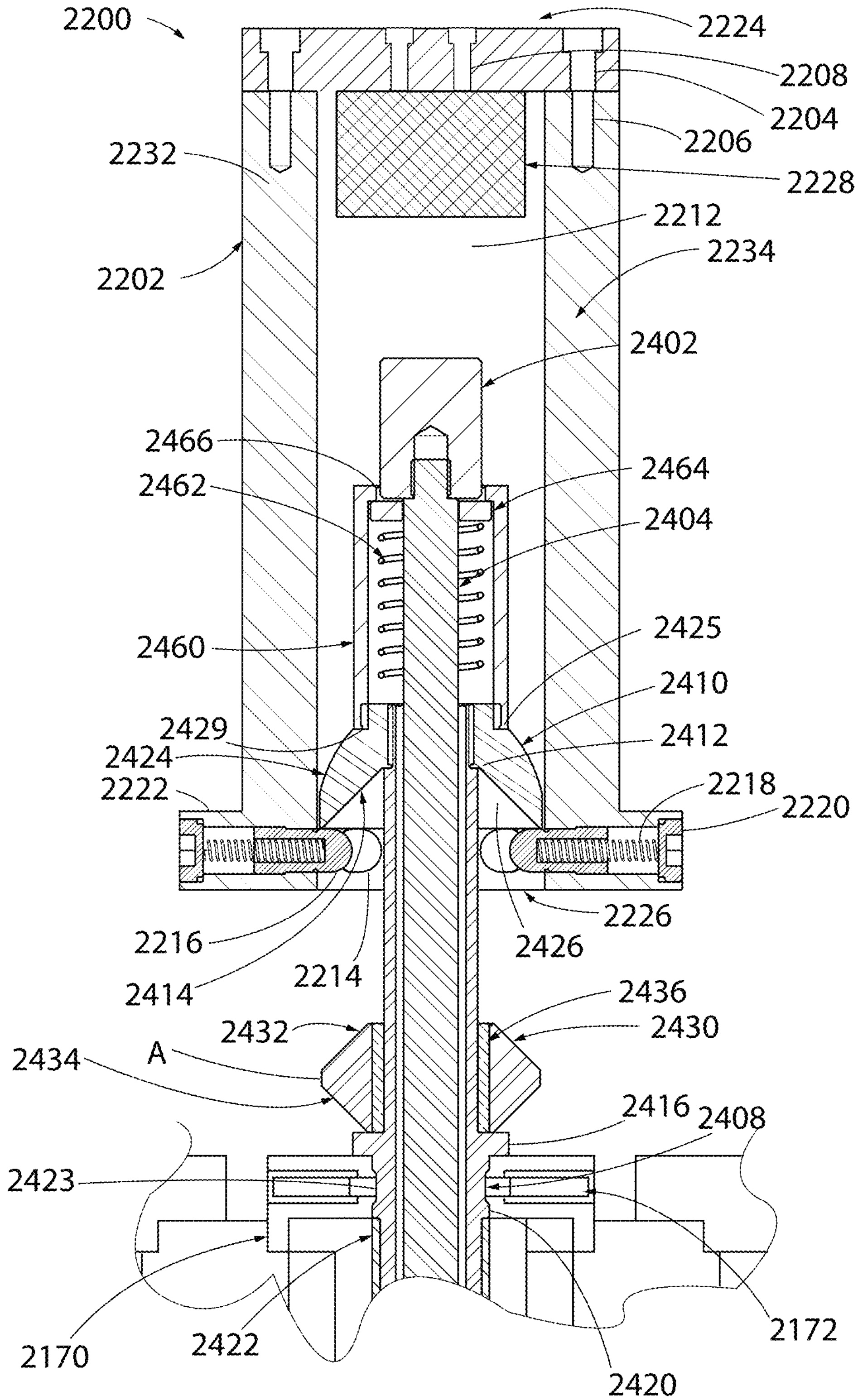
FIG. 48A is a side cross-sectional view of the top end of the drive rod extension and drive rod extension grapple assembly shown in an uncoupled position.
Figure 48B:
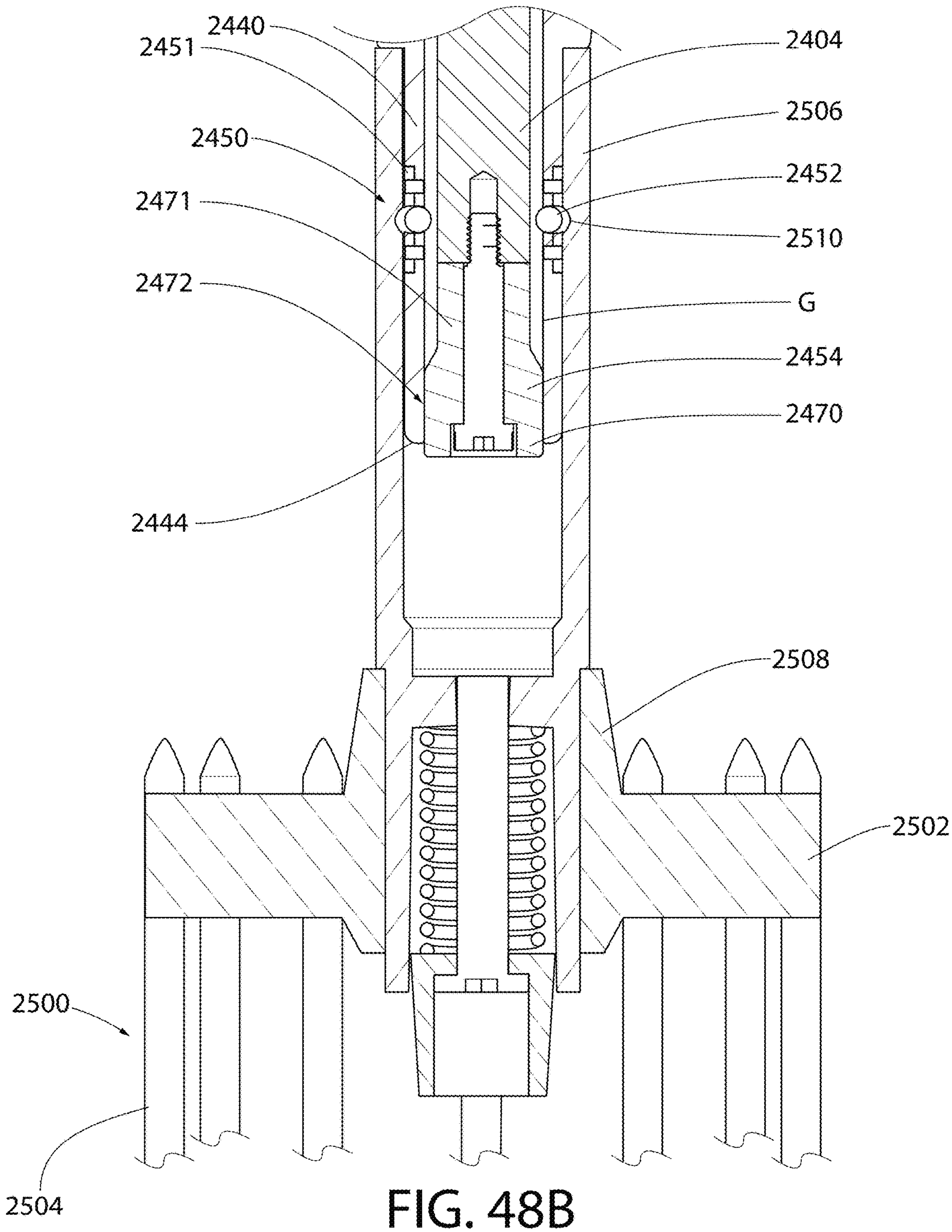
FIG. 48B is a side cross-sectional view of the bottom end of the drive rod extension and rod cluster control assembly in an uncoupled and unlocked position corresponding to the position of the grapple assembly shown in FIG. 48A.

A method to detach the rod cluster control assembly (RCCA) 2500 from the drive rod extension (DRE) 2400 and CRDM 2300 for SCRAM events or other purposes such as opening the reactor vessel head will now be described. In one embodiment, the electromagnet 2228 is first de-activated. This allows the actuator shaft 2404 to fall or drop by a preset distance determined by the drive extension spring 2462 and the spring spacer 2464. Doing so permits the locking balls 2452 to fall into the gap G created by the reduced diameter upper portion 2471 of the actuator cap 2454. The RCCA 2500 is now disengaged from the actuator shaft 2404 of drive rod extension (DRE) 2400 and the CRDM 2300. The foregoing falling action of the actuator shaft 2404 also re-engages the lifting head sleeve 2408 with the retaining pins 2172 in retaining collar 2170 of the DRESS 2160 (see FIG. 48A). It should be noted that this uncoupling action ensures that the control rods attached to the RCCA 2500 remain fully inserted into the fuel core 2116 which shuts down the nuclear reaction. FIGS. 47 and 48 illustrate this foregoing uncoupling sequence.

When in the foregoing position, it should be noted that the DRE 2400 can also be completely removed from the drive rod extension support structure (DRESS) 2160 if desired by simply lifting the drive rod extension grapple assembly (DREGA) 2200 via the control rod drive mechanism (CRDM) 2300. Because the electromagnet 2228 has been de-energized, this lifting action will disengage the lifting head sleeve 2408 from the retaining pins 2172 in retaining collar 2170 of the DRESS 2160 (see also FIGS. 38A and 44A).

Figure 49A:
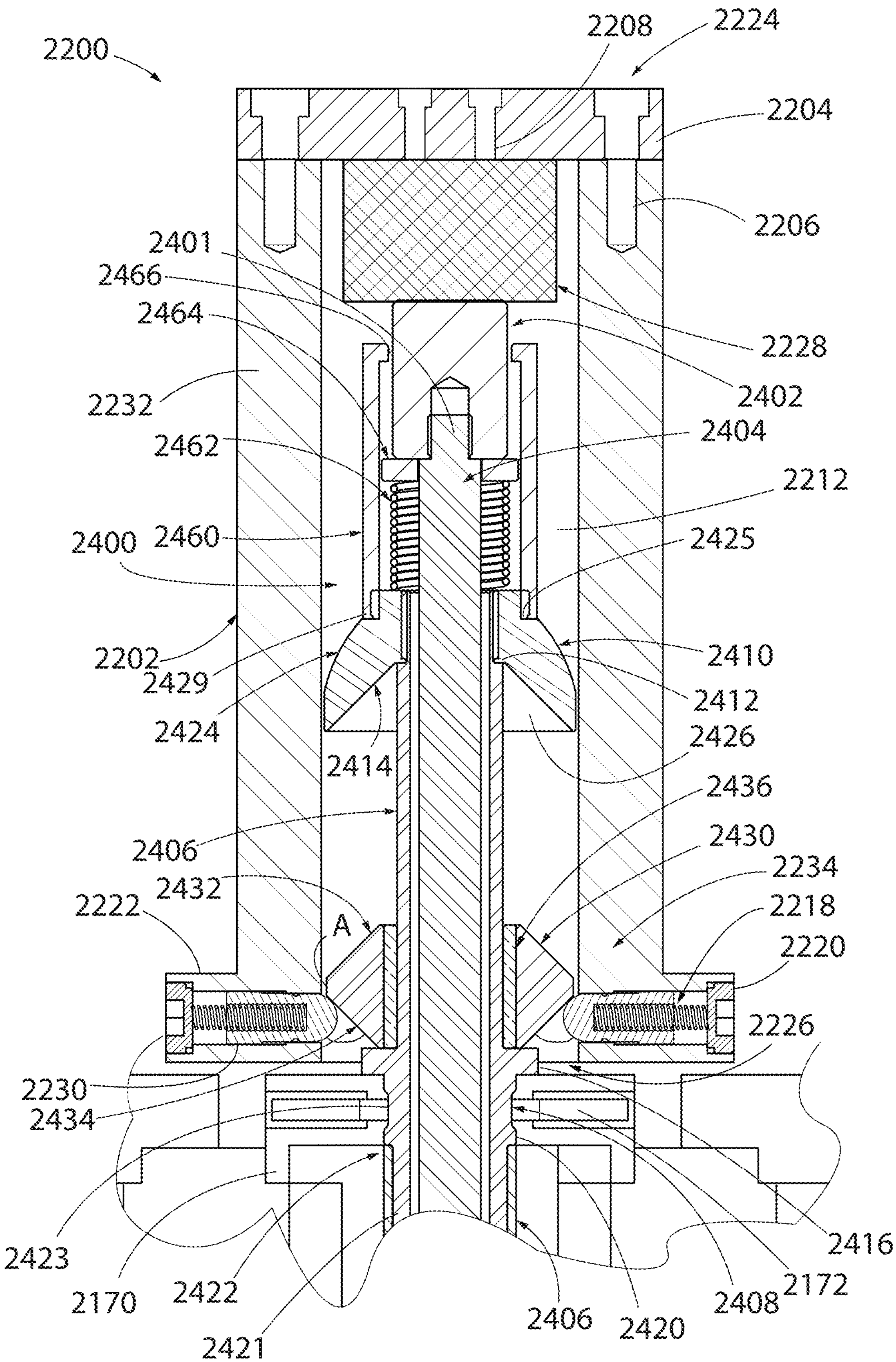
FIG. 49A is a side cross-sectional view of the top end of the drive rod extension and drive rod extension grapple assembly in a coupled position with the grapple assembly in a lowermost position on the drive rod extension.
Figure 49B:
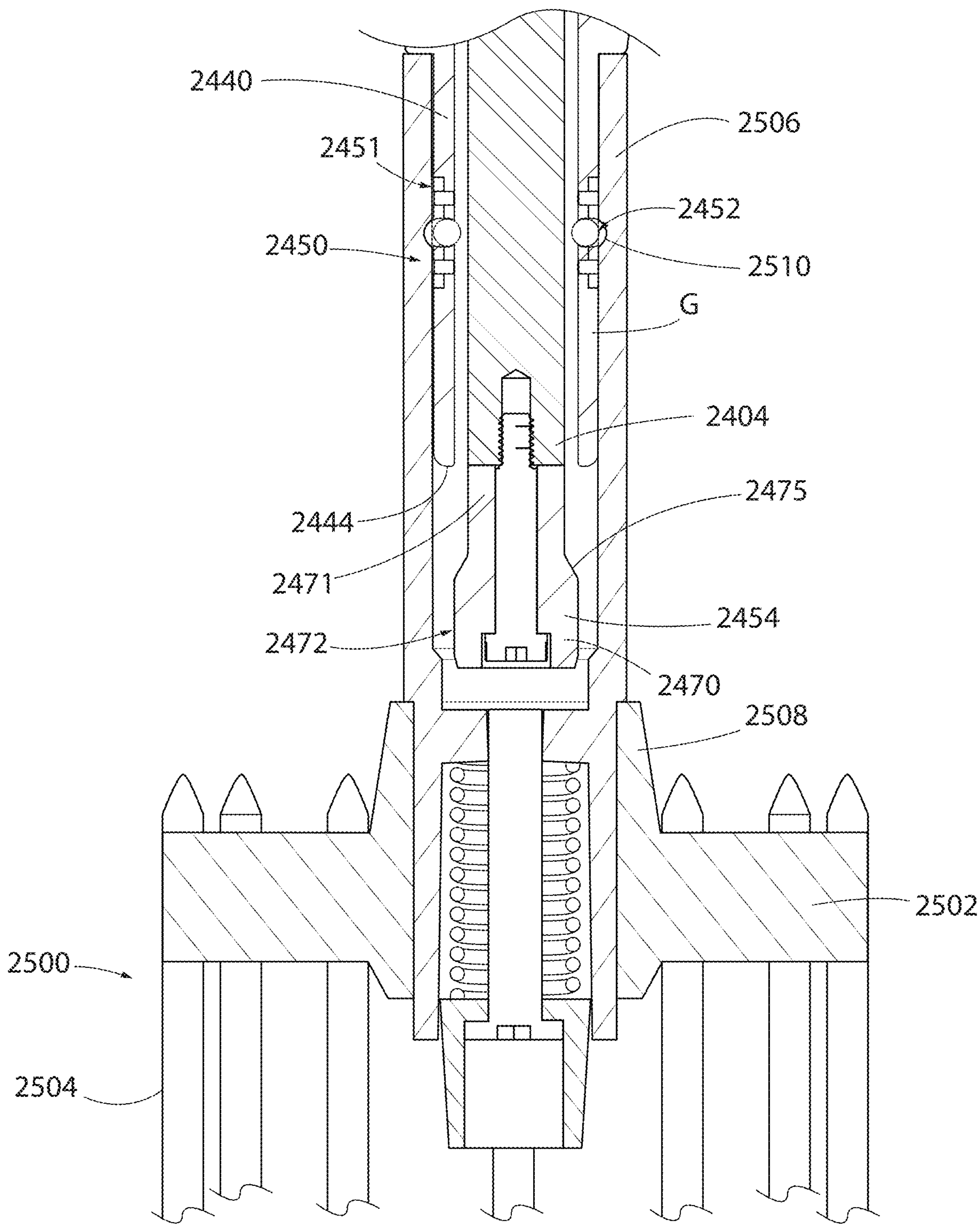
FIG. 49B is a side cross-sectional view of the bottom end of the drive rod extension and rod cluster control assembly with the bottom end of the drive rod extension in a lowermost position in the rod cluster control assembly corresponding to the position of the grapple assembly shown in FIG. 49A.

A method for uncoupling and removing the DREGA 2200 from the DRE 2400 (remaining in place in DRESS 2160) will now be described. First, the electromagnet 2228 is deactivated (and the RCCA 2500 is unlocked) in the manner already described above and shown in FIGS. 48A and 48B. Next, the DREGA 2200 is pushed downwards via the CRDM 2300 (and drive rod 2130) to engage the bobbin 2430. The lifting pins 2216 initially engage angled upper bearing surface 2432 which increasingly drives the pins radially outwards (i.e. retracted from chamber 2212) back into the DREGA 2200 as the pins advance downwards along the upper bearing surface. The lifting pins 2216 reach a maximum retracted position at the apex A of the bobbin 2430, and then increasingly begin projecting back inwards into chamber 2212 of DREGA 2200 again as the pins travel downwards along the angled lower bearing surface 2434 (see FIG. 49A). Eventually, the lifting pins 2216 become fully extended beneath the bobbin 2430 immediately above stop flange 2416 on lifting head sleeve 2408. The downward movement of DREGA 2200 simultaneously compresses drive extension spring 2462 as shown in FIG. 49A which allows the positioning of lifting pins 2216 below bobbin 2430 to occur. Note that a portion of magnetic block 2402 has passed through the central opening 2466 and entered spring retainer 2460 to compress the spring 2462.

Figure 50A:
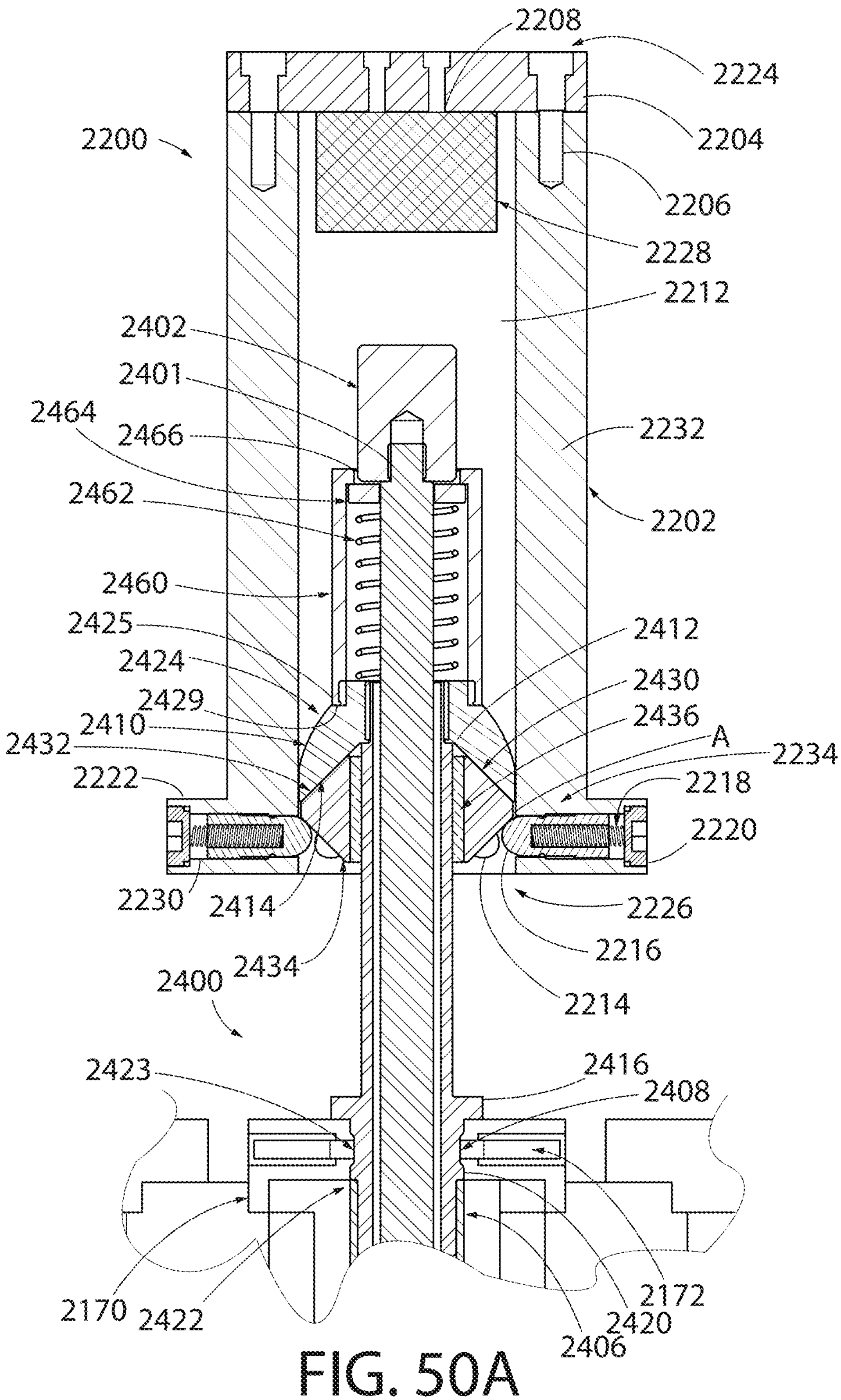
FIGS. 50A-C show sequential steps in a process for uncoupling and dismounting the top end of the drive rod extension from the drive rod extension grapple assembly.
Figure 50B:
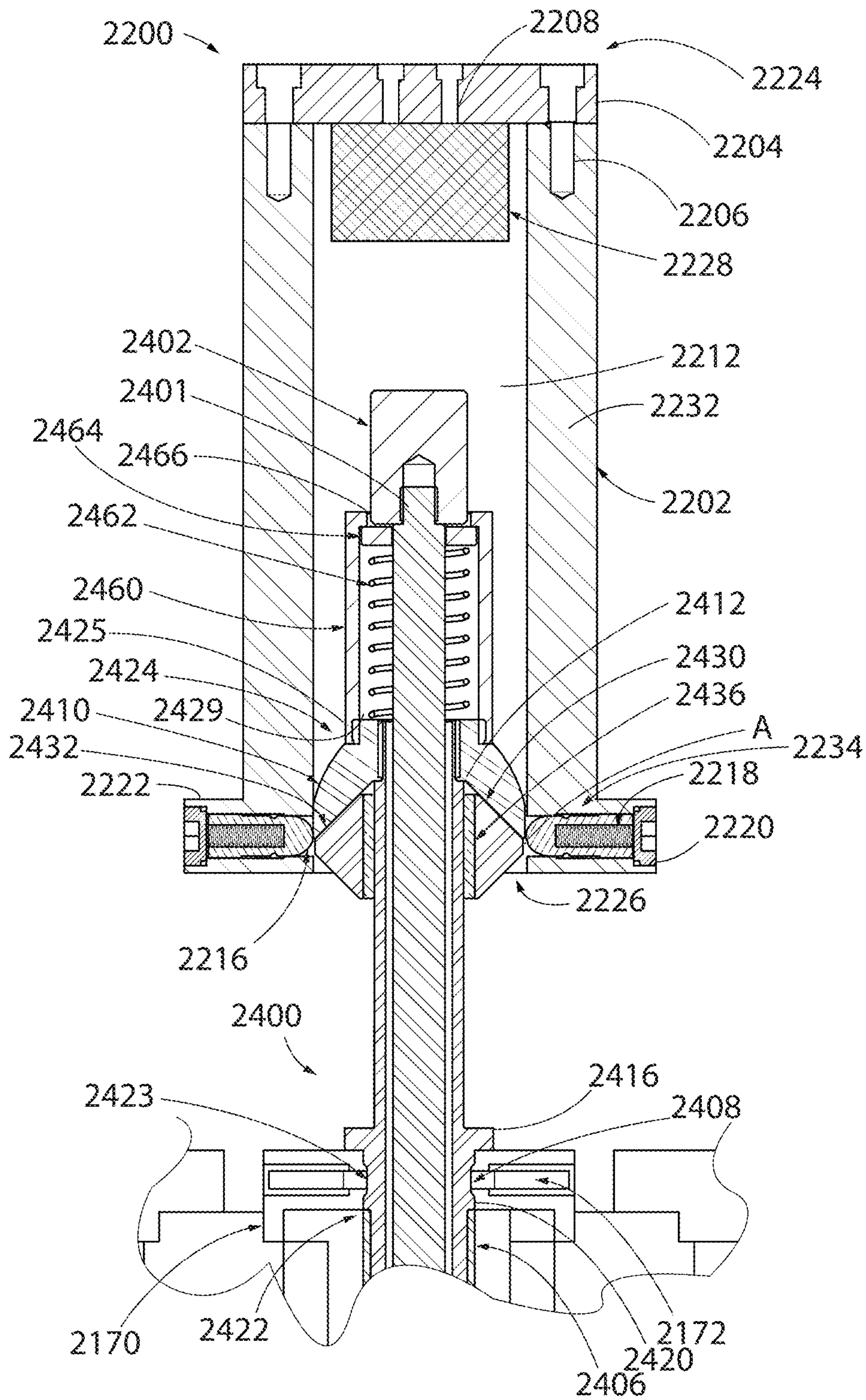
Figure 50C:
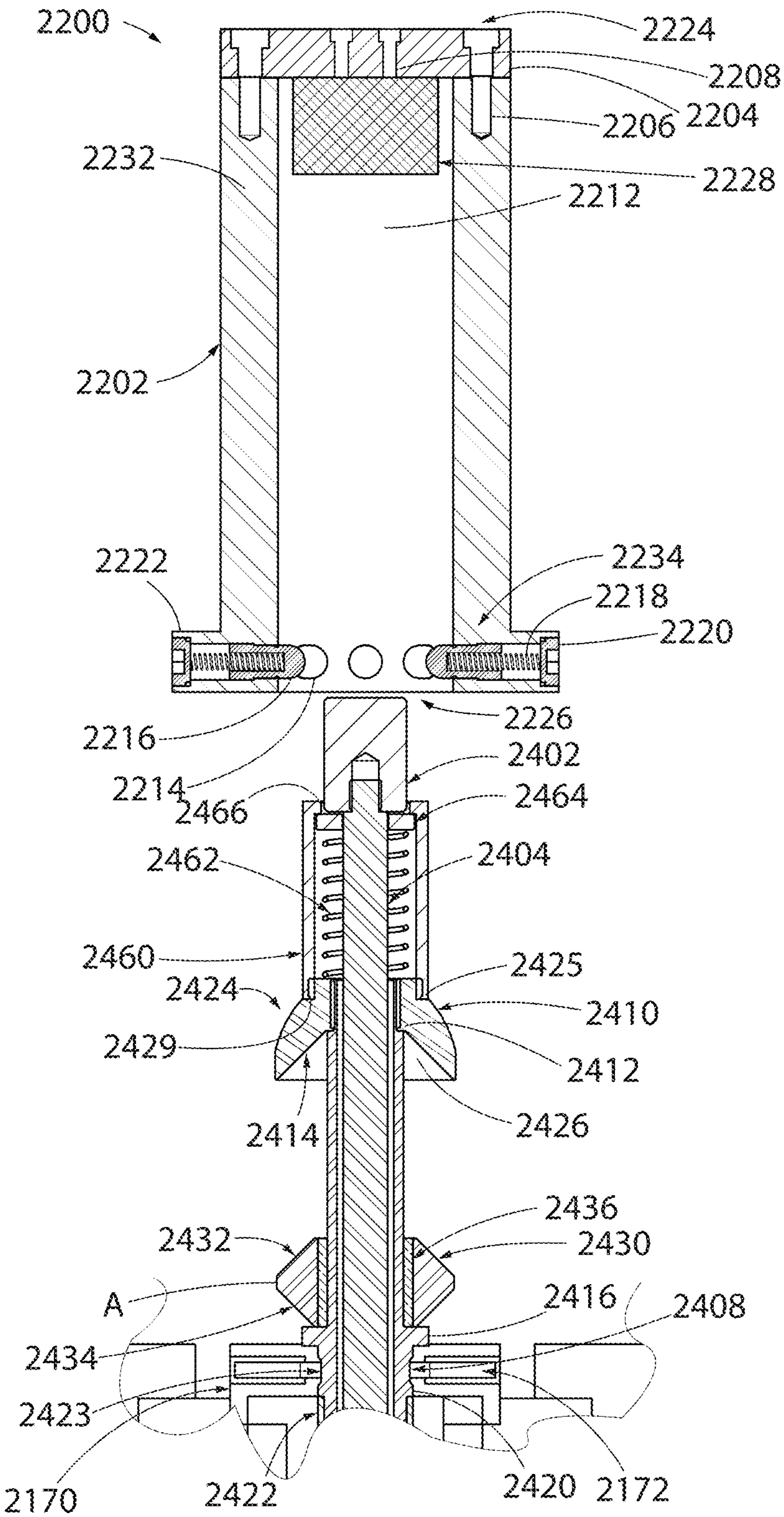
Figure 51:
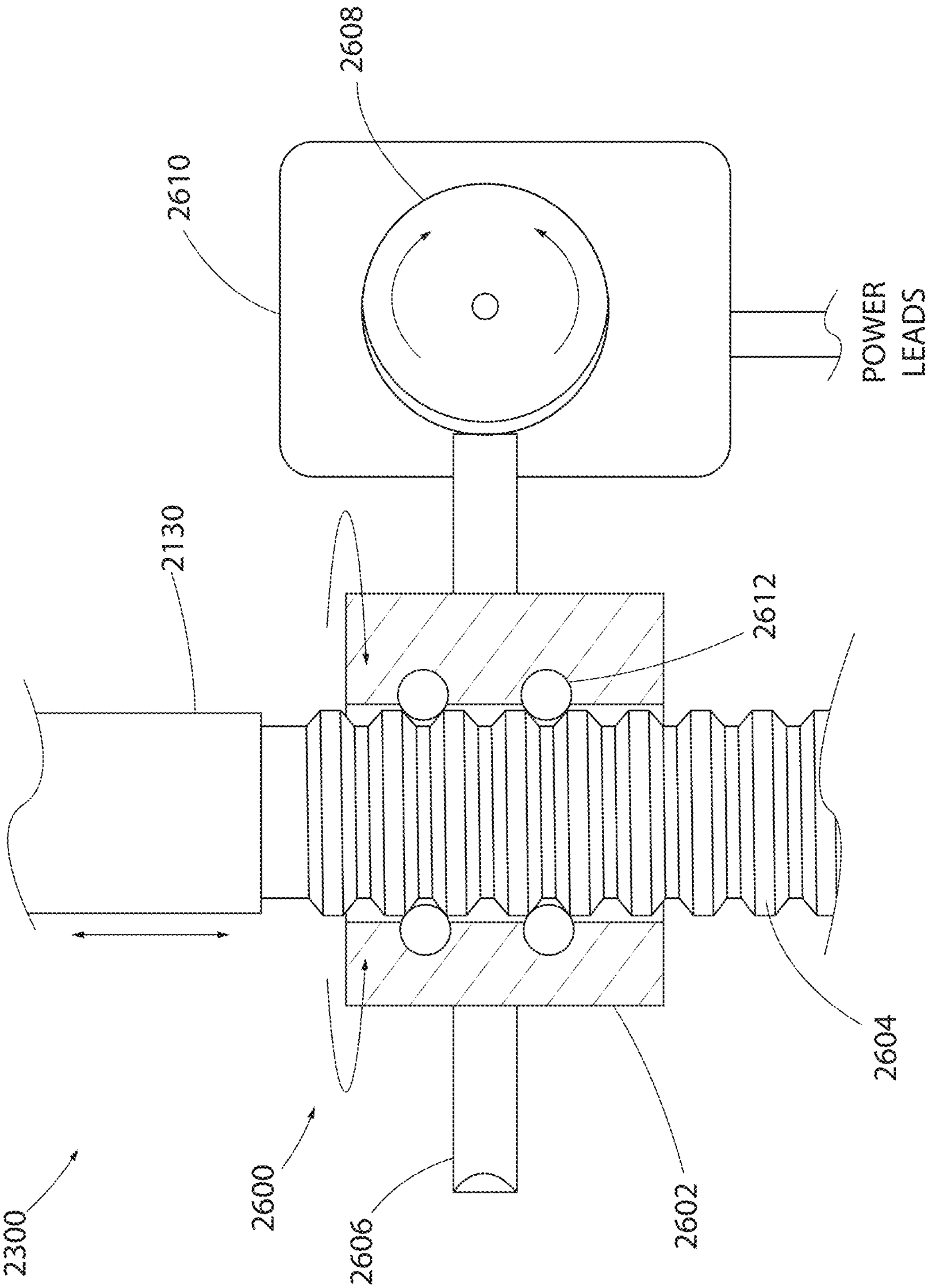
FIG. 51 shows a diagrammatic illustration of an exemplary control rod drive mechanism.

To complete the uncoupling of DREGA 2200 from the DRE 2400, the DREGA is then raised concomitantly lifting the bobbin 2430 with it via the lifting pins 2216 into the lifting head 2410 until the bobbin cannot move any higher, as shown in FIG. 50A. This occurs when the angled upper bearing surface 2432 of bobbin 2430 enters cavity 2426 and engages complementary configured lower bearing surface 2414 of lifting head 2410. The bobbin 2430 is now nested in lifting head 2410. As the DREGA 2200 then continues to be raised, the lifting pins 2216 will again retract outward back into DREGA housing 2222 and ride along the outside of the bobbin (angled lower bearing surface 2434) as shown in FIG. 50B. The lifting pins 2216 then engage and slide along angled upper bearing surface 2424 of lifting head 2410 whereon the pins again increasingly begin projecting back inwards into chamber 2212 of DREGA 2200. Eventually, the lifting pins 2216 become fully extended and are free of the lifting head 2410 as shown in FIG. 50C. The DREGA 2200 is now fully disengaged from the drive rod extension (DRE) 2400 which in turn has disengaged the CRDM 2300 from the DRE.

A control rod drive system according to the present disclosure provides numerous advantages, including the following.

The length of the CRDM drive rod 2130 may be limited to a relatively short length that is easily manufacturable. The shorter length drive rod has the added benefits of ease of maintenance.

There is no risk of the drive rod being damaged during a SCRAM because the drive rod does not fall in a SCRAM event for full insertion of control rods into the fuel core to suppress the nuclear reaction as in prior known designs. In embodiments of the present invention, the control rod assembly (RCCA) 2500 holding the control rods is released by uncoupling the RCCA from the drive rod extension (DRE) 2400 during a SCRAM. Furthermore, because the drive rod does not fall during a SCRAM, the top nozzle of the fuel assembly is not at risk for being damaged during a SCRAM.

The complex electromechanical components in the CRDM system 2100 are not subject to the harsh environment inside of the reactor vessel because the CRDM 2300 is mounted external to the reactor vessel.

The redundant rod ejection protection device (REPD) 2140 eliminates the potential for the drive rod 2130 to be ejected from the reactor vessel due to a CRDM housing failure.

A final advantage is that the CRDS 2100 may be designed so that so that the CRDS will always SCRAM under gravity if the power to the CRDM 2300 is cut via magnetically uncoupling the DREGA 2200 from the DRE 2400, as described above.

Unless otherwise specified, the components described herein may generally be formed of a suitable material appropriate for the intended application and service conditions. A suitable metal is generally preferred for the components described herein with exception of the magnetic components. Components exposed to a corrosive or wetted environment may be made of a corrosion resistant metal (e.g. stainless steel, galvanized steel, aluminum, etc.) or coated for corrosion protection.

Inventive Concept #3

Reference is made generally to FIGS. 52-62 which are relevant to Inventive Concept #3 described below.

Figure 52:
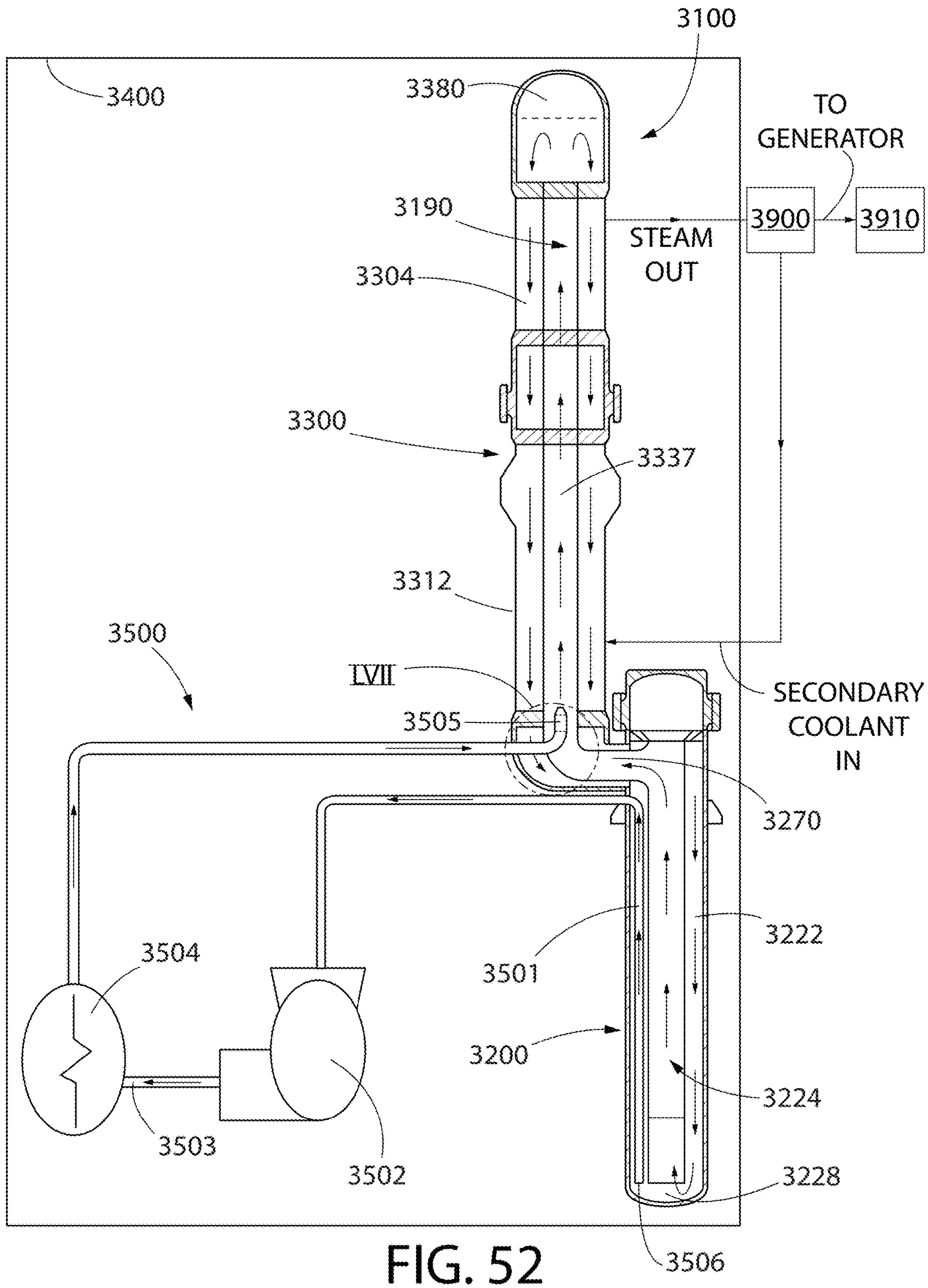
FIG. 52 is front view of a nuclear steam supply system including a reactor vessel, a steam generating vessel and a start-up sub-system in accordance with an embodiment of the present invention.

Referring first to FIG. 52, a nuclear steam supply system 3100 is illustrated in accordance with an embodiment of the present invention. Although described herein as being a nuclear steam supply system, in certain embodiments the system may be generally referred to herein as a steam supply system. The inventive nuclear steam supply system 3100 is typically used in a nuclear pressurized water reactor and generally comprises a reactor vessel 3200, a steam generating vessel 3300 and a start-up sub-system 3500. Of course, the nuclear steam supply system 3100 can have uses other than for nuclear pressurized water reactors as can be appreciated.

During normal operation of the nuclear steam supply system 3100, a primary coolant flows through a primary coolant loop 3190 within the reactor vessel 3200 and the steam generating vessel 3300. This primary coolant loop 3190 is depicted with arrows in FIG. 52. Specifically, the primary coolant flows upwardly through a riser column 3224 in the reactor vessel 3200, from the reactor vessel 3200 to the steam generating vessel 3300 through a fluid coupling 3270, upwardly through a riser pipe 3337 in the steam generating vessel 3300 to a top of the steam generating vessel 3300 (i.e., to a pressurizer 3380), and then downwardly through tubes 3332 (see FIGS. 54 and 55) in a tube side 3304 of the steam generating vessel 3300, from the steam generating vessel 3300 to the reactor vessel 3200 through the fluid coupling 3270, downwardly through a downcomer 3222 of the reactor vessel 3200, and then back from the downcomer 3222 of the reactor vessel 3200 to the riser column 3224 of the reactor vessel 3200. The primary coolant continues to flow along this primary coolant loop 3190 as desired without the use of any pumps during normal operation of the nuclear steam supply system 3100.

It should be appreciated that in certain embodiments the primary coolant loop 3190 is filled or partially filled with the primary coolant when the nuclear steam supply system 3100 is shut down and not operating. By filled it may mean that the entire primary coolant loop 3190 is completely filled with the primary coolant, or that the primary coolant loop 3190 is almost entirely filled with the primary coolant with some room for air which leaves space for the addition of more primary coolant if desired or the expansion of the primary coolant as it heats up during the start-up procedures discussed below. In certain embodiments, before start-up the primary coolant is static in the primary coolant loop 3190 in that there is no flow of the primary coolant along the primary coolant loop. However, during a start-up procedure utilizing the start-up sub-system 3500 discussed in detail below, the primary coolant is heated and caused to flow through the primary coolant loop 3190 and eventually is able to flow through the primary coolant loop 3190 passively and unaided by any pumps due to the physics concept of thermosiphon flow.

Before nuclear fuel within the reactor core engages in a fission chain reaction to produce heat, a start-up process using the start-up sub-system 3500 takes place to heat the primary coolant to a no-load operating temperature, as discussed in more detail below. During normal operation of the nuclear steam supply system 3100, the primary coolant has an extremely high temperature due to its flowing through the reactor core. Specifically, nuclear fuel in the reactor vessel 3200 engages in the fission chain reaction, which produces heat and heats the primary coolant as the primary coolant flows through the reactor core of the reactor vessel 3200. This heated primary coolant is used to phase-change a secondary coolant from a liquid into steam as discussed below.

While the primary coolant is flowing through the primary coolant loop 3190 during normal operation, the secondary coolant is flowing through a second coolant loop. Specifically, the secondary coolant is introduced into the shell side 3305 (FIGS. 54 and 55) of the steam generating vessel 3300 at the secondary coolant in location indicated in FIG. 52. The secondary coolant then flows through the shell side 3305 (FIGS. 54 and 55) of the steam generating vessel 3300 where it is heated by heat transfer from the primary coolant. The secondary coolant is converted into steam due to the heat transfer, and the steam flows from the steam generating vessel 3300 to a turbine 3900 as indicated in FIG. 52. The turbine 3900 drives an electric generator 3910 which is connected to the electrical grid for power distribution. The steam then travels from the turbine 3900 to a condenser (not illustrated) whereby the steam is cooled down and condensed to form condensate. Thus, the condenser converts the steam back to a liquid condensate (i.e., the secondary coolant) so that it can be pumped back into the steam generator 3300 at the secondary coolant inlet location and repeat its flow through the flow path discussed above and be converted back to steam.

In certain embodiments both the primary coolant and the secondary coolant may be water, such as demineralized water. However, the invention is not to be so limited and other liquids or fluids can be used in certain other embodiments, the invention not being limited to the material of the primary and secondary coolants unless so claimed.

The primary coolant continues to flow through the primary coolant loop and the secondary coolant continues to flow in the second coolant loop during normal operation of the nuclear steam supply system 3100. The general provision and operation of the gravity-driven nuclear steam supply system 3100 and details of the associated components is described in detail in International Application No. PCT/US13/38289, filed on Apr. 25, 2013, the entirety of which is incorporated herein by reference.

Referring to FIGS. 52-55, the general details of the components and the operation of the nuclear steam supply system 3100, and specifically of the reactor vessel 3200 and the steam generating vessel 3300, will be described. In the exemplified embodiment, the reactor vessel 3200 and the steam generating vessel 3300 are vertically elongated and separate components which hydraulically are closely coupled, but are discrete vessels in themselves that are thermally isolated except for the exchange of primary coolant (i.e. reactor coolant) flowing between the vessels in the fluid coupling 3270 of the primary coolant loop 3190 as discussed above. In one non-limiting embodiment, each of the reactor vessel 3200 and the steam generating vessel 3300 may be made of a corrosion resistant metal such as stainless steel, although other materials of construction are possible.

Figure 53:
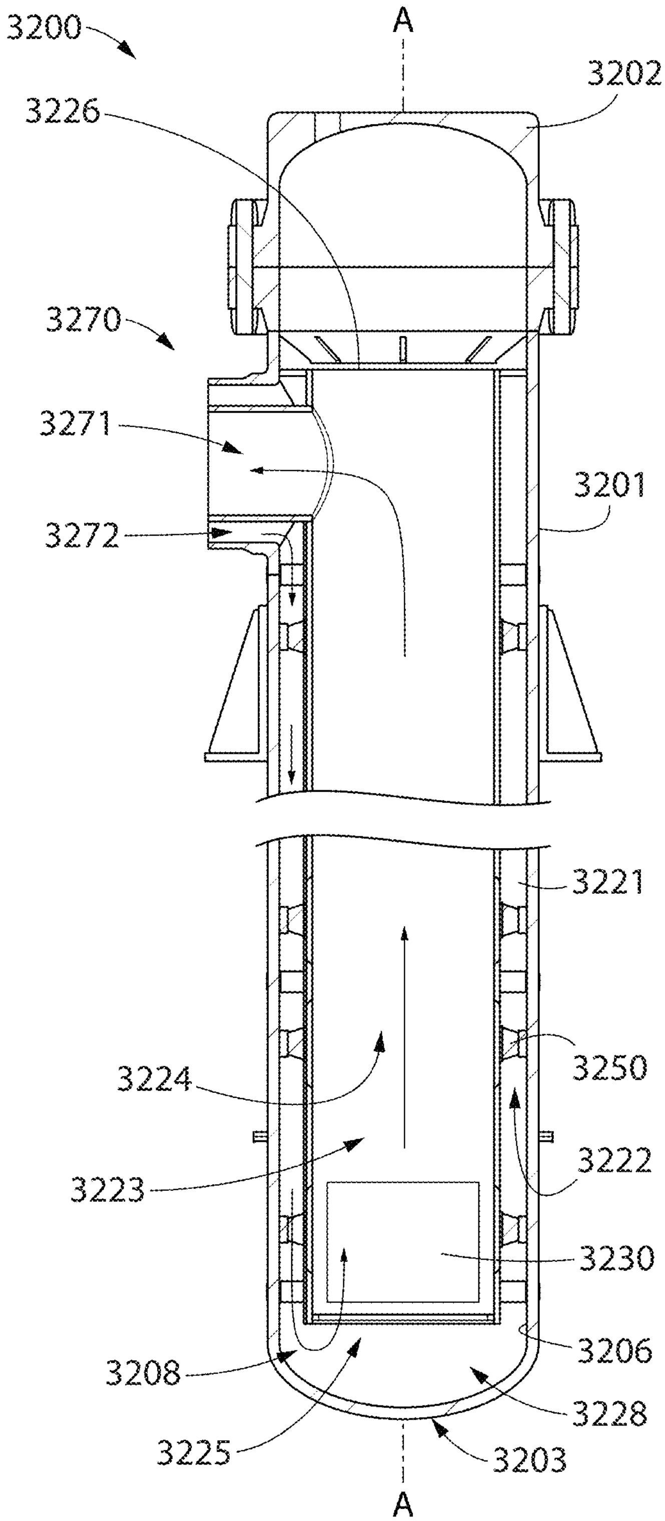
FIG. 53 is an elevation cross-sectional view of the reactor vessel of FIG. 52.

Referring to FIGS. 52 and 53 concurrently, the reactor vessel 3200 will be further described. The reactor vessel 3200 in one non-limiting embodiment is an ASME code Section III, Class 1 thick-walled cylindrical pressure vessel comprised of a cylindrical sidewall shell 3201 with an integrally welded hemispherical bottom head 3203 and a removable hemispherical top head 3202. The shell 3201 defines an internal cavity 3208 configured for holding the reactor core which comprises the nuclear fuel. Specifically, the reactor vessel 3200 includes a cylindrical reactor shroud 3220 which contains the reactor core defined by a fuel cartridge 3230 (i.e., nuclear fuel). The reactor shroud 3220 transversely divides the shell portion of the reactor vessel into two concentrically arranged spaces: (1) an outer annulus 3221 defining the annular downcomer 3222 for primary coolant entering the reactor vessel which is formed between the outer surface of the reactor shroud 3220 and an inner surface 3206 of the shell 3201; and (2) a passageway 3223 defining the riser column 3224 for the primary coolant leaving the reactor vessel 3200 heated by fission in the reactor core.

The reactor shroud 3220 is elongated and extends in an axial direction along a vertical axis A-A of the reactor vessel 3200. The reactor shroud 3220 includes an open bottom end 3225 and a closed top end 3226. In one embodiment, the open bottom end 3225 of the reactor shroud 3220 is vertically spaced apart by a distance from the bottom head 3203 of the reactor vessel 3200 thereby forming a bottom flow plenum 3228 between the bottom end 3225 of the reactor shroud 3220 and the bottom head 3203 of the reactor vessel 3200. As will be discussed in more detail below, during flow of the primary coolant through the primary coolant loop 3190, the bottom flow plenum 3228 collects the primary coolant from the annular downcomer 3222 and directs the primary coolant flow into the inlet of the riser column 3224 formed by the open bottom end 3225 of the reactor shroud 3220.

In certain embodiments, the reactor shroud 3220 is a double-walled cylinder which may be made of a corrosion resistant material, such as without limitation stainless steel. This double-wall construction of the reactor shroud 3220 forms an insulated structure designed to retard the flow of heat across it and forms a smooth vertical riser column 3224 for upward flow of the primary coolant heated by the fission in the fuel cartridge 3230 ("core"), which is preferably located at the bottom extremity of the shroud 3220 in one embodiment as shown in FIG. 53. The vertical space above the fuel cartridge 3230 in the reactor shroud 3220 may also contain interconnected control rod segments along with a set of "non-segmental baffles" that serve to protect them from flow induced vibration during reactor operations. The reactor shroud 3220 is laterally supported by the reactor vessel by support members 3250 to prevent damage from mechanical vibrations that may induce failure from metal fatigue.

In certain embodiments, the fuel cartridge 3230 is a unitary autonomous structure containing upright fuel assemblies, and is situated in a region of the reactor vessel 3200 that is spaced above the bottom head 3203 so that a relatively deep plenum of water lies underneath the fuel cartridge 3230. The fuel cartridge 3230 is insulated by the reactor shroud 3220 so that a majority of the heat generated by the fission reaction in the nuclear fuel core is used in heating the primary coolant flowing through the fuel cartridge 3230 and adjoining upper portions of the riser column 3224. In certain embodiments, the fuel cartridge 3230 is an open cylindrical structure including cylindrically shaped sidewalls, an open top, and an open bottom to allow the primary coolant to flow upward completely through the cartridge (see directional flow arrows, described in detail above with specific reference to FIG. 52). In one embodiment, the sidewalls of the fuel cartridge 3230 may be formed by multiple arcuate segments of reflectors which are joined together by suitable means. The open interior of the fuel cartridge 3230 may be filled with a support grid for holding the nuclear fuel rods and for insertion of control rods into the core to control the fission reaction as needed.

In the interconnecting space between the reactor vessel 3200 and the steam generating vessel 3300 there is a fluid coupling 3270 that comprises an inner flow path 3271 and an outer flow path 3272 that concentrically surrounds the inner flow path 3271. As will be discussed in more detail below, during flow of the primary coolant the primary coolant flows upwardly within the riser column 3224 and through the inner flow path 3271 of the fluid coupling 3270 to flow from the reactor vessel 3200 to the steam generating vessel 3300. After the primary coolant gets to the top of the steam generating vessel 3300, the primary coolant begins a downward flow through the steam generating vessel 3300 and then flows through the outer flow path 3272 from the steam generating vessel 3300 and into the downcomer 3222 of the reactor vessel 3200. Again, this flow path will be described in more detail below.

Figure 54:
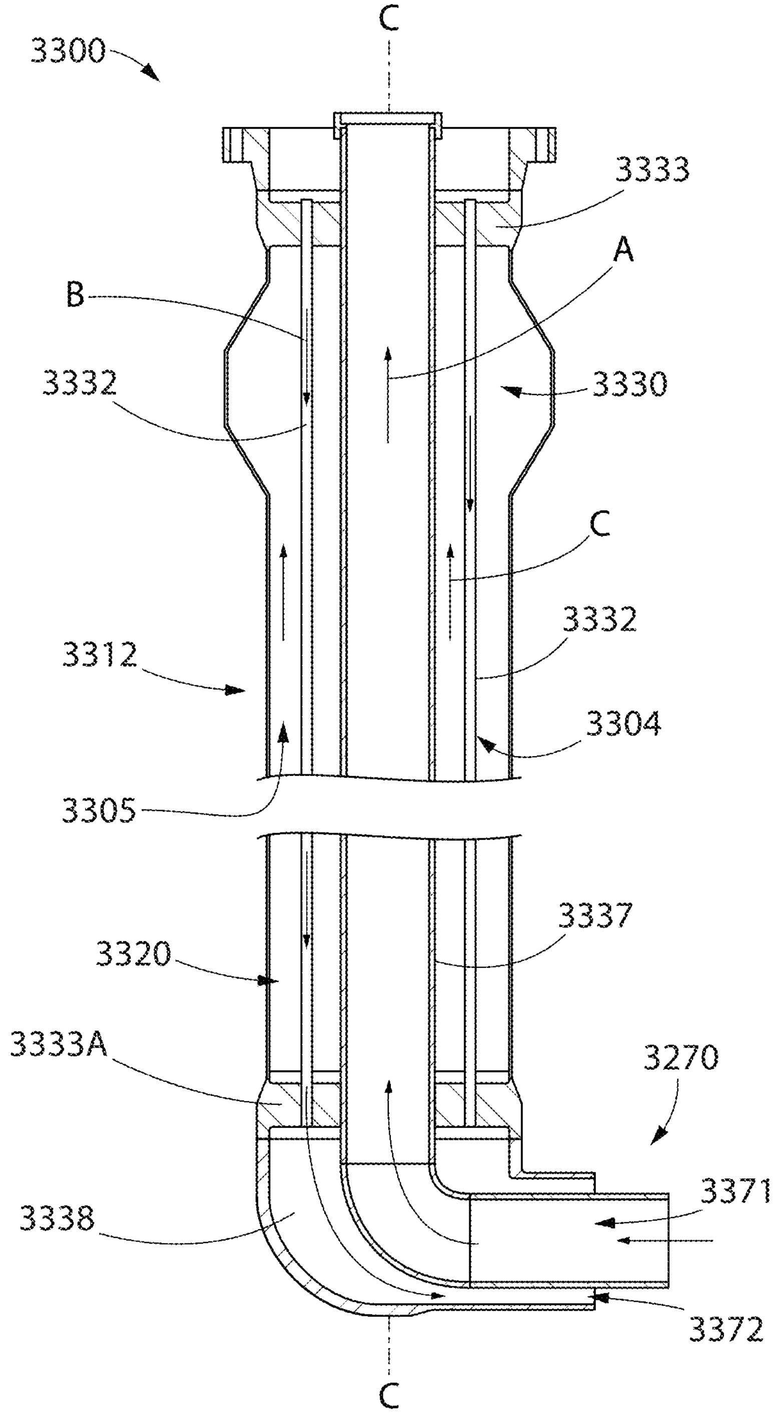
FIG. 54 is an elevation cross-sectional view of the bottom portion of the steam generating vessel of FIG. 52.
Figure 55:
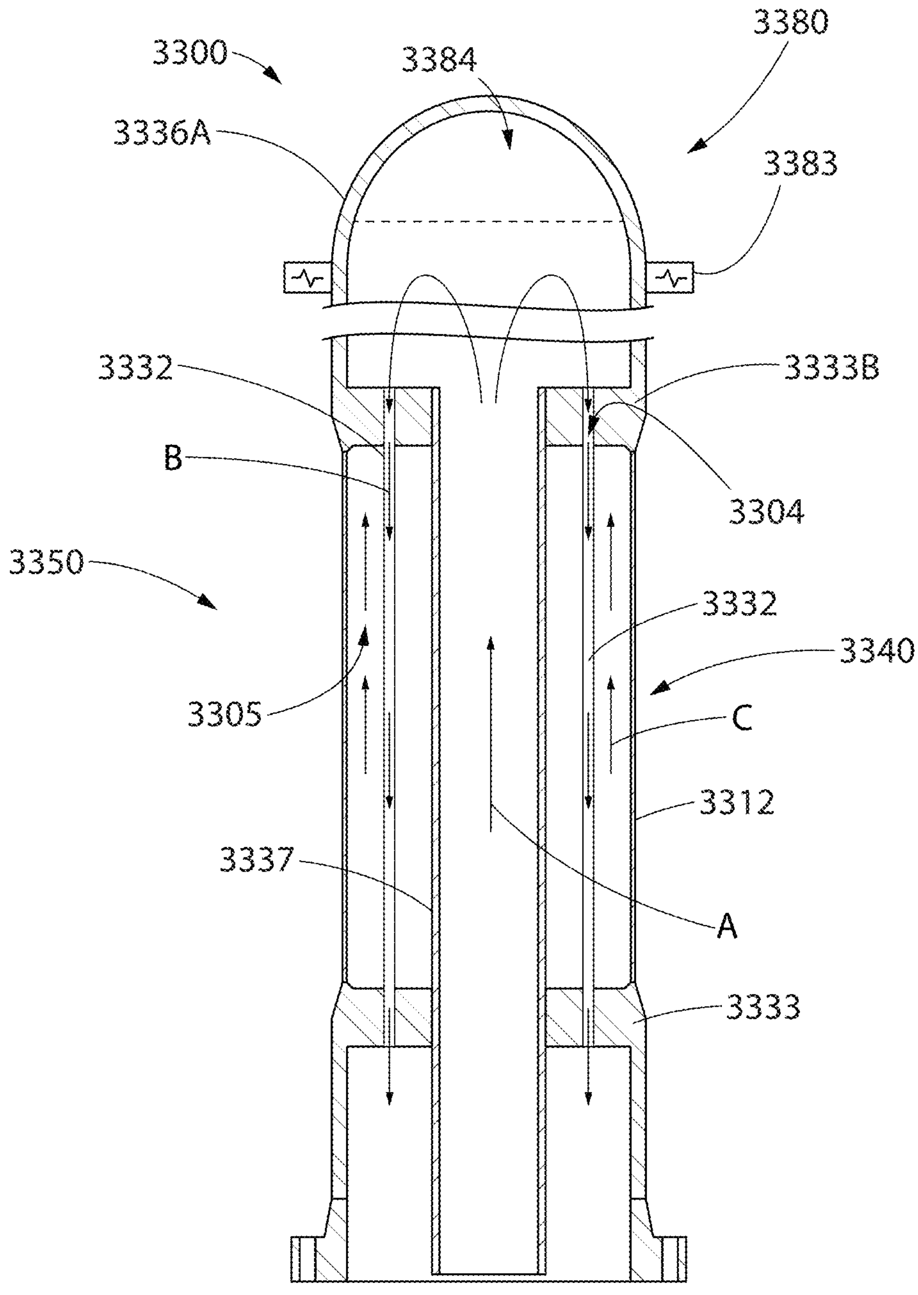
FIG. 55 is an elevation cross-sectional view of the top portion of the steam generating vessel of FIG. 52.

Turning now to FIGS. 52, 54 and 55 concurrently, the details of the steam generating vessel 3300 will be described in more detail. In certain embodiments, the steam generating vessel 3300 includes a preheater section 3320, a steam generator section 3330, a superheater section 3340 and a pressurizer 3380. However, the invention is not to be so limited and one or more of the sections of the steam generating vessel 3300 may be omitted in certain other embodiments. Specifically, in certain embodiments the preheater section 3320 may be omitted, or may itself be considered a part of the steam generator section 3330. A steam bypass loop 3303 may be provided (see, e.g. FIG. 60) to route saturated steam from the steam generator section 3330 to the superheater section 3340 around the intermediate tubesheet structure as shown. As discussed above, it is within the steam generator vessel 3300 that the secondary coolant that is flowing through the shell side 3305 of the steam generator vessel 3300 is converted from a liquid (i.e., secondary coolant inlet illustrated in FIG. 52) to a superheated steam that is sent to the turbine 3900 (FIG. 52) for electricity generation via generator 3910. The secondary coolant flows in the second coolant loop through the shell side of the steam generating vessel 3300, out to the turbine 3900, from the turbine 3900 to a condenser, and then back into the shell side of the steam generating vessel 3300.

In the exemplified embodiment, each of the preheater 3320, the steam generator 3330, and the superheater 3350 are tubular heat exchangers having a tube side 3304 and a shell side 3305. The tube side 3304 of the tubular heat exchangers include a tube bundle comprising a plurality of parallel straight tubes 3332 and tubesheets 3333 disposed at the extremities or ends of each tube bundle that support the tubes. In the exemplified embodiment, only two tubes 3332 are illustrated to avoid clutter. However, in actual use tens, hundreds or thousands of tubes 3332 can be positioned within each of the sections of the steam generating vessel 3300. In certain embodiments, a bottom-most one of the tubesheets 3333A is located in the preheater section 3320 or in the steam generator section 3330. This bottom-most tubesheet 3333A will be discussed in more detail below with regard to a location of injection from the start-up sub-system 3500 in one exemplified embodiment.

As noted above, in one embodiment the preheater section 3320 can be considered as a part of the steam generator section 3330. In such embodiments the steam generator section 3330 and the superheater section 3350 can be considered as stacked heat exchangers such that the superheater section 3350 is disposed above the steam generator section 3330. In certain embodiments, the preheater section 3320, steam generator section 3330, and superheater section 3350 are positioned to form a parallel counter-flow type heat exchanger arrangement in which the secondary coolant (Rankine cycle) flows in an opposite, but parallel direction to the primary coolant (see FIGS. 54 and 55). Specifically, the arrows labeled A indicate the flow direction of the primary coolant through the riser pipe 3337 that is positioned within the steam generating vessel 3300, the arrows labeled B indicate the flow direction of the primary coolant through the tubes 3332 of the steam generating vessel 3300, and the arrows labeled C indicate the flow direction of the secondary coolant through the shell side 3305 of the steam generating vessel 3300. The trio of the foregoing tubular heat exchangers (i.e. preheater, steam generator, and superheater) are hydraulically connected in series on both the tube side 3304 (primary coolant) and the shell side 3305 (the secondary coolant forming the working fluid of the Rankine Cycle which changes phase from liquid to superheated gas).

In the exemplified embodiment, the steam generating vessel 3300 includes a top 3310, a bottom 3311, an axially extending cylindrical shell 3312, and the internal riser pipe 3337 which is concentrically aligned with the shell 3312 and in the exemplified embodiment lies on a centerline C-C of the steam generating vessel 3300. The tubes 3332 are circumferentially arranged around the outside of the riser pipe 3337 between the riser pipe 3337 and the shell 3312 in sections of the steam generating vessel 3300 which include the preheater 3320, the steam generator 3330, and the superheater 3350. In one embodiment, the riser pipe 3337 extends completely through all of the tubesheets 3333 associated with the preheater 3320, the steam generator 3330, and the superheater 3350 from the top of the steam generating vessel 3300 to the bottom to form a part of the continuous primary coolant loop 3190 between the reactor vessel 3200 and the steam generating vessel 3300 all the way to the pressurizer 3380.

The fluid coupling 3270 includes an inner flowpath 3371 and an outer flowpath 3372 on the steam generating vessel 3300 side of the fluid coupling 3270. The inner flowpath 3371 is fluidly coupled to the inner flow path 3271 and the outer flowpath 3372 is fluidly coupled to the outer flowpath 3272. Thus, via these operable couplings the steam generating vessel 3300 is fluidly coupled to the reactor vessel 3200 to complete the primary coolant loop 3190 for flow of the primary coolant through both the reactor vessel 3200 and the steam generating vessel 3300. An annular space is formed between the riser pipe 3337 and the shell 3312, which forms a bottom plenum 3338. The bottom plenum 3338 collects and channels the primary coolant from the steam generating vessel 3300 back to the reactor vessel 3200 via the outer flow paths 3272, 3372. Thus, in the exemplified embodiment the primary coolant flows from the reactor vessel 3200 to the steam generating vessel 3300 through the inner flow paths 3271, 3371 and the primary coolant flows from the steam generating vessel 3300 to the reactor vessel 3200 through the outer flow paths 3272, 3372. However, the invention is not to be so limited and in other embodiments the use of the flow paths 3271, 3272, 3371, 3372 can be reversed The superheater 3350 is topped by a pressurizer 3380 as shown in FIGS. 52 and 55, which is in fluid communication with both the top or outlet of the riser pipe 3337 and the inlet to the tubes 3332 of the superheater 3350. In one embodiment, the pressurizer 3380 is mounted directly to the shell 3312 of the steam generating vessel 3300 and forms a top head 3336*a* on the shell. In one embodiment, the pressurizer has a domed or hemispherical head and may be welded to the shell 3312, or alternatively bolted in other possible embodiments. The pressurizer 3380 forms an upper plenum which collects reactor primary coolant rising through riser pipe 3337 and distributes the primary coolant from the riser pipe 3337 to the superheater tubes 3332. In certain embodiments, the pressurizer 3380 includes a heating/quenching element 38. (i.e. water/steam) for pressure control of the reactor primary coolant.

Shown schematically in FIG. 55, the heating/quenching element 3383 is comprised of a bank of electric heaters which are installed in the pressurizer section that serve to increase the pressure by boiling some of the primary coolant and creating a steam bubble that resides at the top of the pressurizer near the head (above the liquid/gas interface 3340 represented by the dashed line). A water spray column 3384 is located near the top head 3336*a* of the pressurizer 3380 which sprays water into the steam bubble thereby condensing the steam and reducing the size of the steam bubble. The increase/decrease in size of the steam bubble serves to increase/decrease the pressure of the primary coolant inside the reactor coolant system. In one exemplary embodiment, a representative primary coolant pressure maintained by the pressurizer 3380 and the heating/quenching element 3383 may be without limitation about 2,250 psi. In alternative embodiments, as noted above, the liquid/gas interface 3340 is formed between an inert gas, such as nitrogen (N2) supplied by supply tanks (not shown) connected to the pressurizer 3380, and the liquid primary coolant.

In one embodiment, the external surfaces of the tubes 3332 may include integral fins to compensate for the reduced heat transfer rates in the gaseous superheated steam media. The superheater tube bundle is protected from erosion (i.e. by tiny water droplets that may remain entrained in the up-flowing steam) by ensuring that the steam flow is counter-flow being parallel along, rather than across, the tubes 3332 in the tube bundle.

Figure 56A:
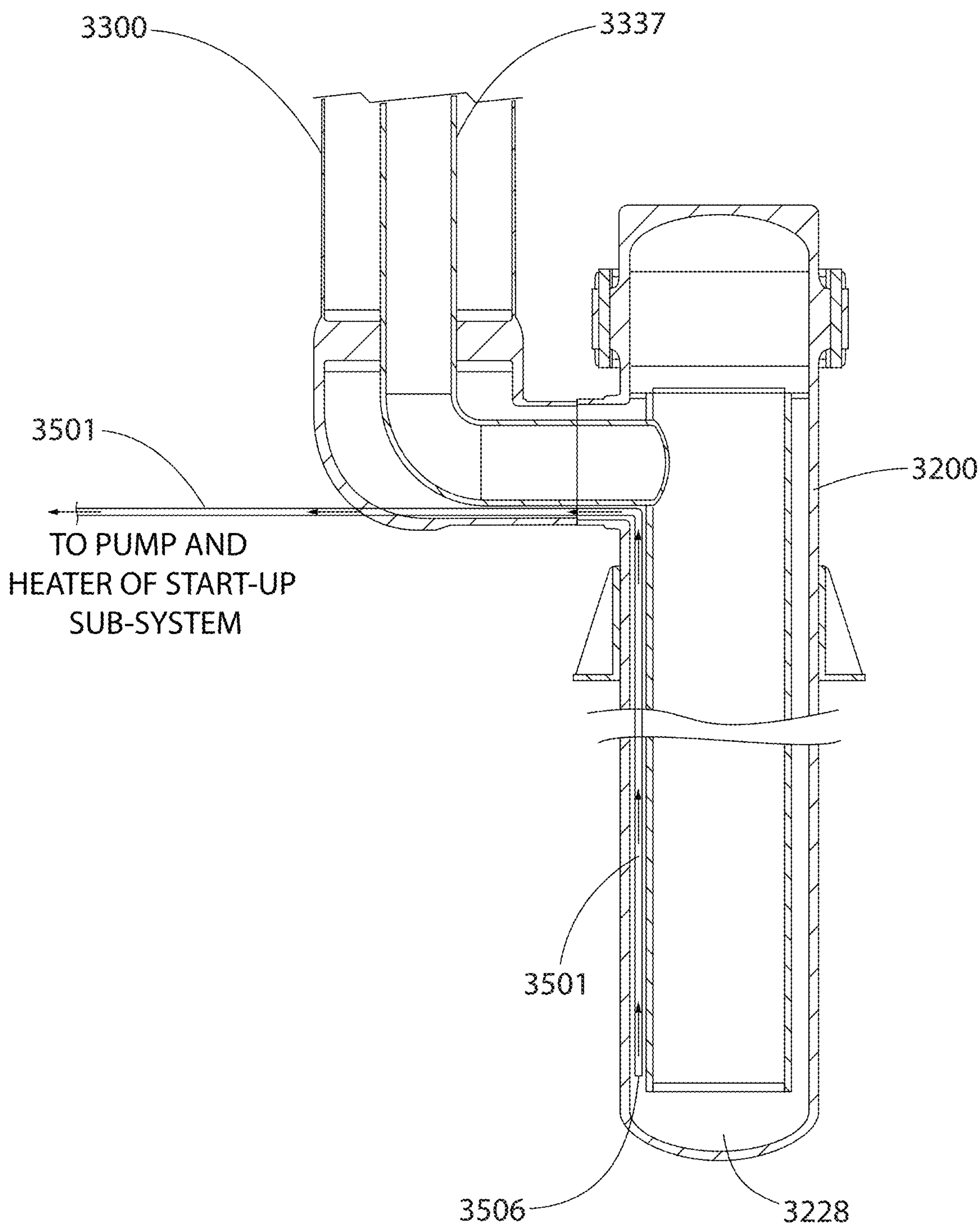
FIG. 56A is a close-up view of the reactor vessel and a portion of the steam generating vessel of FIG. 52 illustrating the location of an intake conduit of the start-up sub-system in accordance with a first embodiment of the present invention.

Referring now to FIGS. 52 and 56A, the start-up sub-system 3500 of the nuclear steam supply system 3100 will be described in accordance with one embodiment of the present invention. In addition to discussing the components of the start-up sub-system 3500 below, the operation of the start-up sub-system 3500 in conjunction with the operation of the nuclear steam supply system 3100 as a whole will be discussed below. Prior to the start-up processes taking place as will be discussed in more detail below, the primary coolant loop 3190 is filled with the primary coolant, but the primary coolant is at ambient temperature and is not flowing through the primary coolant loop 3190. Utilizing the start-up sub-system 3500 of the present invention, the primary coolant is heated, made to flow through the primary coolant loop 3190, and then able to continue passively flowing through the primary coolant loop 3190 without the use of any pumps after disconnecting the start-up sub-system 3500 from the primary coolant loop 3190.

In order to start up the nuclear steam supply system 3100 and begin withdrawing the control rods to initiate a fission chain reaction by the nuclear fuel in the reactor vessel 3200, the primary coolant should be heated to a no load operating temperature, which in certain embodiments can be between 500° F. and 700° F., more specifically between 550° F. and 650° F., and more specifically approximately 600° F. Ensuring that the primary coolant is at the no load operating temperature before normal operation (i.e., before flowing the steam to the turbine and before withdrawing the control rods) is beneficial for several reasons. First, it ensures that the primary coolant has a completely turbulated flow across the fuel core while the control rods are being withdrawn, which avoids localized heating and boiling. Second, it ensures that the reactivity of the water is in the optimal range during start-up and normal operation. Because the nuclear steam supply system 3100 does not utilize any pumps to flow the primary fluid through the primary coolant loop 3190 during normal operation but rather relies on thermosiphon flow as discussed above, conventional means of using frictional heat from the pumps to heat up the primary coolant is unavailable. Thus, the inventive nuclear steam supply system 3100 uses the start-up sub-system 3500 to heat the primary coolant up to the no load operating temperature during start up procedures.

The start-up sub-system 3500 is designed to have a high margin of safety. The start-up sub-system 3500 also ensures a fully turbulent flow across the fuel core in the reactor vessel 3200 and heats the water to no-load operating temperature prior to any withdrawal of the control rods. As discussed in detail above, during start-up of the nuclear steam supply system 3100, the primary coolant is located within the primary coolant loop 3190 in the reactor vessel 3200 and in the steam generating vessel 3300, but it does not flow through the primary coolant loop 3190 initially. While the primary fluid is positioned in the primary coolant loop 3190, the start-up sub-system 3500 draws or receives a portion of the primary coolant from the primary coolant loop 3190, heats up the portion of the primary coolant to form a heated portion of the primary coolant, and injects the heated portion of the primary coolant back into the primary coolant loop 3190. Thus, the start-up sub-system 3500 forms a fluid flow circuit that withdraws some of the primary coolant from the primary coolant loop 3190 and heats the primary coolant prior to re-injecting that portion of the primary coolant into the primary coolant loop 3190.

When the start-up sub-system 3500 injects the heated portion of the primary coolant into the primary coolant loop 3190, this initiates a venturi effect that creates fluid flow of the entire body of the primary coolant within the primary coolant loop 3190. Specifically, the injected heated portion of the primary coolant flows within the primary coolant loop and pulls the initially static primary coolant within the primary coolant loop 3190 with it as it flows, thereby creating an entire turbulent flow of the primary coolant (including the original static primary coolant and the heated portion of the primary coolant) through the primary coolant loop 3190. Furthermore, because the primary coolant injected from the start-up sub-system is heated relative to the temperature of the primary coolant within the primary coolant loop 3190, this injection begins to heat up the primary coolant inventory within the primary coolant loop 3190. When the primary coolant within the primary coolant loop 3190 reaches the no-load operating temperature, the start-up sub-system 3500 can be fluidly disconnected from the reactor vessel 3200 and the steam generating vessel 3300 and flow of the primary coolant through the primary coolant loop 3190 will continue due to thermosiphon properties.

In the exemplified embodiment, the start-up sub-system 3500 comprises an intake conduit 3501, a pump 3502, an injection conduit 3503, a heating element 3504 and a Venturi flow effect injection nozzle 3505 (also alternatively referred to herein as Venturi nozzle 3505). The intake conduit 3501, the pump 3502, the injection conduit 3503 and the injection nozzle 3505 are all fluidly coupled together so that a portion of the primary coolant that is received by the start-up sub-system 3500 will flow through each of the intake conduit 3501, the pump 3502, the injection conduit 3503 and the injection nozzle 3505. The intake conduit 3501 is fluidly coupled to the suction of the pump 3502 and the discharge or injection conduit 3503 is fluidly coupled to the discharge of the pump 3502.

In the exemplified embodiment, the entire nuclear steam supply system 3100 including the reactor vessel 3200, the steam generating vessel 3300 and the start-up sub-system 3500 are housed within a containment vessel 3400. This ensures that in the event of a loss-of-coolant accident during start-up, all of the high energy fluids are contained within the containment boundary of the containment vessel 3400. The details of the containment vessel 3400 can be found in PCT/US13/42070, filed on May 21, 2013, the entirety of which is incorporated herein by reference. Furthermore, the start-up sub-system 3500 is at least partially positioned external to the reactor vessel 3200 and to the steam generating vessel 3300. Specifically, in the exemplified embodiment while the intake conduit 3501 is at least partially positioned within one of the reactor vessel 3200 or the steam generating vessel 3300 to draw a portion of the primary coolant into the start-up sub-system 3500 and the injection nozzle 3505 is at least partially positioned within one of the reactor vessel 3200 or the steam generating vessel 3300 to inject the heated portion of the primary coolant back into one of the reactor vessel 3200 or the steam generating vessel 3300, the pump 3502 and the heating element 3504 are positioned entirety external to the reactor vessel 3200 and to the steam generating vessel 3300.

The portion of the primary coolant that is introduced into the start-up sub-system 3500 flows in a single direction through the start-up sub-system 3500 from the intake conduit 3501 to the injection nozzle 3505. The intake conduit 3501 and the injection conduit 3503 can be a single pipe or conduit or can be multiple pipes or conduits that are fluidly coupled together. In some embodiments, the intake conduit 3501 and the injection conduit 3503 comprise heavy wall pipes that are sized to be between five and seven inches in diameter, and more specifically approximately six inches in diameter. Furthermore, the injection nozzle 3505 has a smaller diameter than the diameter of the intake conduit 3501 and the injection conduit 3503, and can be between two and four inches, or approximately three inches. However, the invention is not to be so limited and the sizing of the intake conduit 3501, the injection conduit 3503 and the injection nozzle 3505 can be greater than or less than the noted ranges in other embodiments.

In the exemplified embodiment, the pump 3502 may be a centrifugal pump designed to pump a sufficiently large flow of the primary coolant to develop turbulent conditions in the reactor core. Specifically, in certain embodiments the pump 3502 can pump approximately 10% of the normal flow through the primary coolant loop 3190 and is able to overcome any pressure differential through the riser pipe 3337. Of course, the invention is not to be so limited and the pump 3502 can be any type of pump and can pump any amount of the primary coolant through the start-up sub-system 3500 as desired or needed for start-up procedures to be successful. In one embodiment, the pump preferably may have a flow capacity of less than 3100% of the normal flow through the primary coolant loop 3190 because flow in the primary coolant system may be a gravity driven as opposed to a pumped coolant flow system and is intended to be used for reactor start-up or shut-down operation only, not during normal reactor operating conditions.

The heating element 3504 can be any mechanism or apparatus that is capable of transferring heat into the portion of the primary coolant that is flowing through the start-up sub-system 3500. The heating element 3504 can be a single heater or a bank of heaters. The heating element can take on any form, including being a resistance wire, molybdenum disilicide, etched foil, a heat lamp, PTC ceramic, a heat exchanger or any other element that can provide heat to a liquid that is flowing through a conduit. In certain embodiments, the heating element 3504 can be powered by electrically powered resistance rods. In other embodiments, the heating element 3504 can be powered by and may be tubular heat exchanger(s) supplied with steam by an auxiliary steam boiler. In this design, heating element 3504 may be a shell and tube heat exchanger having auxiliary steam flowing through the shell side and primary reactor coolant flowing through the tube side of the heat exchanger. Any mechanism can be used as the heating element 3504 so long as the heating element 3504 can transfer heat into the primary coolant in order to heat up the portion of the primary coolant that is flowing through the start-up sub-system 3500.

In the exemplified embodiment, the intake conduit 3501 comprises an inlet 3506 that is located within the primary coolant loop 3190. More specifically, in the embodiment of FIG. 52 the inlet 3506 of the intake conduit 3501 is positioned at a bottom of the reactor vessel 3200. This may include positioning the inlet 3506 of the intake conduit 3501 within the bottom flow plenum 3228 of the reactor vessel 3200. However, the invention is not to be so limited and the bottom of the reactor vessel 3200 may include positioning the inlet 3506 of the intake conduit 3501 adjacent to the bottom end 3225 of the shroud 3220. Furthermore, in other embodiments the inlet 3506 of the intake conduit 3501 can be located in a central vertical region of the reactor vessel 3200 or in a top vertical region of the reactor vessel 3200 or within the steam generating vessel 3300 as discussed in more detail below with reference to 6S. 5A-56C. Positioning the inlet 3506 of the intake conduit 3501 at the bottom of the reactor vessel 3200 ensures that the portion of the primary coolant that is removed from the primary coolant loop and received by the start-up sub-system 3500 is the coolest or coldest primary coolant available in the primary coolant loop. Such positioning of the inlet 3506 of the intake conduit 3501 can reduce start-up time. However, the invention is not to be limited by positioning the inlet 3506 of the intake conduit 3501 at the bottom of the reactor vessel 3200, and other positions are possible as discussed above and again below with regard to FIGS. 56A-56C.

Figure 56B:
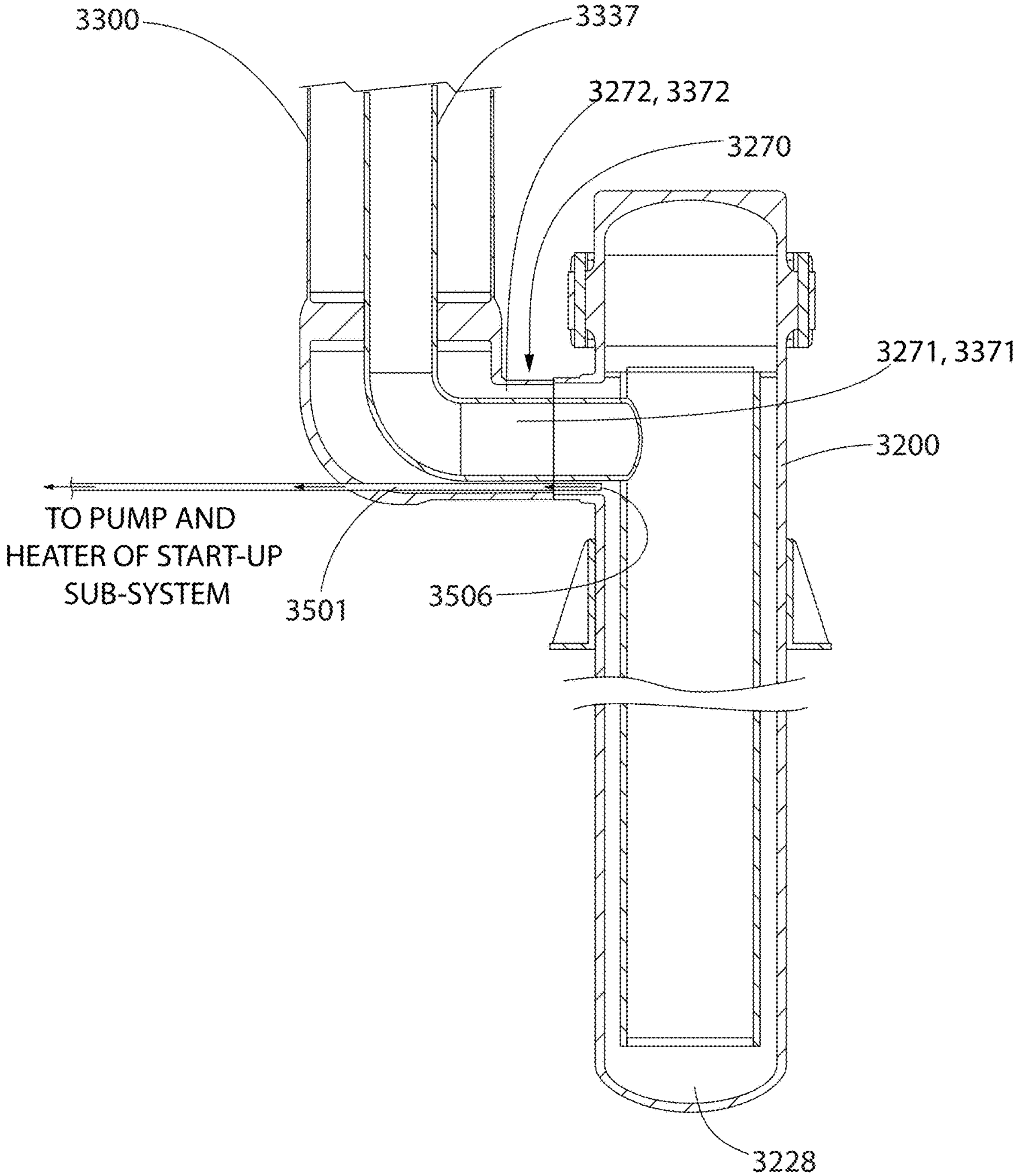
FIG. 56B is the close-up view of FIG. 56A illustrating the location of the intake conduit of the start-up sub-system in accordance with a second embodiment of the present invention.
Figure 56C:
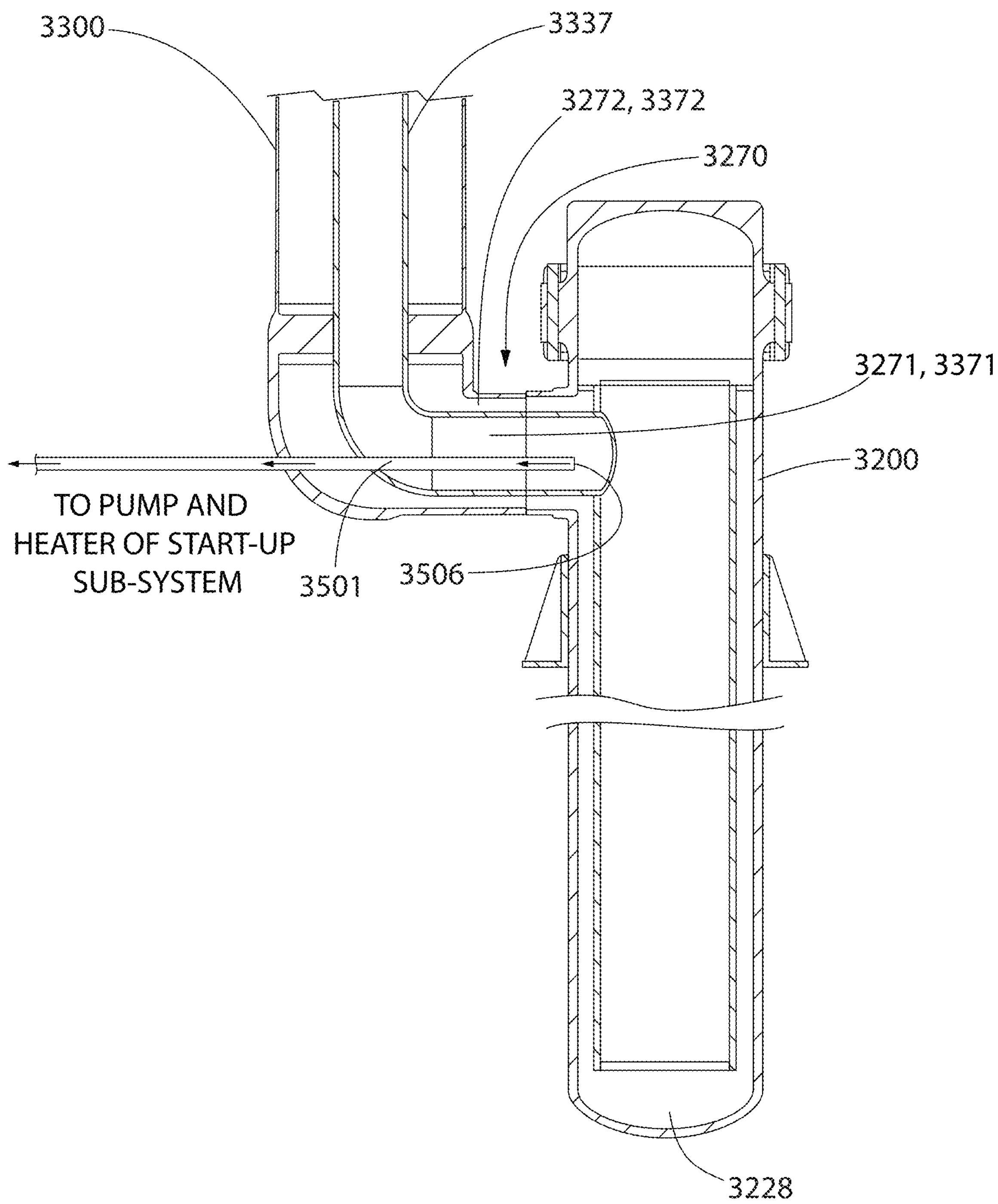
FIG. 56C is the close-up view of FIG. 56A illustrating the location of the intake conduit of the start-up sub-system in accordance with a third embodiment of the present invention.

Specifically, 6S. 5A-56C show different places that the inlet 3506 of the intake conduit 3501 can be positioned in different embodiments. The positioning of the inlet 3506 of the intake conduit 3501 illustrated in FIGS. 56A-56C are merely exemplary and are not intended to be limiting of the present invention. Therefore, it should be understood that the inlet 3506 of the intake conduit 3501 can be located at any other desired location along the primary coolant loop. In FIG. 56A, the inlet 3506 of the intake conduit 3501 is positioned at the bottom of the reactor vessel 3200. In FIG. 56B, the inlet 3506 of the intake conduit 3501 is positioned at the bottom of the steam generating vessel 3300 or within the outer flow path 3272, 3372 of the fluid coupling 3270 between the steam generating vessel 3300 and the reactor vessel 3200. In FIG. 56C, the inlet 3506 of the intake conduit 3501 is positioned within the riser pipe 3337 or within the inner flow path 3271, 3371 of the fluid coupling 3270 between the steam generating vessel 3300 and the reactor vessel 3200. The inlet 3506 of the intake conduit 3501 can also be positioned within the riser pipe 3337 upstream of the fluid coupling 3270 or at any other desired location within the primary coolant loop 3190. Regardless of its exact positioning, the location of the inlet 3506 of the intake conduit 3501 is the location from which the portion of the primary coolant is withdrawn for introduction into the start-up sub-system 3500.

In certain embodiments, the pump 3502 may be fluidly coupled to more than one intake conduit or more than one inlet so that the primary coolant can be drawn from the primary coolant loop 3190 and introduced into the start-up sub-system 3500 from more than one location simultaneously, or so that an operator can determine the location from which the primary coolant can be taken based on desired applications and start-up time requirements. Specifically, there may be multiple intake conduits that are connected to the injection conduit such that there are valves associated within each intake conduit. One of the intake conduits can have an inlet located at a bottom of the reactor vessel 3200 and another one of the intake conduits can have an inlet located at a bottom of the steam generating vessel 3300. Thus, an operator can open one or more of the valves while leaving the other valves closed to determine the location(s) within the primary coolant loop 3190 from which the primary coolant will be drawn for introduction into the start-up sub-system 3500. The multiple intake conduits with their respective isolation or shutoff valves may be fluidly coupled to a common intake piping manifold fluidly connected to the suction of the pump 3502. Such arrangements are well known to those in the art without further elaboration.

Referring back to FIG. 52, regardless of the exact positioning of the inlet 3506 of the intake conduit 3501, a portion of the primary coolant is drawn from the primary coolant loop 3190 into the intake conduit 3501 of the start-up sub-system 3500 when it is desired to start the nuclear steam supply system 3100. More specifically, in the exemplified embodiment the primary coolant is drawn from the primary coolant loop 3190 by the operation of the pump 3502. Specifically, in the exemplified embodiment when the pump 3502 is turned on, the portion of the primary coolant is drawn from the primary coolant loop 3190 and into the start-up sub-system 3500. When the pump is turned off, none of the primary coolant is drawn from the primary coolant loop 3190 and into the start-up sub-system 3500.

Although the use of the pump 3502 for drawing the portion of the primary coolant into the start-up sub-system 3500 is described above, the invention is not to be so limited. In certain other embodiments, the start-up sub-system 3500 may include a shutoff or isolation valve(s) 3501A positioned at some point along the intake conduit 3501. In some embodiments, the start-up sub-system 3500 may also or alternatively include another shutoff or isolation valve(s) 3503A positioned at some point along the injection conduit 3503. The use of valves 3501A, 3503A enables the start-up sub-system to be cut off or isolated from the reactor vessel 3200 and the steam generating vessel 3300 from a fluid flow standpoint. Specifically, by closing the valves the primary coolant will be unable to enter into the start-up sub-system 3500, and the primary coolant loop will form a closed-loop path. One embodiment of the use of valves in the start-up sub system 3500 and the connection/placement of those valves will be described in more detail below with reference to FIG. 58.

Where valves are used, the valves can be alterable and moved between an open state whereby a portion of the primary coolant flows from the primary coolant loop and into the start-up sub-system 3500, and a closed state whereby the primary coolant is prevented from flowing into the start-up sub-system 3500. In some embodiments, both the pump 3502 and one or more valves may be used in conjunction with one another to facilitate and regulate the amount of flow of the portion of the primary coolant bypassed into the start-up sub-system 3500.

Still referring to FIG. 52, when the pump 3502 is operating (and any valves positioned between the reactor vessel 3200 and the start-up sub-system 3500 and between the steam generating vessel 3300 and the start-up sub-system 3500 are open), the portion of the primary coolant flows from the primary coolant loop 3190 and into the intake conduit 3501 through the inlet 3506. In FIG. 52, this portion of the primary coolant is taken from the bottom of the reactor vessel 3200 where the primary coolant is at its coldest. However, as discussed above the primary coolant can be taken from any location along the primary coolant loop 3190, including from within the steam generating vessel 3300 and within the riser pipe 3337. The portion of the primary coolant flows through the intake conduit 3501, passes through the pump 3502 and flows into the injection conduit 3503 whereby the portion of the primary coolant passes through the heating element 3504. As the portion of the primary coolant passes through or by the heating element 3504, the portion of the primary coolant is heated and becomes a heated portion of the primary coolant. The heated portion of the primary coolant then continues to flow along the injection conduit 3503 and into the injection nozzle 3505 where the heated portion of the primary coolant is injected back into the primary coolant loop 3190.

Figure 57:
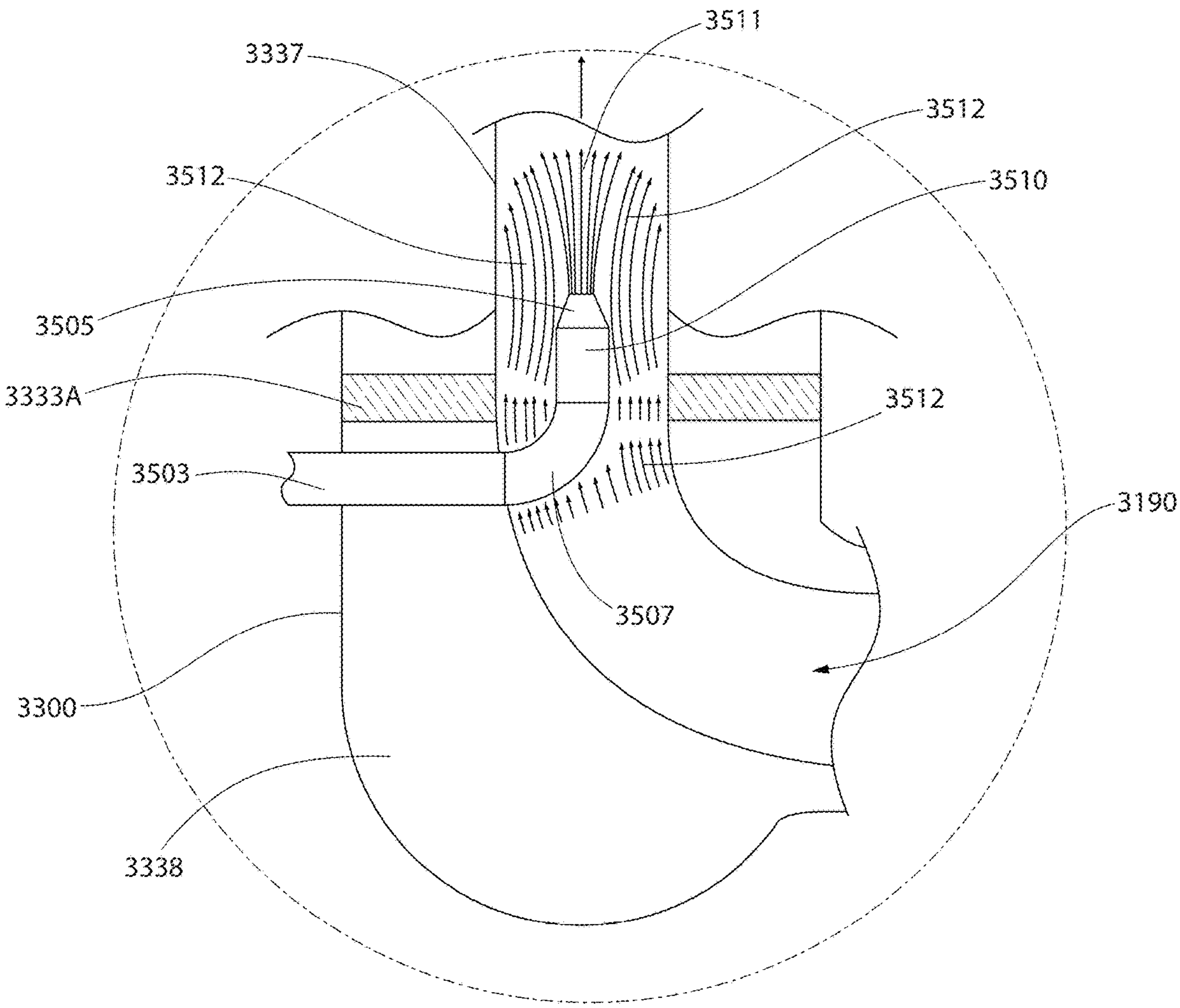
FIG. 57 is a close-up view of area LVII of FIG. 52.

Referring to FIGS. 52 and 57 concurrently, the injection of the heated portion of the primary coolant into the primary coolant loop 3190 will be discussed in more detail. In the exemplified embodiment, the injection nozzle 3505 is positioned within the riser pipe 3337 of the steam generating vessel 3300. Of course, the invention is not to be so limited and the injection nozzle 3505 can be positioned at other locations within either the reactor vessel 3200 or the steam generating vessel 3300 as desired. Specifically, the injection conduit 3505 can be located within the riser column 3224 of the reactor vessel 3200, within the downcomer 3222 of the reactor vessel 3200, within the pressurizer 3380 of the steam generating vessel 3300 or at any other desired location.

In the exemplified embodiment the injection nozzle 3505 is centrally located within the riser pipe 3337 so as to be circumferentially equidistant from the inner surface of the riser pipe 3337. Furthermore, the injection nozzle 3505 faces in an upwards direction so that the heated portion of the primary coolant injected from the injection nozzle 3505 is made to flow in a vertical upward direction. In the exemplified embodiment, the injection conduit 3503 enters into the steam generating vessel 3300 at the bottom-most tubesheet 3333A elevation, and the injection nozzle 3505 is positioned near or at the elevation of the bottom-most tubesheet 3333A. More specifically, the injection conduit 3503 extends horizontally into the riser 3337 just below the bottom-most tubesheet 3333A, an elbow connects the injection conduit 3503 to the injection nozzle 3505, and the injection nozzle 3505 extends vertically from the elbow within the riser pipe 3337. Specifically, the injection nozzle 3505 in one embodiment is located so as to inject the heated portion of the primary coolant just above the bottom-most tubesheet 3333A. Thus, in the exemplified embodiment the injection nozzle 3505 is located at and injects the heated portion of the primary coolant to a location above the bottom plenum 3338 of the steam generating vessel 3300. Of course, the invention is not to be so limited in all embodiments and as discussed above the location at which the heated portion of the primary coolant is injected can be modified as desired.

In the exemplified embodiment, the injection nozzle 3505 of the start-up sub-system 3500 injects a heated portion of the primary coolant (indicated with arrows as 3511) into the riser pipe 3337 in a first vertical direction. At the time of the initial injection of the heated portion of the primary coolant 3511 into the riser pipe 3337, the primary coolant (indicated with arrows as 3512) is positioned in the primary coolant loop 3190 including within the riser pipe 3337 but is static or non-moving. After the start-up sub-system 3500 begins injecting the heated portion of the primary coolant 3511 into the riser pipe 3337 in the first vertical direction, the entire body of the primary coolant 3512 within the primary coolant loop 3190 begins to flow in the first vertical direction due to the venturi effect, as discussed below. In certain embodiments, once the primary coolant 3512 within the primary coolant loop 3190 begins to flow, it flows at a first flow rate. Furthermore, the heated portion of the primary coolant 3511 is injected at a second flow rate, the second flow rate being greater than the first flow rate.

In the exemplified embodiment, the injection of the heated portion of the primary coolant 3511 creates a venturi effect in the closed loop path 3190, and more specifically in the riser pipe 3337. Specifically, introducing a jet of high velocity heated primary coolant 3511 into the riser pipe 3337 creates a venturi effect in the riser pipe 3337 that creates a low pressure in the vicinity of the injection nozzle 3505. This in essence creates what is also referred to in the art as a Venturi or jet pump. This low pressure pulls the primary coolant 3512 from the bottom of the riser pipe 3337 upwardly in the direction of the flow of the heated portion of the primary coolant 3511 to the top of the steam generating vessel 3300 and facilitates the flow of the primary coolant through the primary coolant loop 3190. Thus, the injection of the heated portion of the primary coolant 3511 from the start-up sub-system 3500 initiates start-up of the nuclear steam supply system 3100 by facilitating the flow of the primary coolant 3512 through the primary coolant loop 3190. Specifically, due to the venturi effect the mixture of the heated portion of the primary coolant 3511 and the primary coolant 3512 flows upwardly within the riser pipe 3337, and due to gravity the mixed primary coolant 3511/3512 flows downwardly through the tubes 3332 in the steam generating vessel 3300 and downwardly through the downcomer 3222 in the reactor vessel 3200 due to thermosiphon flow. When the heated portion of the primary coolant 3511 mixes with the primary coolant 3512 in the riser pipe 3337, this heated mixture expands and becomes less dense and more buoyant than the cooler primary coolant below it in the primary coolant loop. Convection moves this heated liquid upwards in the primary coolant loop as it is simultaneously replaced by cooler liquid returning by gravity.

Once the primary coolant gets heated up to the no-load operating temperature, the flow of the primary coolant in the primary coolant loop 3190 is continuous without the use of an external pump. The start-up sub-system 3500 and the pump 3502 associated therewith merely operate to heat up the temperature of the primary coolant and to begin the flow of the primary coolant in the primary coolant loop 3190 and to heat up the primary coolant in the primary coolant loop 3190. However, the start-up sub-system 3500 can be disconnected from the primary coolant loop 3190 once no-load operating temperature of the primary coolant is reached and thermosiphon flow of the primary coolant in the primary coolant loop is achieved.

As discussed above, as the primary coolant in the primary coolant loop 3190 heats up, the primary coolant expands. Thus, in certain embodiments the system 3100 may be fluidly coupled to a chemical and volume control system which can remove the additional volume of the primary coolant as needed. Furthermore, such a chemical and volume control system can also remove dissolved gases in the primary coolant. Thus, the chemical and volume control system can be used to control the liquid level by draining and adding additional primary coolant into the primary coolant loop 3190 as needed. In certain embodiments, the chemical and volume control system may be capable of adding and/or removing the primary coolant at a desired rate, such as at a rate of sixty gallons per minute in some embodiments. When used, the chemical and volume control system can be fluidly coupled to the nuclear steam supply system 3100 at any desired location along the primary coolant loop 3190.

During start-up of the nuclear steam supply system 3100, the start-up sub-system 3500 continues to take a portion of the primary coolant from the primary coolant loop 3190, heat the portion of the primary coolant to form a heated portion of the primary coolant, and inject the heated portion of the primary coolant into the primary coolant loop 3190. The flow of the heated portion of the primary coolant into the primary coolant loop 3190 serves to heat up the primary coolant (which is actually a mixture of original primary coolant and the heated portion of the primary coolant) during the start-up process. Once the primary coolant in the primary coolant loop 3190 reaches the no load operating temperature, the pump 3502 is turned off or the start-up sub-system 3500 is otherwise isolated/disconnected/valved off from the primary coolant loop 3190. In certain embodiments, only after the primary coolant reaches the no load operating temperature do the control rods begin to be withdrawn.

During the start-up procedures discussed above, the secondary coolant (i.e., feedwater) continues to be circulated on the shellside 3305 of the steam generating vessel 3300. Thus, as the primary coolant heats up due to the start-up procedures and begins to flow through the primary coolant loop 3190 including through the tubes 3332 of the steam generating vessel, the secondary coolant flowing through the shellside 3305 of the steam generating vessel 3300 boils to produce steam. This steam is held inside of the steam generating vessel 3300 until a desired pressure is reached. Once the desired pressure is reached, a steam isolation valve (i.e., a valve between the steam generating vessel 3300 and the turbine 3900) is opened and a portion of the steam is sent to the turbine 3900 for turbine heat-up and the remainder of the steam is sent to the condenser in a bypass operation.

In certain embodiments, the steam is sent to the turbine 3900 for power production only when all of the control rods are fully withdrawn and the nuclear steam supply system 3100 is at full power. Furthermore, as noted above the control rods are only fully withdrawn in some embodiments after the primary coolant reaches the no-load operating temperature. Thus, in those embodiments, during the start-up process no steam is sent to the turbine 3900 for power production (although it may be sent to the turbine 3900 for turbine heat-up). Power production begins in such embodiments only when the start-up process is complete and the primary coolant flows through the primary coolant loop 3190 passively without the operation of a pump.

In addition to heating the primary coolant within the primary coolant loop 3190, the start-up sub-system 3500 can also be used for draining the primary coolant from the primary coolant loop 3190 if the need arises. In certain embodiments, such as the embodiment depicted in FIGS. 52 and 56A whereby the inlet 3506 of the intake conduit 3501 is positioned at a bottom of the reactor vessel 3300, this can include draining primary coolant from the reactor vessel 3200. Furthermore, the start-up supply system 3500 can be used to remove debris that may accumulate at the bottom of the reactor vessel 3200 or at the bottom of the steam generating vessel 3300, depending on the location of the inlet 3506 of the intake conduit 3501.

Figure 59:
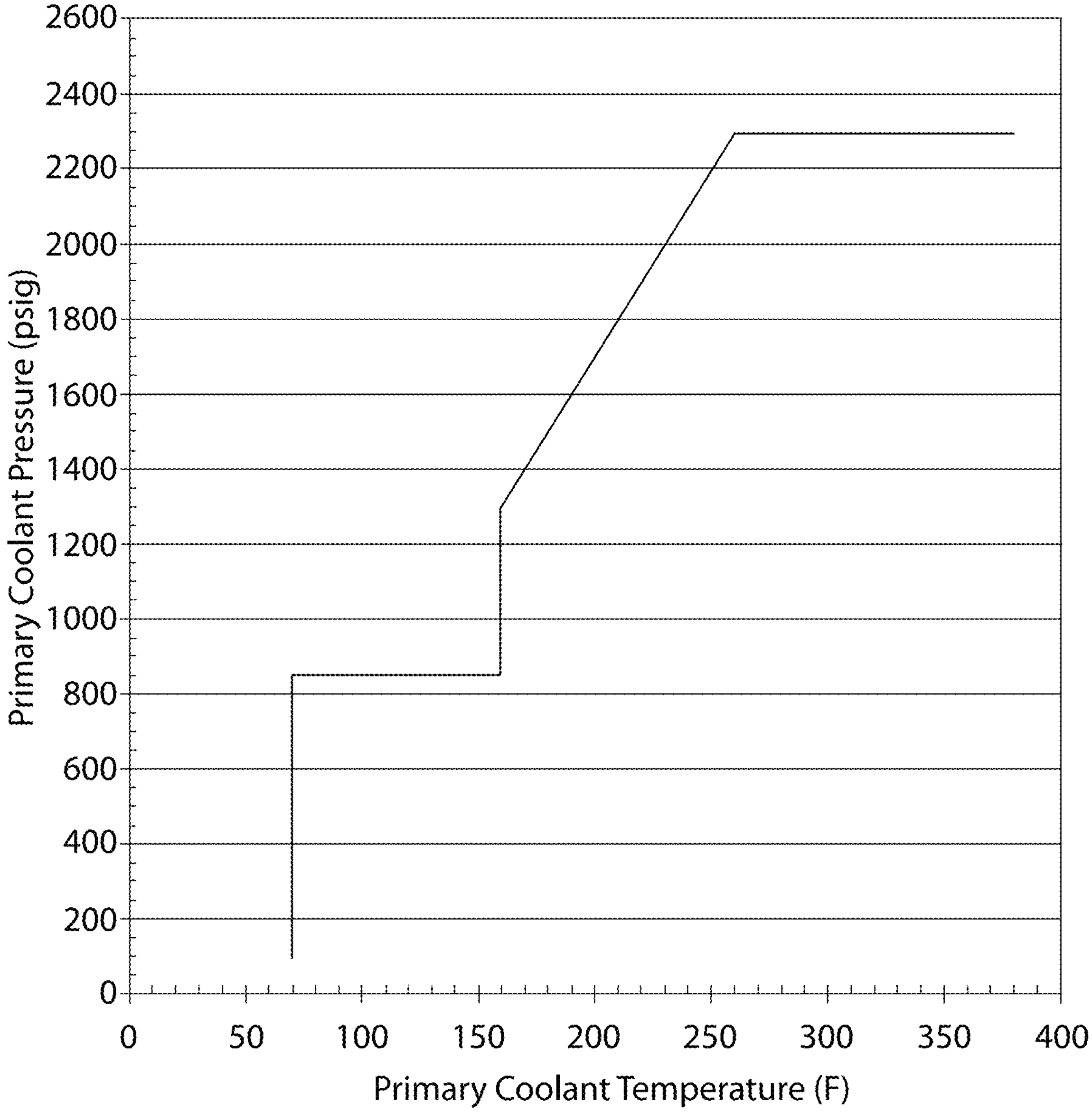
FIG. 59 is a graph illustrating the primary coolant pressure vs. the primary coolant temperature.

In certain embodiments, as the primary coolant is being heated by injecting the heated portion of the primary coolant into the primary coolant loop 3190 using the start-up sub-system 3500, pressure in the primary coolant loop 3190 is increased in stages by introducing high pressure inert gas into the pressurizer 3380 volume. The two-phase (inert gas-water vapor with liquid water) equilibrium maintains the liquid level in the pressurizer 3380 volume. The staged increase in pressure follows the typical heat-up curve as shown in FIG. 59, which is based on a brittle toughness curve specific to the primary coolant loop 3190, reactor vessel 3200 and steam generating vessel 3300 material of construction.

Figure 58:
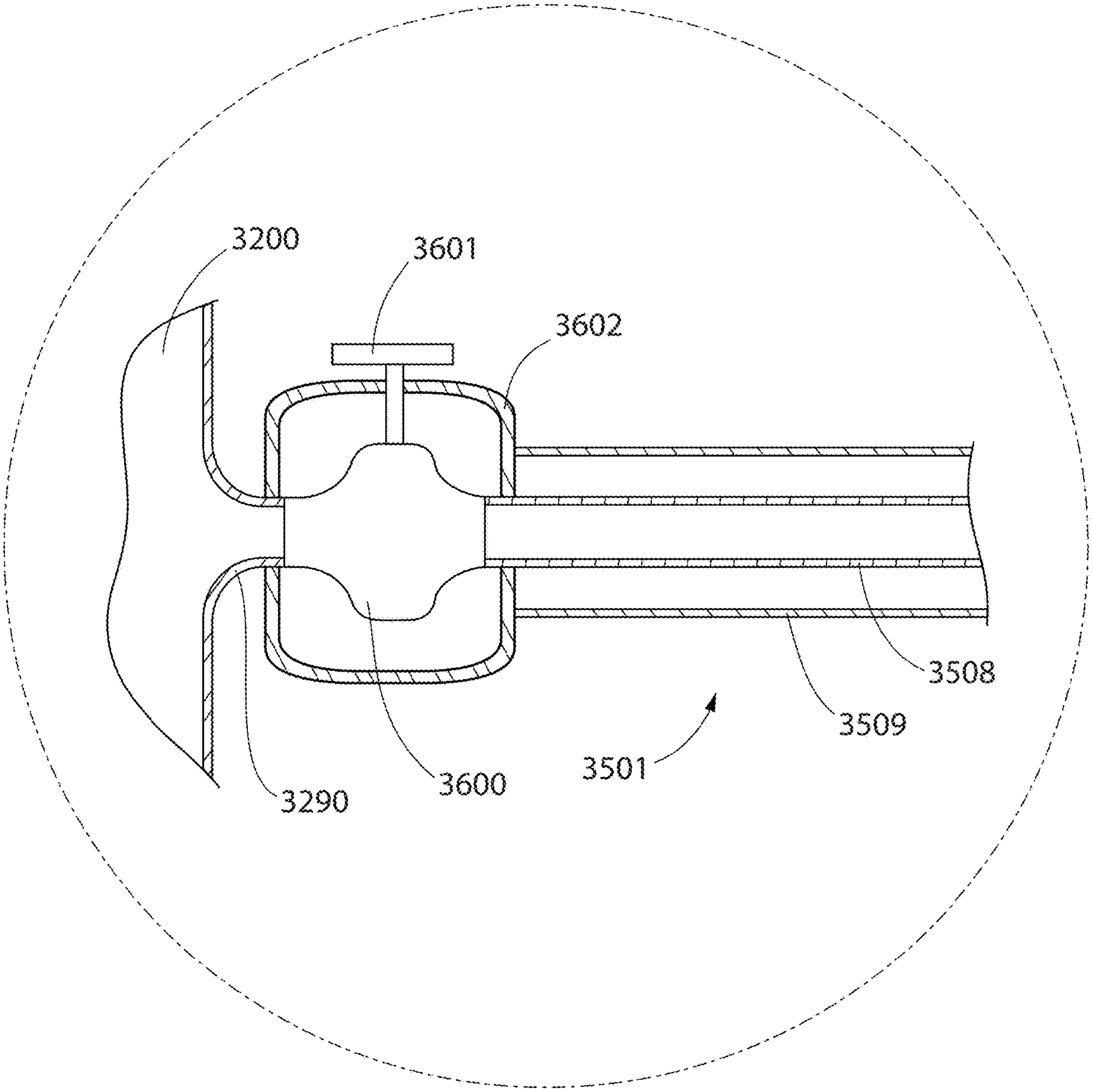
FIG. 58 is a schematic flow diagram illustrating the connection between the start-up sub-system and the reactor vessel.

Referring now to FIG. 58, the interconnection between the start-up sub-system 3500 and the reactor vessel 3200 will be described. Although FIG. 58 only depicts the connection between the start-up sub-system 3500 and the reactor vessel 3200, it should be appreciated that an identical connection can be used for connecting the start-up sub-system 3500 to the steam generating vessel 3300. Stated another way, FIG. 58 illustrates the manner in which the intake conduit 3501 is connected to the reactor vessel 3200 in a manner that prevents or eliminates or substantially reduces the likelihood of a loss-of-coolant accident. Of course, certain embodiments may omit the valves discussed below, and in certain embodiments the connection between the start-up sub-system 3500 and the reactor vessel 3200 and the steam generating vessel 3300 may be achieved in other manners than that discussed directly below.

As illustrated in FIG. 58, the intake conduit 3501 comprises a concentric pipe construction including an inner pipe 3508 that carries the portion of the primary fluid from the primary coolant loop 3190 and an outer pipe 3509 that concentrically surrounds the inner pipe 3508. The outer pipe serves as a redundant pressure boundary to contain the portion of the primary coolant within the piping in case the inner pipe 3508 were to develop a leak. Two independent pressure enclosures (i.e., the inner pipe 3508 and the outer pipe 3509) serve to render the potential of a pipe break loss-of-coolant accident non-credible.

The inner pipe 3508 is directly connected to a valve 3600. Furthermore, the valve 3600 is enclosed in a pressure vessel 3602 which encloses the entirety of the valve 3600 except for the valve stem 3601. Thus, the valve stem 3601 extends from the pressure vessel 3602 so that manual opening and closing of the valve 3600 is still possible while the pressure vessel 3602 remains enclosing the valve 3600. The inner pipe 3509 connects to the valve 3600 within the pressure vessel 3602. Thus, the pressure vessel 3602 prevents any loss-of-coolant accident event initiating at the weldment between the valve 3600 and the inner/outer pipe 3508, 3509 arrangement. Specifically, if there was a breakage at the weldment between the valve 3600 and the inner pipe 3508, any coolant leakage would occur within the pressure vessel 3602 and would not escape into the environment or elsewhere where it could cause harm.

Furthermore, the reactor vessel 3200 comprises a forging 3290 extending from the sidewall thereof. The valve 3600 is directly welded to the forging 3290. This eliminates the possibility of pipe breakage between the reactor vessel 3200 and the valve 3600. Furthermore, the connection between the forging 3290 and the valve 3600 occurs within the pressure vessel 3602 so that a break at the weldment between the forging 3290 and the valve 3600 would result in coolant leakage occurring within the pressure vessel 3602.

Shutdown System for Nuclear Steam Supply System

For shutting down a typical pumped-flow pressurized water reactor in presently designed systems which include reactor coolant pumps for circulating coolant through the reactor vessel, it is necessary to cool down the primary reactor coolant from hot full power conditions to shutdown cold conditions, hereafter called Cold Shutdown Condition (CSC). The fuel core can only be accessed (by opening the reactor vessel head) to start refueling operation after reaching the Cold Shutdown Condition (CSC).

Once the reactor core has been fully shutdown by inserting all the shutdown control rods, the reactor core will begin to reject its residual decay heat to the primary coolant (which in this case will be pressurized water). Initially the primary coolant temperature in the hot leg of a traditional PWR is close to the normal operating temperature. The primary coolant has sufficient enthalpy (for the first few hours) to enable the steam generator to produce steam. The low pressure steam thus produced bypasses the turbine and is sent directly to the condenser where it is condensed and returned back to the steam generator using the feedwater pumps. In this manner, the decay heat is rejected to the ultimate heat sink (i.e. the environment) through the use of for example a cooling tower which cools the condenser or an air cooled condenser. Throughout the entire operation, the primary coolant is being circulated through the reactor pressure vessel using the reactor coolant pump.

The decay heat being produced by the shutdown reactor core will monotonically reduce and will reach a point (within the first few hours), hereafter called Intermediate Switchover Condition (ISC), where it no longer has sufficient enthalpy to enable the steam generator into producing steam. At this juncture, the primary coolant is routed through a set of heat exchangers called the Residual Heat Removal heat exchanger (RHR heat exchanger) where the primary coolant is cooled by rejecting its heat to the component cooling water supplied by the component cooling water supply system.

Once the primary coolant temperature reaches the cold shutdown condition, the reactor flange can be opened to commence the refueling operation.

According to another aspect of the invention, a nuclear steam supply shutdown system 3700 is provided which functions to cool down the fuel core and dissipate residual decay heat generated by the core under steam supply shutdown conditions so that the reactor vessel may ultimately be accessed for maintenance, refueling, repairs, inspection, and/or other reasons. In various embodiments disclosed herein, this is accomplished by cooling the primary coolant and/or by cooling the secondary coolant using cooling apparatuses fluidly coupled to flow loops located externally or outside of the steam generating vessel 3300 and reactor vessel 3200, as further described herein.

In one embodiment, the start-up sub-system 3500 may advantageously also be re-used in a modified reverse operating mode as part of the steam supply shutdown system 3700 for use with the passive nuclear steam supply system 3100 that normally operates via natural gravity-driven coolant circulation through the reactor. In lieu of heating the primary coolant during startup of the reactor, the start-up sub-system 3500 is instead operated to remove heat from and cool the primary coolant flowing through the nuclear steam supply system 3100 (i.e. reactor vessel 3200 and steam generating vessel 3300). As further described below, the shutdown system 3700 is operable to facilitate shutdown of the reactor from a hot full power normal operating state to a cold shutdown state in a safe and controlled manner which protects the steam supply system components from damage due to the associated thermal transients experienced during reactor shutdown. The shutdown system 3700 may be used of either planned or emergency reactor shutdown situations.

By definition, a passively safe nuclear steam supply system as disclosed herein does not include or require any 100% primary coolant flow pumps in the primary reactor coolant loop because the flow is driven by gravity, not mechanical pumps. In a passively cooled reactor, natural circulation flow will be sustained even after the reactor shutdown control rods are fully inserted into the core. The residual decay of the spent fuel core provides the motive force to sustain the natural circulation flow due to buoyancy effects, albeit at a reduced circulation rate.

The residual decay heat is a fraction of the full power heat decaying monotonically with time, thereby reducing the natural circulation flow rate, and taking the flow eventually into the laminar regime. This is highly undesirable as it is difficult to predict the occurrence of nucleate boiling phenomenon at the fuel cladding surface. Departure from nucleate boiling is a highly undesirable phenomenon in a PWR, which is best to be avoided to ensure operational stability and performance predictability.

Also, the cooling rate will be affected as the heat transfer coefficient is at least an order of magnitude lower in the laminar regime compared to the turbulent regime. This increases the duration to reach Cold Shutdown Conditions (CSC) delaying the refueling process. It is desirable to reach the cold shutdown condition in as short a time as possible.

The shutdown system 3700 described below is uniquely designed to have a high margin of safety from the above described undesirable event and to ensure quick and safe shutdown of the reactor and steam supply system 3100. The shutdown system ensures fully turbulent flow across the fuel core during the cool down process to optimize core cooling.

Figure 60:
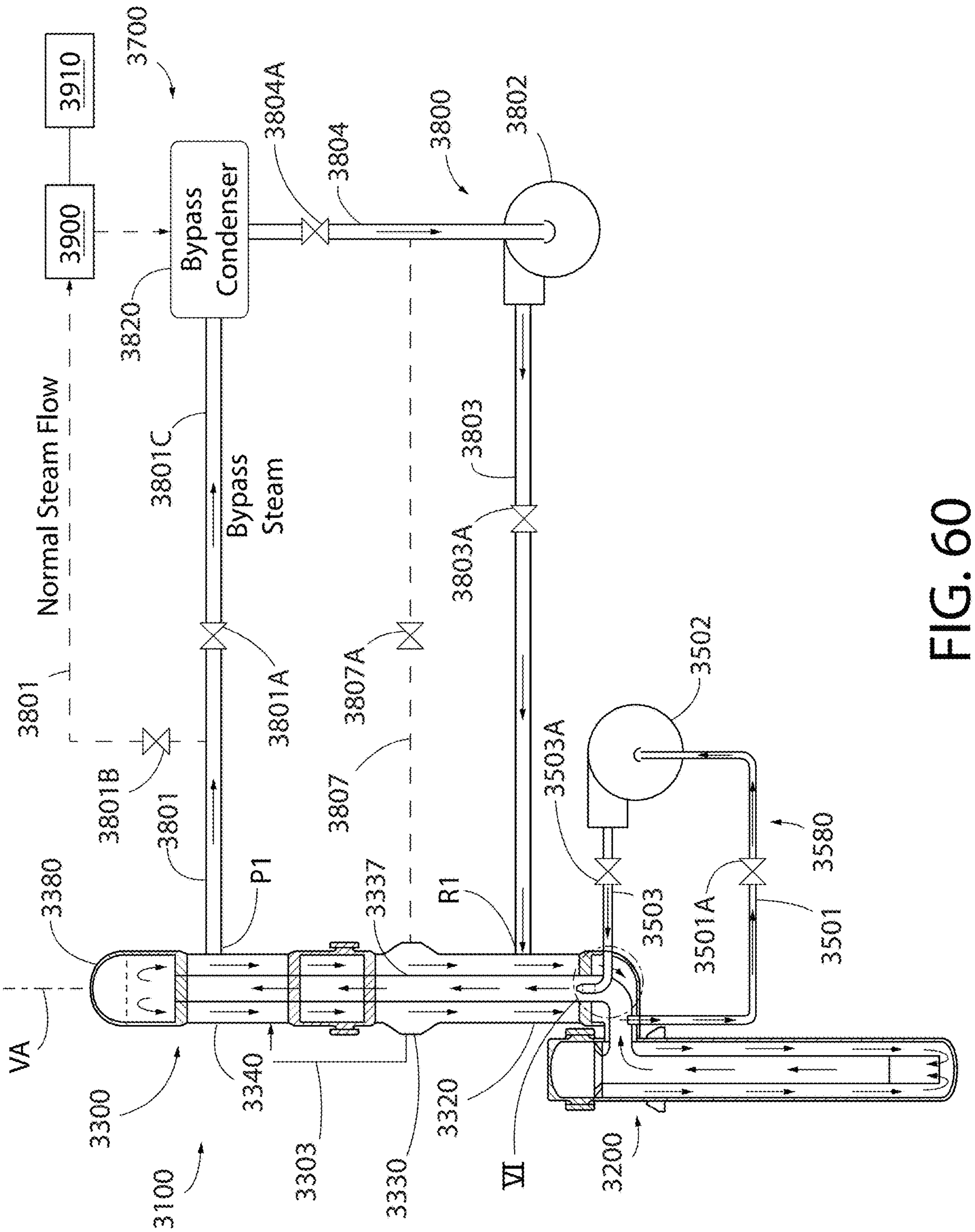
FIG. 60 is a schematic flow diagram illustrating a nuclear steam supply shutdown system in a first phase or stage of operation.
Figure 61:
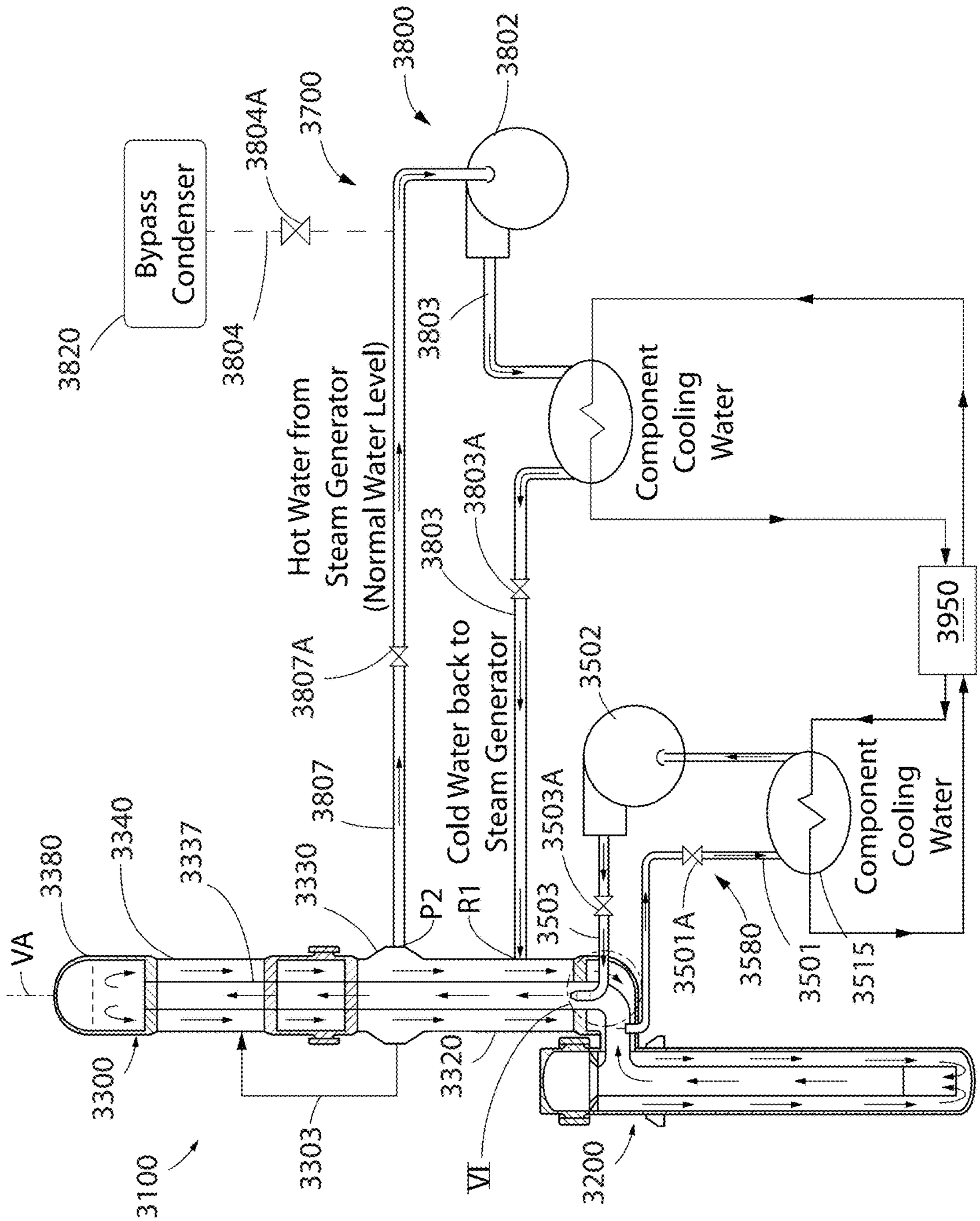
FIG. 61 is a schematic flow diagram illustrating a nuclear steam supply shutdown system in a subsequent second phase or stage of operation.

In one exemplary embodiment shown in FIGS. 60 and 61, the steam supply shutdown system 3700 may generally include a primary coolant cooling system 3580 configured for cooling primary coolant and a secondary coolant cooling system 3800 configured for cooling the secondary coolant which normally undergoes a phase change in the steam generating vessel 3300 during normal reactor operation (i.e. not shutdown or start-up) from liquid to steam to power the turbine-generator set for producing electricity. Each of the primary coolant cooling system 3580 and secondary coolant cooling system 3800 are comprised of separate external piping loops or circuits with pump-driven flow and coolant cooling apparatuses; the former system extracting and circulating primary coolant from the primary side (e.g. tubeside) of the steam generator 3300 and the latter system extracting and circulating secondary coolant from the secondary or steam side (e.g. shell side) of the steam generator. Interconnecting piping used in each of these foregoing sub-systems may be made from nuclear industry standard piping of suitable diameter and wall thickness.

Primary Coolant Side Heat Removal

FIG. 60 is a schematic flow diagram showing an initial first operating phase of the steam supply shutdown system 3700 for removing and rejecting residual decay heat from the nuclear fuel core. This situation is encountered when first shutting down the reactor, wherein the primary coolant has enough residual heat to heat the secondary coolant to a temperature sufficient to produce steam. The secondary coolant therefore is in a steam phase or state.

FIG. 61 is a schematic flow diagram showing a later second operating phase of the steam supply shutdown system 3700 for removing and rejecting residual decay heat from the nuclear fuel core. This situation is encountered later in the reactor shutdown cycle, wherein the primary coolant still heats the secondary coolant but does not have enough residual heat to produce steam any longer. The secondary coolant is therefore heated by the hotter primary coolant, but remains in a liquid phase or state.

Referring generally but not exclusively to FIGS. 60 and 61, the primary coolant cooling system 3580 in one embodiment may utilize and generally be comprised of the same start-up sub-system 3500 (see FIG. 52) which has been slightly reconfigured for performing cooling rather than heating the cooling primary coolant during reactor shutdown. The start-up sub-system 3500 may therefore be dual purposed which advantageously reduces capital equipment and maintenance costs. The primary coolant cooling system 3580 therefore generally includes the same Venturi or jet pump such as Venturi injection nozzle 3505 and primary coolant circulation pump 3502 of the start-up sub-system 3500, which operates in the same manner already described herein. To that basic system, however, the primary coolant cooling system 3580 adds a cooling apparatus which in one embodiment may be a "dual purpose" primary coolant tubular heat exchanger 3515 that replaces the heating element 3504 of the start-up sub-system 3500. A dual purpose heat exchanger 3515 operates in both a user-selectable cooling mode (during shutdown) or a heating mode (during startup), as further described herein.

In other possible embodiments, it will be appreciated that completely separate primary coolant cooling system 3580 and start-up sub-system 3500 may be used. Accordingly, the invention is not limited to either equipment arrangement.

In one arrangement, the Venturi injection nozzle 3505 as already described herein may remain located and positioned inside the straight vertical internal riser pipe 3337 of steam generator 3300 (see FIGS. 52, 54, 57, and 60-61). The Venturi nozzle 3505 may be located near and just above the bottom end of the straight portion of riser pipe 3337 so that the nozzle discharges into the riser pipe through a majority of its length.

The Venturi injection nozzle 3505 is oriented to face and discharge primary coolant flow vertically and upwards through the riser pipe 3337 parallel to vertical axis VA of steam generating vessel 3300. The injection conduit 3503 may laterally enter through the cylindrical shell 3312 of steam generating vessel 3300 and riser pipe 3337. Preferably, in one embodiment, the injection conduit 3503 enters the shell 3312 of steam generating vessel 3300 below the bottom tubesheet 3333A so as to not interfere with the vertically straight heat exchanger tubes 3332 mounted through the top surface of tubesheet.

A flow elbow 3507 may be provided to change the flow direction in injection conduit 3503 from horizontal to vertical. The Venturi injection nozzle 3505 may be attached to the outlet of the flow elbow 3507 or preferably on a short stub pipe 3510 fluidly coupled to the outlet of the elbow. The latter stub piping allows the vertical position of the Venturi injection nozzle 3505 to be adjusted as desired within the steam generator riser pipe 3337.

As already described herein, the injection conduit 3503 may be formed of heavy wall piping (e.g. 6 inches in diameter in one embodiment) that enters the riser pipe 3337 at the bottom tubesheet 3333A elevation) and may be then be reduced to a smaller bore nozzle 3505 (e.g. 3" nozzle diameter). The heated water being pumped through the reduced bore/diameter Venturi injection nozzle 3505 creates a pressurized jet stream of inlet water in the riser pipe 3337 which creates the Venturi flow effect to draw primary coolant out from the reactor pressure vessel 3200 into the riser pipe. The combined primary coolant flow from the Venturi nozzle discharge and primary coolant drawn upwards from the reactor vessel 3200 rises together through the internal riser pipe 3337 of the steam generating vessel 3300 towards the pressurizer 3380. The primary coolant then reverses direction and flows back down inside the tubes 3332 into the reactor vessel 3200, and then upwards inside riser column 3224 (holding the nuclear fuel core) back to the internal riser pipe 3337, as already described herein.

In one embodiment, the heating element 3504 of the start-up sub-system 3500 may be replaced by the dual purpose shell and tube tubular heat exchanger 3515 as described above if the shutdown system 3700 incorporates a modified version of start-up sub-system 3500. This same heat exchanger may therefore be used for both initially heating the primary coolant during reactor start-up as already described herein in a first operating mode using a suitable steam source as the heating medium, and also conversely for removing heat from the primary coolant during reactor shutdown in a second reverse operating mode using a suitable cold water source as the cooling medium. In one embodiment, component cooling water may provide the cooling medium. This type of heat exchanger may also be referred to in the art as a "dual purpose primary heater."

During both the start-up and shutdown operation, primary coolant will flow through the tubeside (i.e. inside the tubes) in the dual purpose heat exchanger 3515. However, during shutdown cooling operation as shown in FIG. 61, colder component cooling water from a component cooling water system 3950 is pumped through the shellside (i.e. outside of the tubes) while allowing the hotter primary coolant to flow inside through the tubeside. The colder component cooling water cools the primary coolant flowing in the tubes of the heat exchanger 3515. As described above, primary coolant is pumped through the heat exchanger 3515 by the circulating water pump 3502 prior to introducing the coolant back into the steam supply system 3100 and reactor vessel 3200 for cooling the reactor. In one embodiment, the heat exchanger 3515 is disposed on the suction side of circulating water pump 3502 at a suitable location in the intake conduit 3501. This arrangement allows the heat exchanger tubes to have thinner wall thicknesses since the pressure of the primary coolant is lower on the suction side of the pump 3502. In other possible embodiments, however, the heat exchanger 3515 may be disposed on the discharge side of the circulating water pump 3502 wherein thicker walled tubes would be provided for primary coolant pressure retention.

Component cooling water systems 3950 are well known in the art and are pumped systems forming a continuous closed flow loop operable to circulate cooling water to a variety of plant equipment and components having cooling needs. The component cooling water extracts heat from the plant components. The heated cooling water flow is collected from multiple plant components and cooled back down in heat exchangers provided as part of the component cooling water system 3950 which operate typically by either water and/or air cooling. The now cooled cooling water is then recirculated back to the plant components to repeat the cycle.

The inlet 3506 of the intake piping 3501 may take suction and extract primary coolant from the reactor vessel 3200 or steam generating vessel 3300 at any suitable location, some possible non-limiting examples of which are shown in FIGS. 56A-C and described above with respect to the start-up sub-system 3500. The intake piping 3501 arrangement of the start-up sub-system 3500 may therefore be identical for the primary coolant cooling system 3580. The location of the primary coolant extraction point selected from the reactor vessel 3200 or steam generating vessel 3300 will depend on a number of factors, including without limitation accessibility based on the physical layout of the steam supply system 3100 equipment, thermal flow dynamics, and other considerations.

In reactor and steam supply shutdown operation, a portion of the primary coolant flowing through the reactor vessel 3200 and steam generating vessel 3300 is extracted or drawn into the primary coolant cooling system 3580 assisted by pump 3502 through the intake conduit 3501. The remaining portion of the primary coolant remains in the reactor vessel 3200 and steam generating vessel 3300 and continues to flow through the primary coolant flow loop as described herein forming a circulation path inside the steam generating vessel and reactor vessel. In one embodiment, the amount of primary coolant extracted and circulated through the start-up sub-system 3500 is less than 100% of the total volume of primary coolant present in the reactor vessel 3200 and steam generating vessel 3300. In some embodiments, the amount of extracted primary coolant may be less than 50%, and less than 25% of the total primary coolant volume. In one exemplary non-limiting embodiment, the extracted primary coolant may be about 10% of the total primary coolant volume stored in the reactor vessel 3200 and steam generating vessel 3300.

During the first initial operating phase of the steam system shutdown system 3700 shown in FIG. 60 occurring right after reactor shutdown, primary coolant is extracted from the reactor vessel 3200 or steam generating vessel 3300 by the circulating water pump 3502 and discharged through the external piping loop or circuit of the primary coolant cooling 3580. The primary coolant from pump 3502 is discharged directly into the riser pipe 3337 without flowing through the heat exchanger 3515. During this initial phase, the temperature of the primary coolant may generally be too high to utilize the heat exchanger. The secondary coolant cooling system 3800 performs the function of cooling the primary coolant, as described below. At this juncture, the primary coolant cooling system 3580 functions primarily to induce and drive primary coolant circulation through the primary coolant flow loop inside the reactor vessel 3200 and steam generating vessel 3300 under the reduced power level of the reactor fuel core 3230.

During the second operating phase of the steam system shutdown system 3700 shown in FIG. 61, the extracted primary coolant flows through heat exchanger 3515 and is cooled in the manner already described before reaching the inlet or suction of circulating water pump 3502. The pump 3502 pressurizes and discharges the primary coolant through the injection conduit 3503 to the Venturi injection nozzle 3505 under high velocity. The pressure of the returned portion of the primary coolant is higher than the pressure of the primary coolant circulating through the reactor vessel 3200 and steam generating vessel 3300 in the primary coolant flow loop. It bears noting that the pump 3502 therefore discharges primary coolant at a higher pressure than at the extraction pressure of the primary coolant from the primary coolant flow loop which is drawn into the intake conduit 3501.

The Venturi or jet pump formed by introducing a jet of high velocity primary coolant water through Venturi injection nozzle 3505 into the internal riser pipe 3337 of the steam generating vessel 3300 produces the motive force necessary during reactor shutdown to circulate primary coolant through the reactor vessel when insufficient heat is generated by the reactor to sustain normal gravity-driven coolant flow. The Venturi effect creates a low pressure in the vicinity of the nozzle 3505 thereby pulling the water from the reactor vessel 3200 into the lower portion of the internal riser pipe 3337. The jet of primary coolant water injected via Venturi injection nozzle 3505 mixes with the hot upwelling water from the reactor vessel 3200 and is pushed upwards with the high pressure water jet to the pressurizer 3380 at the very top the heat exchanger stack in the steam generating vessel 3300 (reference FIGS. 52, 55, 60, and 61). The water then naturally flows downwards by gravity through the tubes 3332 to the bottom of the reactor vessel completing a full cycle of primary coolant circulation. As the primary coolant flows down the heat exchanger stack tubes, the primary coolant cools down by rejecting heat across the tube walls secondary coolant. Preferably, the primary coolant flow rate is sufficient to ensure a fully turbulent flow regime across the fuel core.

As the primary coolant water cools down, it should be noted that the volume of water inventory eventually reduces and the loss may be compensated by a fresh inventory of water introduced into the primary coolant flow loop from any suitable source, such as by a chemical and volume control system in one non-limiting example.

Secondary Coolant Side Heat Removal

Referring generally but not exclusively to FIGS. 60 and 61, the secondary coolant cooling system 3800 includes a secondary residual heat removal heat exchanger 3810, a secondary feedwater circulation pump 3802, and steam bypass condenser 3820. Heat exchanger 3810 may be a tubular heat exchanger including a shell and a tube bundle comprised of a plurality of tubes inside the shell, as are well known in the art. In one embodiment, the cooling water source for the heat exchanger 3810 may be the plant component cooling water system 3950. Secondary feedwater circulation pump 3802 may be similar in type to pump 3502, and in one embodiment may be a centrifugal type pump. Any suitable type pump may be used, however, for pump 3802 so long as it is operable to circulate secondary coolant in a liquid state. Steam bypass condenser 3820 may be any type of air or water cooled condenser operable to condense secondary coolant in a steam phase from the nuclear steam supply system 3100 to liquid (variously referred to in the art as condensate or feedwater). In various embodiments, the main plant steam condenser may be used as the bypass condenser 3820 or a separate condenser may be provided to serve the sole function as the bypass condenser.

Referring to FIG. 60, isolation or shutoff valves 3801A and 3803A may be provided respectively to isolate a steam bypass piping 3801C of the secondary coolant cooling system 3800 from the steam generating vessel 3300 and to isolate the feedwater return piping 3803 from the secondary feedwater circulation pump 3802 back to the steam generating vessel. The secondary coolant cooling system 3800 and associated piping loop may be sized to handle 3100% of the secondary coolant flow.

During the normal generating plant and reactor power cycle operation to produce electricity) bypass isolation valve 3801A is closed and a main steam isolation/shutoff valve 3801B is opened to allow superheated steam (secondary coolant) from the steam generating vessel 3300 to flow to the steam turbine 3900 through the main steam piping 3801 as shown in FIG. 60. Steam is extracted from the superheater section 3340 of the steam generator at a first extraction point P1 located at the top of the steam generating vessel 3300 near and below the pressurizer 3380. In this embodiment shown, the main condenser may be dual purposed and also serves as the steam bypass condenser 3820. Steam (secondary coolant) flows through the steam turbine 3900, is condensed by the dual purpose main/bypass condenser 3820, and then is pumped back as a liquid through feedwater return piping 3803 to the steam generating vessel 3300 such as by secondary feedwater circulation pump 3802 in one embodiment. The liquid secondary coolant may be returned to the steam generator section 3330 (or preheater section 3320 if provided) of the steam generating vessel 3300 at a return point R1.

During reactor shutdown, the secondary coolant cooling system 3800 of the shutdown system 3700 may be operated in two phases to cool the hot secondary coolant; a first steam cooling phase and a subsequent second liquid cooling phase. These phases are each described in turn below.

Referring to FIG. 60, a first initial shutdown system 3700 operating phase or mode (secondary coolant steam cooling phase) is shown in which the secondary coolant cooling system 3800 utilizes the feedwater circulation pump 3802 and steam bypass condenser 3820. The secondary residual heat removal heat exchanger 3810 is not used in this initial steam cooling mode.

During the first few hours following a reactor shutdown, the primary coolant cooling system 3580 using the jet pump provided by Venturi nozzle 3505 is operated as described above to continue to circulate primary coolant through the reactor vessel 3200 and steam generating vessel 3300 as described above and shown in FIG. 60. The dual purpose heat exchanger 3515 is bypassed and not operated in one embodiment during this initial shutdown system 3700 operating mode. There is still sufficient decay heat being rejected to the primary coolant by the nuclear fuel core 3230 in this first shutdown system operating mode to coerce the steam generator to convert the secondary coolant into steam. Accordingly, this residual heat picked up by the secondary coolant in the steam generating vessel 3300 must continue to be cooled absent normal operation of the steam turbine 3900 which is not run during reactor shutdown.

To accomplish the foregoing cooling, in one embodiment the main steam isolation valve 3801B is closed and bypass isolation valve 3801A is opened to divert the steam flow (secondary coolant) through the steam bypass piping 3801C of the secondary coolant cooling system 3800 directly to the bypass condenser 3820, thereby bypassing the steam turbine 3900 (reference FIG. 60). Steam continues to be extracted from the superheater section 3340 at a first extraction point P1 located at the top of the steam generating vessel 3300 near and below the pressurizer 3380. This is the same steam extraction point P1 used during normal plant power cycle and turbine operation discussed above. The steam is condensed and cooled in the bypass condenser 3820, and the collected water condensate flows through suction piping 3804 to the inlet of the secondary feedwater circulation pump 3802. Pump 3802 pressurizes the condensate (liquid secondary coolant) which is pumped back to the steam generator vessel 3300 through feedwater return piping 3803 forming a continuous closed circulation flow loop (external to the reactor and steam generating vessels 3200, 3300) which cools and gradually reduces the temperature of the primary coolant. This also replenishes the lost inventory of secondary coolant water in the steam generating vessel 3300 and cools the secondary coolant to remove the residual heat transferred by the reactor fuel core 3230 to the primary coolant, which in turn is transferred to the secondary coolant in the steam generator. Accordingly, the secondary coolant ultimately extracts and rejects residual heat from the reactor core in conjunction with operating the primary coolant shutdown system 3580 in the manner described above. The cooled liquid phase secondary coolant is returned at return point R1 to the steam generating section 3330 or preheater section 3320 if provided.

After the first few hours when the Intermediate Switchover Condition (ISC) is reached, the decay heat from the reactor fuel core 3230 is no longer sufficient to convert the secondary coolant into steam in the steam generating vessel 3300. Referring to FIG. 61, the secondary coolant water remains in liquid phase and reaches a normal water level in the steam generating vessel 3330 near the top of the intermediate steam generator section 3330, which may be diametrically enlarged in some embodiments. Further cooling of the liquid secondary coolant is still required using the secondary residual heat removal heat exchanger 3810 in lieu of the bypass condenser 3820 to reach temperature conditions in the reactor suitable for a full shutdown.

Referring now to FIG. 61, a second shutdown system 3700 operating phase or mode (secondary coolant liquid cooling phase) is initiated to further cool the secondary coolant to a level commensurate with final reactor shutdown conditions (i.e. primary coolant reaches the cold shutdown condition). A new secondary coolant extraction point P2 near the top of the steam generating section 3330 of the steam generating vessel 3300 is used to capture the heated secondary coolant flowing upwards through the shell side of the vessel which is still being heated by the residual heat in the primary coolant. Extracted hot secondary coolant (liquid phase) flows through secondary coolant suction conduit 3807 and an open isolation valve 3807A directly into the inlet of secondary feedwater circulation pump 3802. It should be noted that the pump inlet source from the bypass condenser 3820 via suction piping 3804 is not used in this present secondary coolant cooling phase and may be isolated by closing isolation valve 3804A. The hot liquid secondary coolant (water) is discharged from pump 3802 and flows through feedwater return piping 3803 to secondary residual heat removal heat exchanger 3810. Heat exchanger 3810 cools the hot secondary water by rejecting its heat to the component cooling water supplied by the component cooling water system 3950 as already described herein. The now cold secondary coolant flows through the remainder of feedwater return piping 3803 to return point R1 in the steam generator vessel 3300. The foregoing secondary coolant circulation flow loop is continued until the reactor has been cooled sufficiently for complete shutdown.

Figure 62:
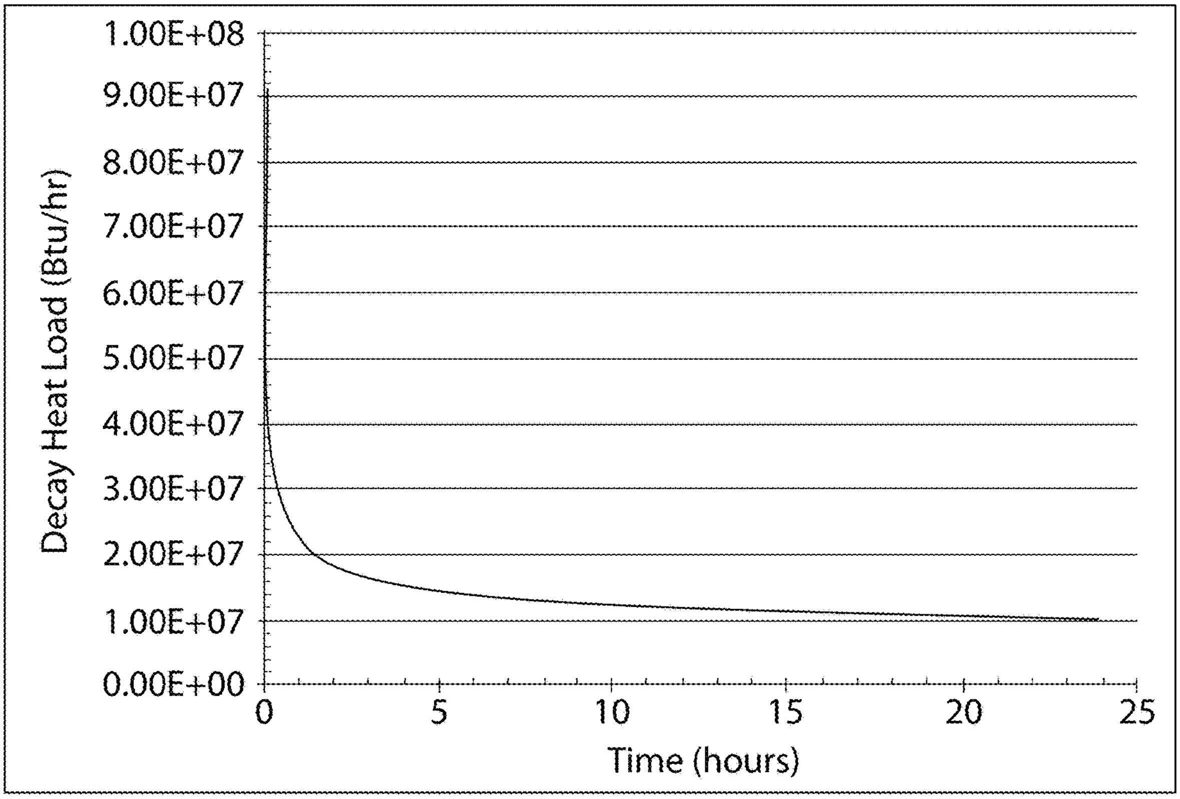
FIG. 62 is a graph illustrating the decay heat load versus time of a shutdown reactor core.

FIG. 62 is a graph showing an exemplary decay heat curve for reactor core 3230 of the nuclear steam supply system 3100. In this non-limiting example, core decay heat may reach minimum levels within approximately 24 hours which may be compensated for by using the steam supply shutdown system 3700 described herein.

The shutdown system 3700 may be configured to minimize or eliminate exposure to a Loss-of-Coolant Accident (LOCA) in this system. Referring to FIG. 58, the interconnecting piping may be made of a double wall construction. This pipe arrangement consists of a two-concentric-pipe construction with the inner pipe carrying the fluid while the outer one serves as a redundant pressure boundary to contain the fluid within the piping in case the inner pipe were to develop a leak. Two independent pressure enclosures, thus designed, serve to render the potential of a pipe-break LOCA non-credible. All isolation valves may be directly welded to the vessel nozzle forgings (see, e.g. FIG. 58) minimizing the possibility of pipe breakage between the pressure vessel and the valve. The isolation valves themselves may be enclosed in a small removable pressure vessel (called a stuffing box) as shown which encloses the entirety of the valve except for the sealed valve stem. This contains and prevents any LOCA event initiating at the weldment between valve and steam generator vessel and/or double walled piping.

The shutdown system 3700 may further be configured to provide filtration. In the intake conduit 3501 arrangement of the primary coolant cooling system 3580 (start-up subsystem 3500) shown in FIG. 56A, the intake piping reaches all the way to the bottom of the reactor vessel 3200 bottom head and may be used as a siphon for debris removal. The debris, if any, generally consists of corrosion products and it is known from reactor operating experience that all debris tends to accumulate at the bottom head of the reactor pressure vessel. When the primary coolant reaches a few degrees below maximum operating temperature of the filtration system during steam system shutdown, the filtration is turned on and the circulating pump 3502 will draw and extract the debris through the intake piping 3501 which may include a filtration system disposed upstream of the circulating pump 3502. The temperature is set by the maximum operating temperature of the filtration system. The filtration system may comprise a set of mechanical filters and a demineralizer. However, the debris could be radiologically active due to long periods of residence near the fuel core. Therefore, the filtration system may be located in a heavily shielded part of the reactor containment.

Unless otherwise specified, the components described herein may generally be formed of a suitable material appropriate for the intended application and service conditions. All conduits and piping are generally formed from nuclear industry standard piping. Components exposed to a corrosive or wetted environment may be made of a corrosion resistant metal (e.g. stainless steel, galvanized steel, aluminum, etc.) or coated for corrosion protection.

Inventive Concept #4

Reference is made generally to FIGS. 63-70 which are relevant to Inventive Concept #4 described below.

Figure 63:
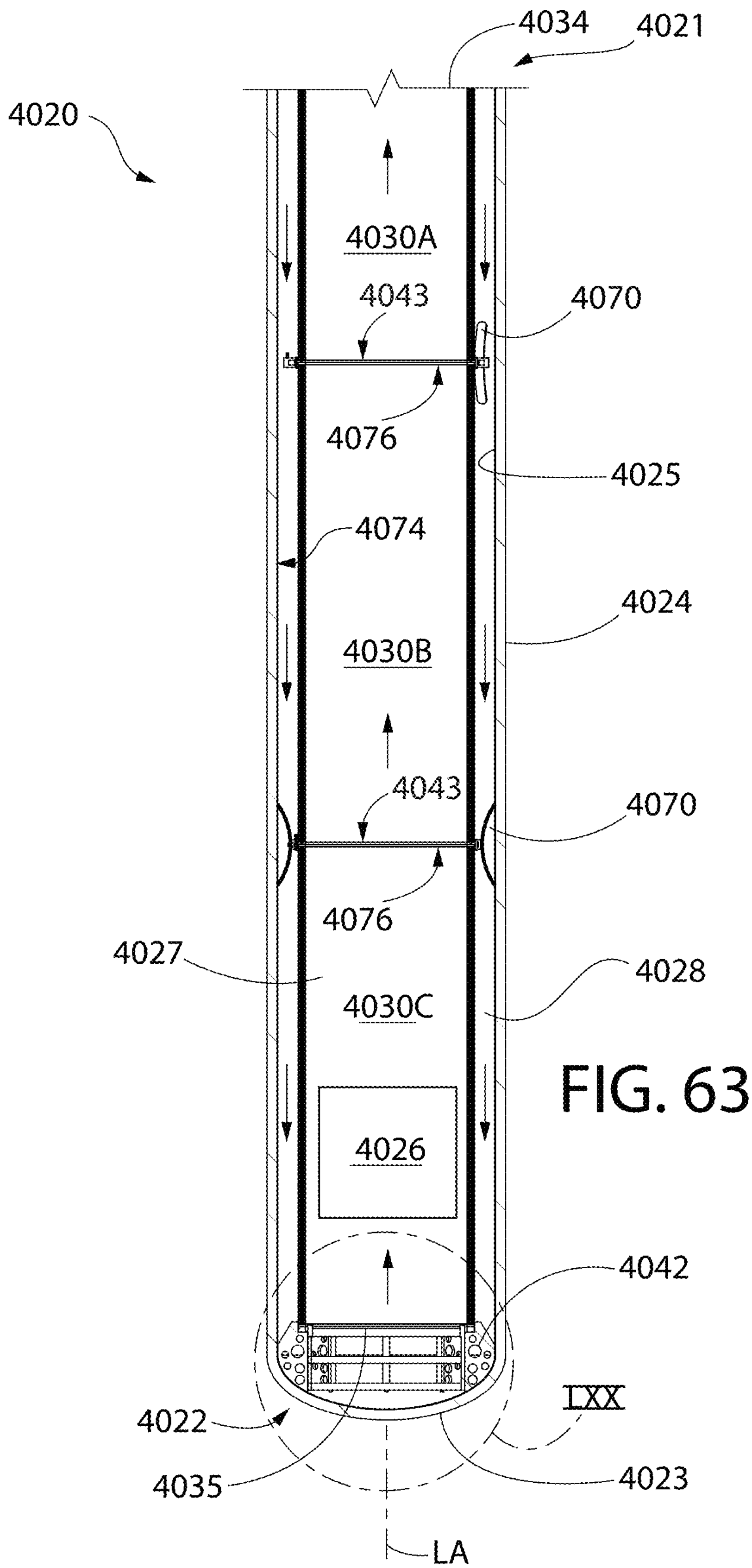
FIG. 63 is a longitudinal cross sectional view of a nuclear reactor with shroud surrounding the fuel core according to the present disclosure.

Referring to FIG. 63, a reactor vessel 4020 includes a vertically elongated cylindrical body defining a longitudinal axis LA and having a top 4021, closed bottom 4022, and a circumferentially extending sidewall 4024 extending between the top and bottom. Sidewall 4024 defines an internal cavity 4025 configured for holding a nuclear fuel core 4026. Internal cavity extends axially along the longitudinal axis from the top 4021 to the bottom 4022 of the reactor vessel 4020 in one embodiment. The bottom 4022 may be closed by a lower head 4023, which may be without limitation dished or hemispherical in configuration. In one embodiment, the internal cavity 4025 may be filled with a liquid such as primary coolant which may be demineralized water. The reactor vessel 4020 may be made of any suitable metal, including without limitation coated steel or stainless steel for corrosion resistance.

Figure 8:
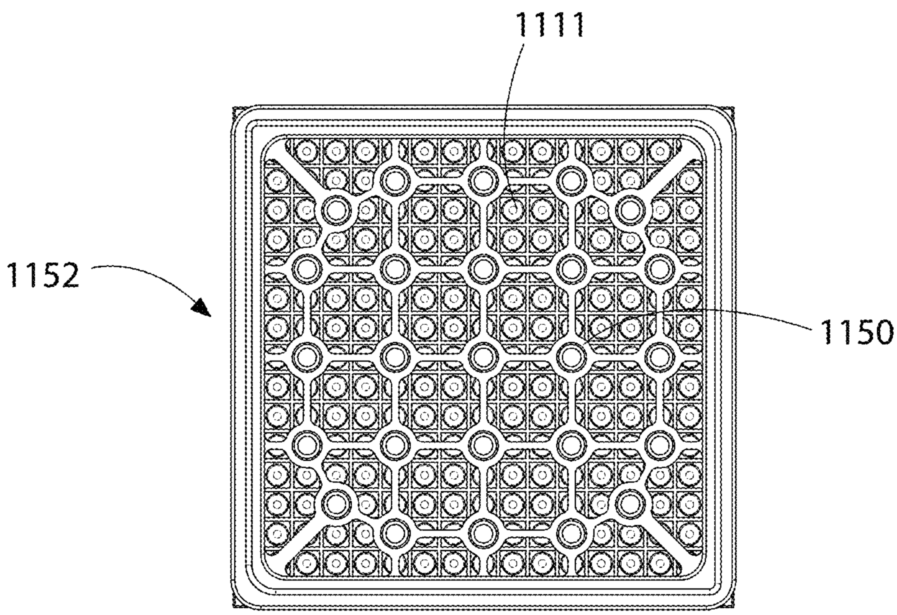
FIG. 8 is a top view of the first nuclear fuel assembly of FIG. 5B.
Figure 9:
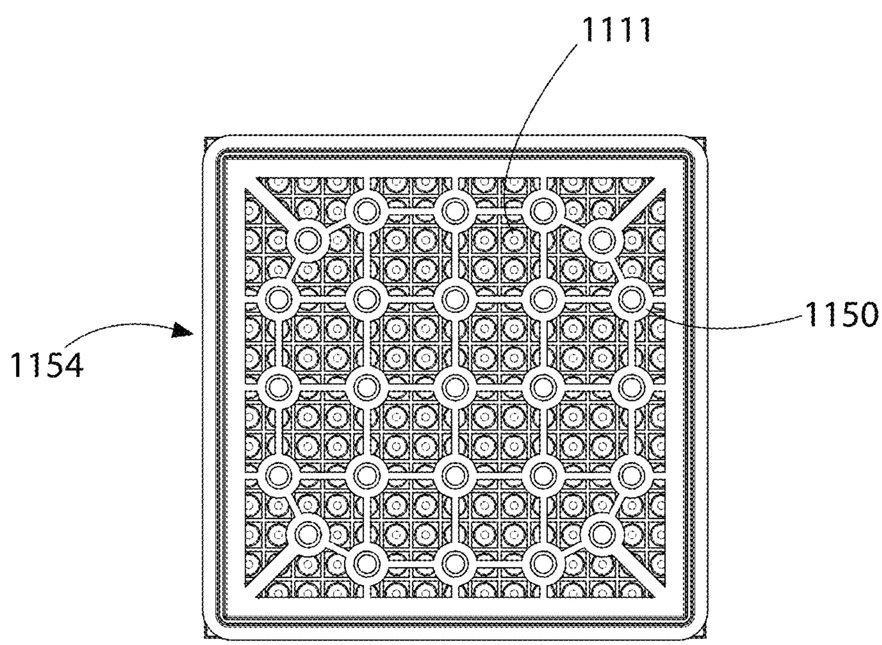
FIG. 9 is bottom view of the first nuclear fuel assembly of FIG. 5B.
Figure 10:
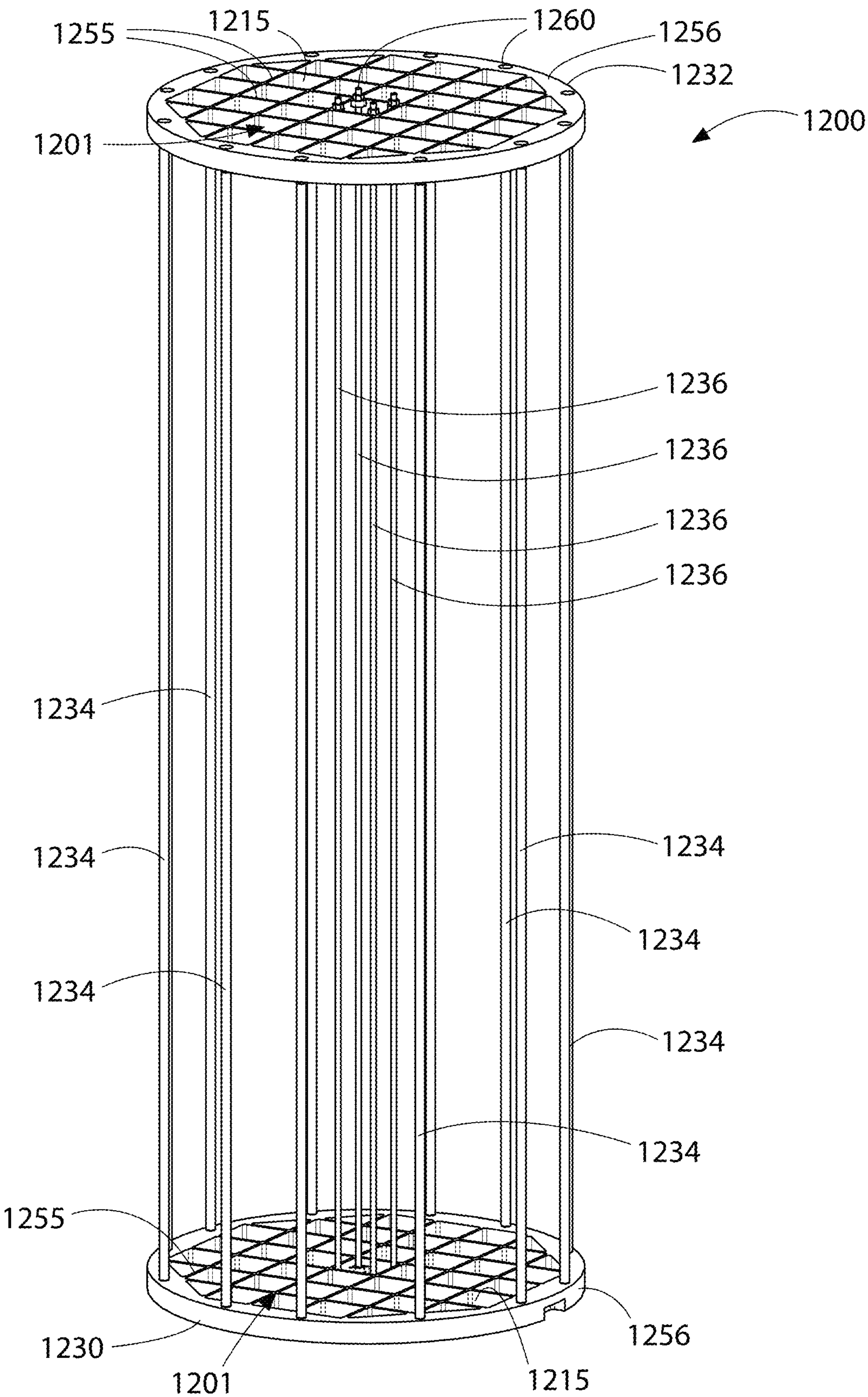
FIG. 10 is a perspective view of a unitary support structure of the nuclear fuel cartridge of FIG. 1, wherein the nuclear fuel core and reflector cylinder have been removed.
Figure 11:
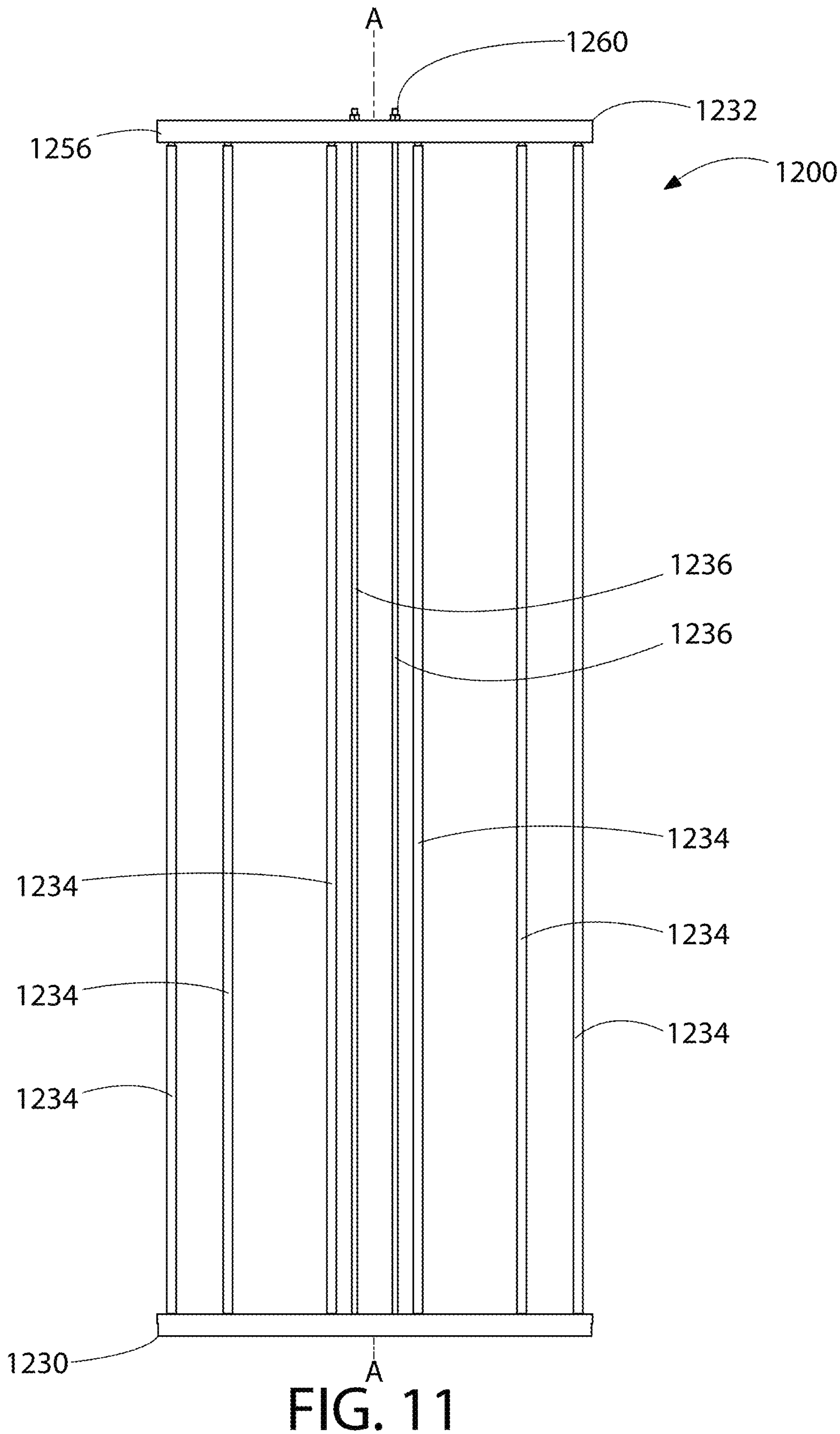
FIG. 11 is a side view of the unitary support structure of FIG. 10.
Figure 12:
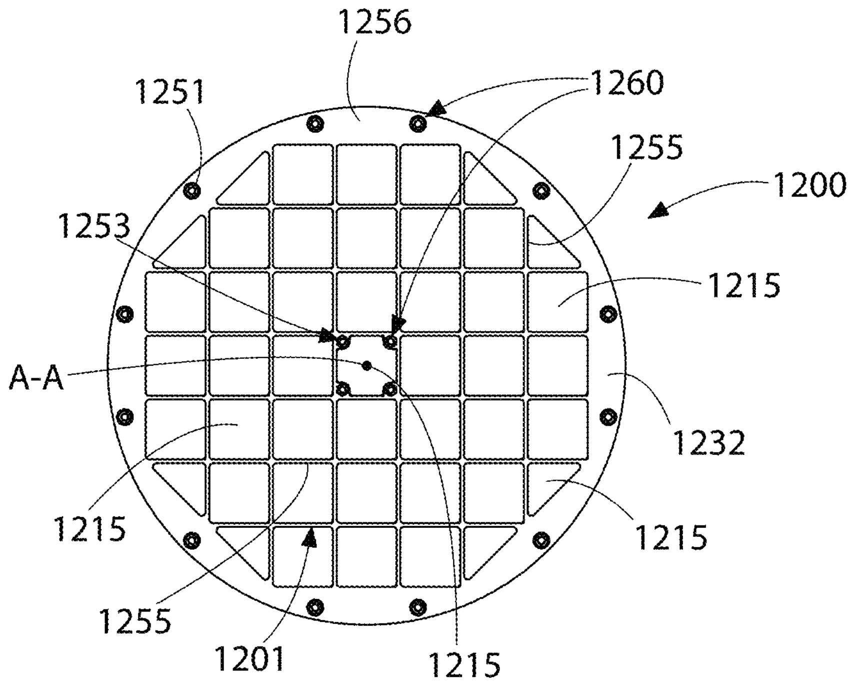
FIG. 12 is a top view of the unitary support structure of FIG. 10.
Figure 13:
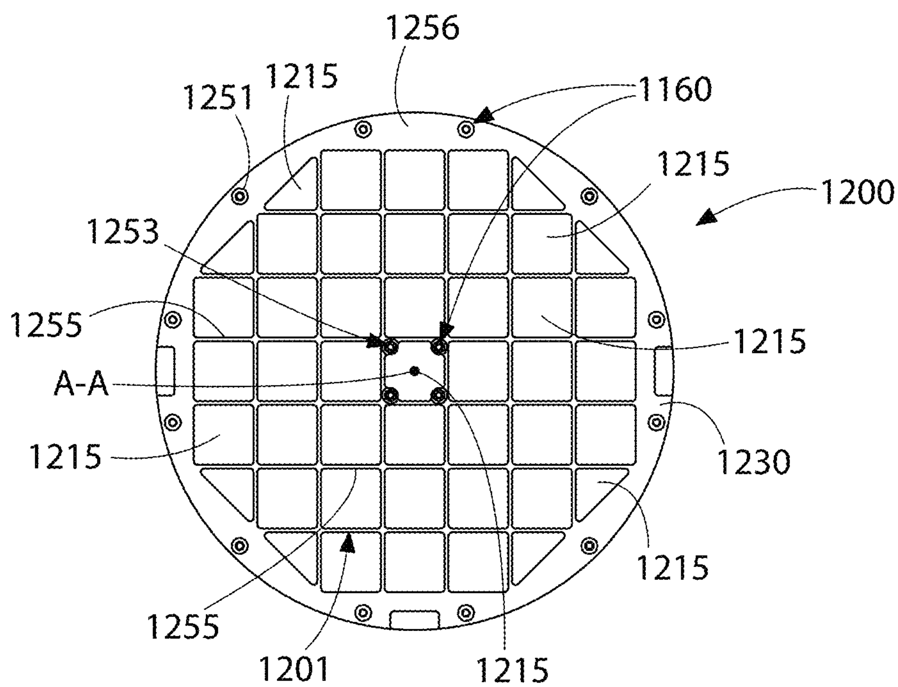
FIG. 13 is a bottom view of the unitary support structure of FIG. 10.

Referring to FIGS. 63-65 and 69, a vertically elongated shroud 4030 is provided which is disposed in the internal cavity 4025 of the reactor vessel 4020. Shroud 4030 may be cylindrical in shape with a circular annular cross-section; however, other suitable shapes may be used. Shroud 4030 is coaxially aligned with the reactor vessel 4020 along the longitudinal axis LA. The fuel core 4026 may be located inside the shroud 4030, and in one non-limiting embodiment nearer to the bottom 4022 of the reactor vessel 4020. Shroud 4030 includes a top 4034 and bottom 4035 which may be spaced vertically apart from the bottom 4022 of reactor vessel 4020 to provide a flow passage into the shroud 4030 at the bottom of the reactor vessel 4020 (see, e.g. directional flow arrows FIGS. 63 and 70). In one embodiment as best shown in FIG. 8, the bottom 4035 of the shroud 4030 may be spaced apart from bottom 4022 of reactor vessel 4020 and supported by a plurality of radially oriented and circumferentially spaced apart support plates 4042. Support plates 4042 are configured to engage the reactor vessel bottom 4022 at one extremity and bottom 4035 of shroud 4030 at another extremity. In one embodiment, support plates 4042 may include one or more flow holes 4041 to allow primary coolant to flow and circulate through the plates at the bottom of the reactor vessel. In other embodiments, the holes may be omitted.

The shroud 4030 divides the internal cavity 4025 of reactor vessel 4020 into an outer annular space which defines a vertical downcomer region 4028 (i.e. down-flow region) and an inner space which defines a vertical riser region 4027 (up-flow region). Primary coolant flows downwards in reactor vessel 4020 through the annular downcomer region 4028, reverses direction and enters the bottom 4035 of the shroud 4030, and flows upwards through riser region 4027 through the fuel core 4026 where the primary coolant is heated for generating steam in an external steam generator.

In one embodiment, the shroud 4030 may comprise an elongated outer shell 4031, an inner shell 4032, and a plurality of intermediate shells 4033 disposed between the outer and inner shells. Shells 4031-4033 are cylindrically shaped in one embodiment. Shells 4031-4033 are concentrically aligned with respect to each other and spaced radially apart forming an array comprised of a plurality of relatively thin concentric annular cavities 4040 between the outer and inner shell 4031, 4032. In one embodiment, the cavities 4040 are fluid-filled with primary coolant, as further described herein. Annular cavities 4040 extend longitudinally from the top 4034 to bottom 4035 of shroud 4030. Accordingly, the annular cavities 4040 have a length or height substantially coextensive with the length of the shells 4031-4033. The shells 4031-4033 may be formed of a suitable corrosion resistant metal, such as coated or stainless steel for example.

In one exemplary embodiment, the number of intermediate shells 4033 may be at least two to provide at least three annular cavities 4040. In non-limiting preferred embodiments, at least six or more intermediate shells 4033 (divider shells) may be provided to divide the space between the inner and outer shells 4032 and 4031 into at least seven annular cavities 4040. In one representative embodiment, without limitation, eight intermediate shells 4033 are provided to create nine intermediate shells 4033. The number of water-filled annular cavities 4040 selected correlates to the insulating effect and heat transfer reduction from the inner shell 4032 through the shroud to the outer shell 4031. The number of intermediate shells 4033 will be one less than the number of water-filled annular cavities 4040 to be created.

Figure 64:
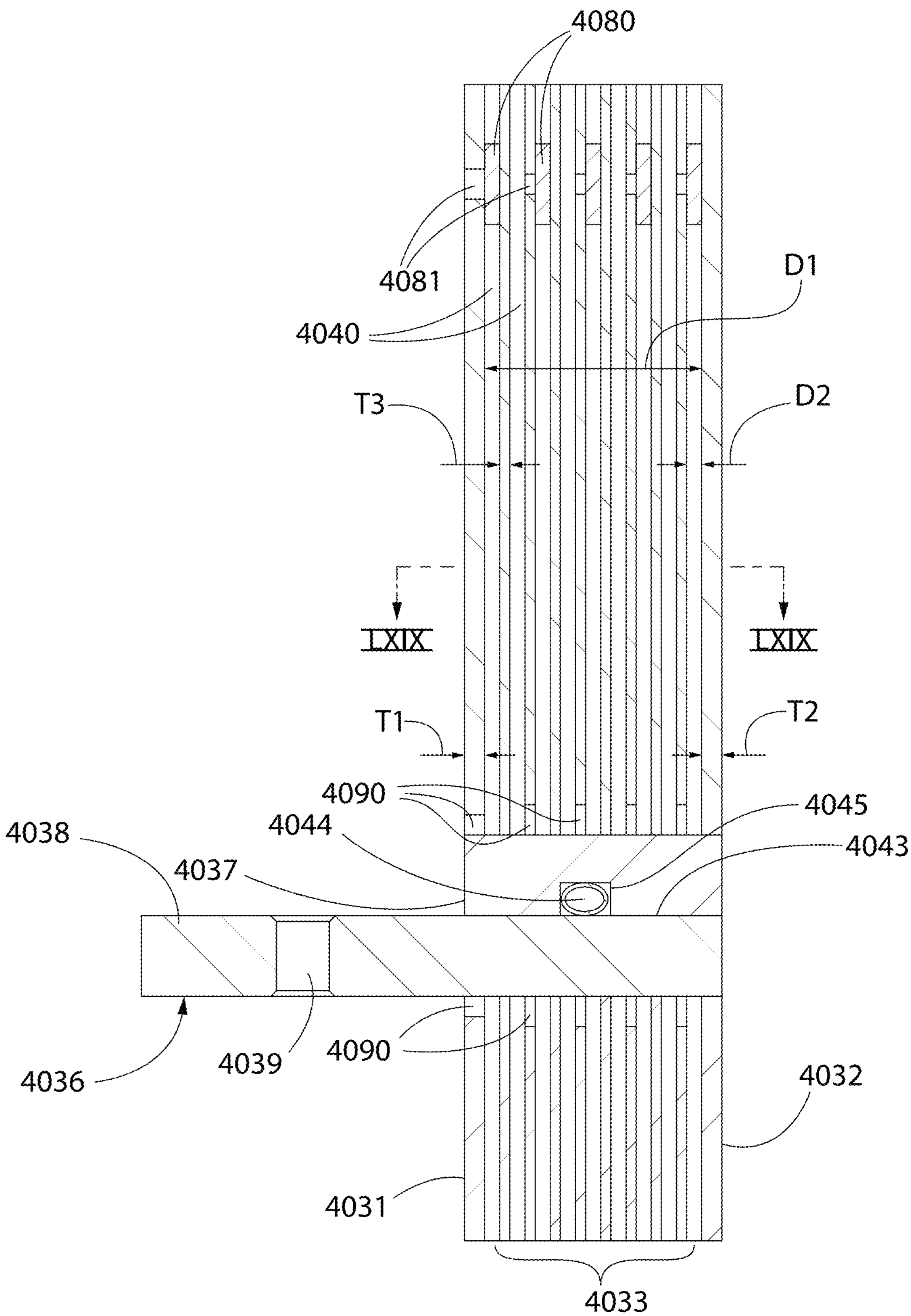
FIG. 64 is an enlarged cross section of a sidewall portion of the shroud of FIG. 63 at a joint between two adjoining stacked shroud sections.

In order to provide inter-shell connectivity and maintain the radial gap of annular cavities 4040 between intermediate shells 4033 and between the innermost and outermost intermediate shells and inner shell 4032 and outer shell 4031 respectively, spacers 4080 may be provided as shown in FIG. 64. Spacers 4080 are disposed in annular cavities 4040 between the shells 4031-4033 and have a radial thickness sufficient to provide the desired radial width of each annular cavity. Each annular cavity 4040 preferably includes spacers 4080 in an exemplary embodiment. To retain the spacers 4080 in their desired vertical position, the spacers may be rigidly attached to a shell 4031-4033 by any suitable means such as fusion welding in an exemplary embodiment. In one embodiment, a spot weld 4081 may be used to attach spacer 4080 to a shell 4031-4033 as shown. The spot welds 4081 may have any suitable diameter, such as without limitation about 1 inch as a representative example. The number of spot welds 4081 (spot nuggets) needed for joining neighboring shells 4031-4033 together may be estimated by the following empirical formula: Number=(shroud diameter times height (in inches)/40100). Preferably, the spot welds 4081 and spacers 4080 should be spaced as uniformly as possible. In one embodiment, the spacers 4080 may be radially staggered such that the spacers between adjacent shells 4031-4033 do not lie on the same radial axis (see, e.g. FIG. 64 showing a set of spacers aligned radially only in every other annular cavity 4040). Other suitable arrangements of spacers 4080 may be used. Spacers 4080 may have any suitable shape, including circular or polygonal configurations. Preferably, spacers 4080 may be formed of metal such as steel or other.

Figure 65:
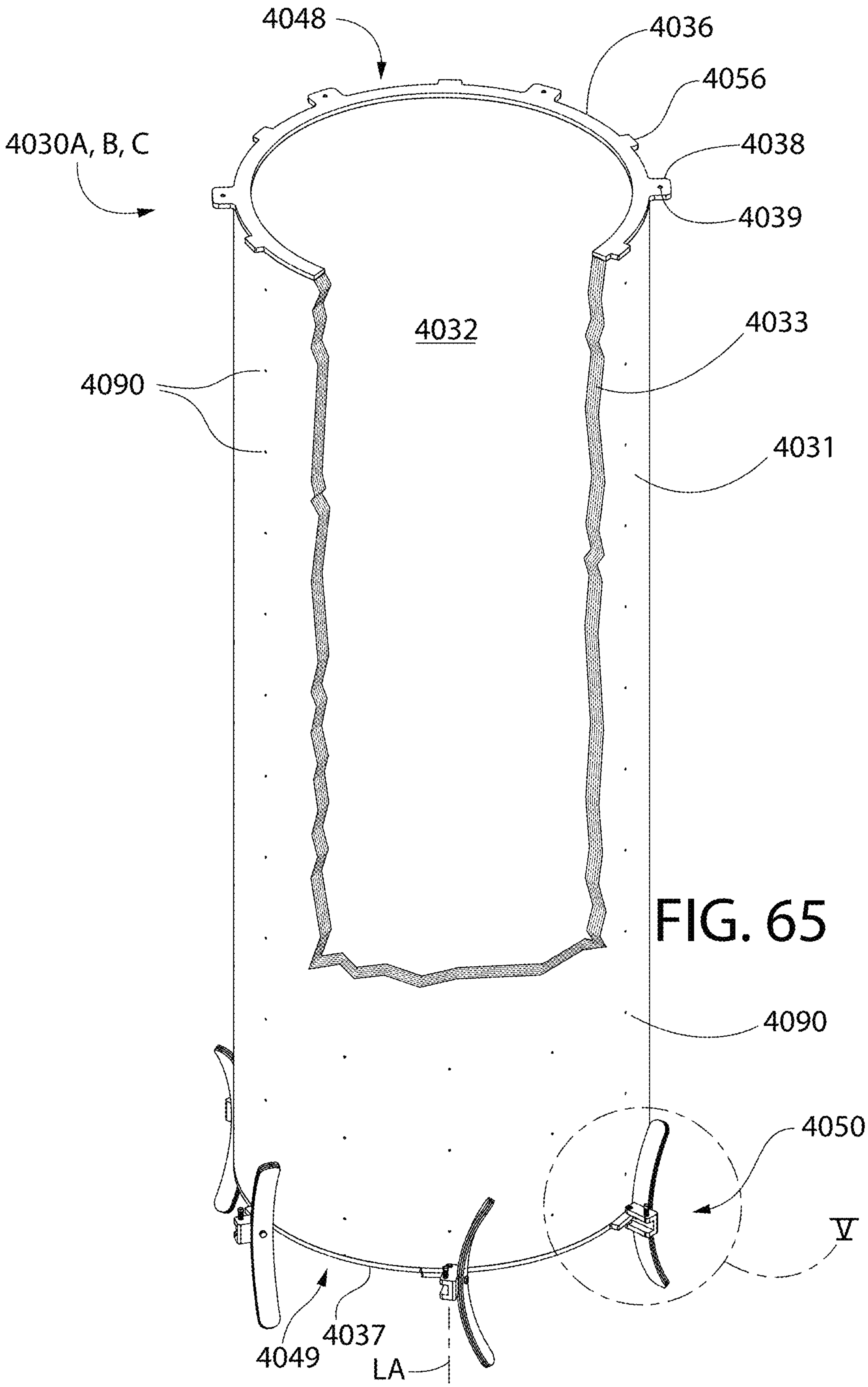
FIG. 65 is a top perspective view of a single shroud section.
Figure 69:
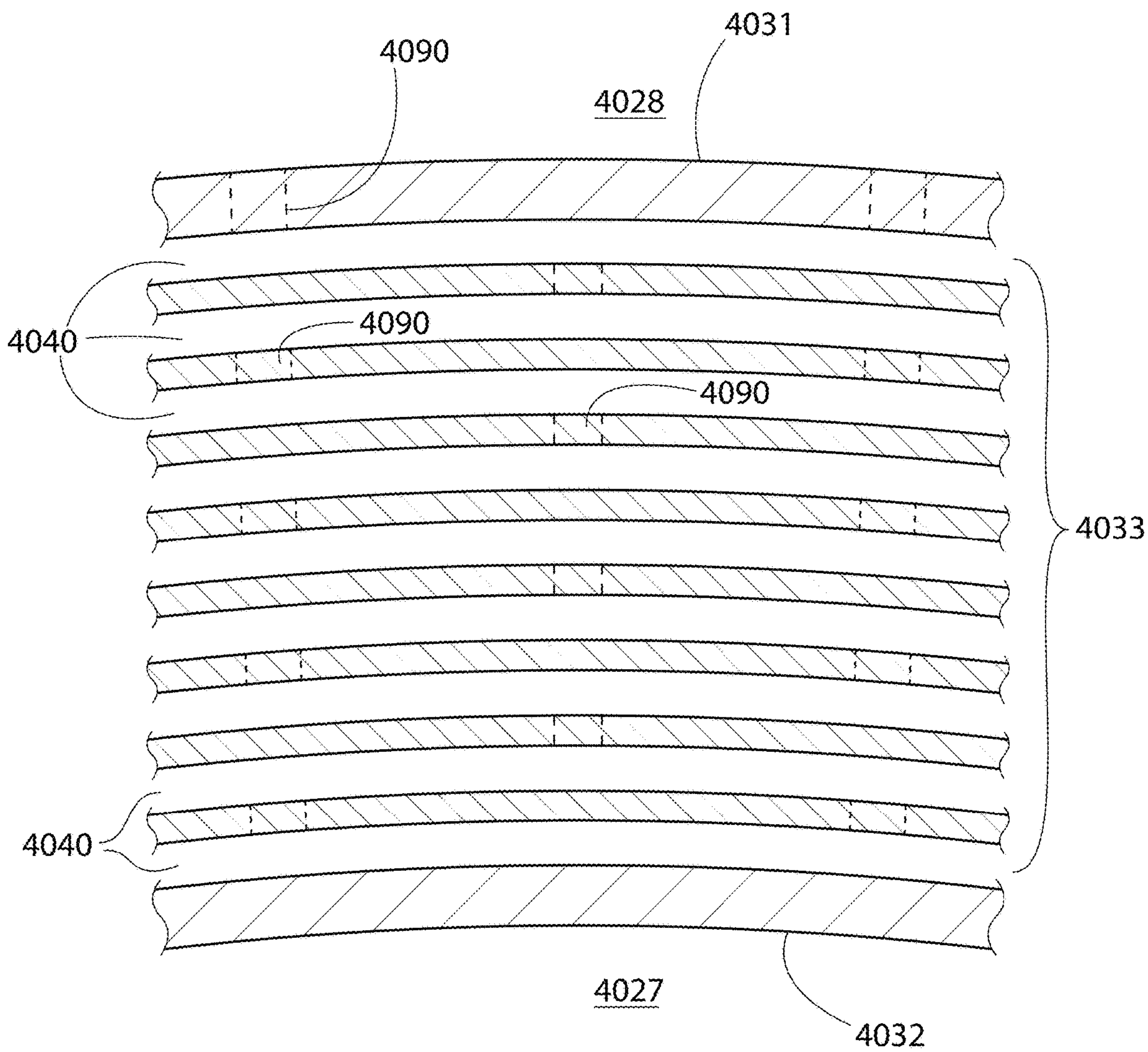
FIG. 69 is a transverse cross sectional view of a shroud section from FIG. 64.
Figure 70:
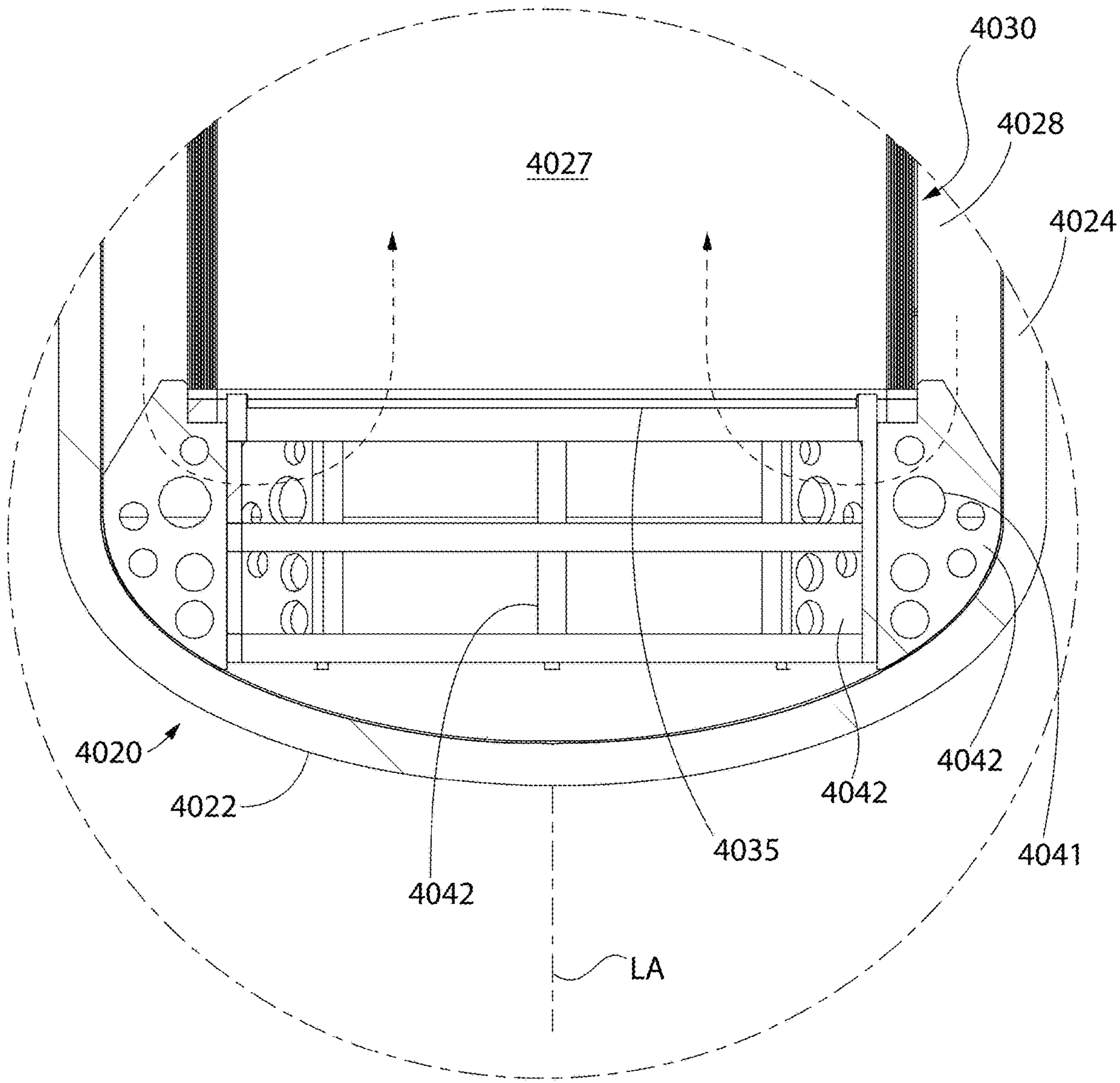
FIG. 70 is a detailed view of the bottom of the reactor shroud taken from FIG. 63.
Figure 71:
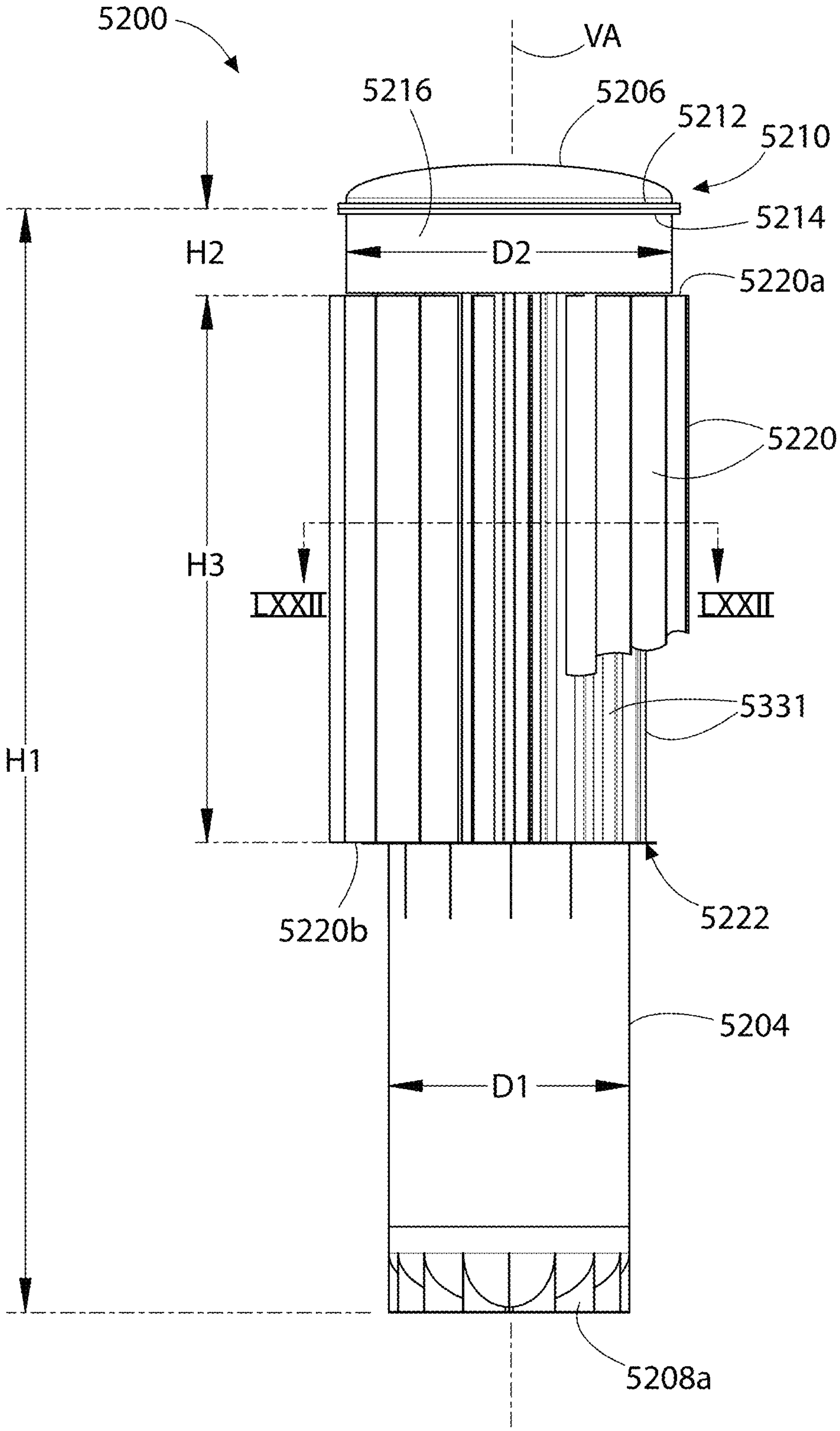
FIG. 71 is side elevation view of a finned primary reactor containment vessel according to the present disclosure which forms part of a nuclear reactor containment system, the lower portions of some fins being broken away in part to reveal vertical support columns and circumferential rib.

Referring to FIGS. 64, 65, and 69, each annular cavity 4040 may be connected to its adjoining cavities by one or more small fluid drain holes 4090. Drain holes 4090 are configured and arranged to hydraulically or fluidly interconnect all of the annular cavities 4040. The outer shell 4031 includes drain holes 4090 which fluidly connect the outermost annular cavity 4040 in shroud 4030 to the annular downcomer region 4028 in reactor vessel 4020. This allows the primary coolant water to enter the outermost cavity 4040 and then flow inwards successively through the plurality of drains holes in intermediate shells 4033 for filling all the annular cavities with the fluid. Submerging the multi-shell shroud 4030 body in the water-filled reactor vessel (e.g. demineralized primary coolant) will fill all of the internal annular cavities 4040 with water and expel virtually all entrapped air, thereby creating water-filled annular cavities. In one arrangement, the drains holes 4090 may be radially staggered as best shown in FIG. 69 so that the holes in one shell 4031 or 4033 do not radially align with holes in its neighboring shells. This forms a staggered flow path through the shroud 4030. The inner shell 4032 may not have drain holes 4090 and is solid in one embodiment. Preferably, a plurality of drain holes 4090 are spaced both circumferentially and longitudinally apart along the entire height or length of the shroud 4030 in each shroud segment 4030A-C Referring to FIG. 64, the inner and outer shells 4032 and 4031 may have thicknesses T2 and T1 respectively which are larger than the intermediate shells 4033 in one embodiment to stiffen and strengthen the shroud 4030. For example, in one representative example without limitation inner and outer shells 4032 and 4031 may have a plate thickness (T1 and T2) of about ¼ inch and intermediate shells 4033 may have a thickness T3 of about ⅛ inch. Each annular cavity 4040 has a depth D2 (measured in the radial direction transverse to longitudinal axis LA) which is less than the total depth D1 between the inner and outer shells 4032 and 4031. In one embodiment, the water-filled annular cavities 4040 may have a depth D2 that is less than the thickness T1-T3 of the shells 4031-4033. In one representative example without limitation, the depth of cavity 4040 may be about 3/16 inch. This arrangement provides a plurality of thin water films or chambers comprised of primary coolant sandwiched between the inner and outer shells 4032 and 4031 in the multi-shell weldment (MSW) shroud wall construction. The thin water films have an insulating effect for shroud 4030 which minimizes heat transfer between the hot riser region 4027 and colder downcomer region 4028 (see FIG. 63). Advantageously, the water films eliminate the need for traditional insulation materials in the shroud which may be wetted or otherwise damaged.

In one embodiment, inner shell 4032, outer shell 4031, and intermediate shells 4033 may have vertical heights or lengths which are substantially coextensive.

According to one aspect of the invention, the shroud 4030 may comprise a plurality of vertically stacked and coupled shroud sections or segments 4030A, 4030B, and 4030C. Referring to FIGS. 63 and 65, each shroud segment 4030A-C includes an upper end 4048, lower end 4049, an annular top closure plate 4036 attached to upper end 4048, and an annular bottom closure plate 4037 attached to lower end 4049. The top closure plate 4036 and bottom closure plate 4037 may be formed of a suitable metal such as steel. Corrosion resistant closure plates 4036, 4037 formed of coated or stainless steel may be used. Within each shroud segment 4030A-C, the annular cavities 4040 and shells 4031-4033 extend longitudinally between the top and bottom closure plates 4036 and 4037, and may have coextensive lengths or heights.

The outer shell 4031, inner shell 4032, and intermediate shells 4033 in each segment 4030A-C may be rigidly attached to the top and bottom closure plates, such as via a rigid connection formed by welding for structural strength. In one embodiment, the shells 4031-4033 may be hermetically seal joined to the top and bottom closure plates such as with full circumferential seal welds. This forms a water-tight joint between the shells 4031-4033 and the top and bottom closure plates 4036 and 4037, respectively.

Each shroud segment 4030A-C is a self-supporting structure which may be transported, raised, and lowered individually for ease of maneuvering and assembly to adjoining segments during fabrication of the shroud 4030. To facilitate handling the shroud segments 4030A-C individually, the top closure plates 4036 may include radially extending lifting lugs 4038 which include a rigging hole 4039 for attachment of lifting slings or hoists. A suitable number of lifting lugs 4038 circumferentially spaced apart at appropriate intervals are provided to properly and safely hoist the shroud segments 4030A-C. The weight of each shroud segment 4030A-C may be vertically supported by the shroud segment immediately below with the weight being transferred through the top and bottom closure plates 4036 and 4037, respectively. Accordingly, in some embodiments, the entire weight of the shroud segments 4030A-C may be supported by support plates 4042 (see, e.g. FIGS. 63 and 70).

In one embodiment, adjoining shroud segments 4030A-C may be coupled together at joints 4043 between segments via a plurality connectors 4076 such as of clamps 4050. Referring to FIGS. 63 and 65-67, clamps 4050 are configured to detachably join and engage the bottom closure plate 4037 of one shroud segment (e.g. 4030B) to top closure plate 4036 of the adjoining lower shroud segment (e.g. 4030C). Clamps 4050 each include a U-shaped body 4051 defining a recess 4052 configured to receive a mounting lug 4055 formed on bottom closure plate 4037 and a mating mounting lug 4056 formed on top closure plate 4036 as shown. Mounting lugs 4055 and 4056 are radially extending and circumferentially spaced apart on bottom and top closure plates 4037 and 4036, respectively. Each mounting lug 4055 is arranged in a pair and coaxially aligned along the longitudinal axis LA with a corresponding mounting lug 4056. In one embodiment, the mounting lugs 4055 and 4056 are integrally formed with and a unitary structural part of the bottom and top closure plates 4037, 4036. Accordingly, the mounting lugs 4055, 4056 may preferably be formed of metal similarly to bottom and top closure plates 4037, 4036 for structural strength.

In one arrangement, clamps 4050 may each be pivotably connected to a mounting lug 4055 on the bottom closure plate 4037 by a pivot pin 4054 which defines a pivot axis. Pivot pins 4054 are oriented parallel to longitudinal axis LA so that the clamp 4050 may be pivotably swung or moved transversely to the longitudinal axis LA between a closed locked position (see, e.g. FIG. 66) and open unlocked position (see, e.g. FIG. 67). In one embodiment, pivot pin 4054 is disposed proximate to one end 4058 of the clamp body 4051 and the opposing end 4057 is open to receive mounting lug 4056 of a top closure plate 4036 into recess 4052. Pivot pin 4054 extends axially through the mounting lug 4055 and the bottom and top flanges 4059, 4060 of clamp 4050.

Figure 66:
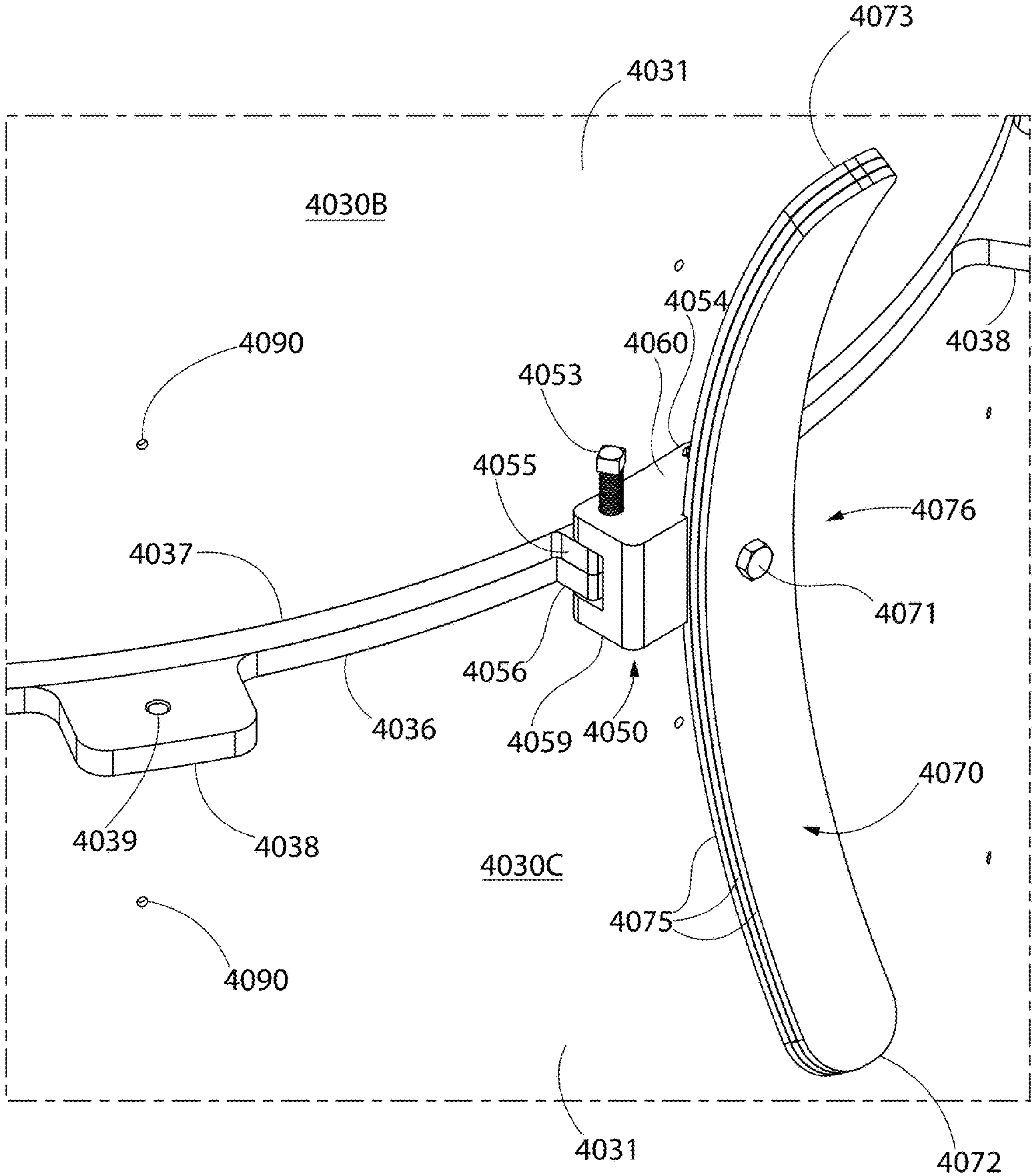
FIG. 66 is an enlarged perspective view a portion of a joint between two shroud sections showing a clamping mechanism in a locked or closed position.

To secure the clamp 4050 in the closed locked position shown in FIG. 66, a locking fastener such as set screw 4053 may be provided which is configured and arranged to engage a top surface of mounting flange 4055. Set screw 4053 may be threadably engaged in threaded bore 4061 formed in top flange 4060 of clamp 4050. The bore 4061 extends completely through top flange 4060 to allow the bottom end of the set screw shaft to be projected into or withdrawn from clamp recess 4051 for engaging or disengaging mounting flange 4055. Raising or lowering the set screw 4053 alternatingly disengages or engages the set screw with the mounting flange 4055. Set screw 4053 is preferably withdrawn from A method for assembling shroud 4030 comprised of segments 4030A-C using clamps 4050 will now be described. For brevity, assembly of shroud segment 4030B onto segment 4030C will be described; however, additional shroud segments may be mounted in a similar manner.

Referring to FIG. 65, a pair of shroud segments 4030B and 4030C are provided each configured as shown. Clamps 4050 are in the open unlocked position (see, e.g. FIG. 67). Shroud segment 4030B is first axially aligned along longitudinal axis LA with segment 4030C. Segment 4030B may then be rotated as needed to axially align mounting flanges 4055 on bottom closure plate 4037 with mounting flanges 4056 on top closure plate 4036 of segment 4030C. Each pair of mounting flanges 4055 and 4056 may be brought into abutting relationship. In the process, bottom closure plate 4037 is brought into abutting contact with top closure plate 4036 forming the joint 4043 between segments 4030B and 4030C. Clamp 4050 is then pivoted about pivot pin 4054. Mounting flanges 4055 and 4056 are inserted into recess 4051 of clamp 4050 between flanges 4059 and 4060 (see, e.g. FIG. 67). The set screw 4053 is then tightened to secure the clamp 4050 in the closed locked position shown in FIG. 67. It will be appreciated that the order of performing the steps of the fore steps may be varied. In addition, numerous variations of the foregoing assembly process are possible.

Referring to FIG. 64, a sealing gasket 4044 may be provided in between each pairing of a top closure plate 4036 and bottom closure plate 4037 to seal the interface at joint 4043 therebetween. In one embodiment, the gasket 4044 may be metallic formed of steel, aluminum, or another seal material suitable for the environment within a reactor vessel 4020. The gasket 4044 may be situated in an annular groove 4045 formed in the bottom closure plate 4037 as shown, or alternatively in the top closure plate 4036 (not shown), to seal water seepage at the interface of joint 4043 and also provide a certain level of verticality alignment capability during installation and joining of shroud segments 4030A-C. In one embodiment, gasket 4044 may be circular in transverse cross-section prior to the joint 4043 being closed which will compress and deform the gasket.

Figure 67:
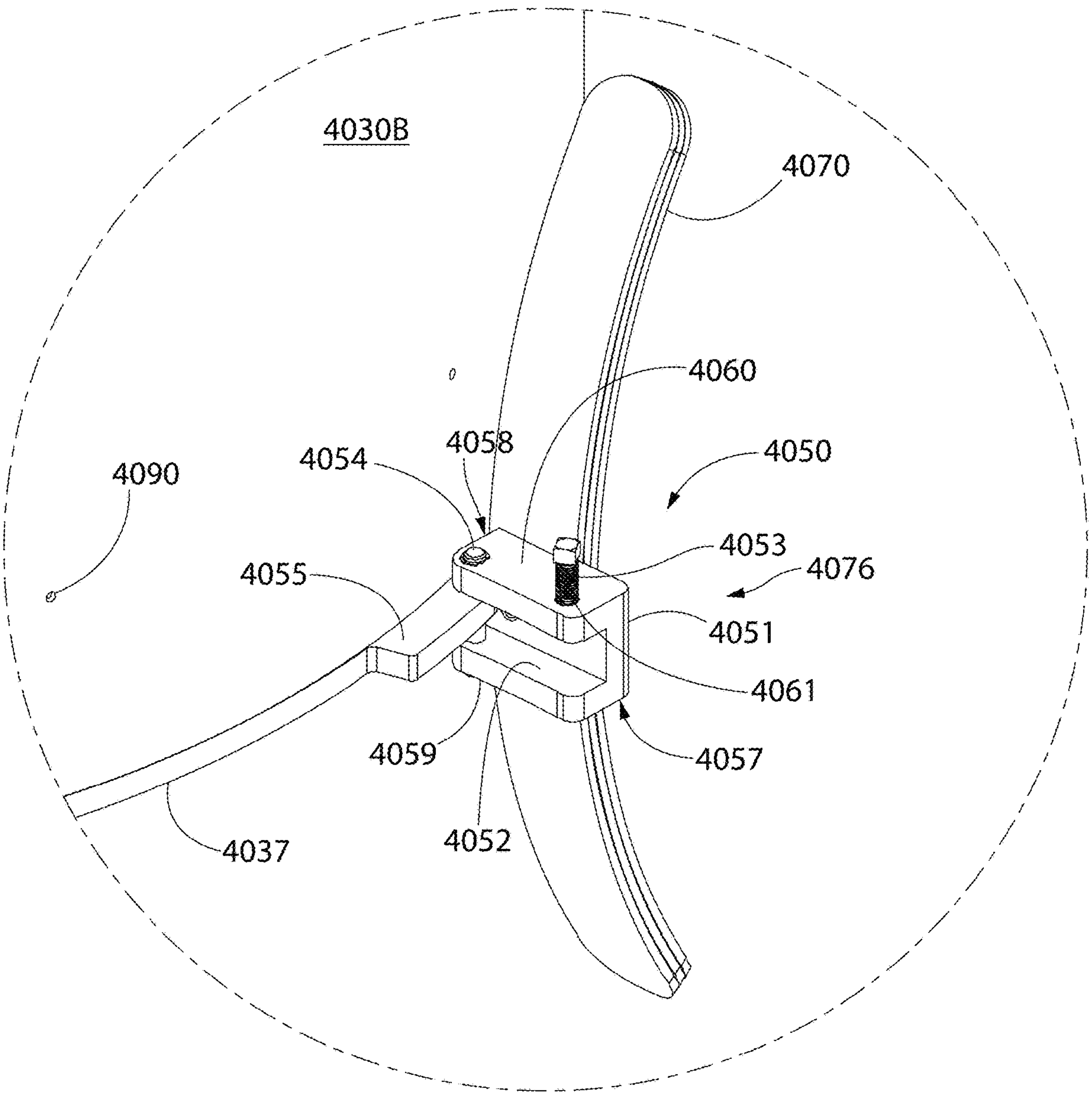
FIG. 67 is an enlarged perspective view of the bottom of a shroud section showing the clamping mechanism in an unlocked or open position.
Figure 68:
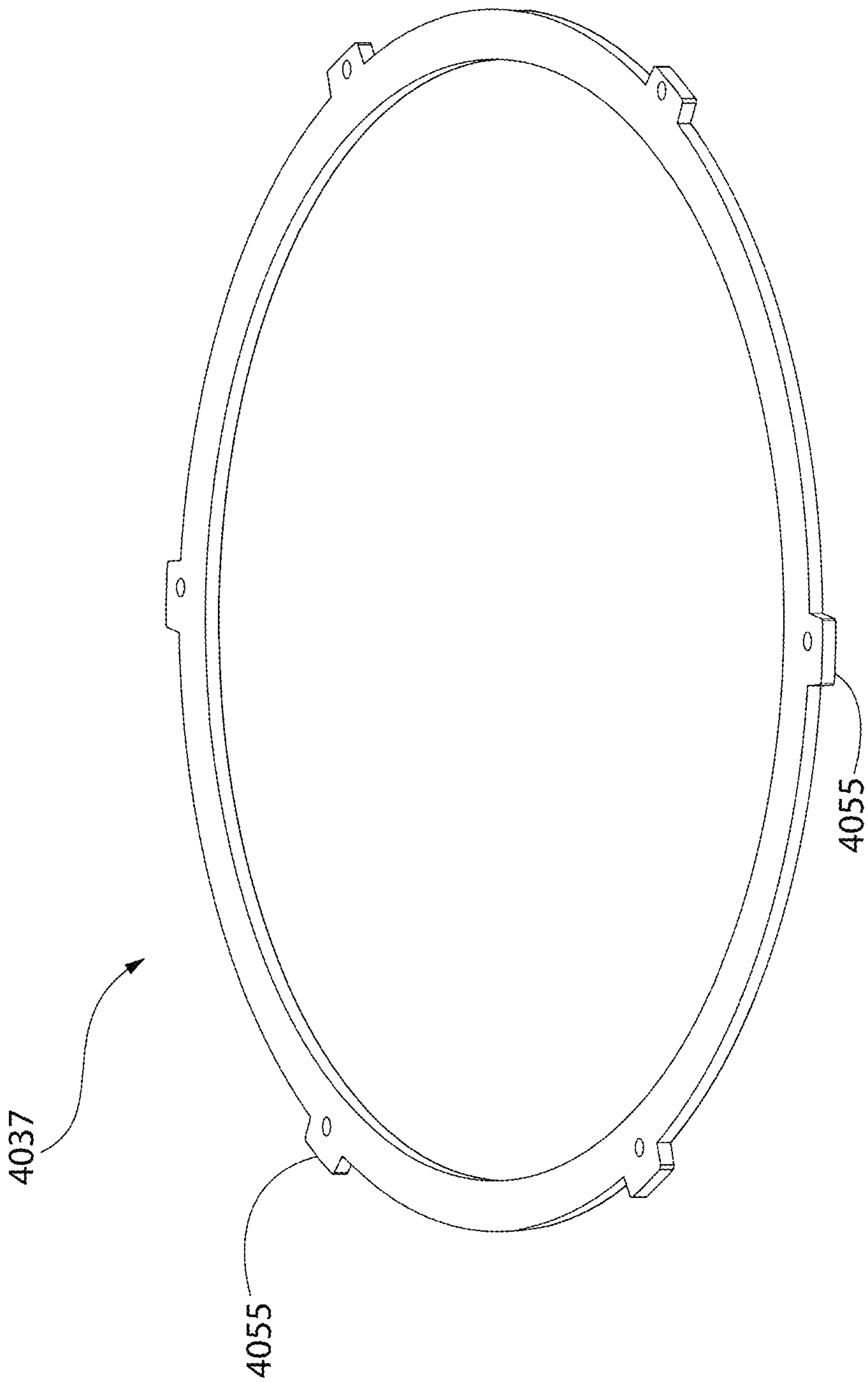
FIG. 68 is a perspective view of the annular bottom closure plate of the shroud of FIG. 63.

According to another aspect of the invention, a plurality of lateral seismic restraints such as restraint springs 4070 may be provided to horizontally support and protect the structural integrity of the shroud 4030 inside reactor vessel 4020 during a seismic event. In one embodiment as shown in FIGS. 66 and 67, a dual purpose connector 4076 (fastener or coupler for joints 4043 between shroud segments 4030A-C and lateral restraint) may be provided which combine the clamps 4050 and seismic springs 4070 into a single assembly.

Referring to FIGS. 63 and 65-67, seismic springs 4070 are disposed between and engage shroud 4030 and the interior surface 4074 of the reactor vessel 4020. A plurality of seismic springs 4070 are provided which are circumferentially spaced apart on the outer shell 4028 of the shroud 4030. In one embodiment, the seismic springs 4070 may be spaced apart at equal intervals.

Seismic springs 4070 are elastically deformable to absorb lateral movement of the shroud 4030. In one embodiment, each spring 4070 may be in the form of an arcuate leaf spring comprised of a plurality of individual leaves 4075 joined together to function as a unit. The leaves 4075 may be made of suitable metal such as spring steel having an elastic memory. Other appropriate materials however may be used. The thickness and number of leaves 4075 may be varied to adjust the desired spring force K of the spring 4070. Seismic springs are arranged with the concave side facing outwards away from shroud 4030 and towards reactor vessel 4020 when in the fully mounted and active operating position. Opposing ends 4072 and 4073 of each seismic spring 4070 are arranged to engage the interior surface 4074 of reactor vessel 4020.

In one embodiment, seismic springs 4070 may be rigidly attached to shroud 4030 to provide a stable mounting for proper operation and deflection of the spring to absorb energy during a seismic event. In one possible arrangement, seismic springs 4070 may be rigidly attached to clamps 4050 via a fastener 4071 or another suitable mounting mechanism. Spring 4070 may be fastened to clamp 4050 at the midpoint between ends 4072 and 4073 in one embodiment. Accordingly, seismic springs 4070 may be pivotably movable with clamps 4050 in the manner already described herein. In FIG. 63, for example, the seismic spring 4070 and clamp 4050 shown between shroud segments 4030A and 4030B is in the open unlocked position. In this same figure, seismic springs 4070 shown between shroud segments 4030B and 4030C are in the pivoted closed locked position in which the seismic springs 4070 are in the active operating position with ends 4072 and 4073 engaged with the reactor vessel 4020. During a seismic event when the shroud 4030 may shift laterally/horizontally in one or more directions, the seismic springs 4070 will deform and deflect assuming a more flattened configuration until the seismic load is removed, thereby returning the spring elastically to its original more arcuately-shaped configuration shown. In one embodiment, each joint 4043 between shroud segments 4030A, 4030B, and 4030C may include seismic springs 4070 to horizontal support the shroud 4030 intermittently along its entire height.

Underlying Operating Principle of the Shroud

The multi-shell weldment (MSW) design for shroud 4030 described herein is based on the principle in applied heat transfer which holds that an infinitely tall and infinitesimally thin closed end cavity filled with water would approximate the thru-wall thermal resistance equal to that of the metal walls and the water layer conductances. The governing dimensionless quantity that provides the measure of departure from the ideal (conduction only) is Rayleigh number defined as the product of the Prandtl number (Pr) and the Grashof number (Gr).

Heat transfer in a differentially heated vertical channel of height H and gap L is characterized by Nusselt number correlation as a function of Rayleigh number as follows:

$$Nu=0.039Ra^{1/3}$$

Where:

Nu is Nusselt Number (=hL/k)

h is heat transfer coefficient k is conductivity of water

Ra is Rayleigh number ($=g\beta\Delta TL^3\rho^2/\mu^2$)*Pr g is gravitational acceleration $\beta$ is coefficient of thermal expansion of water $\Delta T$ is hot-to-cold face temperature difference $\rho$ is density of water $\mu$ is water viscosity As Rayleigh number defined above exhibits an $L^3$ scaling it follows that gap reduction substantially affects Ra number. For example, a factor of 2 gap reduction cuts down Ra number by a factor of 8 (almost by an order of magnitude). Thus, engineering the shroud with small gaps has the desired effect of minimizing heat transfer. To further restrict heat transfer a multiple array of gaps are engineered in the shroud lateral space to have the effect of resistances in series. An example case is defined and described below to illustrate the concept.

Example

A Small Modular Reactor (SMR), such as the SMR-160 available from SMR, LLC of Jupiter, Florida, may have a particularly long shroud (e.g. over 70 feet). In such a case, the principal design concerns are: ease of installation, removal, verticality of the installed structure, mitigation of thermal expansion effects and protection from flow induced vibration of the multi-wall shell. The design features, described below to address the above concerns for such an SMR, can be applied to any shroud design.

A. Narrow cavity geometry: The height of each shroud (e.g. shroud segments 4030A-C) is approximately three times its nominal diameter. The innermost and outer most shells (e.g. shells 4032 and 4031) are relatively thick compared to the intermediate (inner) shells (e.g. shells 4033). The water cavity is less than 0.1% of the shroud's height. The table below provides representative dimensions for demonstrating the concept:

Dimensions of a typical shroud in SMR-160:

Inner diameter 71⅛ inch

Height 71 ft.

(Shroud built in four stacked sections (segments), 3×20 ft. (lower) and 1×11 ft. (top))

Number of water annuli (cavities) 9

Thickness of inner most shell ¼ inch

Thickness of outermost shell ¼ inch

Thickness of interior shell walls ⅛ inch

Thickness of water cavities 3/16 inch

B. Inter-shell connectivity: The number of spot nuggets (approximately 1 inch diameter) joining neighboring shells should be estimated by the following empirical formula: Number=(shroud diameter times height (in inches)/100). The spot welds should be spaced as uniformly as possible.

C. Handling: The top plate 4036 of each shroud segment 4030A-C is equipped with lift lugs 4038 for handling and installation. Typically, six lift lug locations, evenly spaced in the circumferential direction, will suffice.

D. Stacked construction: The multi-shell weldments (MSW) of shroud segments 4030A-C are stacked on top of each other as shown in FIGS. 63 and 64. One or more round metallic gaskets 4044 as described above are provided at the interface between the annular top and bottom closure plates 4036, 4037 of successive stacks of shroud segments 4030A-C. The gaskets 4044 situated in the annular grooves 4045 in the bottom closure plate 4037 serve to seal water seepage at the interface of joint 4043 and also provide a certain level of verticality alignment capability.

E. Thermal expansion: The axial thermal expansion of a tall stack of shroud segments 4030A-C will cause severe stresses in adjoining structures such as the return piping that delivers the reactor coolant from the steam generator to the reactor's outer annulus (downcomer). To mitigate the thermal stresses, the upper region of the shroud may be equipped with a multi-ply bellows type expansion joint.

F. Seismic restraints: The junctions or joints 4043 of the MSW shroud segments 4030A-C provide the "hard" locations to join them and to secure them against lateral movement during earthquakes. The dual purpose connector 4076 (fastener and lateral restraint) design concept shown in FIGS. 65-67 comprising the clamps 4050 and seismic springs 4070 as described herein provide the joining and lateral restraint functionality. This dual purpose connector 4076 has the following capabilities:

(i) The two interfacing closure plates 4036 and 4037 are prevented from significant rotation or separation from each other during earthquakes.

(ii) The connector 4076 is amenable to remote installation and removal.

(iii) The connector 4076 is equipped with the seismic springs 4070 (e.g. leaf springs) to enable it to establish a soft contact or a small clearance with the reactor's inside wall under operating condition (hot).

A set of three connectors 4076, equipment-spaced in the circumferential direction at each closure plate 4036, 4036 elevation, is deemed to be adequate for the SMR described above. Additional connectors may be employed in other reactor applications at the designer's option.

Performance assessment: The efficacy of the MSW design is demonstrated by the case of the SMR-160 described above. Calculations show that the decrease in the hot leg temperature (primary coolant inside shroud 4030) using water-filled annular cavities 4040 due to heat loss across the shroud is merely 0.355 deg. F. As a point of reference, the idealized temperature loss would be 0.092 deg. F. if the water layers were instead omitted and "solid," i.e., heat transferred only by conduction through the shroud. It can be seen that the Rayleigh effect, responsible for the movement of water in closed cavities, has been largely suppressed by the MSW design of shroud 4030.

Extension to vessels and conduits: The concept of establishing a thin water layer inside pipes (hereafter called "water lining") carrying heated water is proposed to be employed at the various locations in the power plant where minimizing heat loss from the pipe is desired. For example, the lines carrying hot and cooled reactor coolant are water lined to limit heat loss. Water lining is achieved by the following generic construction:

(i) An inner thin walled (liner) pipe that is nominally concentric with the main pipe. The liner pipe has a few small holes to make the narrow annulus communicate with the main flow space.

(ii) The small gap between the main and liner pipes is held in place by small spacer nuggets attached to the outside surface of the liner pipe.

(iii) In piping runs subject to in-service inspection of pressure boundary welds, the liner pipe is discontinued at the location of such welds.

The foregoing water lining approach is also proposed to be used to reduce thermal shock to pressure retaining vessel/nozzle junctions (locations of gross structural discontinuity) where large secondary stresses from pressure exist. This is true of penetrations in the reactor vessel, steam generator as well as the superheater. Water lined pressure boundaries will experience significantly reduced fatigue inducing cyclic stresses which will help extend the service life of the owner plant.

Inventive Concept #5

Reference is made generally to FIGS. 71-93 which are relevant to Inventive Concept #5 described below.

Referring to FIGS. 71-85, a nuclear reactor containment system 5100 according to the present disclosure is shown. The system 5100 generally includes an inner containment structure such as containment vessel 5200 and an outer containment enclosure structure (CES) 5300 collectively defining a containment vessel-enclosure assembly 5200-5300. The containment vessel 5200 and containment enclosure structure (CES) 5300 are vertically elongated and oriented, and define a vertical axis VA.

Figure 76:
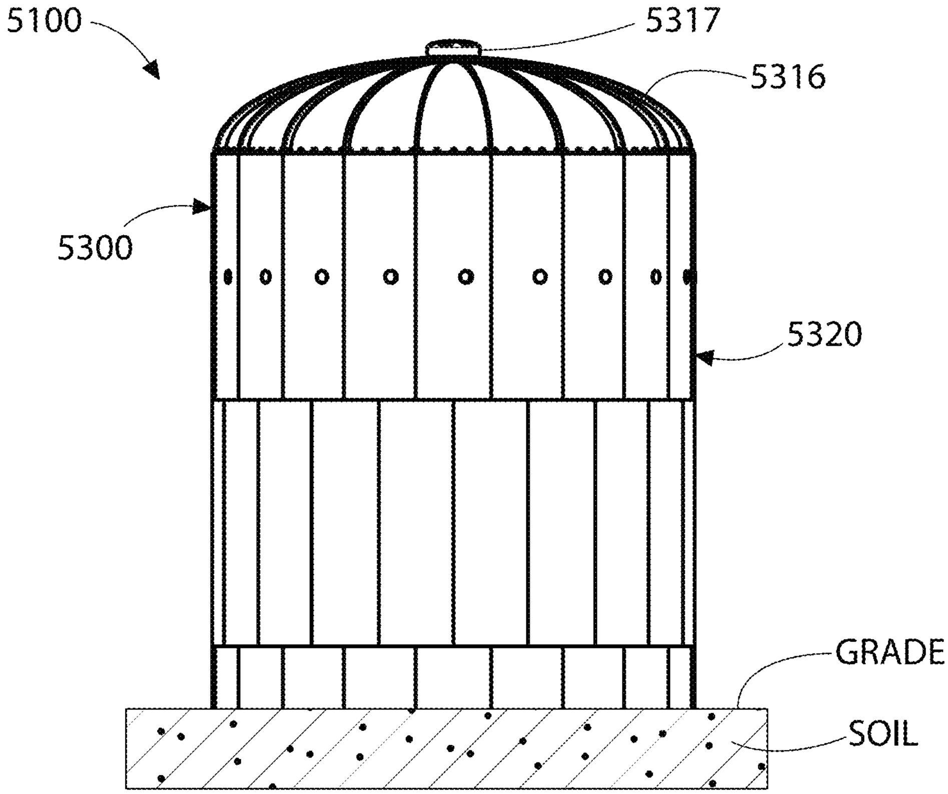
FIG. 76 is a side elevation view of nuclear reactor containment system as installed with the outer containment enclosure structure (CES) being visible above grade.
Figure 77:
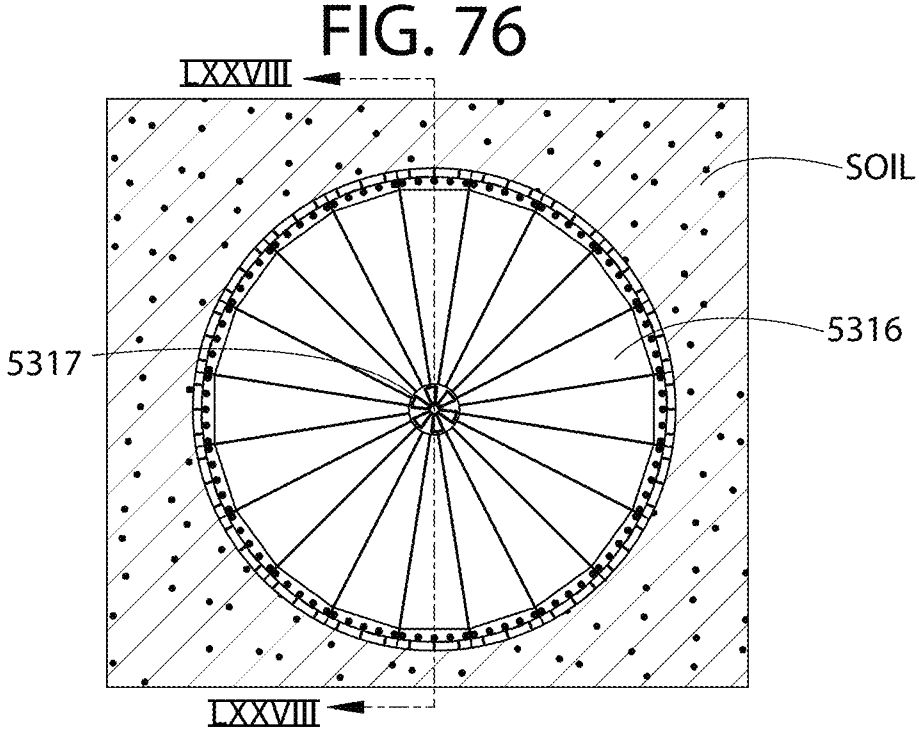
FIG. 77 is a top plan view thereof.
Figure 78:
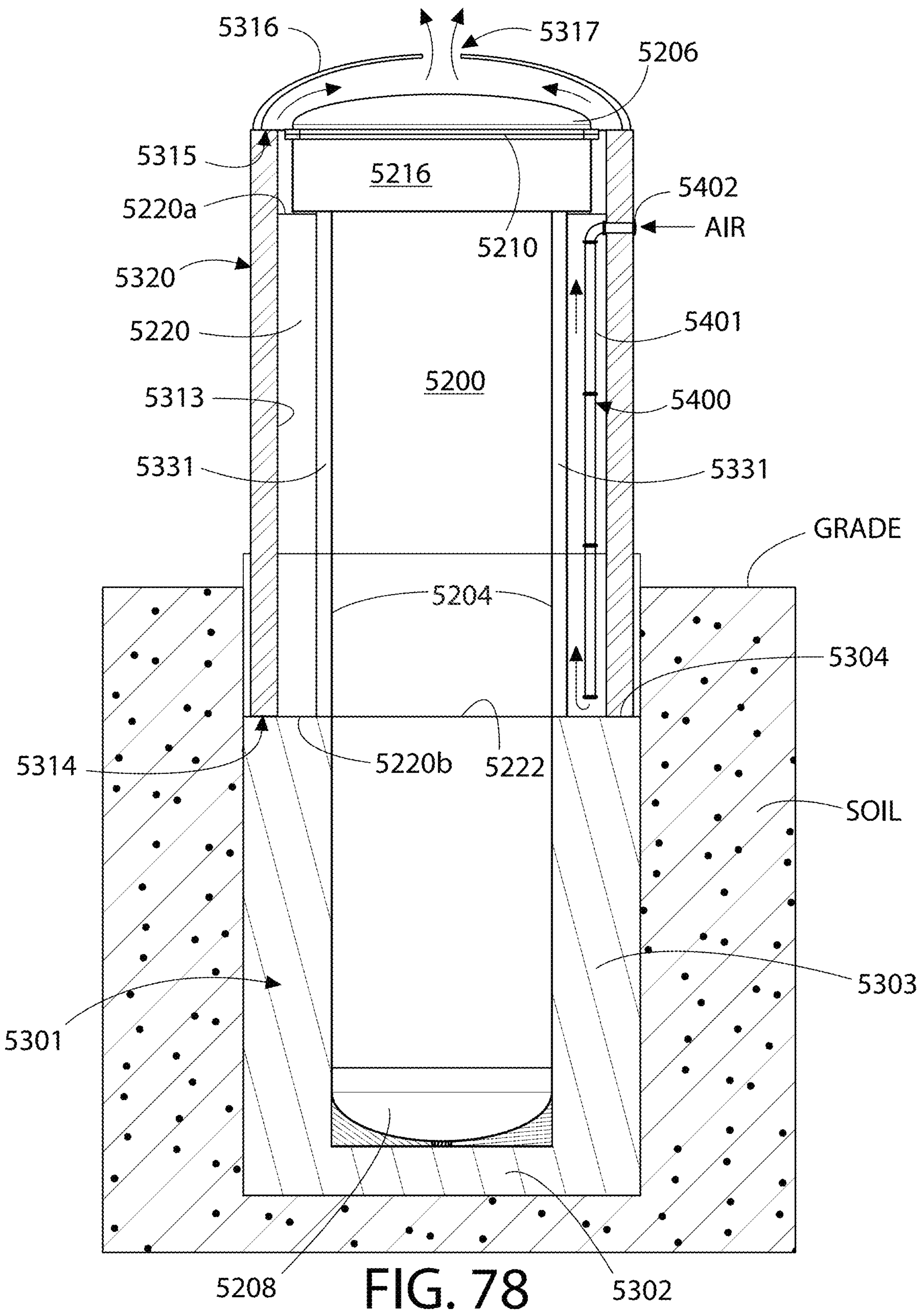
FIG. 78 is longitudinal cross-sectional view thereof taken along line VIII-VIII in FIG. 7 showing both above and below grade portions of the nuclear reactor containment system.
Figure 79:
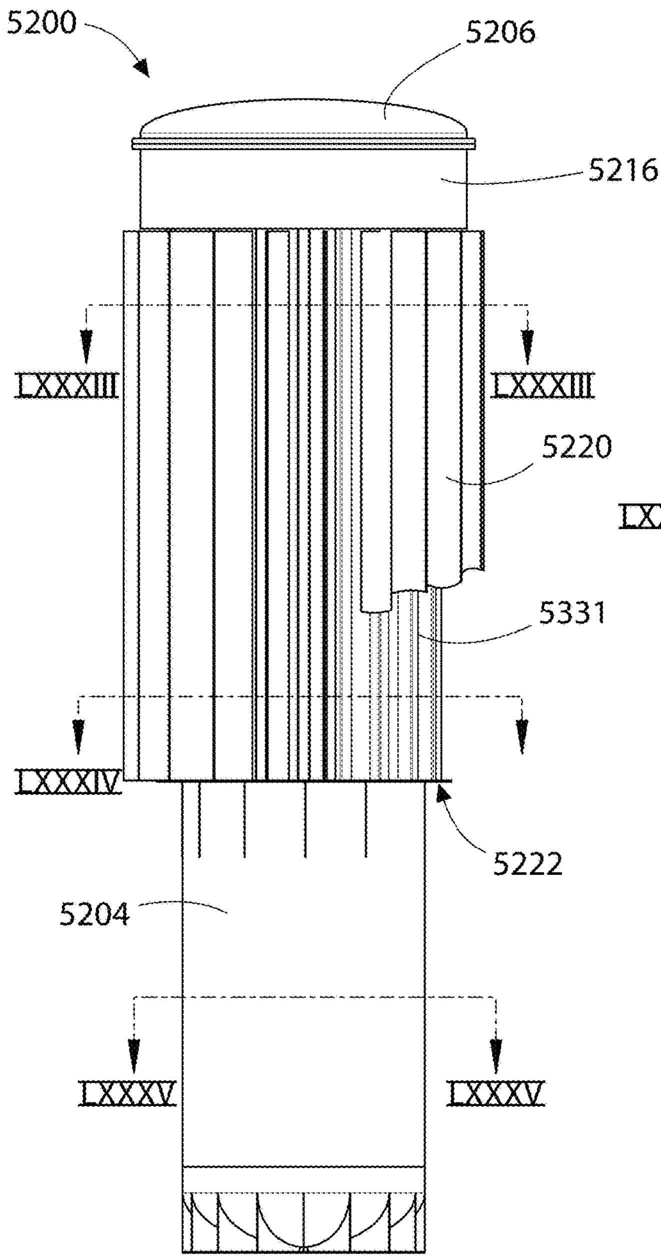
FIG. 79 is side elevation view of the primary reactor containment vessel showing various cross-section cuts to reveal equipment housed in and additional details of the containment vessel.
Figure 80:
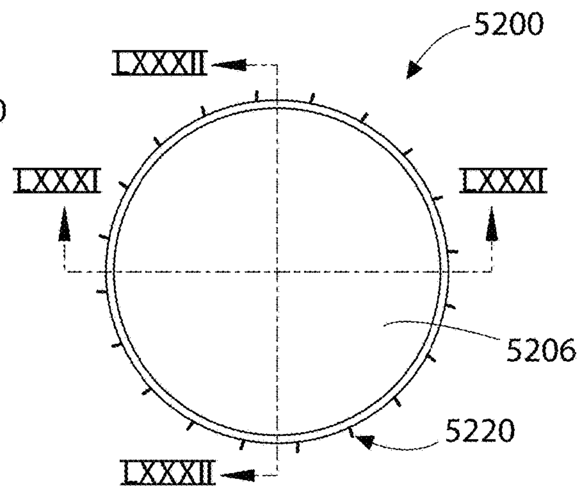
FIG. 80 is a top plan view thereof.

In one embodiment, the containment vessel-enclosure assembly 5200-5300 is configured to be buried in the subgrade at least partially below grade (see also FIGS. 76-78). The containment vessel-enclosure assembly 5200-5300 may be supported by a concrete foundation 5301 comprised of a bottom slab 5302 and vertically extending sidewalls 5303 rising from the slab forming a top base mat 5304. The sidewalls 5303 may circumferentially enclose containment vessel 5200 as shown wherein a lower portion of the containment vessel may be positioned inside the sidewalls. In some embodiments, the sidewalls 5303 may be poured after placement of the containment vessel 5200 on the bottom slab 5302 (which may be poured and set first) thereby completely embedding the lower portion of the containment vessel 5200 within the foundation. The foundation walls 5303 may terminate below grade in some embodiments as shown to provide additional protection for the containment vessel-enclosure assembly 5200-5300 from projectile impacts (e.g. crashing plane, etc.). The foundation 5301 may have any suitable configuration in top plan view, including without limitation polygonal (e.g. rectangular, hexagon, circular, etc.).

In one embodiment, the weight of the containment vessel 5200 may be primarily supported by the bottom slab 5302 on which the containment vessel rests and the containment enclosure structure (CES) 5300 may be supported by the base mat 5304 formed atop the sidewalls 5303 of the foundation 5301. Other suitable vessel and containment enclosure structure (CES) support arrangements may be used.

With continuing reference to FIGS. 71-85, the containment structure vessel 5200 may be an elongated vessel including a hollow cylindrical shell 5204 with circular transverse cross-section defining an outer diameter D1, a top head 5206, and a bottom head 5208. In one embodiment, the containment vessel 5200 (i.e. shell and heads) may be made from a suitably strong and ductile metallic plate and bar stock that is readily weldable (e.g. low carbon steel). In one embodiment, a low carbon steel shell 5204 may have a thickness of at least 1 inch. Other suitable metallic materials including various alloys may be used.

The top head 5206 may be attached to the shell 5204 via a flanged joint 5210 comprised of a first annular flange 5212 disposed on the lower end or bottom of the top head and a second mating annular flange 5214 disposed on the upper end or top of the shell. The flanged joint 5210 may be a bolted joint, which optionally may further be seal welded after assembly with a circumferentially extending annular seal weld being made between the adjoining flanges 5212 and 5214.

The top head 5206 of containment vessel 5200 may be an ASME (American Society of Mechanical Engineers) dome-shaped flanged and dished head to add structural strength (i.e. internal pressure retention and external impact resistance); however, other possible configurations including a flat top head might be used. The bottom head 5208 may similarly be a dome-shaped dished head or alternatively flat in other possible embodiments. In one containment vessel construction, the bottom head 5208 may be directly welded to the lower portion or end of the shell 5204 via an integral straight flange (SF) portion of the head matching the diameter of shell. In one embodiment, the bottom of the containment vessel 5200 may include a ribbed support stand **5208*a* or similar structure attached to the bottom head 5208 to help stabilize and provide level support for the containment vessel on the slab 5302 of the foundation 5301**, as further described herein.

In some embodiments, the top portion 5216 of the containment vessel shell 5204 may be a diametrically enlarged segment of the shell that forms a housing to support and accommodate a polar crane (not shown) for moving equipment, fuel, etc. inside the containment vessel. This will provide crane access to the very inside periphery of the containment vessel and enable placement of equipment very close to the periphery of the containment vessel 5200 making the containment vessel structure compact. In one configuration, therefore, the above grade portion of the containment vessel 5200 may resemble a mushroom-shaped structure.

In one possible embodiment, the enlarged top portion 5216 of containment vessel 5200 may have an outer diameter D2 that is larger than the outer diameter D1 of the rest of the adjoining lower portion 5218 of the containment vessel shell 5204. In one non-limiting example, the top portion 5216 may have a diameter D2 that is approximately 10 feet larger than the diameter D1 of the lower portion 5218 of the shell 5204. The top portion 5216 of shell 5204 may have a suitable height H2 selected to accommodate the polar crane with allowance for working clearances which may be less than 50% of the total height H1 of the containment vessel 5200. In one non-limiting example, approximately the top ten feet of the containment vessel 5200 (H2) may be formed by the enlarged diameter top portion 5216 in comparison to a total height H1 of 5200 feet of the containment vessel. The top portion 5216 of containment vessel 5200 may terminate at the upper end with flange 5214 at the flanged connection to the top head 5206 of the containment vessel.

In one embodiment, the diametrically enlarged top portion 5216 of containment vessel 5200 has a diameter D2 which is smaller than the inside diameter D3 of the containment enclosure structure (CES) 5300 to provide a (substantially) radial gap or secondary annulus 5330 (see, e.g.

Figure 74:
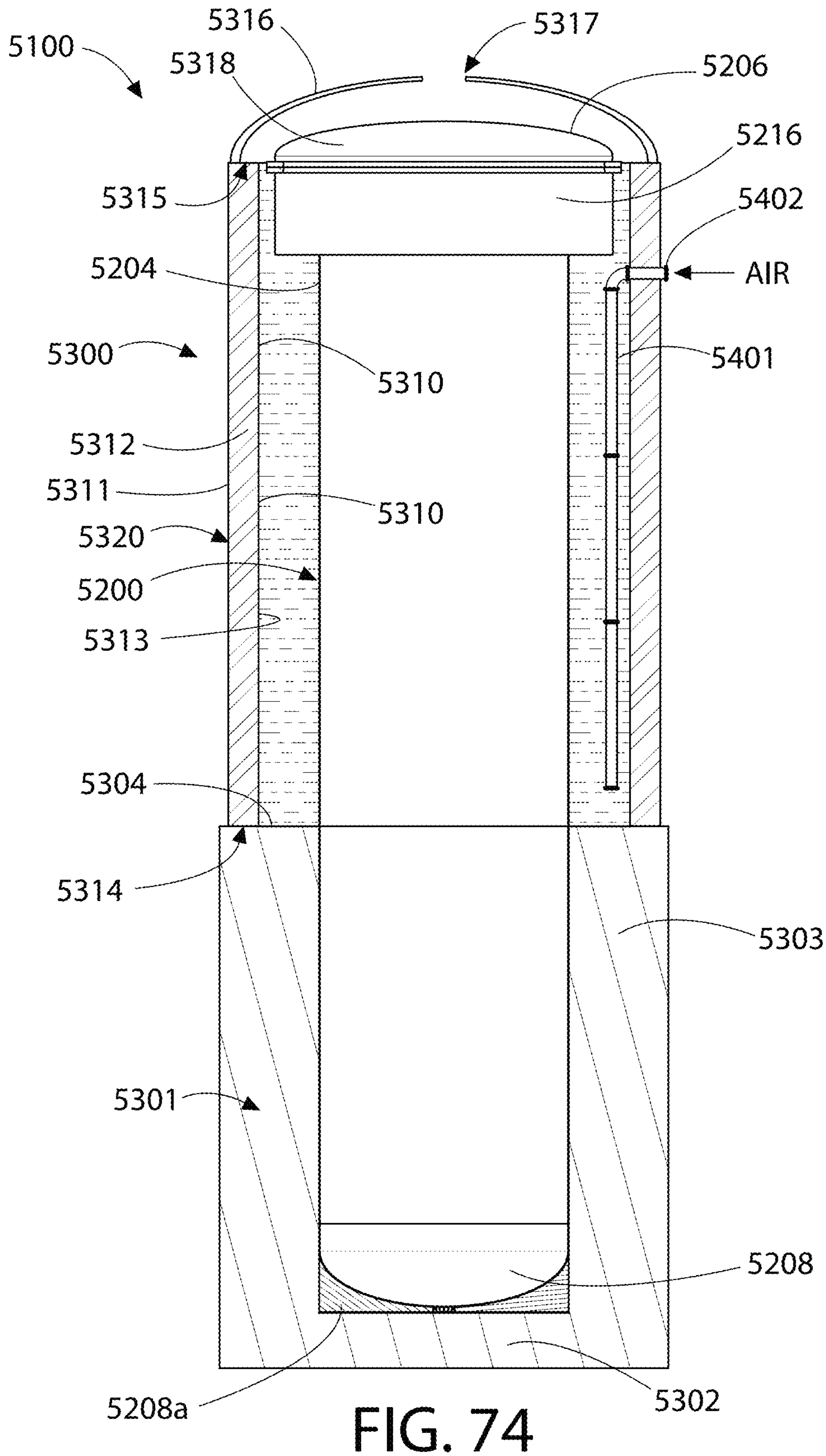
FIG. 74 is a longitudinal cross-sectional view of the nuclear reactor containment system showing the containment vessel of FIG. 1 and outer containment enclosure structure (CES) with water filled annular reservoir formed between the vessel and enclosure.

FIG. 74). This provides a cushion of space or buffer region between the containment enclosure structure (CES) 5300 and containment vessel top portion 5216 in the advent of a projectile impact on the containment enclosure structure (CES). Furthermore, the annulus 5330 further significantly creates a flow path between primary annulus 5313 (between the shells of the containment enclosure structure (CES) 5300 and containment vessel 5200) and the head space 5318 between the containment enclosure structure (CES) dome 5316 and top head 5206 of the containment vessel 5200 for steam and/or air to be vented from the containment enclosure structure (CES) as further described herein. Accordingly, the secondary annulus 5330 is in fluid communication with the primary annulus 5313 and the head space 5318 which in turn is in fluid communication with vent 5317 which penetrates the dome 5316. In one embodiment, the secondary annulus 5330 has a smaller (substantially) radial width than the primary annulus 5313.

Referring to FIGS. 71-74, the containment enclosure structure (CES) 5300 may be double-walled structure in some embodiments having sidewalls 5320 formed by two (substantially) radially spaced and interconnected concentric shells 5310 (inner) and 5311 (outer) with plain or reinforced concrete 5312 installed in the annular space between them. The concentric shells 5310, 5311 may be made of any suitably strong material, such as for example without limitation ductile metallic plates that are readily weldable (e.g. low carbon steel). Other suitable metallic materials including various alloys may be used. In one embodiment, without limitation, the double-walled containment enclosure structure (CES) 5300 may have a concrete 5312 thickness of 6 feet or more which ensures adequate ability to withstand high energy projectile impacts such as that from an airliner.

The containment enclosure structure (CES) 5300 circumscribes the containment vessel shell 5204 and is spaced (substantially) radially apart from shell 5204, thereby creating primary annulus 5313. Annulus 5313 may be a water-filled in one embodiment to create a heat sink for receiving and dissipating heat from the containment vessel 5200 in the case of a thermal energy release incident inside the containment vessel. This water-filled annular reservoir preferably extends circumferentially for a full 360 degrees in one embodiment around the perimeter of upper portions of the containment vessel shell 5204 lying above the concrete foundation 5301. FIG. 74 shows a cross-section of the water-filled annulus 5313 without the external (substantially) radial fins 5221 in this figure for clarity. In one embodiment, the annulus 5313 is filled with water from the base mat 5304 at the bottom end 5314 to approximately the top end 5315 of the concentric shells 5310, 5311 of the containment enclosure structure (CES) 5300 to form an annular cooling water reservoir between the containment vessel shell 5204 and inner shell 5310 of the containment enclosure structure (CES). This annular reservoir may be coated or lined in some embodiments with a suitable corrosion resistant material such as aluminum, stainless steel, or a suitable preservative for corrosion protection. In one representative example, without limitation, the annulus 5313 may be about 10 feet wide and about 100 feet high.

In one embodiment, the containment enclosure structure (CES) 5300 includes a steel dome 5316 that is suitably thick and reinforced to harden it against crashing aircraft and other incident projectiles. The dome 5316 may be removably fastened to the shells 5310, 5311 by a robust flanged joint 5318. In one embodiment, the containment enclosure structure (CES) 5300 is entirely surrounded on all exposed above grade portions by the containment enclosure structure (CES) 5300, which preferably is sufficiently tall to provide protection for the containment vessel against aircraft hazard or comparable projectile to preserve the structural integrity of the water mass in the annulus 5313 surrounding the containment vessel. In one embodiment, as shown, the containment enclosure structure (CES) 5300 extends vertically below grade to a substantial portion of the distance to the top of the base mat 5304.

The containment enclosure structure (CES) 5300 may further include at least one rain-protected vent 5317 which is in fluid communication with the head space 5318 beneath the dome 5316 and water-filled annulus 5313 to allow water vapor to flow, escape, and vent to atmosphere. In one embodiment, the vent 5317 may be located at the center of the dome 5316. In other embodiments, a plurality of vents may be provided spaced (substantially) radially around the dome 5316. The vent 5317 may be formed by a short section of piping in some embodiments which is covered by a rain hood of any suitable configuration that allows steam to escape from the containment enclosure structure (CES) but minimizes the ingress of water.

In some possible embodiments, the head space 5318 between the dome 5316 and top head 5206 of the containment vessel 5200 may be filled with an energy absorbing material or structure to minimize the impact load on the containment enclosure structure (CES) dome 5316 from a crashing (falling) projecting (e.g. airliner, etc.). In one example, a plurality of tightly-packed undulating or corrugated deformable aluminum plates may be disposed in part or all of the head space to form a crumple zone which will help absorb and dissipate the impact forces on the dome 5316.

Referring primarily to FIGS. 71-75 and 78-87, the buried portions of the containment vessel 5200 within the concrete foundation 5301 below the base mat 5304 may have a plain shell 5204 without external features. Portions of the containment vessel shell 5204 above the base mat 5304, however, may include a plurality of longitudinal external (substantially) radial ribs or fins 5220 which extend axially (substantially) parallel to vertical axis VA of the containment vessel-enclosure assembly 5200-5300. The external longitudinal fins 5220 are spaced circumferentially around the perimeter of the containment vessel shell 5204 and extend (substantially) radially outwards from the containment vessel.

The ribs 5220 serve multiple advantageous functions including without limitation (1) to stiffen the containment vessel shell 5204, (2) prevent excessive "sloshing" of water reserve in annulus 5313 in the occurrence of a seismic event, and (3) significantly to act as heat transfer "fins" to dissipate heat absorbed by conduction through the shell 5204 to the environment of the annulus 5313 in the situation of a fluid/steam release event in the containment vessel.

Accordingly, in one embodiment to maximize the heat transfer effectiveness, the longitudinal fins 5220 extend vertically for substantially the entire height of the water-filled annulus 5313 covering the effective heat transfer surfaces of the containment vessel 5200 (i.e. portions not buried in concrete foundation) to transfer heat from the containment vessel 5200 to the water reservoir, as further described herein. In one embodiment, the external longitudinal fins 5220 have upper horizontal ends **5220*a* which terminate at or proximate to the underside or bottom of the larger diameter top portion 5216 of the containment vessel 5200, and lower horizontal ends 5220*b* which terminate at or proximate to the base mat 5304 of the concrete foundation 5301**. In one embodiment, the external longitudinal fins 5220 may have a height H3 which is equal to or greater than one half of a total height of the shell of the containment vessel.

In one embodiment, the upper horizontal ends 5220a of the longitudinal fins 5220 are free ends not permanently attached (e.g. welded) to the containment vessel 5200 or other structure. At least part of the lower horizontal ends 5220b of the longitudinal fins 5220 may abuttingly contact and rest on a horizontal circumferential rib 5222 welded to the exterior surface of the containment vessel shell 5204 to help support the weight of the longitudinal fins 5220 and minimize stresses on the longitudinal rib-to-shell welds. Circumferential rib 5222 is annular in shape and may extend a full 360 degrees completely around the circumferential of the containment vessel shell 204. In one embodiment, the circumferential rib 5222 is located to rest on the base mat 5304 of the concrete foundation 5301 which transfers the loads of the longitudinal fins 5220 to the foundation. The longitudinal fins 5220 may have a lateral extent or width that projects outwards beyond the outer peripheral edge of the circumferential rib 5222. Accordingly, in this embodiment, only the inner portions of the lower horizontal end 5220b of each rib 5220 contacts the circumferential rib 5222. In other possible embodiments, the circumferential rib 5222 may extend (substantially) radially outwards far enough so that substantially the entire lower horizontal end 5220b of each longitudinal rib 5220 rests on the circumferential rib 5222. The lower horizontal ends 5220b may be welded to the circumferential rib 5222 in some embodiments to further strengthen and stiffen the longitudinal fins 5220.

The external longitudinal fins 5220 may be made of steel (e.g. low carbon steel), or other suitable metallic materials including alloys which are each welded on one of the longitudinally-extending sides to the exterior of the containment vessel shell 5204. The opposing longitudinally-extending side of each rib 5220 lies proximate to, but is preferably not permanently affixed to the interior of the inner shell 5310 of the containment enclosure structure (CES) 5300 to maximize the heat transfer surface of the ribs acting as heat dissipation fins. In one embodiment, the external longitudinal fins 5220 extend (substantially) radially outwards beyond the larger diameter top portion 5216 of the containment vessel 5200 as shown. In one representative example, without limitation, steel ribs 5220 may have a thickness of about 1 inch. Other suitable thickness of ribs may be used as appropriate. Accordingly, in some embodiments, the ribs 5220 have a radial width that is more than 10 times the thickness of the ribs.

Figure 72:
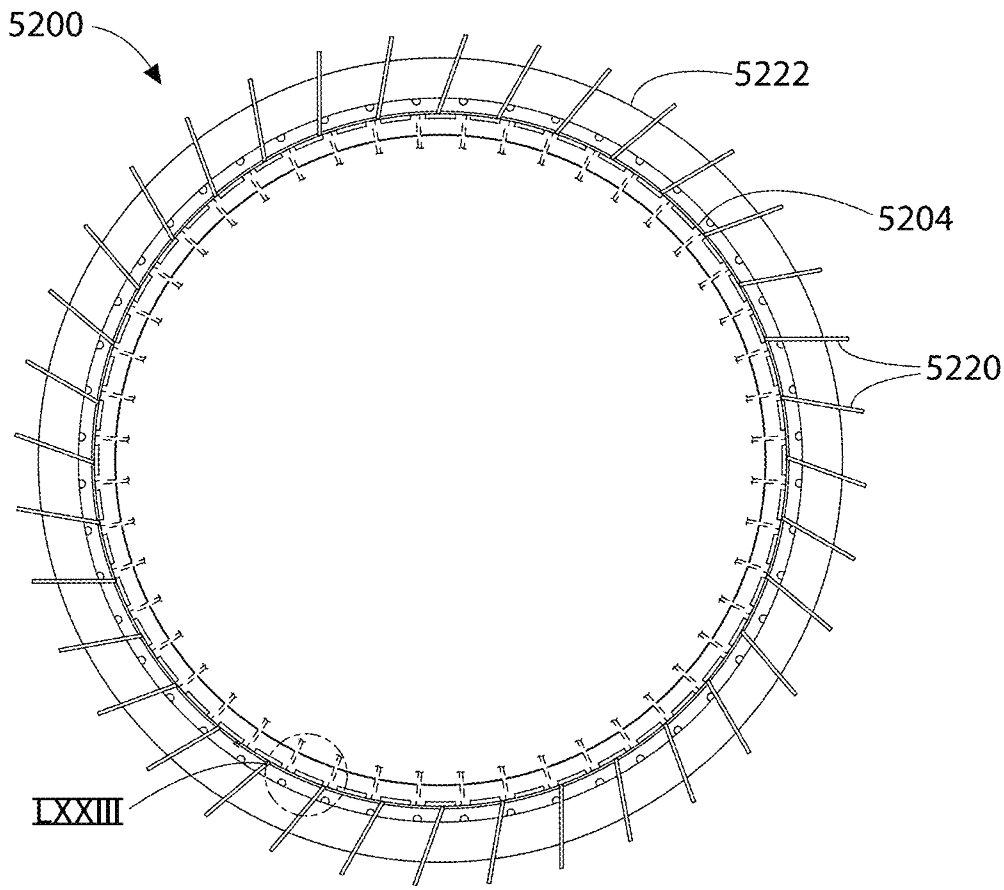
FIG. 72 is transverse cross-sectional view thereof taken along line LXXII.
Figure 73:
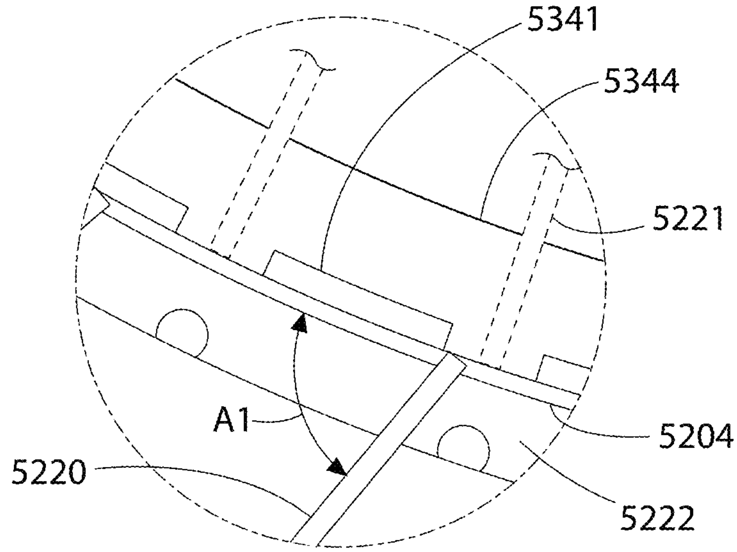
FIG. 73 is a detail of item III in FIG. 2.
Figure 75:
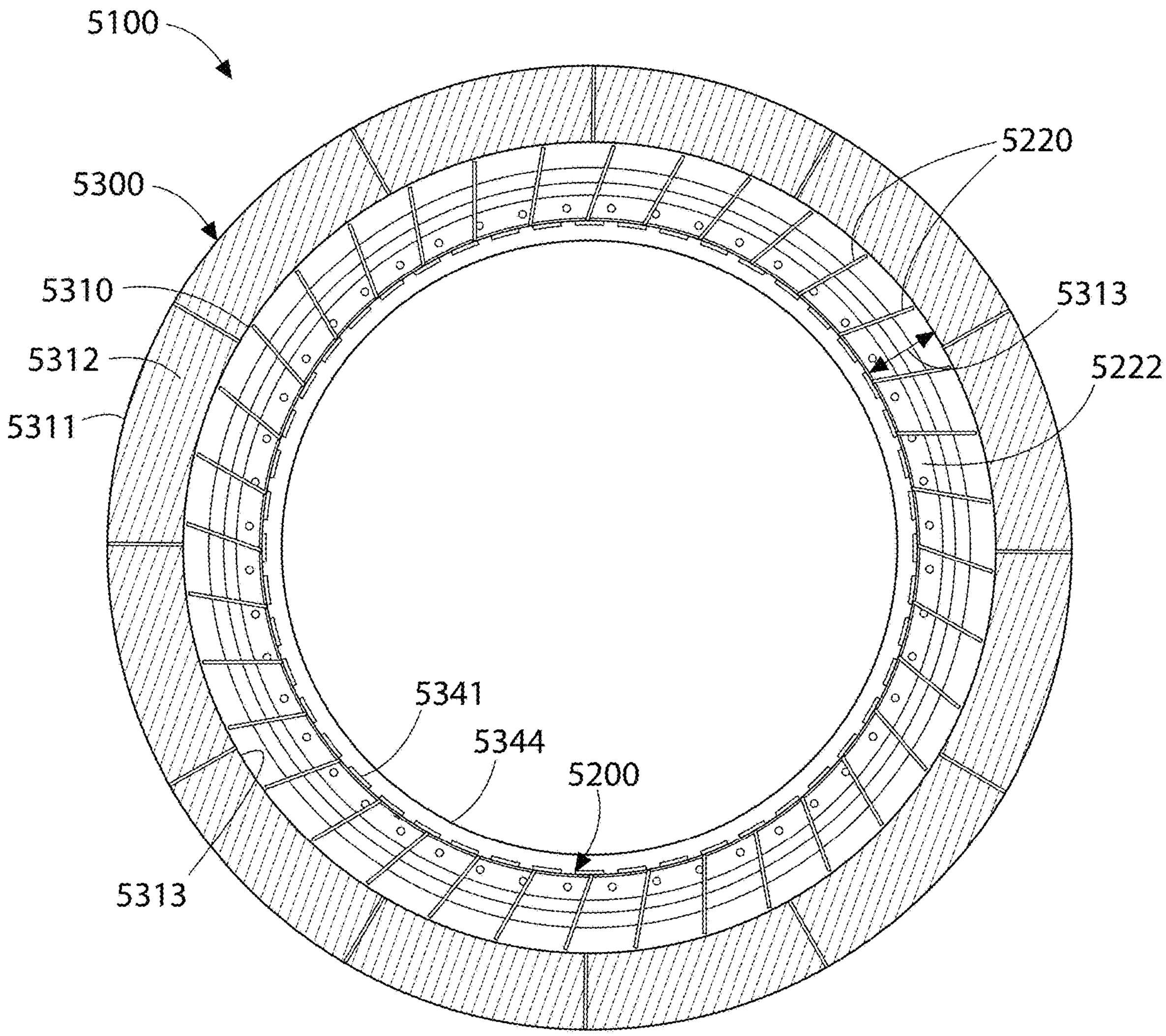
FIG. 75 is a longitudinal cross-sectional view through the containment vessel and containment enclosure structure (CES)

In one embodiment, the longitudinal fins 5220 are oriented at an oblique angle A1 to containment vessel shell 5204 as best shown in FIGS. 72-73 and 75. This orientation forms a crumple zone extending 5360 degrees around the circumference of the containment vessel 5200 to better resist projectile impacts functioning in cooperation with the outer containment enclosure structure (CES) 5300. Accordingly, an impact causing inward deformation of the containment enclosure structure (CES) shells 5210, 5211 will bend the longitudinal fins 5220 which in the process will distribute the impact forces preferably without direct transfer to and rupturing of the inner containment vessel shell 5204 as might possibly occur with ribs oriented 90 degrees to the containment vessel shell 5204. In other possible embodiments, depending on the construction of the containment enclosure structure (CES) 5300 and other factors, a perpendicular arrangement of ribs 5220 to the containment vessel shell 5204 may be appropriate.

In one embodiment, referring to FIGS. 76-78, portions of the containment vessel shell 5204 having and protected by the external (substantially) radial fins 5220 against projectile impacts may extend below grade to provide protection against projectile strikes at or slightly below grade on the containment enclosure structure (CES) 5300. Accordingly, the base mat 5304 formed at the top of the vertically extending sidewalls 5303 of the foundation 5301 where the fins 5220 terminate at their lower ends may be positioned a number of feet below grade to improve impact resistance of the nuclear reactor containment system.

In one embodiment, the containment vessel 5200 may optionally include a plurality of circumferentially spaced apart internal (substantially) radial fins 5221 attached to the interior surface of the shell 5204 (shown as dashed in FIGS. 72 and 73). Internal fins 5221 extend (substantially) radially inwards from containment vessel shell 5204 and longitudinally in a vertical direction of a suitable height. In one embodiment, the internal (substantially) radial fins 5221 may have a height substantially coextensive with the height of the water-filled annulus 5313 and extend from the base mat 5304 to approximately the top of the shell 5204. In one embodiment, without limitation, the internal fins 5221 may be oriented substantially perpendicular (i.e. 90 degrees) to the containment vessel shell 5204. Other suitable angles and oblique orientations may be used. The internal fins function to both increase the available heat transfer surface area and structurally reinforce the containment vessel shell against external impact (e.g. projectiles) or internal pressure increase within the containment vessel 5200 in the event of a containment pressurization event (e.g. LOCA or reactor scram). In one embodiment, without limitation, the internal fins 5221 may be made of steel.

Referring to FIGS. 71-85, a plurality of vertical structural support columns 5331 may be attached to the exterior surface of the containment vessel shell 5204 to help support the diametrically larger top portion 5216 of containment vessel 5200 which has peripheral sides that are cantilevered (substantially) radially outwards beyond the shell 5204. The support columns 5331 are spaced circumferentially apart around the perimeter of containment vessel shell 5204. In one embodiment, the support columns 5331 may be formed of steel hollow structural members, for example without limitation C-shaped members in cross-section (i.e. structural channels), which are welded to the exterior surface of containment vessel shell 5204. The two parallel legs of the channels may be vertically welded to the containment vessel shell 5204 along the height of each support column 5331 using either continuous or intermittent welds such as stitch welds.

The support columns 5331 extend vertically downwards from and may be welded at their top ends to the bottom/underside of the larger diameter top portion 5216 of containment vessel housing the polar crane. The bottom ends of the support columns 5331 rest on or are welded to the circumferential rib 5222 which engages the base mat 5304 of the concrete foundation 5301 near the buried portion of the containment. The columns 5331 help transfer part of the dead load or weight from the crane and the top portion 5216 of the containment vessel 5300 down to the foundation. In one embodiment, the hollow space inside the support columns may be filled with concrete (with or without rebar) to help stiffen and further support the dead load or weight. In other possible embodiments, other structural steel shapes including filled or unfilled box beams, I-beams, tubular, angles, etc. may be used. The longitudinal fins 5220 may extend farther outwards in a (substantially) radial direction than the support columns 5331 which serve a structural role rather than a heat transfer role as the ribs 5220. In certain embodiments, the ribs 5220 have a (substantially) radial width that is at least twice the (substantially) radial width of support columns.

FIGS. 71-85 show various cross sections (both longitudinal and transverse) of containment vessel 5200 with equipment shown therein. In one embodiment, the containment vessel 5200 may be part of a small modular reactor (SMR) system such as SMR-5160 by Holtec International. The equipment may generally include a nuclear reactor vessel 5500 disposed in a wet well 5504 and defining an interior space housing a nuclear fuel core inside and circulating primary coolant, and a steam generator 5502 fluidly coupled to the reactor and circulating a secondary coolant which may form part of a Rankine power generation cycle. Such a system is described for example in PCT International Patent Application No. PCT/US13/566777 filed Oct. 25, 52013, which is incorporated herein by reference in its entirety. Other appurtenances and equipment may be provided to create a complete steam generation system.

Steam generator 5502 is more fully described in International PCT Application No. PCT/US13/38289 filed Apr. 25, 2013, which is incorporated herein by reference in its entirety. As described therein and shown in FIGS. 81, 82, and 93 of the present application, the steam generator 5502 may be vertically oriented and axially elongated similarly to submerged bundle heat exchanger 5620. The steam generator 5502 may be comprised of a set of tubular heat exchangers arranged in a vertical stack configured to extract the reactor's decay heat from the primary coolant by gravity-driven passive flow means.

The circulation flow loops of primary coolant (liquid water) and secondary coolant (liquid feedwater and steam) through the reactor vessel and steam generator during normal operation of the reactor and power plant with an available electric supply produced by the station turbine-generator (T-G) set is shown in FIG. 23 herein. The primary coolant flow between the fluidly coupled steam generator 5502 and reactor vessel 5500 forms a first closed flow loop for purposes of the present discussion. In one embodiment, the primary coolant flow is gravity-driven relying on the change in temperature and corresponding density of the coolant as it is heated in the reactor vessel 5500 by nuclear fuel core 5501, and then cooled in the steam generator 5502 as heat is transferred to the secondary coolant loop of the Rankine cycle which drives the turbine-generator set. The pressure head created by the changing different densities of the primary coolant (i.e. hot—lower density and cold—higher density) induces flow or circulation through the reactor vessel-steam generating vessel system as shown by the directional flow arrows.

In general, with respect to a pressurized closed flow loop, the primary coolant is heated by the nuclear fuel core 5501 and flows upwards in riser column 5224. The primary coolant from the reactor vessel 5500 then flows through the primary coolant fluid coupling 5273 between the reactor vessel 5500 and steam generator 5502 and enters the steam generator. The primary coolant flows upward in the centrally located riser pipe 5337 to a pressurizer 5380 at the top of the steam generator. The primary coolant reverses direction and flows down through the tube side of the steam generator 5502 and returns to the reactor vessel 5500 through the fluid coupling 5273 where it enters an annular downcomer 5222 to complete the primary coolant flow loop.

Figure 81:
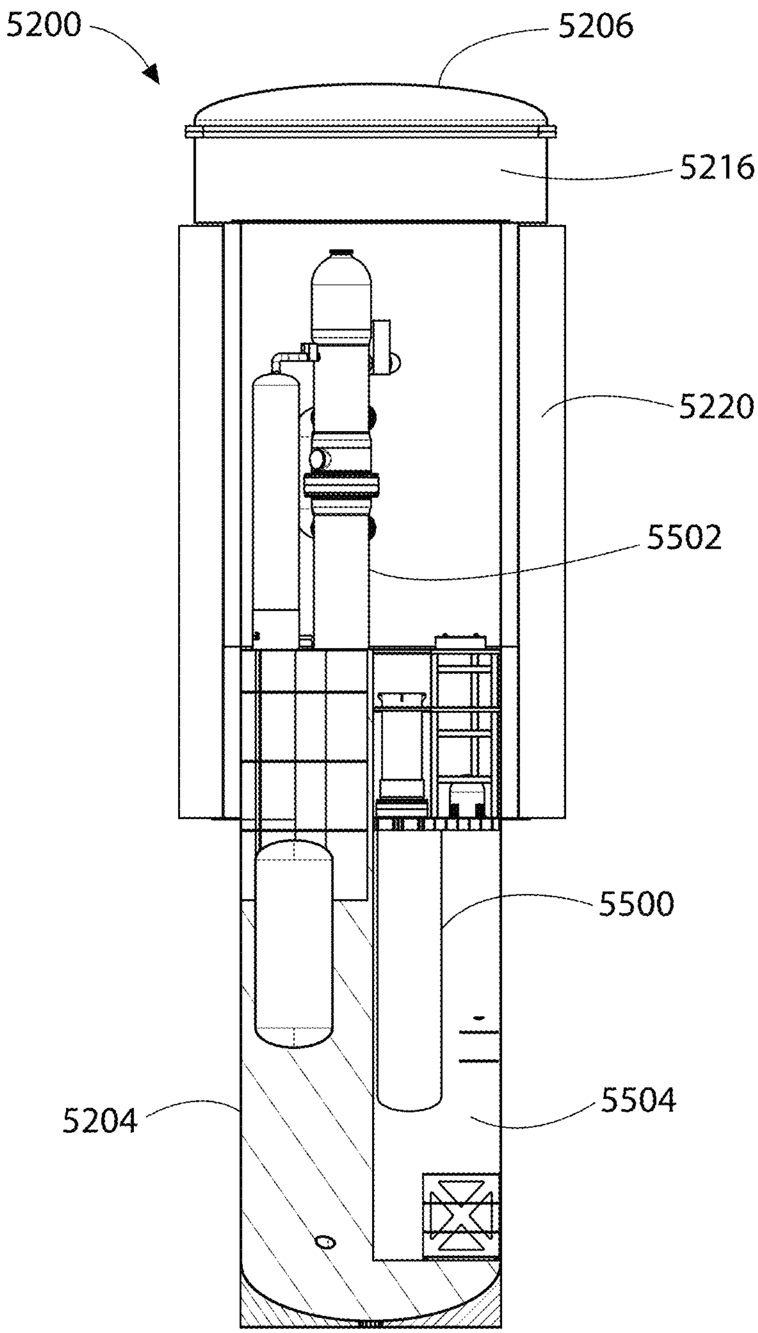
FIG. 81 is a longitudinal cross-sectional view thereof taken along line XI-XI in FIG. 10.
Figure 82:
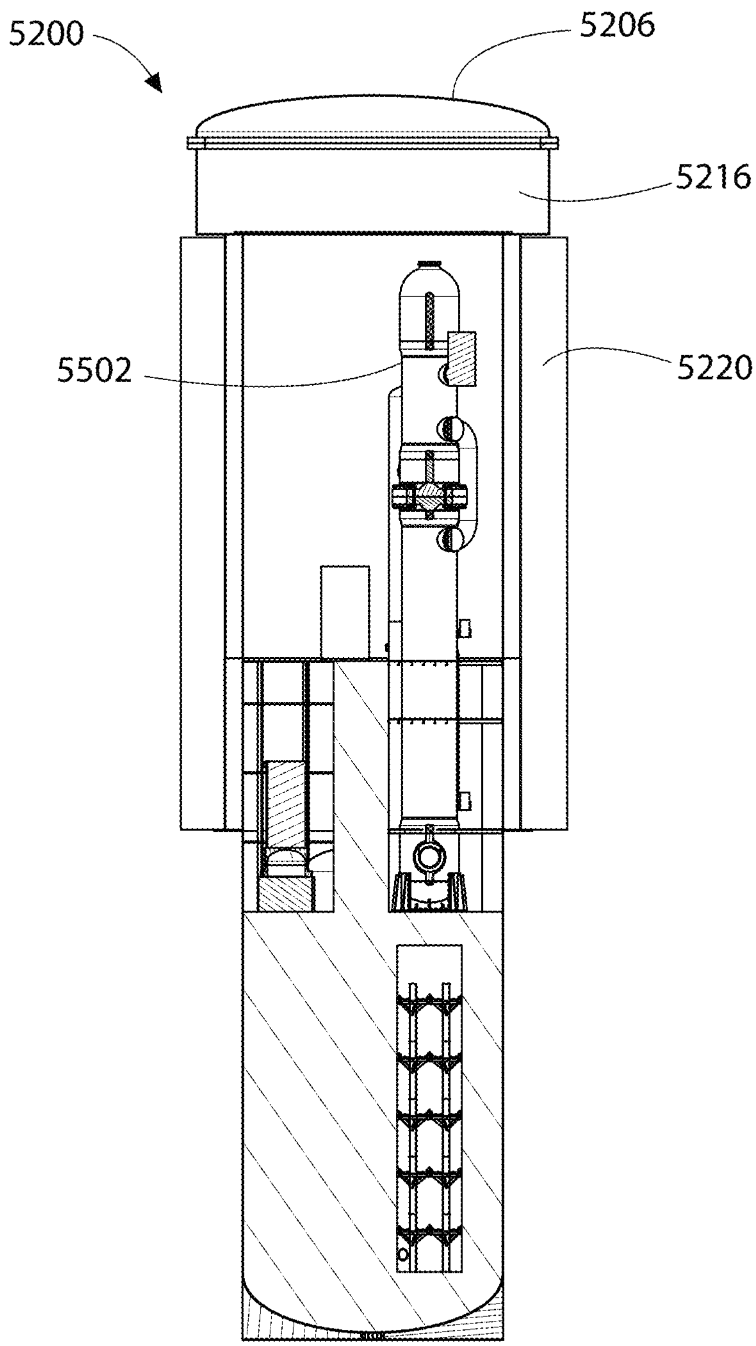
FIG. 82 is a longitudinal cross-sectional view thereof taken along line XII-XII in FIG. 10.
Figure 83:
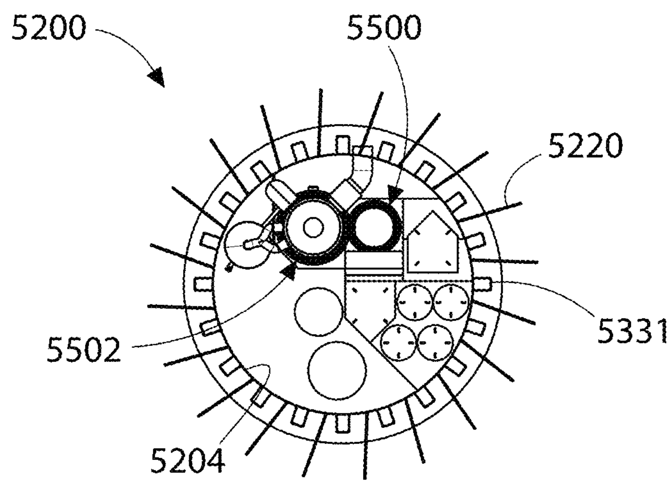
FIG. 83 is a transverse cross-sectional view thereof taken along line XIII-XIII in FIG. 9.
Figure 84:
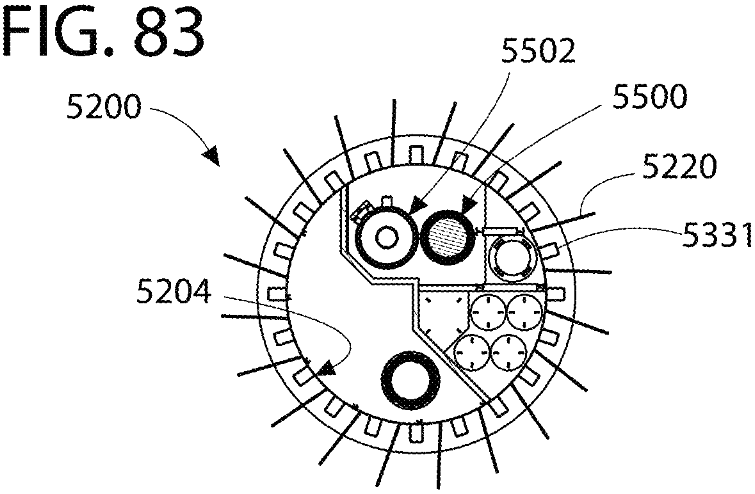
FIG. 84 is a transverse cross-sectional view thereof taken along line XIV-XIV in FIG. 9.
Figure 85:
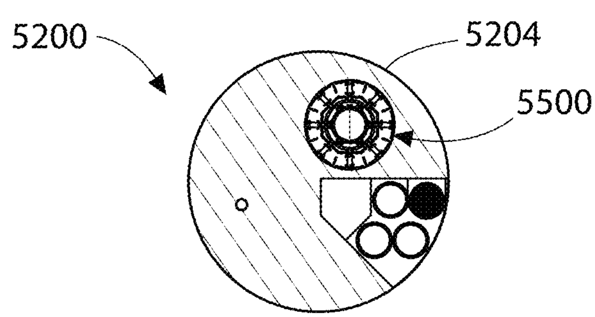
FIG. 85 is a transverse cross-sectional view thereof taken along line XV-XV in FIG. 9.
Figure 93:
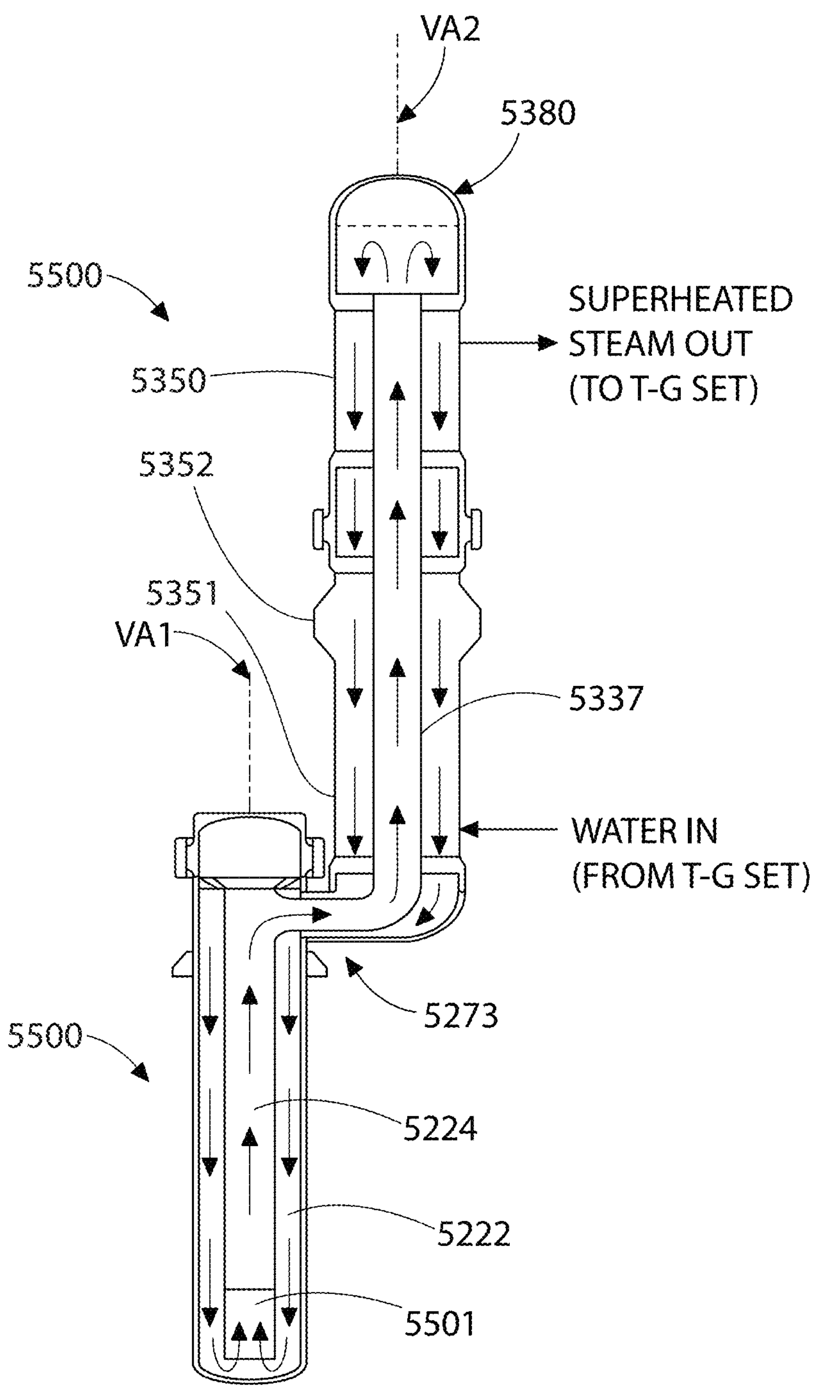
FIG. 93 is a schematic diagram showing the flow of primary and secondary coolant through the reactor vessel and steam generator.

The steam generator 5502 may include three vertically stacked heat transfer sections—from bottom up a preheater section 5351, steam generator section 5352, and superheater section 5350 (see, e.g. FIGS. 81, 82, and 93). Secondary coolant flows on the shellside of the steam generator 5502 vessel. Secondary coolant in the form of liquid feedwater from the turbine-generator (T-G) set of the Rankine cycle enters the steam generator at the bottom in the preheater section 5351 and flows upwards through the steam generator section 5352 being converted to steam. The steam flows upwards into the superheater section 5350 and reaches superheat conditions. From there, the superheated steam is extracted and flows to the T-G set to produce electric power.

Auxiliary Heat Dissipation System

Referring primarily now to FIGS. 72-73, 86, and 88, the containment vessel 5200 may further include an auxiliary heat dissipation system 5340 comprising a discrete set or array of heat dissipater ducts 5341 (HDD). In one embodiment, the auxiliary heat dissipation system 5340 and associated heat dissipater ducts 5341 may form part of a passive reactor core cooling system described in further detail below and shown in FIGS. 92 and 93.

Heat dissipater ducts 5341 include a plurality of internal longitudinal ducts (i.e. flow conduits) circumferentially spaced around the circumference of containment vessel shell 5204. Ducts 5341 extend vertically parallel to the vertical axis VA and in one embodiment are attached to the interior surface of shell 5204. The ducts 5341 may be made of metal such as steel and are welded to interior of the shell 5204. In one possible configuration, without limitation, the ducts 5341 may be comprised of vertically oriented C-shaped structural channels (in cross section) or half-sections of pipe/tube positioned so that the parallel legs of the channels or pipe/tubes are each seam welded to the shell 5204 for their entire height to define a sealed vertical flow conduit. The fluid (liquid or steam phase) in the heat dissipater ducts in this embodiment therefore directly contacts the reactor containment vessel 5200 to maximize heat transfer through the vessel to the water in the annular reservoir (primary annulus 5313) which forms a heat sink for the reactor containment vessel 5200 and the heat dissipater ducts. Other suitably shaped and configured heat dissipater ducts 5341 may be provided for this type construction so long as the fluid conveyed in the ducts contacts at least a portion of the interior containment vessel shell 5204 to transfer heat to the water-filled annulus 5313.

In other possible but less preferred acceptable embodiments, the heat dissipater ducts 5341 may be formed from completely tubular walled flow conduits (e.g. full circumferential tube or pipe sections rather than half sections) which are welded to the interior containment vessel shell 5204. In these type constructions, the fluid conveyed in the ducts 5341 will transfer heat indirectly to the reactor containment vessel shell 5204 through the wall of the ducts first, and then to the water-filled annulus 5313.

Any suitable number and arrangement of ducts 5341 may be provided depending on the heat transfer surface area required for cooling the fluid flowing through the ducts. The ducts 5341 may be uniformly or non-uniformly spaced on the interior of the containment vessel shell 5204, and in some embodiments grouped clusters of ducts may be circumferentially distributed around the containment vessel. The ducts 5341 may have any suitable cross-sectional dimensions depending on the flow rate of fluid carried by the ducts and heat transfer considerations.

The open upper and lower ends 5341*a*, 5341*b* of the ducts 5341 are each fluidly connected to a common upper inlet ring header 5343 and lower outlet ring header 5344. The annular shaped ring headers 5343, 5344 are vertically spaced apart and positioned at suitable elevations on the interior of the containment vessel 5200 to maximize the transfer of heat between fluid flowing vertically inside ducts 5341 and the shell 5204 of the containment vessel in the active heat transfer zone defined by portions of the containment vessel having the external longitudinal fins 5220 in the primary annulus 5313. To take advantage of the primary water-filled annulus 5313 for heat transfer, upper and lower ring headers 5343, 5344 may each respectively be located on the interior of the containment vessel shell 5204 adjacent and near to the top and bottom of the annulus.

In one embodiment, the ring headers 5343, 5344 may each be formed of half-sections of arcuately curved steel pipe as shown which are welded directly to the interior surface of containment vessel shell 5204 in the manner shown. In other embodiments, the ring headers 5343, 5344 may be formed of complete sections of arcuately curved piping supported by and attached to the interior of the shell 5204 by any suitable means.

In one embodiment, the heat dissipation system 5340 is fluidly connected to a source of steam that may be generated from a water mass inside the containment vessel 5200 to reject radioactive material decay heat from the reactor core. The containment surface enclosed by the ducts 5341 serves as the heat transfer surface to transmit the latent heat of the steam inside the ducts to the shell 5204 of the containment vessel 5200 for cooling via the external longitudinal fins 5220 and water filled annulus 5313. In operation, steam enters the inlet ring header 5343 and is distributed to the open inlet ends of the ducts 5341 penetrating the header. The steam enters the ducts 5341 and flows downwards therein along the height of the containment vessel shell 5204 interior and undergoes a phase change from steam to liquid. The condensed steam drains down by gravity in the ducts and is collected by the lower ring header 5344 from which it is returned back to the source of steam also preferably by gravity in one embodiment. It should be noted that no pumps are involved or required in the foregoing process.

It will be appreciated that in certain embodiments, more than one set or array of heat dissipater ducts 5341 may be provided and arranged on the inside surface of the inner containment vessel 5200 within the containment space defined by the vessel.

Auxiliary Air Cooling System

According to another aspect of the present disclosure, a secondary or backup passive air cooling system 5400 is provided to initiate air cooling by natural convection of the containment vessel 5200 if, for some reason, the water inventory in the primary annulus 5313 were to be depleted during a thermal reactor related event (e.g. LOCA or reactor scram). Referring to FIG. 78, the air cooling system 5400 may be comprised of a plurality of vertical inlet air conduits 5401 spaced circumferentially around the containment vessel 5200 in the primary annulus 5313. Each air conduit 5401 includes an inlet 5402 which penetrates the sidewalls 5320 of the containment enclosure structure (CES) 5300 and is open to the atmosphere outside to draw in ambient cooling air. Inlets 5402 are preferably positioned near the upper end of the containment enclosure structure's sidewalls 5320. The air conduits 5401 extend vertically downwards inside the annulus 5313 and terminate a short distance above the base mat 5304 of the foundation (e.g. approximately 1 foot) to allow air to escape from the open bottom ends of the conduits.

Using the air conduits 5401, a natural convection cooling airflow pathway is established in cooperation with the annulus 5313. In the event the cooling water inventory in the primary annulus 5313 is depleted by evaporation during a thermal event, air cooling automatically initiates by natural convection as the air inside the annulus will continue to be heated by the containment vessel 5200. The heated air rises in the primary annulus 5313, passes through the secondary annulus 5330, enters the head space 5318, and exits the dome 5316 of the containment enclosure structure (CES) 5300 through the vent 5317 (see directional flow arrows, FIG. 78). The rising heated air creates a reduction in air pressure towards the bottom of the primary annulus 5313 sufficient to draw in outside ambient downwards through the air conduits 5401 thereby creating a natural air circulation pattern which continues to cool the heated containment vessel 5200. Advantageously, this passive air cooling system and circulation may continue for an indefinite period of time to cool the containment vessel 5200.

It should be noted that the primary annulus 5313 acts as the ultimate heat sink for the heat generated inside the containment vessel 5200. The water in this annular reservoir also acts to maintain the temperature of all crane vertical support columns 5331 (described earlier) at essentially the same temperature thus ensuring the levelness of the crane rails (not shown) at all times which are mounted in the larger portion 5216 of the containment vessel 5200.

Figure 89:
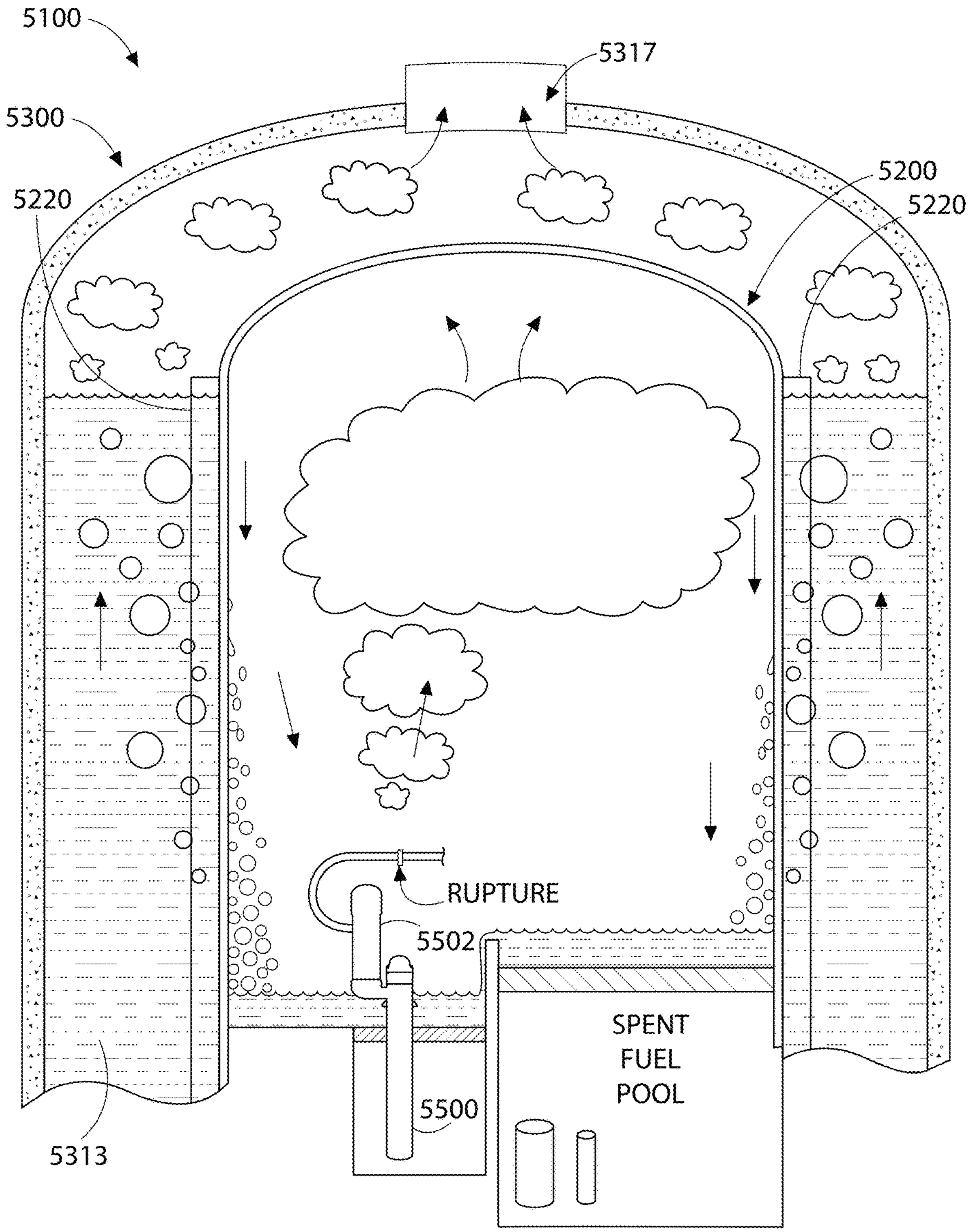
FIG. 89 is a schematic depiction of a generalized cross-section of the nuclear reactor containment system and operation of the water filled annular reservoir to dissipate heat and cool the containment vessel during a thermal energy release event.

Operation of the reactor containment system 5100 as a heat exchanger will now be briefly described with initial reference to FIG. 89. This figure is a simplified diagrammatic representation of the reactor containment system 5100 without all of the appurtenances and structures described herein for clarity in describing the active heat transfer and rejection processes performed by the system.

In the event of a loss-of-coolant (LOCA) accident, the high energy fluid or liquid coolant (which may typically be water) spills into the containment environment formed by the containment vessel 5200. The liquid flashes instantaneously into steam and the vapor mixes with the air inside the containment and migrates to the inside surface of the containment vessel 5200 sidewalls or shell 5204 (since the shell of the containment is cooler due the water in the annulus 5313). The vapor then condenses on the vertical shell walls by losing its latent heat to the containment structure metal which in turn rejects the heat to the water in the annulus 5313 through the longitudinal fins 5220 and exposed portions of the shell 5204 inside the annulus. The water in the annulus 5313 heats up and eventually evaporates forming a vapor which rises in the annulus and leaves the containment enclosure structure (CES) 5300 through the secondary annulus 5330, head space 5318, and finally the vent 5317 to atmosphere.

As the water reservoir in annulus 5313 is located outside the containment vessel environment, in some embodiments the water inventory may be easily replenished using external means if available to compensate for the evaporative loss of water. However, if no replenishment water is provided or available, then the height of the water column in the annulus 5313 will begin to drop. As the water level in the annulus 5313 drops, the containment vessel 5200 also starts to heat the air in the annulus above the water level, thereby rejecting a portion of the heat to the air which rises and is vented from the containment enclosure structure (CES) 5300 through vent 5317 with the water vapor. When the water level drops sufficiently such that the open bottom ends of the air conduits 5401 (see, e.g. FIG. 78) become exposed above the water line, fresh outside ambient air will then be pulled in from the air conduits 5401 as described above to initiate a natural convection air circulation pattern that continues cooling the containment vessel 5200.

In one embodiment, provisions (e.g. water inlet line) are provided through the containment enclosure structure (CES) 5300 for water replenishment in the annulus 5313 although this is not required to insure adequate heat dissipation. The mass of water inventory in this annular reservoir is sized such that the decay heat produced in the containment vessel 5200 has declined sufficiently such that the containment is capable of rejecting all its heat through air cooling alone once the water inventory is depleted. The containment vessel 5200 preferably has sufficient heat rejection capability to limit the pressure and temperature of the vapor mix inside the containment vessel (within its design limits) by rejecting the thermal energy rapidly.

Figure 86:
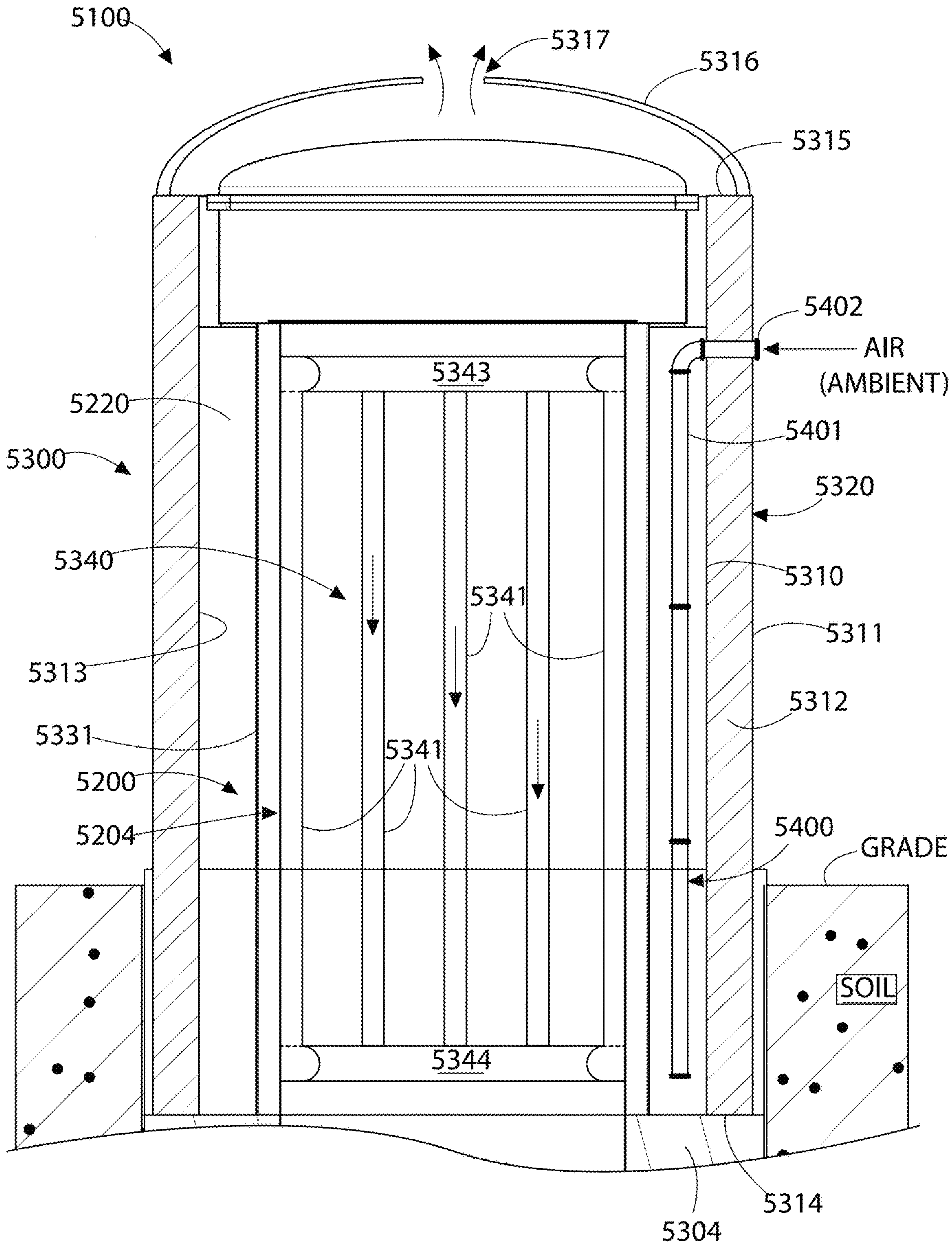
FIG. 86 is a partial longitudinal cross-sectional view of the nuclear reactor containment system showing an auxiliary heat dissipation system.
Figure 87:
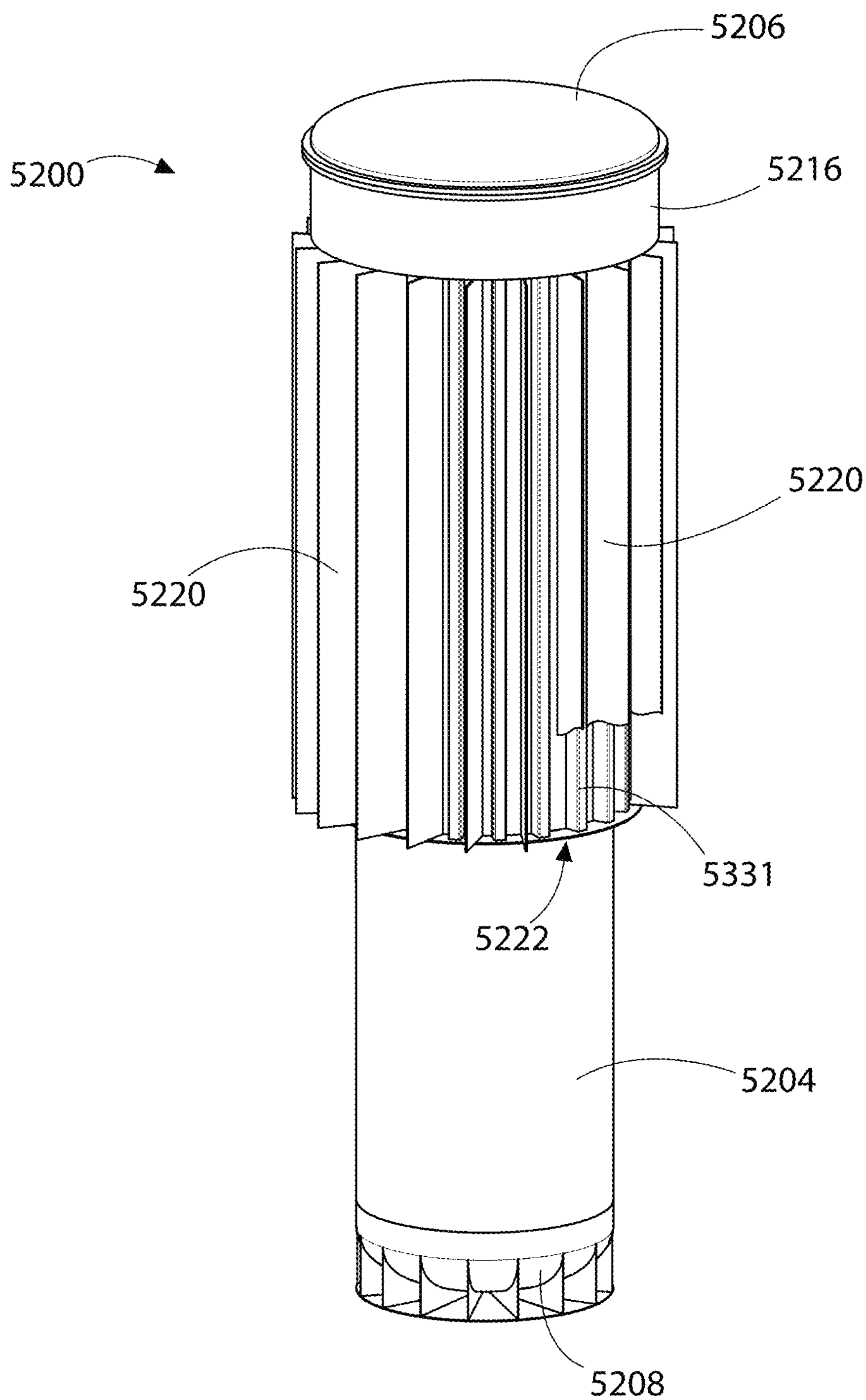
FIG. 87 is an isometric view of the containment vessel with lower portions of the (substantially) radial fins of the containment vessel broken away in part to reveal vertical support columns and circumferential rib.
Figure 88:
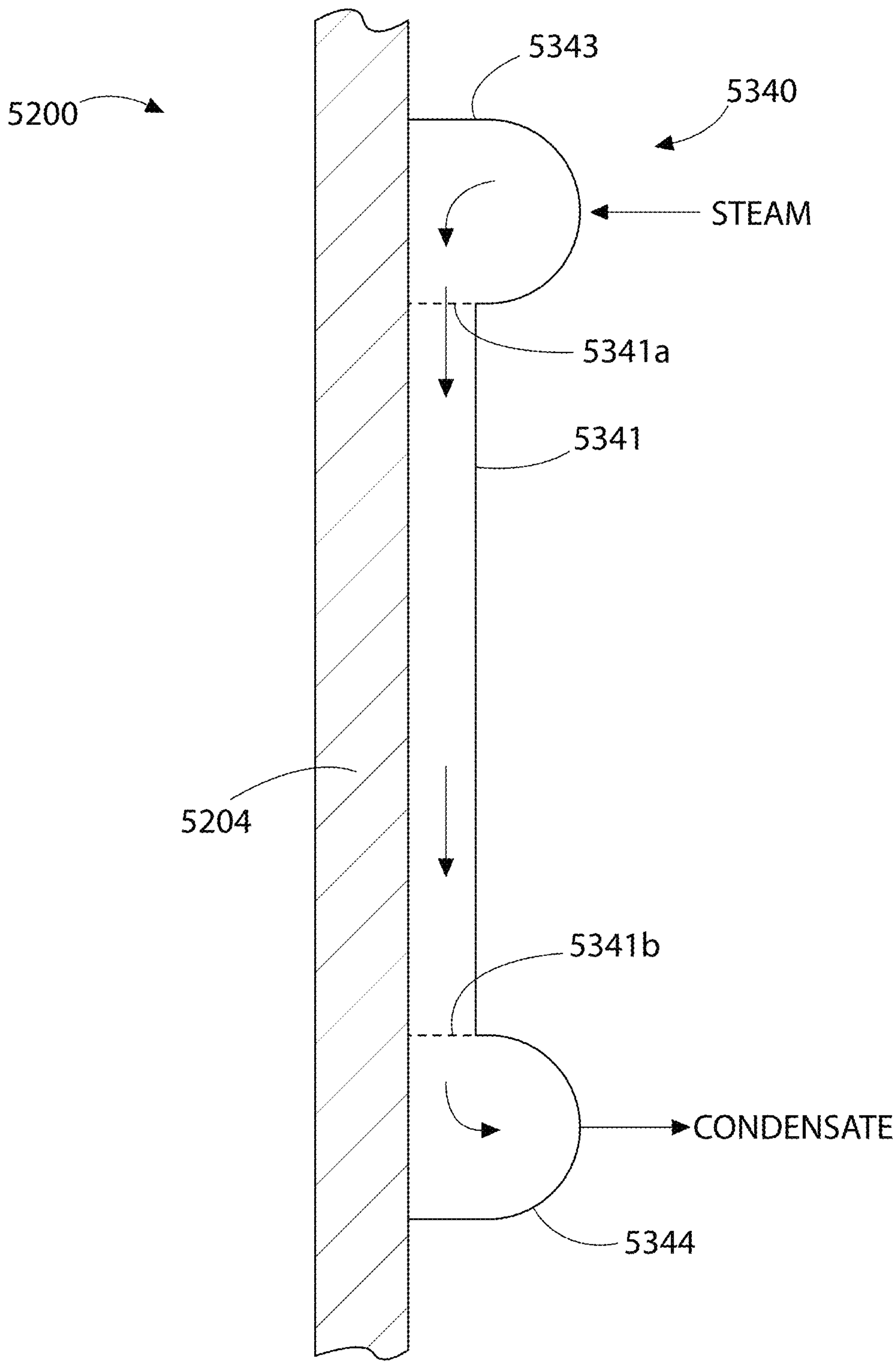
FIG. 88 is a longitudinal cross-sectional view of a portion of the heat dissipation system of FIG. 16 showing upper and lower ring headers and ducts attached to the shell of the containment vessel.

In the event of a station blackout, the reactor core is forced into a "scram" and the passive core cooling systems will reject the decay heat of the core in the form of steam directed to upper inlet ring header 5343 of heat dissipation system 5340 already described herein (see, e.g. FIGS. 86 and 88). The steam then flowing downwards through the network of internal longitudinal ducts 5341 comes in contact with the containment vessel shell 5204 interior surface enclosed within the heat dissipation ducts and condenses by rejecting its latent heat to the containment structure metal, which in turn rejects the heat to the water in the annulus via heat transfer assistance provide by the longitudinal fins 5220. The water in the annular reservoir (primary annulus 5313) heats up eventually evaporating. The containment vessel 5200 rejects the heat to the annulus by sensible heating and then by a combination of evaporation and air cooling, and then further eventually by natural convection air cooling only as described herein. As mentioned above, the reactor containment system 5100 is designed and configured so that air cooling alone is sufficient to reject the decay heat once the effective water inventory in annulus 5313 is entirely depleted.

In both these foregoing scenarios, the heat rejection can continue indefinitely until alternate means are available to bring the plant back online. Not only does the system operate indefinitely, but the operation is entirely passive without the use of any pumps or operator intervention.

Passive Reactor Cooling System

According to another aspect of the invention, a passive gravity-driven nuclear reactor cooling system 5600 is provided to reject the reactor's decay heat following a loss-of-coolant accident (LOCA) during which time the reactor is shutdown (e.g. "scram"). The cooling system does not rely on and suffer the drawbacks of pumps and motors which require an available electric supply. Accordingly, the reactor cooling system 5600 can advantageously operate during a power plant blackout situation.

Figure 90:
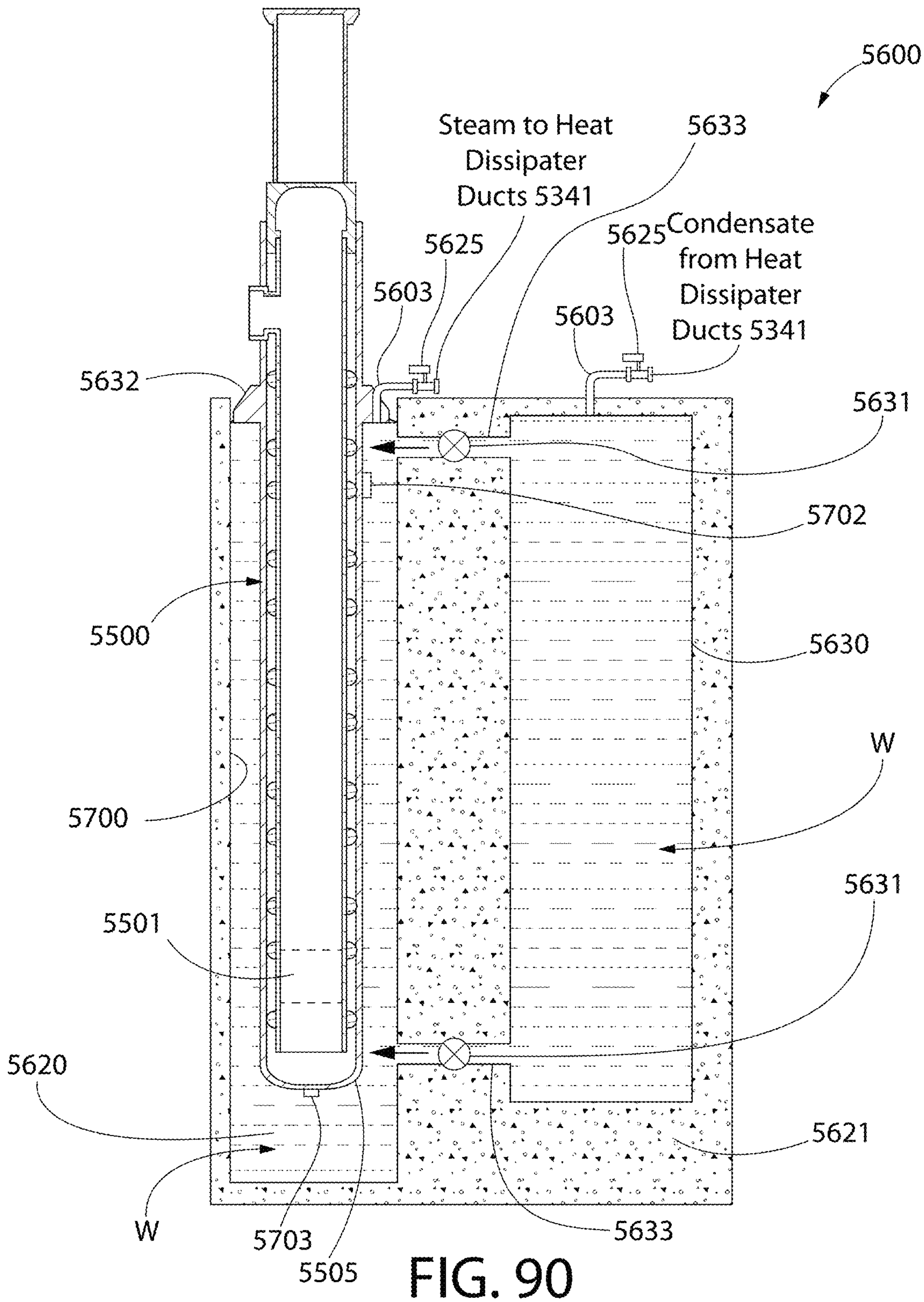
FIG. 90 is schematic diagram showing a reactor vessel and related portion of a reactor cooling system according to the present disclosure for cooling a reactor core in the event of a LOCA.
Figure 91:
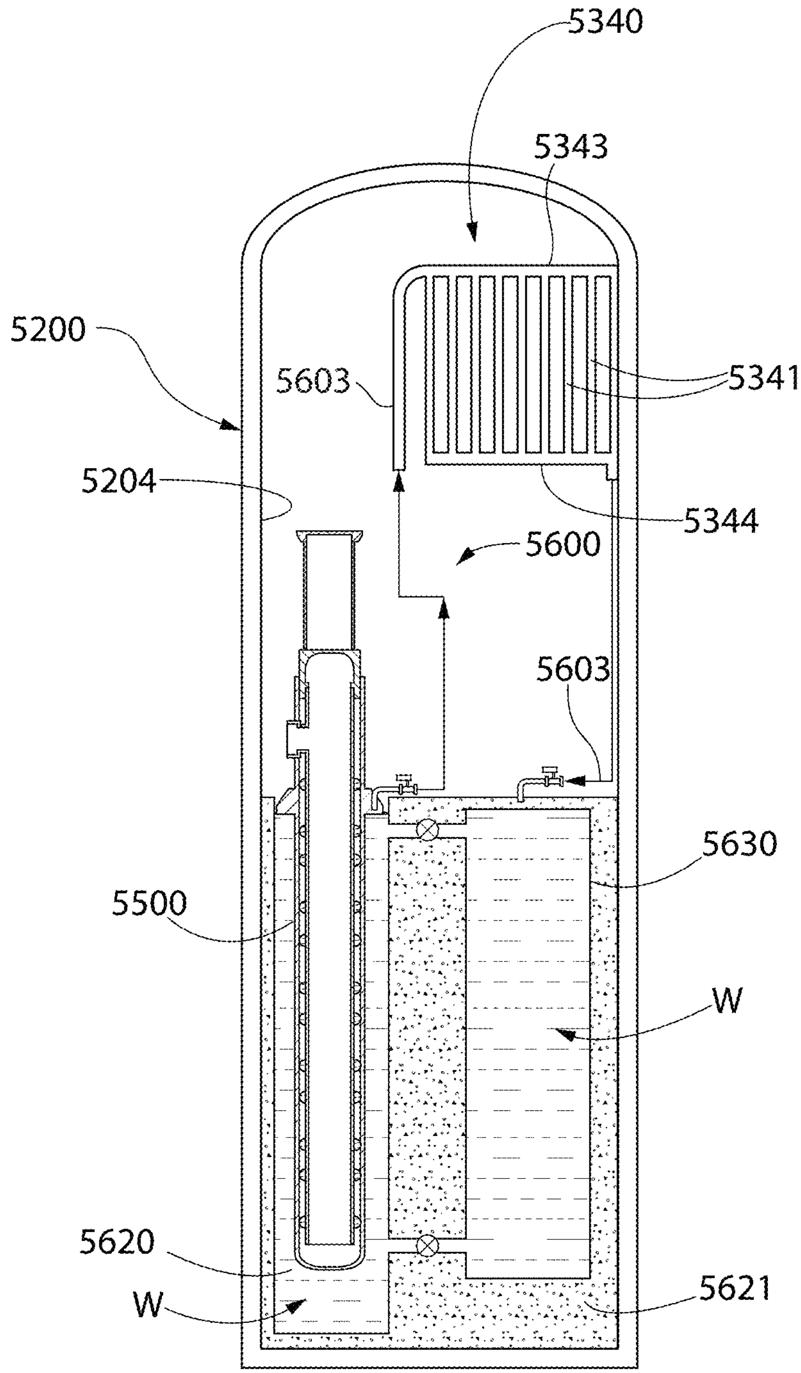
FIG. 91 is a schematic diagram showing the overall reactor cooling system and containment structure for cooling a reactor core.

Referring to FIGS. 90 and 91, the passive reactor cooling system 5600 in one embodiment is an atmospheric pressure closed loop flow system in one embodiment comprised of three major fluidly coupled parts or sub-systems, namely (i) a reactor well 5620, (ii) a discrete set or array of heat dissipater ducts 5341 (HDD) integrally connected to the inner wall of the containment structure (described in detail above), and (iii) an in-containment reactor water storage tank 5630 filled with a reserve of cooling water. The reactor cooling system 5600 is configured to utilize cooling water flooded into the reactor well 5620 from the storage tank to extract the thermal energy generated by the fuel core during a reactor shutdown and LOCA that can continue indefinitely in the absence of an available source of electric power, as further described herein. Although FIGS. 90 and 91 shows the reactor well 5620 in the flooded condition, it should be noted that the reactor well is dry and empty during the normal power generation operating mode of the reactor prior to a LOCA event.

Referring to FIGS. 90-93, the reactor vessel 5500 containing the nuclear core 5501 is disposed in reactor well 5620 defined by a large concrete monolith 5621. The monolith 5621 is formed inside the inner containment vessel 5200 (best shown in FIG. 91). Reactor vessel 5500 is generally formed by a vertically elongated cylindrical shell (sidewall) and a closed bottom head 5505. Accordingly, the reactor vessel 5500 is vertically oriented with a majority of the height or length of the reactor vessel being positioned inside the reactor well as shown. The reactor well 5620 is an annular vacant space surrounding the reactor vessel 5500 and may be dry and unfilled during normal power generation operation of the reactor. The bottom head 5505 of the reactor vessel 5500 is spaced above the bottom of the reactor well 5620. The top of the reactor well 5620 may be partially or completely closed by a closure structure. In one embodiment, the closure structure may be formed at least in part by a ring-shaped reactor support flange 5632 that extends circumferentially around the perimeter of the reactor vessel 5500. The annular support flange may be supported by the concrete monolith 5621. Additional structural and other elements (e.g. metal, concrete, seals/gaskets, etc.) may be provided to supplement the support flange 5632 and to seal the top of the reactor well 5630 if it is to be completely sealed for better capturing steam present in the reactor well which is directed to the auxiliary heat dissipation system 5340, as further described herein.

Figure 92:
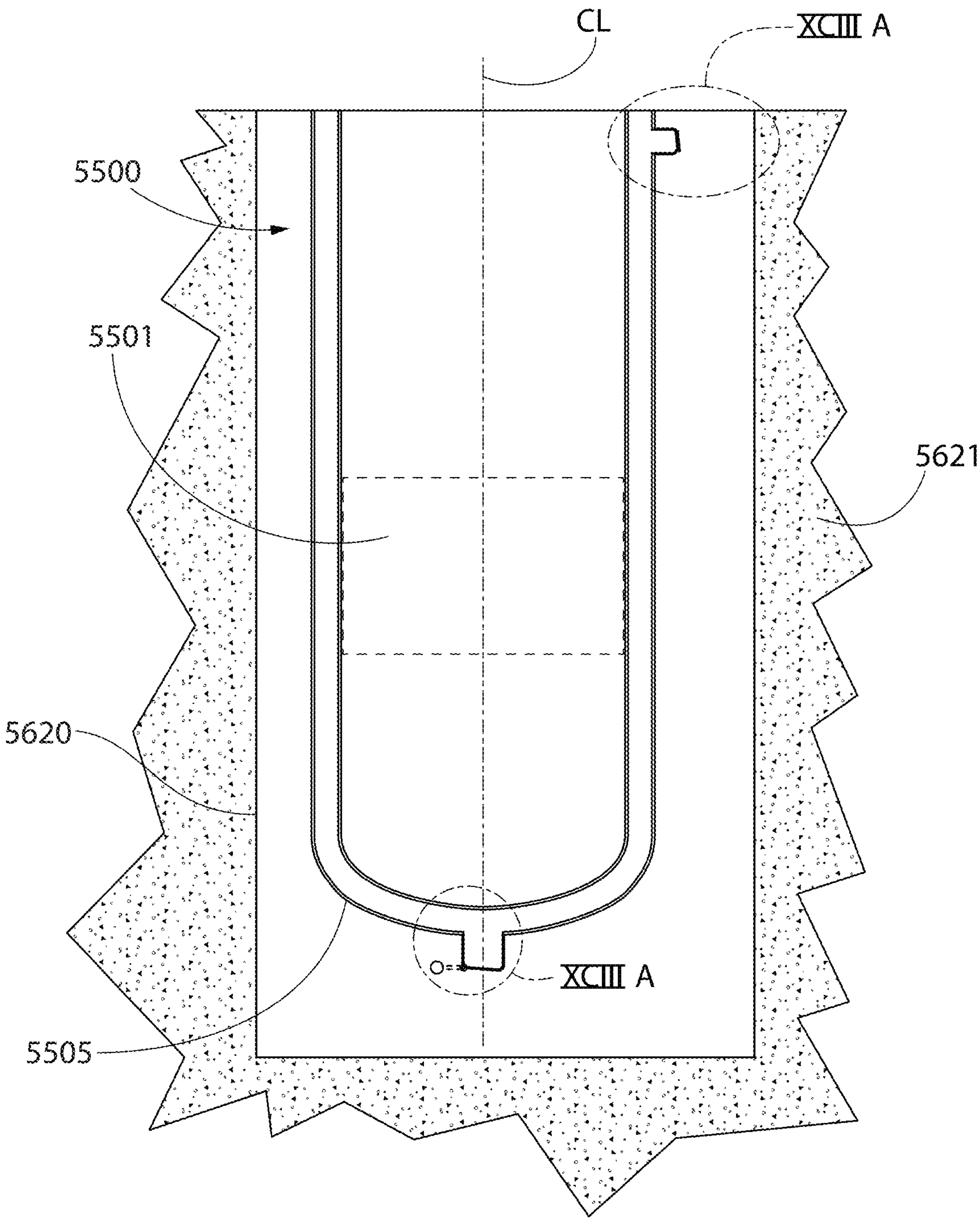
FIG. 92 is side cross sectional view showing the lower portion of the reactor well and reactor vessel with an insulating liner system and flow-hole nozzle arrangement.
Figure 92A:
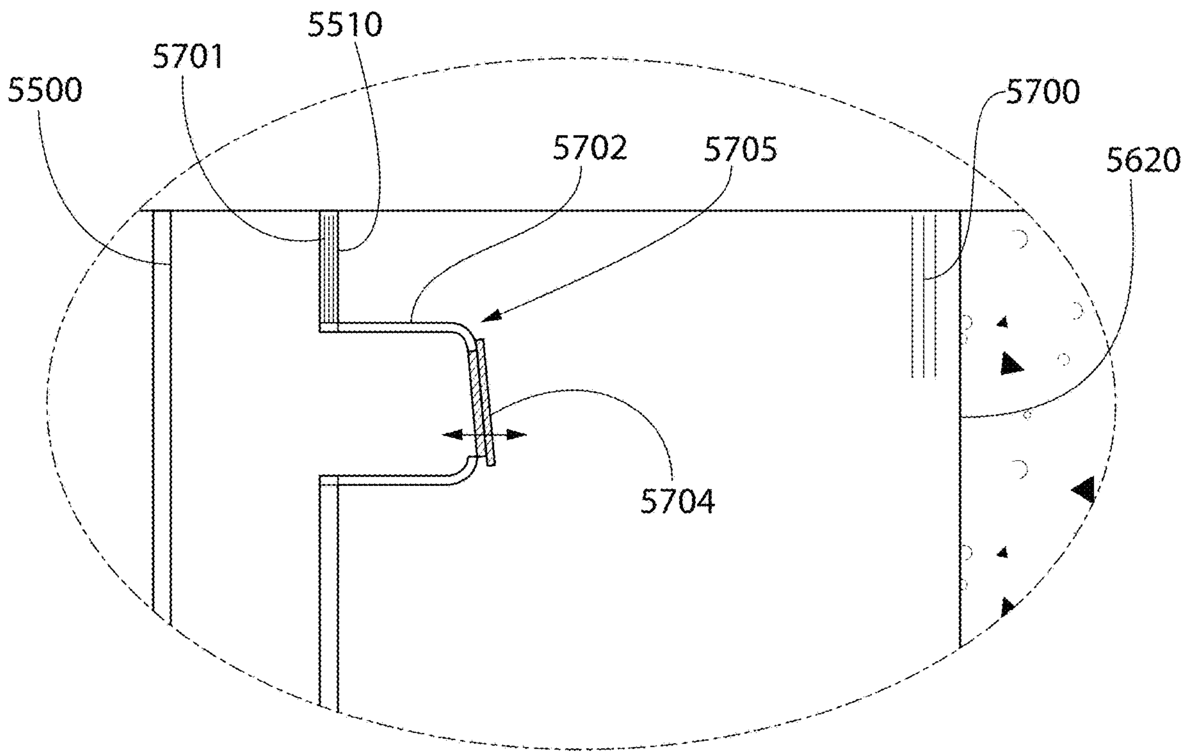
FIGS. 92A and 92B are details from FIG. 92 showing flow-hole nozzles.
Figure 92B:
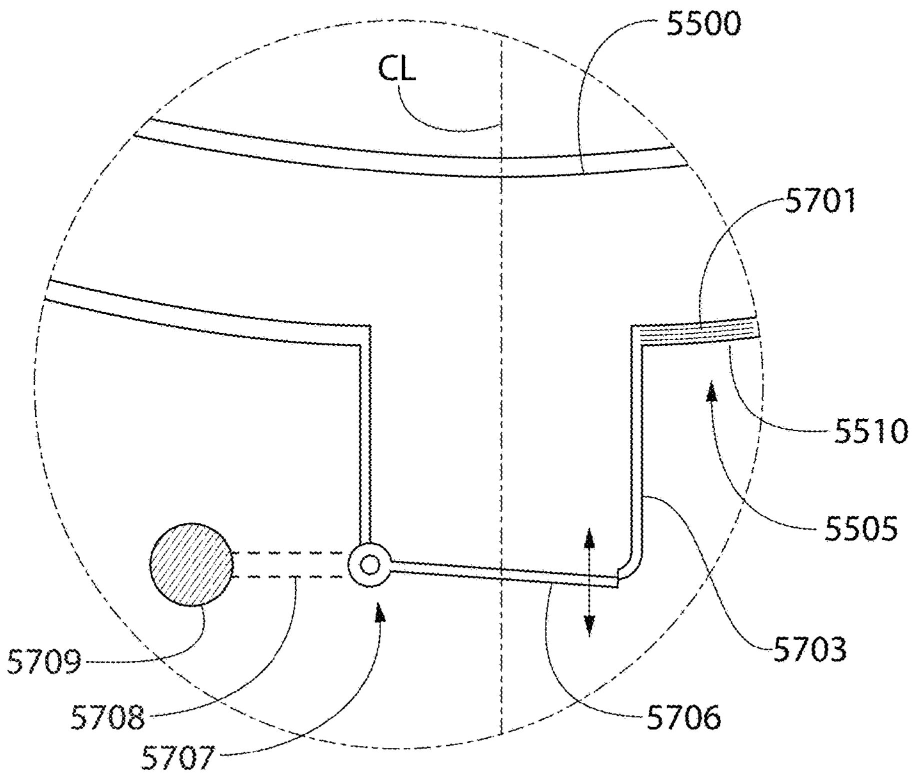

The outer wall of the reactor well 5620 may be insulated by one or more layers of stainless steel liners 5700 with small interstitial space or air gap formed between them (see, e.g. FIGS. 92,922A, 92B). For additional cooling of the reactor well space, cold water may be circulated in the inter-liner spaces in some embodiments. The stainless steel liners 5700 serve to block extensive heating of the concrete monolith 5621 forming the reactor well.

Referring to FIGS. 90 and 92 (including sub-parts A and B), the outside surface of the reactor vessel 5500 may also be insulated by a liner assembly comprised of one or more layers of metal liners 5701 with small interstitial spaces or air gaps therebetween which serve to retard the outflow of heat generated by the reactor core 5501 during normal reactor operation. In some non-limiting examples, the liners may preferably be stainless steel or aluminum; however, other suitable metals for a reactor well environment may be used. Preferably, in one embodiment, the liners 5701 may extend completely around the circumference and the entire height of the reactor vessel 5500 that is positioned within the reactor well 5620 including under the bottom head 5505 of the reactor vessel. The entire perimeter of the reactor vessel 5500 lying within the reactor well may therefore include the liners 5701 such that a plurality of liners is disposed between the outside surface of the reactor vessel 5500 and outermost liner 5510.

The insulating liner assembly comprised of liners 5701 may include an array of one or more flow-holes which may be formed by top flow-hole nozzles 5702 disposed in the upper sidewall (shell) region of the reactor vessel 5500 and reactor well 5620, preferably below the first pipe penetration into the reactor vessel in one embodiment. The nozzles 5702 are in fluid communication with the air gaps (interstitial spaces) in the insulating liner assembly and space formed within the reactor well 5620. The top flow-hole nozzles 5702 are therefore disposed on the outside surface of the reactor vessel sidewall, but are not in fluid communication with the interior of the reactor vessel 5500 and primary coolant therein. Although in some embodiments the nozzles 5702 may be attached to outside surface of the reactor vessel for support, the nozzles are instead configured to be in fluid communication with the air gaps formed in the side liner 5701 assembly on the outside of the reactor vessel as noted above. In one embodiment, for example, this may be accomplished by providing a plurality of lateral holes in the nozzles 5702 adjacent the air gaps between the liners 5701. The top flow-hole nozzles 5702 are configured and operable to evacuate steam flowing within the liner assembly and discharge the steam to the reactor well, as further described herein.

The top flow-hole nozzles 5702 may be circumferentially spaced around the reactor vessel. In one non-limiting embodiment, four top flow-hole nozzles 5702 may be provided at approximately the same elevation. Other arrangements and numbers of top flow-hole nozzles 5702 may be provided.

One or more bottom flow-hole nozzles 5703 may also be provided for the vessel liners 5701 adjacent the bottom head 5505 of the reactor vessel 5500. In one embodiment, a single larger nozzle 5703 may be provided which is concentrically aligned with the centerline CL of the reactor vessel 5500 at the lowest point on the arcuate bottom reactor vessel head 5505. The nozzle 5703 may be supported, configured, and arranged to form fluid communication with the air gaps (interstitial spaces) between the bottom liners 5701 and reactor well 5620 in similar fashion as the top flow-hole nozzles 5702. Nozzle 5703 may therefore be constructed and operate similarly to top flow-hole nozzles 5702 being supported by, but not in fluid communication with the interior of the reactor vessel 5500 and primary coolant therein. The bottom flow-hole nozzle 5703 is configured and operable to admit cooling water in the reactor well from the water storage tank 5630 into the lower portion of the insulating liner assembly, as further described herein.

The top flow-hole nozzles 5702 may have provisions such as closure flaps 5704 which are designed to remain closed during normal operation of the reactor when the gaps between the reactor vessel 5500 and the liners 5701 are filled with air (see, e.g. FIG. 92A). The flap and nozzle combination forms a flap valve. The flaps 5704 are each pivotably movable and connected to its respective nozzle 5702 at a top end by a pivot 5705. Any suitable type of pivot may be provided, such as without limitation a pinned joint or self-hinge wherein the flap is made of a flexible material such as a high temperature withstanding polymer. The flaps 5704 may be made of any suitable metallic or non-metallic material. The vertical orientation and weight of the flap 5704 holds it in the closed position against the free end of nozzle 5702 by gravity. In other embodiments, a commercially available flap valve comprising a valve body and flap may instead be mounted on the free end of the top flow-hole nozzles 5702 to provide the same functionality.

The bottom flow-hole nozzles 5703 are also normally each closed by a flap 5706 during normal operation of the reactor when the gaps between the reactor vessel 5500 and the liners 5701 are filled with air (see, e.g. FIG. 92B). In one embodiment, the flaps 5706 may be held closed via a float device including a buoyant float 5709 rigidly connected to one end of the flap by a linkage arm 5708. The flap 5706 and linkage arm 5708 assembly is pivotably coupled to a bottom nozzle 5703 by a pivot 5707, such as without limitation a pinned joint in one embodiment. Flap 5706 is preferably made of a rigid metallic or non-metallic material in order to maintain its shape and seal against the free end of nozzle 5703 when in its closed position.

In operation, gravity acts downward on the float 5709 when the reactor well 5620 is empty during normal operation of the reactor. This rotates the float 5709 and the flap 5706 assembly in a counter-clockwise direction to force the flap against the free end of nozzle 5703. When water floods the reactor well 5620 from storage tank 5630 during a LOCA event as further described herein, the rising water will cause the float 5709 to rotate upwards now in a clockwise direction. This simultaneously rotates the flap clockwise and downward opening the nozzle 5703 admitting water into the air gaps between the reactor vessel 5500 metal shell wall and the stainless steel liners 5701.

When the cooling water W from water storage tank 5630 enters the air gaps between the liners 5701 and comes in contact with the metal reactor vessel 5500 wall after the passive reactor cooling system 5600 is activated, the water vaporizes producing steam which raises the pressure in the gap. This buildup of pressure forces the flaps 5704 of the top flow-hole nozzles 5702 to open and relieve the steam build up into the reactor well 5620 which is subsequently routed to the heat dissipation ducts 5341 of the auxiliary heat dissipation system 5340, as further described herein. Accordingly, the cooling water W therefore enters the liners 5701 through the open flap(s) 5706 of the bottom flow-hole nozzle(s) 5703 and is evacuated from the liner assembly through the top flow-hole nozzles 5702 in the form of steam.

Referring now to FIGS. 90 and 91, the concrete monolith 5621 further defines a large in-containment cooling water storage tank 5630 (i.e. within the inner containment vessel 5200 also variously shown in FIGS. 71-89). The water tank 5630 holds a reserve of cooling water W and is fluidly coupled and positioned to dump its contents into the reactor well 5620 in the event of a LOCA. In one embodiment, water storage tank 5630 is fluidly coupled to the reactor well 5620 by an upper and lower flow conduit 5633 in which dump valves 5631 are positioned to control flow. At least one flow conduct 5633 with dump valve 5634 may be provided; however, in some embodiments more than two flow conduits with dump valves may be provided. The dump valve may be operated in a fully opened or closed mode, or alternatively if needed throttled in a partially open mode. During normal power generation operation of the reactor, the dump valves are normally closed to prevent cooling water W from flooding into the reactor well 5620 through the flow conduits. The dump valves 5631 may be automatically operated via electric or pneumatic valve operators. In one embodiment, the dump valves 5631 may be configured to operate as "fail open" when power supply is lost to the valves to automatically flood the reactor well 5620 with cooling water W.

In some preferred non-limiting embodiments, the cooling water tank 5630 has a volumetric capacity at least as large as or larger than the capacity of the reactor well 5620 to optimize cooling the reactor core and replenishing any cooling water W in the reactor well which might be lost as steam to the containment space in designs where the top of the reactor well is either not intentionally fully enclosed and/or tightly sealed or may be damaged.

A method for operating the passive reactor cooling system 5600 will now be described with primary reference to FIGS. 90-92. As mentioned earlier in this disclosure, in the case of a LOCA, the pressure and temperature in the containment will rise. When the containment pressure (or temperature) reaches a pre-set threshold value, then the dump valves 5631 connecting the water storage tank 5630 and reactor well 5620 are opened causing a rapid transfer of cooling water W and filling of the reactor well. The insulating liners 5701 on the reactor vessel 5500 protect it from rapid quenching (and high thermal stresses). After the water in the reactor well 5620 reaches near the top flow-hole nozzle 5702 in the liner 5701 assembly (until then the reactor vessel is undergoing limited cooling thru the heat transfer across the liners to the reactor well water), then the cold cooling water W begins to fill the interstitial spaces between the liners and the reactor vessel thus significantly accelerating the extraction of decay heat from the reactor core 5501 and reactor vessel.

After some time, the temperature of the pool of deposited water in the reactor well 5620 reaches the boiling point temperature and begins to boil. The steam thus produced rises by buoyancy action through inlet piping 5603 to the bank of heat dissipater ducts 5341 of the auxiliary heat dissipation system 5340, as described above and shown in FIGS. 86, 88, and 91. These ducts 5341 condense the steam generated in the reactor well pool and return the condensate to the reactor well 5620 via outlet piping 5603 with the latent heat of steam delivered to the external annular reservoir 5313 holding water having a temperature lower than the steam to form a heat sink in thermal communication with the containment vessel 5200. Accordingly, the heat from the spilled reactor cooling system primary coolant water (e.g. via a primary coolant piping failure) is thus removed by the containment, albeit less efficiently, as the water/air mixture rises and contacts the internal surface of the containment (which is equipped with large external and internal fins 5220, 5221 shown in FIG. 73 and described above) to facilitate the heat extraction.

It should be noted that the flow of steam and condensate between the heat dissipater ducts 5341 and reactor well 5620 is advantageously driven solely by gravity due to the changing densities of the steam and condensate, without need for pumps and an available power supply. The heat dissipater ducts 5341 are therefore preferably positioned on the inner containment vessel 5200 wall at higher location than the reactor well 5630 and the extraction point of steam from the reactor well. Flow of steam and condensate through the inlet and outlet piping 5603 to and from the array of heat dissipater ducts 5341 may be controlled by suitable valves 5625 (see FIG. 90), which may be operated in an on/off mode, or throttled. Valves 5625 may be configured to operate as "fail open" when power supply is lost to the valves which may have electric or pneumatic valve operators. This automatically opens and actuates the closed flow loop of the reactor cooling system 5600 between the heat dissipater ducts 5341 and reactor well 5620.

The inlet steam piping 5603 to the heat dissipater ducts 5341 may be fluidly coupled to the top portion of reactor well 5620 to optimally capture the accumulating steam. The outlet condensate return piping 5603 may be fluidly coupled to the top portion of water storage tank 5630 to optimally capture the accumulating steam. The atmospheric closed flow loop of the reactor cooling system 5600 between the reactor well 5620 and heat dissipater ducts 5341 may therefore flow through the water storage tank 5630 (see FIG. 91).

In the event of a LOCA, as the water inventory in the annular reservoir 5313 between the inner containment vessel 5200 and outer containment enclosure structure 5300 evaporates, it may be readily replenished. However, if replenishment is not possible, then the receding water inventory in the reservoir 5313 will actuate rejection of heat to the air by ventilation action using the passive air cooling system 5400 described above. Once all the water has evaporated in the reservoir 5313, the containment structure will continue to reject heat by air cooling alone. Air cooling after a prolonged period of water cooling is ideally sufficient to remove all the decay heat. This also passive gravity driven heat expulsion process driven by changing air densities can continue as long as necessary to cool the reactor.

It will be appreciated that numerous variations of the foregoing method for operating the passive reactor cooling system 5600 are possible.

While the foregoing description and drawings represent exemplary embodiments of the present invention, it will be understood that various additions, modifications and substitutions may be made therein without departing from the spirit and scope and range of equivalents of the accompanying claims. In particular, it will be clear to those skilled in the art that the present invention may be embodied in other forms, structures, arrangements, proportions, sizes, and with other elements, materials, and components, without departing from the spirit or essential characteristics thereof. In addition, numerous variations in the methods/processes. One skilled in the art will further appreciate that the invention may be used with many modifications of structure, arrangement, proportions, sizes, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims and equivalents thereof, and not limited to the foregoing description or embodiments. Rather, the appended claims should be construed broadly, to include other variants and embodiments of the invention, which may be made by those skilled in the art without departing from the scope and range of equivalents of the invention.

What is claimed is:

1. A control rod drive system for a nuclear reactor vessel, the system comprising:

- a control rod drive mechanism mounted externally to the reactor vessel;
- a drive rod mechanically coupled to the control rod drive mechanism and extending through the reactor vessel into an interior cavity of the reactor vessel holding a nuclear fuel core, the control rod drive mechanism operable to raise and lower the drive rod through a plurality of vertical axial positions;
- a grapple assembly connected to the drive rod in the interior cavity of the reactor vessel and movable with the drive rod;
- an electromagnet mounted in the grapple assembly;
- a rod cluster control assembly comprising a plurality of control rods configured for removable insertion into the nuclear fuel core; and
- a drive rod extension extending axially between the rod cluster control assembly and the grapple assembly, the drive rod extension comprising:
  - an axially extending actuator shaft having a top end including a magnetic block configured to releasably engage the electromagnet of the grapple assembly and a bottom end configured to releasably engage the rod cluster control assembly; and
  - a lifting head sleeve including a diametrically enlarged lifting head, the lifting head sleeve slideably receiving the actuator shaft therethrough for axial upward and downward movement;
- wherein the electromagnet is operable to magnetically couple the actuator shaft to the grapple assembly at the top of the drive rod extension when the electromagnet is energized and uncouple the actuator shaft from the rod cluster control assembly at the bottom of the drive rod extension when the electromagnet is de-energized.

2. The system of claim 1, wherein the bottom end of the actuator shaft includes a locking mechanism comprising radially movable locking elements releasably engageable with the rod cluster control assembly, the locking elements movable between a locked position coupling the actuator shaft to the rod cluster control assembly and an unlocked position uncoupled from the rod cluster control assembly.

3. The system of claim 2, wherein the locking elements are radially movable between the locked and unlocked positions by raising or lowering the actuator shaft with the drive rod.

4. The system of claim 3, wherein the locking elements are locking balls which engage an annular groove formed on the rod cluster control assembly in the locked position.

5. The system of claim 4, wherein the locking balls are movably retained in an adapter sleeve mounted on a bottom portion of the actuator shaft.

6. The system according to claim 1, further comprising a diametrically enlarged bobbin slideably disposed and axially movable upwards and downwards on the lifting head sleeve, the bobbin operable to selectively engage the lifting head and enter a downwardly open chamber of the grapple assembly, wherein the bobbin is configured and operable to enter a downwardly open cavity of the lifting head in a nested relationship.

7. A control rod drive system for a nuclear reactor vessel, the system comprising:

a vertically oriented drive rod mechanically coupled to a control rod drive mechanism operable to raise and lower the drive rod through a plurality of axial positions;

a rod cluster control assembly comprising a plurality of control rods configured for removable insertion into a nuclear fuel core;

a drive rod extension extending axially between the rod cluster control assembly and the drive rod, the drive rod extension having a bottom end releasably coupled to the rod cluster control assembly;

a drive rod extension grapple assembly connected to the drive rod, the grapple assembly releasably coupled to a top end of the drive rod extension;

the grapple assembly including:

a body defining a downwardly open chamber configured to movably receive the top end of the drive rod extension therein, the body including a plurality of spring-biased radially retractable lifting pins engageable with the drive rod extension and slideably movable in a linear manner between a radial inward position projected into the chamber, and a radial outward position retracted from the chamber, the drive rod extension including:

a longitudinally-extending actuating tube and an actuating shaft slideably disposed in the actuating tube, the actuating shaft operably coupled to the grapple assembly for upward and downward movement with the drive rod relative to the actuating;

a lifting head coupled to a first end of a lifting head sleeve tube, a second end of the lifting head sleeve coupled to the actuator tube;

a diametrically enlarged bobbin slideably disposed and axially movable on the lifting head sleeve, the bobbin operable to selectively engage the lifting head and enter the downwardly open chamber of the grapple assembly;

wherein the lifting head is configured to engage and force the lifting pins to the outward position when the lifting head enters the chamber of the grapple assembly;

wherein the bobbin is movable in an upwards direction with the lifting head sleeve to engage and retract the lifting pins of the grapple assembly independently of the lifting head;

wherein raising and lowering the drive rod raises and lowers the rod cluster control assembly.

8. The system of claim 7, wherein the grapple assembly includes an electromagnet which magnetically couples the drive rod extension to the grapple assembly when the electromagnet is energized and uncouples the drive rod extension from the grapple assembly when the electromagnet is de-energized; and wherein the drive rod extension includes a magnetic block engageable with the electromagnet of the grapple assembly.

9. The system of claim 8, wherein the control rod drive mechanism is configured and operable to maintain the drive rod in axial position when the drive rod extension is uncoupled from the drive rod via de-energizing the electromagnet.

10. The system of claim 8, wherein responsive to a loss of power to the electromagnet, the drive rod extension automatically uncouples from the drive rod extension grapple assembly and drops vertically while the drive rod remains stationary.

11. The system of claim 7, wherein the bottom end of the actuating shaft includes a locking mechanism comprising radially movable locking elements releasably engageable with the rod cluster control assembly, the locking elements movable between a locked position coupling the drive rod extension to the rod cluster control assembly and an unlocked position uncoupled from the rod cluster control assembly.

12. The system of claim 11, wherein the locking elements are radially movable between the locked and unlocked positions by raising or lowering the actuating shaft.

13. The system of claim 12, wherein the locking elements are locking balls which engage an annular groove formed on the rod cluster control assembly in the locked position.

14. The system of claim 7, wherein the control rod drive mechanism is mounted above a top head of the reactor vessel outside the reactor vessel and the grapple assembly is mounted below the top head inside the reactor vessel.

15. The system of claim 14, wherein the control rod drive mechanism is mounted to a flanged nozzle extending upwards from the top head of the reactor vessel.

16. The system of claim 7, wherein the drive rod extension extends axially from a location proximate to the top of a fuel core in the reactor vessel to a location spaced below a top head of the reactor vessel.

17. The system of claim 7, wherein the bobbin is configured and operable to enter a downwardly open cavity of the lifting head in a nested relationship.

18. The system according to claim 17, wherein the bobbin comprises an angled upper bearing surface which is abuttingly engageable with mating angled lower bearing surface disposed inside the cavity of the lifting head when the bobbin is nested in the lifting head.

19. The system according to claim 7, wherein the lifting head sleeve comprises an annular stop flange which supports the bobbin.

* * * * *